United States Patent [19]

Nielsen et al.

[11] Patent Number: 5,124,942
[45] Date of Patent: Jun. 23, 1992

[54] MACHINE INTERFACE WITH CYCLICALLY DISPLAYED HIERARCHICAL MENUS AND USER SELECTION OF MENU ITEMS BY ACTUATION OF A SINGLE SWITCH

[75] Inventors: Wyn Y. Nielsen, La Jolla; steven C. Carlin, Spring Valley; Dennis A. Kaiser, Escondido, all of Calif.

[73] Assignee: Solatrol, Inc., San Diego, Calif.

[21] Appl. No.: 255,156

[22] Filed: Oct. 4, 1988

Related U.S. Application Data

[63] Continuation-in-part of Ser. No. 250,841, Sep. 28, 1988, abandoned.

[51] Int. Cl.⁵ .............................................. G06F 15/46
[52] U.S. Cl. .................... 395/100; 364/927.62; 364/948.21; 364/921; 364/928.5; 364/DIG. 2
[58] Field of Search ... 364/200 MS File, 900 MS File, 364/144, 146, 188, 474.01, 474.22, 474.27, 518, 521; 340/792, 825.44

[56] References Cited

U.S. PATENT DOCUMENTS

| | | | |
|---|---|---|---|
| 4,024,531 | 5/1977 | Ashby | 340/792 X |
| 4,425,627 | 1/1984 | Eibner | 364/900 |
| 4,635,030 | 1/1987 | Ranch | 364/424.06 X |
| 4,660,032 | 4/1987 | Tsunoda | 340/792 |
| 4,660,037 | 4/1987 | Buchas | 340/792 |
| 4,723,207 | 2/1988 | Isobe et al. | 364/474.22 X |
| 4,727,473 | 2/1988 | Anderson et al. | 364/188 |
| 4,823,253 | 4/1988 | Shima et al. | 364/474.22 X |
| 4,846,597 | 7/1989 | Bryant et al. | 400/472 |
| 4,931,769 | 6/1990 | Philips et al. | 340/825.32 |

FOREIGN PATENT DOCUMENTS 2054909  2/1981  United Kingdom .......... 364/474.27

Primary Examiner—Thomas C. Lee
Assistant Examiner—Richard Lee Ellis
Attorney, Agent, or Firm—William C. Fuess

[57] ABSTRACT

A user interface, typically to an irrigation controller, prompts user responses by continuously autoscrolling questions. The questions are hierarchally organized, preferably in a hierarchal tree having approximately three to six questions on each hierarchal level between root and leaves. All command and data input may be done with only an OK/YES pushbutton switch, switches. Each OK/YES user response affirms the premise fo a currently-displayed question, and advances the autoscrolled questioning to a related branch upon a next hierarchal level. The NO pushbutton is never required to advance the questioning which is always autoscrolled, but instead serves, while depressed, to accelerate the autoscrolling of successive questions. A HELP response invokes context-sensitive help messages. A STOP response causes reversion in the hierarchy of questioning toward the root level, but does not stop the autoscrolling of questions.

42 Claims, 16 Drawing Sheets

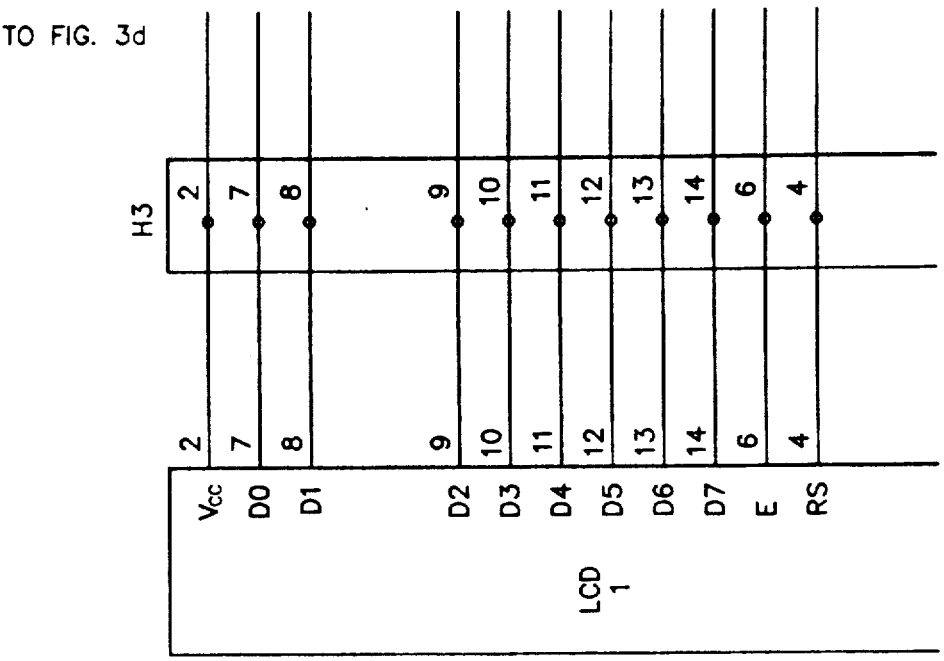
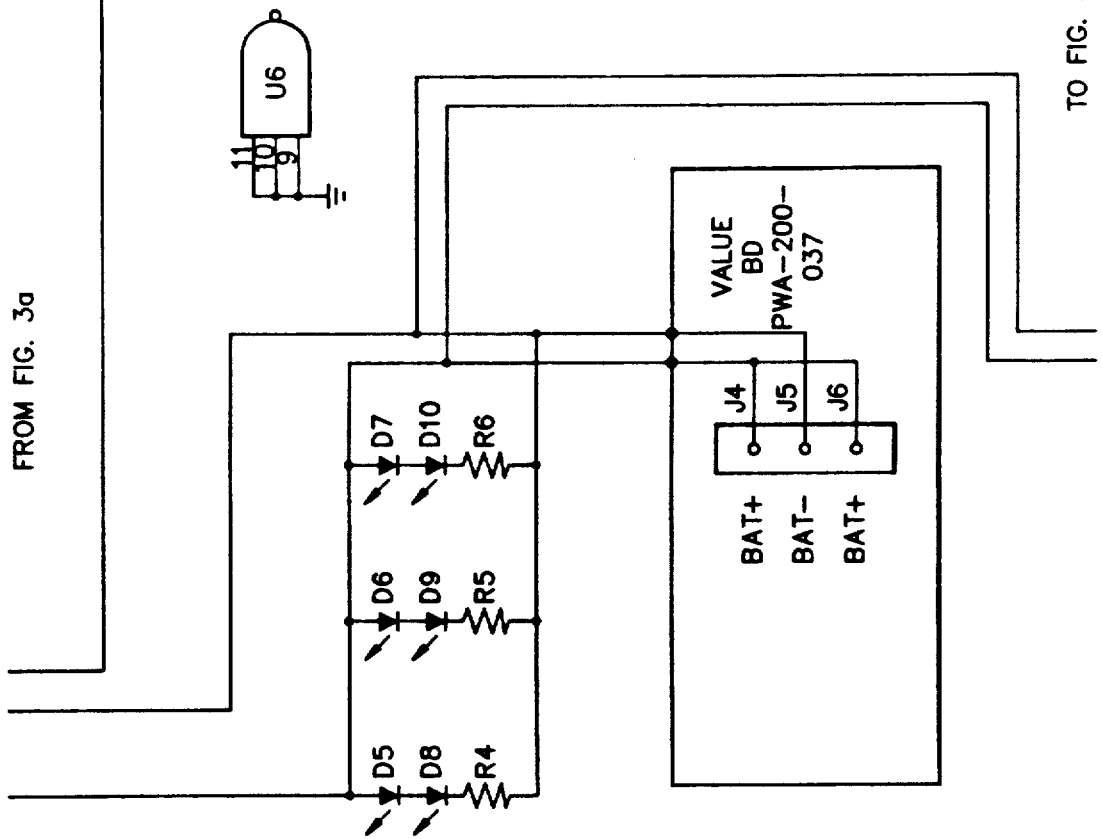
FIG. 3c

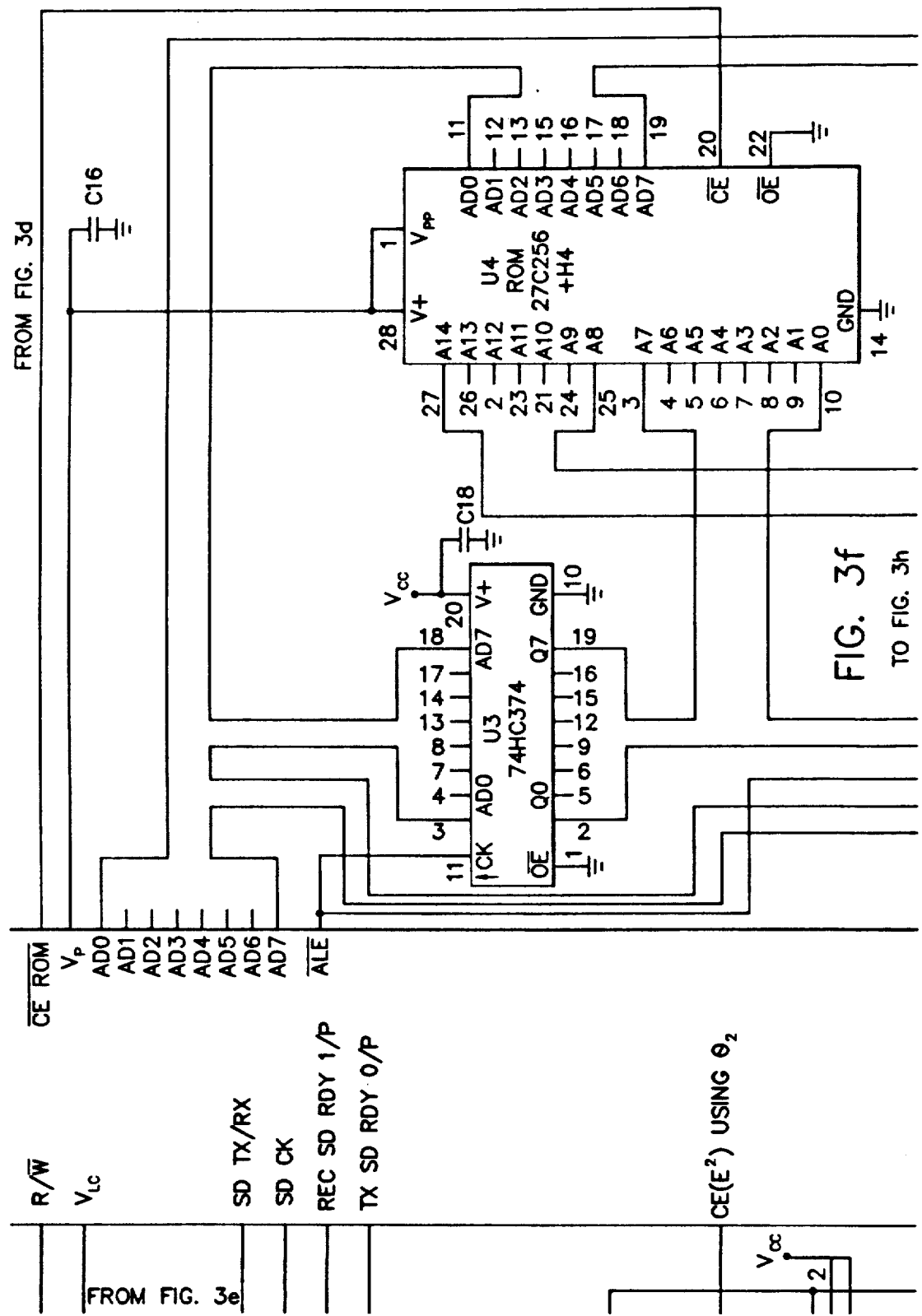

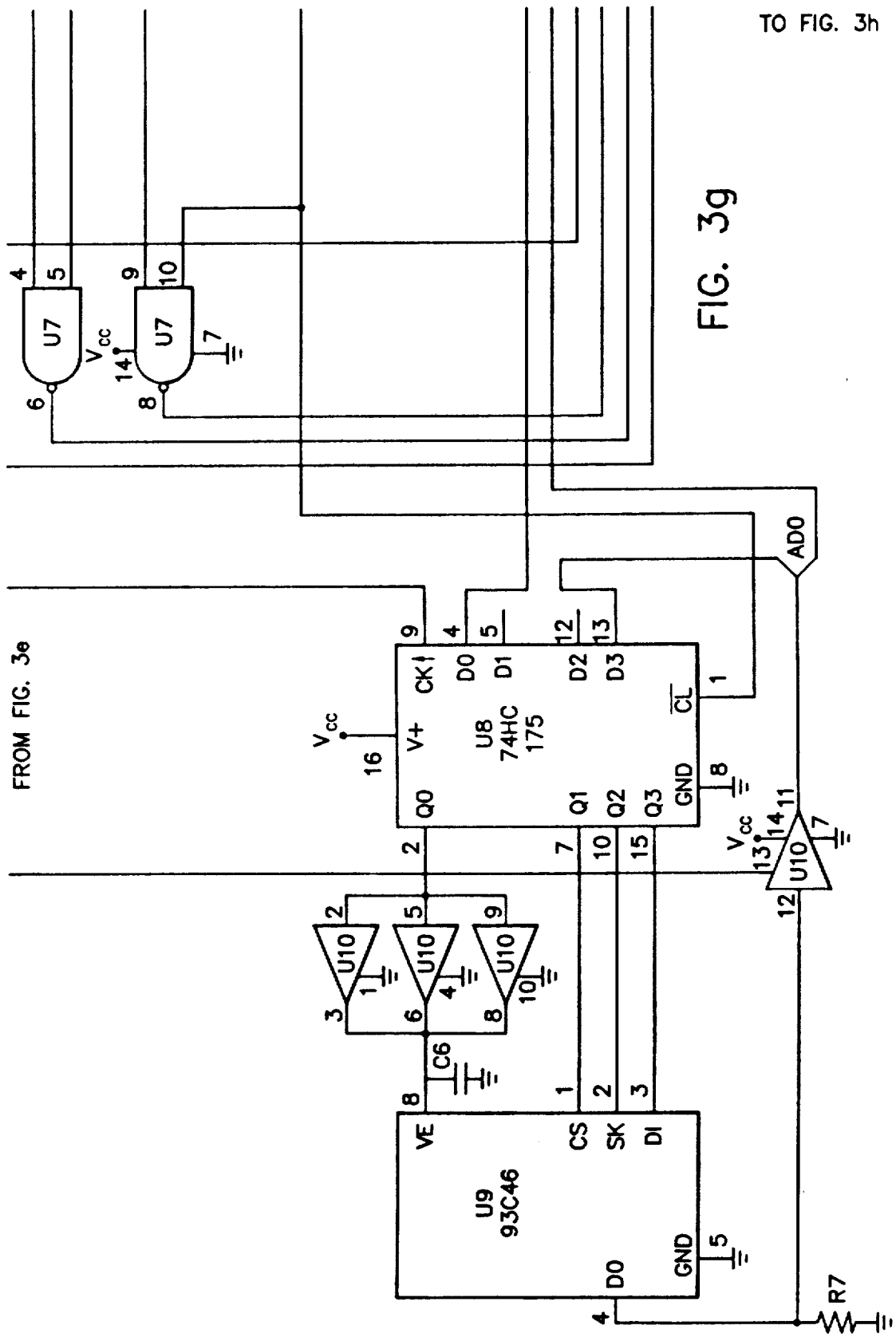

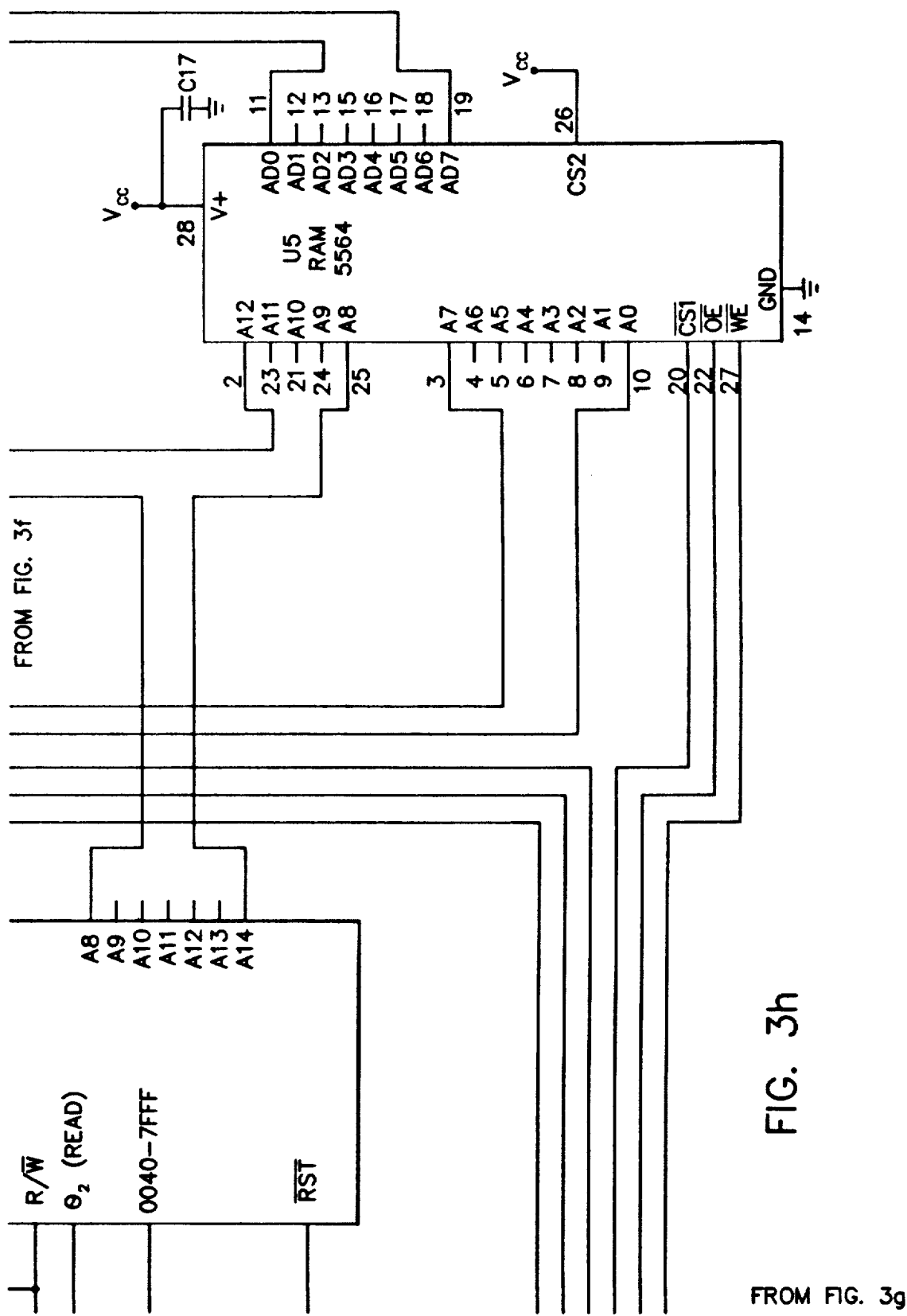

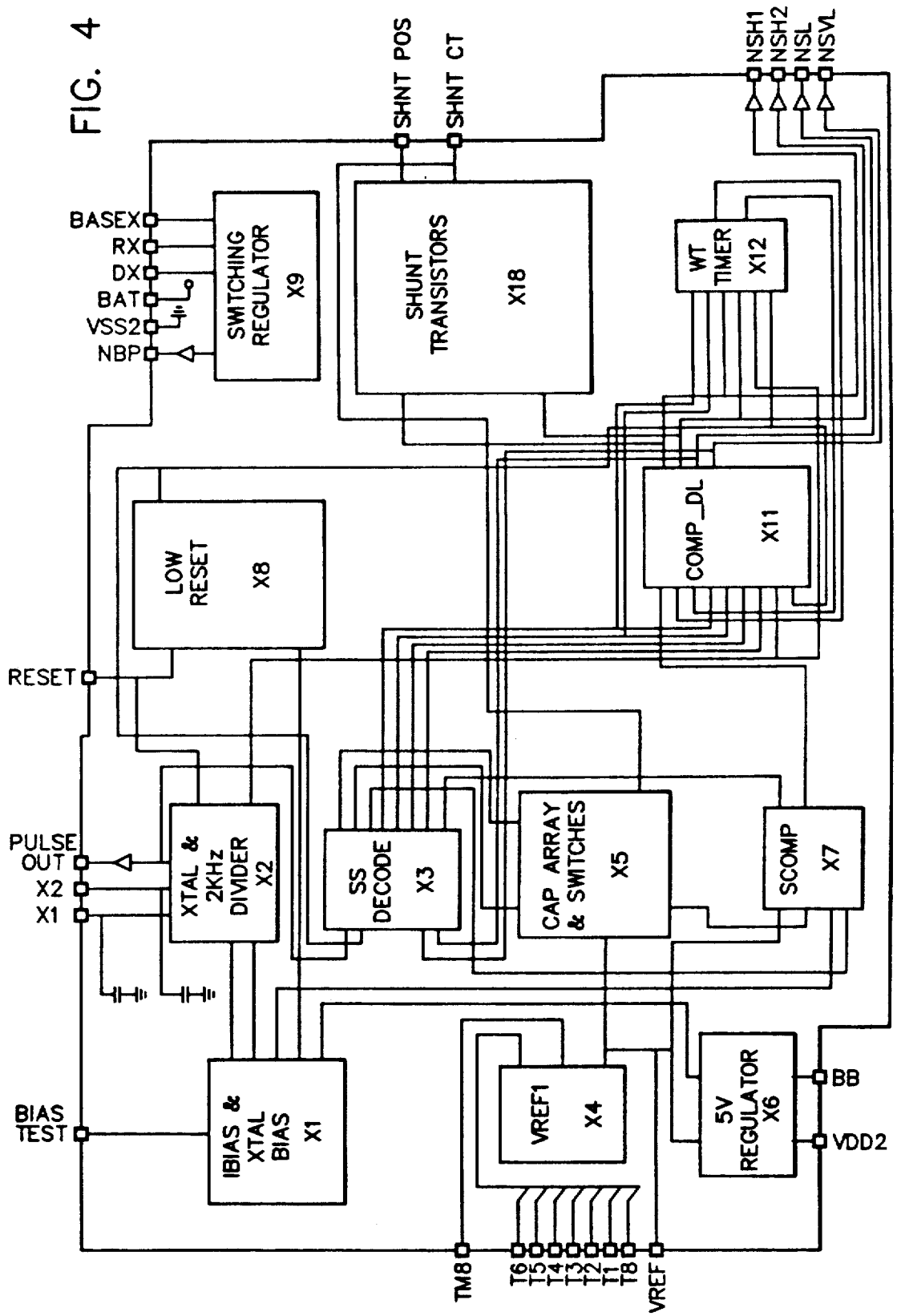

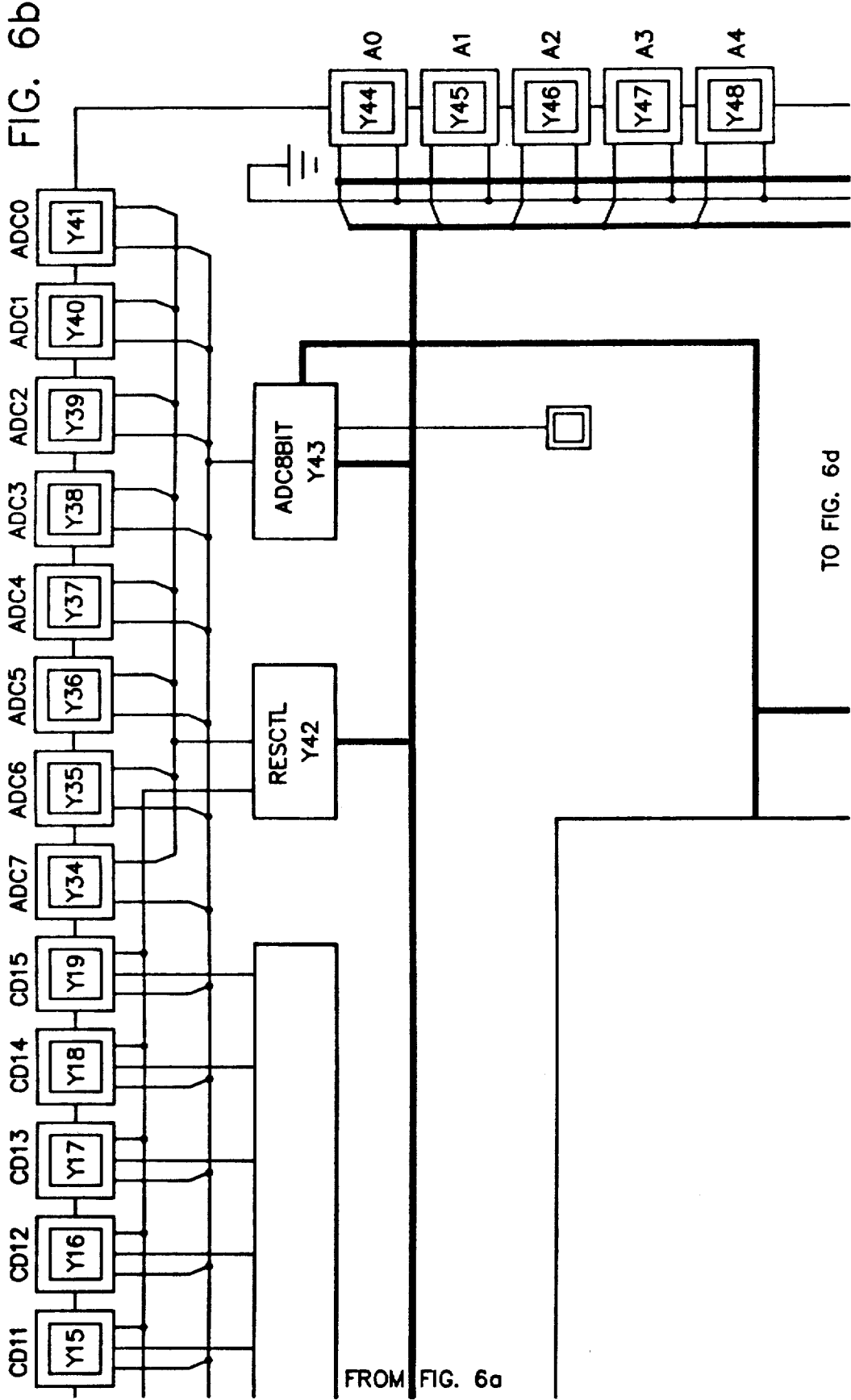

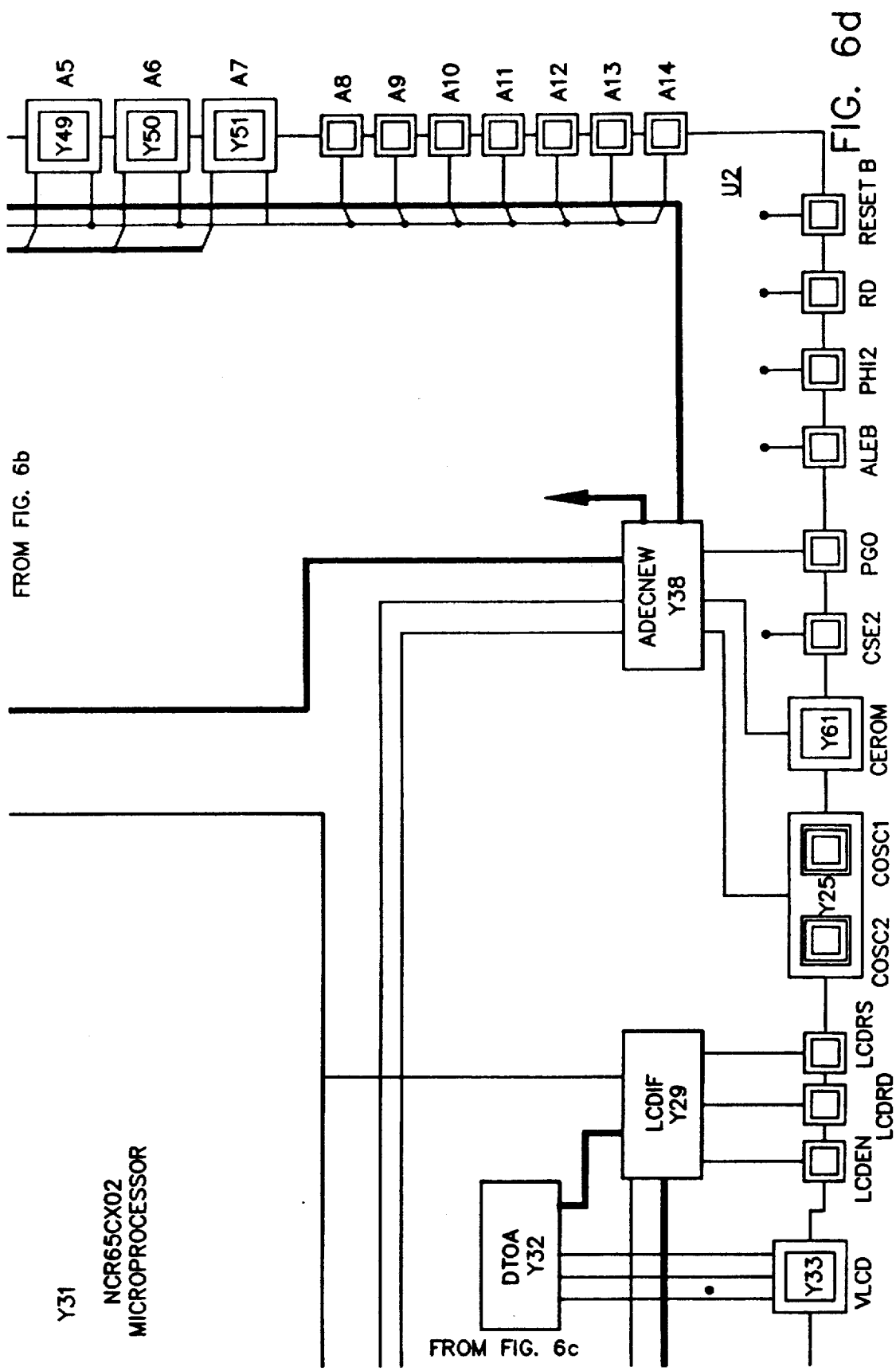

MACHINE INTERFACE WITH CYCLICALLY DISPLAYED HIERARCHICAL MENUS AND USER SELECTION OF MENU ITEMS BY ACTUATION OF A SINGLE SWITCH

The present patent application is a continuation-in-part of patent application U.S. Ser. No. 07/250,841, hereby incorporated by reference, filed Sep. 28, 1988 for a FLEXIBLY PROGRAMMABLE IRRIGATION SYSTEM CONTROLLER now abandoned.

BACKGROUND OF THE INVENTION

1.0 Field of the Invention

The present invention concerns electronic devices having a man-machine interface for the display of information and/or status and for the receipt of information and/or control. The present invention more particularly concerns man-machine interfaces where cost and physical size constraints limit the display size to a few words or lines, and where, for the same reasons, a full user keyboard is impractical.

2.0 Background of the Invention: Man-Machine Interfaces

The advent and widespread low-cost availability of microprocessors and other powerful digital logic building blocks has given rise to an astonishing array of products exhibiting machine "intelligence". This machine "intelligence" often takes the form of increased flexibility and responsiveness to particular user dictates. The user must make his/her dictates known to the machine through a man-machine interface. The man-machine interface desirably permits detailed user control of the machine.

If a machine is to be flexibly controlled by its user at its user interface then an extensive sequence of commands and/or data must typically be entered by the user into the machine. This information entry must typically be in accordance with rigorous procedures. The required exactitude is difficult to achieve, especially to the extent that the required entries are extensive, complex, or infrequently performed.

The goal of man-machine interface design is to permit effective and efficient communication between man and machine, considering the costs to both.

At one end of the spectrum of common interfaces between men and "intelligent" (meaning variably flexibly controllable) machines is the typical interface to a complex, multi-function, digital watch. This interface is characterized by having a very narrow information transfer bandwidth. The user must make large amounts of data and control information known to the watch through typically but a few pushbutton switches. A problem exists with this interface in that large numbers of people desiring to exercise the full functionality of a complex, multi-function, digital watch cannot effectively do so, or are deterred from doing so.

At the other end of the spectrum of common man-machine interfaces is the personal computer. Information is typically entered into the computer by a keyboard or tablet (mouse). The computer typically displays information, questions, and help messages upon a video monitor. The informational bandwidth of this interface is much wider than the informational bandwidth of the user interface to a digital watch. This wider informational bandwidth is required in order to support the relatively more complex tasks that are commanded and parameterized across the interface.

A notable characteristic of the man-machine interfaces exhibiting a relatively wider informational bandwidth, such as those of personal computers, is that the man can usually elicit prompts, questions, and/or help messages from the machine. This capability of the machine to guide the human in performing necessary procedures to enter information is designed to reduce the burden on the human, and to facilitate necessary communication.

In the middle of the spectrum of common man-machine interfaces exist a variety of relatively rudimentary interfaces which, although elementary, must support the human control and parameterization of machines of considerable functional complexity. Interfaces, and machines, in this middle range include common household appliances like microwave ovens and Video Cassette Recorders (VCR's).

A common strategy for implementing man-machine interfaces in this middle range is to use a large number of switches each of which is assigned to a particular datum, or function. Typically, a small display is controlled by the machine. A proliferation of dedicated switches costs money, and occupies considerable room. Nonetheless, when an appropriate multi-function display area shows at various times either prompts or status, and when additional display area is devoted to printed instructions and catalogs, most users manage to use this type of man-machine interface to good effect.

Sometimes, however, the control panels become crowded with switches. The functions enabled become increasingly arcane. The cross- compatibility between the user interfaces of different products becomes nonexistent, making a user unable to transfer his knowledge and experience from one product to another.

Another problem occurs with man-machine interfaces if the number of switches and/or the size of the display is limited (i.e., the information bandwidth is constricted), or if the complexity of the required control is high. This problem is exemplified by the typical interface to a VCR. A small display presents the VCR status and parameterization. Because the VCR can be set to initiate and to conclude actions, such as recording of television, at many different times, a great number of similarly-appearing time datums are variously multiplexed into the small display. The user tends to lose track of what times he/she has and has not specified, and also of his/her progress in the intricate stepwise procedures for selecting and setting a number of different timed occurrences. The programming is consequently often erroneous. The user's failure to have programmed the VCR as he/she desired or expected typically goes unrecognized until improper results are obtained. At this time recovery is often difficult or impossible.

SUMMARY OF THE INVENTION

The present invention contemplates the user programming of complex machine control and/or data sequences by having the machine ask a hierarchy of questions and collect from the user one response only: "OK/YES", meaning the affirmative. Three other user responses—NO, HELP, and STOP—may optionally be recognized by the machine. However, no other user response other than OK/YES is ever mandated because the machine autoscrolls its questions cyclically in endless loops in a completely automated manner.

This automated presentation of alternatives ensures that the user is exposed, in the form of hierchical questions, to all acceptable directives and/or datums, one hierchical level at a time, which may suitably be entered into the machine. The user simply adopts one alternative on each hierchical level by responding OK/YES to one question on that level.

The machine then steps, in a completely logical manner, to another series of questions upon the next level in the hierarchy. At the conclusion of the several user responses the machine may routinely have been programmed with control and/or data that is, in the aggregate, complex.

In accordance with the invention the hierarchy of questions asked by the machine is typically a hierchical tree exhibiting several hierchical levels between a root level and a leaf level. An OK/YES response to a question on one hierchical level causes a branching to a related series of questions upon the next hierchical level. Progress within the hierchical tree from root level to leaf level thus requires asking only such questions at each hierchical level as are appropriate to previous branchings within the hierchical tree. This is obviously efficient because only precisely pertinent questions are asked at each level of the hierchical tree.

In accordance with the invention the hierchical tree of machine-posited questions is typically not a binary tree. Instead, several questions of equal stature are preferably asked at each level, or rank, of the hierchical tree that normally exhibits several hierchical levels between a root level and a leaf level. The number of related questions at each level is normally not so many that the user is likely to forget the first-asked questions before the last questions are asked, and is typically approximately three to six. When the user responds OK/YES to any question, meaning that the question's premise is adopted by the user, then all questioning on that hierchical level ends and the machine progresses to a new series of questions upon a next hierchical level. The questioning so proceeds in a hierarchy from root to branches to twig to leaf levels, with one OK/YES response being accepted to one of the typically several questions at each level of the hierarchy.

When a question on the leaf hierchical level is ultimately affirmatively responded to then the machine will resume questioning at a higher hierchical level, including commonly at the root level.

In accordance with the present invention an optional NO switch—which switch is not required to advance the menu of questions which is autoscrolling—is used to accelerate the presentation of questions for so long as it is actuated. One problem with an autoscrolled presentation of questions, even hierchically organized questions, is that many questions must occasionally be asked before a question to which the user desires to respond affirmatively is asked. For example, it is distinctly not user-friendly for a user to wait to confirm an hour of 11:00 p.m. in response to autoscrolled questions regarding each of the twenty-four hours starting at 12 midnight. Meanwhile, each asked question must be held displayed with a latency time that is sufficient to permit the user to make an affirmative response, should he or she so desire. This problem tends to make the autoscrolling slow and the user bored, impatient, or frustrated. The present invention addresses this problem with the NO switch. Depressing the NO switch accelerates the sequencing of questions, normally by a considerable margin that is predetermined in advance in accordance with the complexity of the questions being asked. For example, complex questions formed from words might be accelerated in presentation by approximately 50% upon activating the NO switch. For example, simple questions involving successive numbers might be accelerated 80%. When the NO switch is released then the cyclic autoscrolled presentation of questions continues at the basic rate. It is, of course, not of any great consequence that a question to which an affirmative response was desired to be made should inadvertently be overrun by prolonged depression of the NO switch. This is because each series of questions are presented in an endless loop, and any one question will always come around to be asked again.

Despite the fact that all questions and their ordered hierchical presentations are always as clear and logically ordered as is possible, it is always possible that a user cannot understand what a particular question is asking. Therefore the present invention contemplates an optional HELP switch. Actuation of the HELP switch upon the presentation of any question causes the display of an expanded explanation of that question. After one or more autoscrolled help messages the user may, by response to still another question, either return to the main line of questioning or see the help messages again (or sometimes see still further help messages).

Actuation of the HELP switch at some or all root mode questions may typically result in help messages explaining the operation of the interface of the present invention. Mainly, the messages will explain that the user should attempt to answer the questions with the OK/YES switch.

The present invention further contemplates an optional STOP switch. Actuation of the STOP switch never stops the process of the machine, nor the autoscrolling of questions in the previously described "interactive" mode of machine operation. To so do would be antithetical to the present invention. (If desired a mere pause might be contemplated from actuation of the STOP switch, or from a PAUSE switch.) The STOP switch causes a retrenchment within the hierarchy of the autoscrolled questioning to a level closer to the root level than that hierchical level at which scrolling is presently proceeding. The STOP switch overrides or cancels affirmative responses made since this level closest to the root level was previously entered, and "wipes the slate" of information interchange either clean or partially clean. Successive actuations of the STOP switch always eventually bring the machine to the root level of the hierchical tree of questions. Once "automatic" operation of the machine has commenced, however, as the result of the previous user responses to questions, then actuation of the "STOP" switch will serve to halt this "automatic" operation. It does so by bringing the machine back into the "interactive" mode of machine operation with the root level questions proceeding to autoscroll.

The major attributes of a man-machine interface in accordance with the invention are susceptible of various different combinations. Each man-machine interface in accordance with the present invention will exhibit at least a display within which a multiplicity of datums, preferably in the form of questions, may be successively individually displayed. Each interface will also have an OK/YES switch or equivalent by which a man may make his affirmation or adoption of a currently-displayed datum known to the machine.

In one man-machine interface in accordance with the invention the display displays the multiplicity of datums that are particularly organized in a hierchical tree having a plurality of datums at each of a plurality of levels. An autoscrolling control, typically a microprocessor, causes the display means to automatically sequentially display one datum at a time of the plurality of datums that are upon a one hierchical level in an endless loop. In this interface the OK/YES switch is manually actuable for causing (i) adoption and use by the machine of a currently displayed one of the multiplicity of datums, and (ii) the display means to display a plurality of datums that are upon a next hierchical level to the hierchical level.

In another man-machine interface in accordance with the invention the display displays a multiplicity of datums one at a time. An autoscrolling control causes the display means to automatically sequentially display the multiplicity of datums one at a time. The OK/YES switch is manually actuable for causing the machine to adopt and use a currently-displayed one of the multiplicity of datums. Alternatively, a NO/NEXT switch is manually actuable for causing the autoscrolling means to cause the display means to automatically sequentially advance the display of the plurality of datums more rapidly, one datum at a time.

In still another man-machine interface in accordance with the invention the display displays a multiplicity of datums one at a time, and at other times a multiplicity of messages that are associated with the multiplicity of datums also one at a time. An autoscrolling control causes the display means to automatically display each of multiplicity of datums, or to alternatively display one of the multiplicity of messages and of an associated one of the multiplicity of datums, as the case may be. An OK/YES switch is manually actuable for causing the machine to adopt and use a currently-displayed one of the multiplicity of datums. A HELP switch is manually actuable for causing the display means to display a one of the multiplicity of messages that is associated with a currently displayed one of the multiplicity of datums.

Still another man-machine interface in accordance with the invention uses the NO switch to also mean "next", and thereby achieves advancement of the displayed datums without benefit of autoscrolling.

The man-machine interfaces and man-machine interfacing methods in accordance with the invention are perceived to be especially efficacious for control and parameterization of machines that require lengthy and logical, complex, control sequences. A machine requiring this type of sequence typically requires an instruction manual, and is opposite from machines requiring pure data entry such as, typically, telephones.

These and other aspects and attributes of the present invention will become increasingly clear upon reference to the following drawings and accompanying specification wherein:

BRIEF DESCRIPTION OF THE DRAWINGS

FIGS. 3a through 3h are a schematic diagram of the preferred embodiment of the irrigation controller in accordance with the present invention;

FIG. 4 is a block diagram of a first, U1, Application Specific Integrated Circuit (ASIC) used in the preferred embodiment of an irrigation controller in accordance with the present invention;

Figure 1:
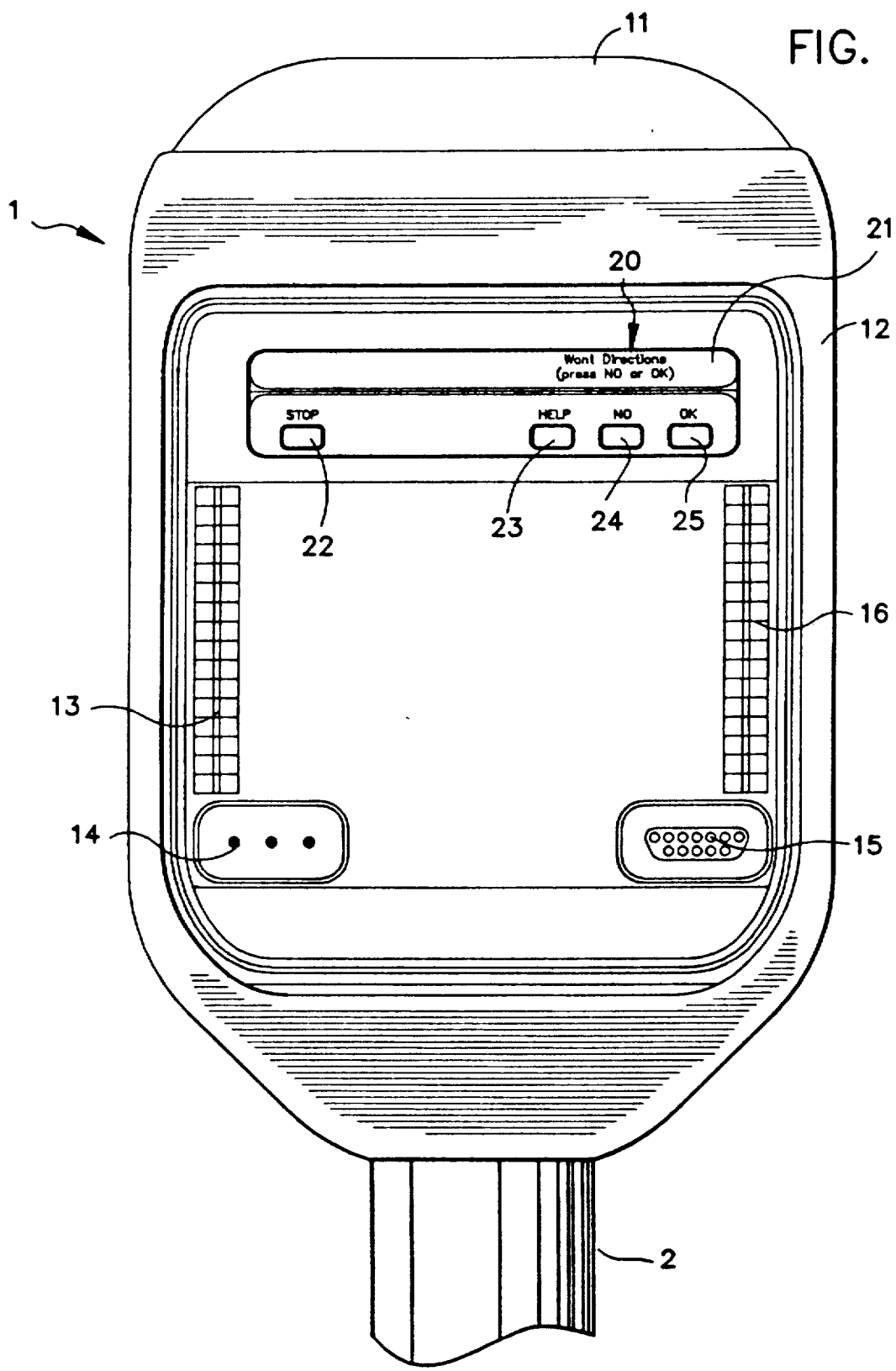
FIG. 1 is the block diagram showing elements of an irrigation system having an irrigation controller that is one preferred embodiment of an apparatus in accordance with the present invention.

DESCRIPTION OF THE PREFERRED EMBODIMENT 1.0 The Basic Principles of the Present Invention are Explained by Reference to the Control of a Microwave Oven The preferred embodiment of an apparatus in accordance with the present invention is an irrigation controller. The complex function of this irrigation controller, as hereinafter explained, serves as a demonstration of the power of the approach of the present invention for query/response user programming of sequences that are complex. However, it is not necessary to consider the complexities of irrigation control and irrigation controllers in order to understand the basic principles of the present invention. It is sufficient to discuss a simpler embodiment of the invention such as might be used to control, for example, a microwave oven.

The user interface in accordance with the present invention greatly simplifies operational control of an intelligent machine because (i) the user is constantly prompted by questions, and (ii) all command and data input may be done with just one, and preferably with two keys. Because of the simplicity of this interface, it has many potential applications. Any device which needs to be programmed with information, and which has a small display (no keyboard is required) can potentially use the interface of the present invention. The device is typically controlled by a microprocessor. Examples of possible applications include home appliances such as microwave ovens, and entertainment electronics such as Video Cassette Recorders (VCR's).

The key features of the new user interface and how it might be applied to a microwave oven are as follows. All data entry and review for the microwave oven is accomplished by actuating two switches only, namely an affirmation/selection or "OK/YES" switch, and a switch for causing the acceleration of the presentation of successive questions, or "NO" switch.

A microwave oven might also beneficially use two additional switches, namely "HELP" and "STOP" switches The "HELP" switch could elicit context sensitive help messages. The "STOP" key could serve as a universal "exit" or "stop current action" key. A microwave oven even optimally also have a fifth switch, a "START" switch, although this function could easily be handled with a "Do you want to start now?" question.

There is a natural tendency for the user to occasionally answer "NO" to questions posited. No harm is ever done by a correct "NO" response The most that will happen is that the cyclic presentation of questions will immediately advance, without waiting for a normal latency period. It should be recognized that a "NO" response is never required to reject the posited option, or to advance the course of the machine's asking of questions.

The microwave oven's display initially cycles continuously between the questions:

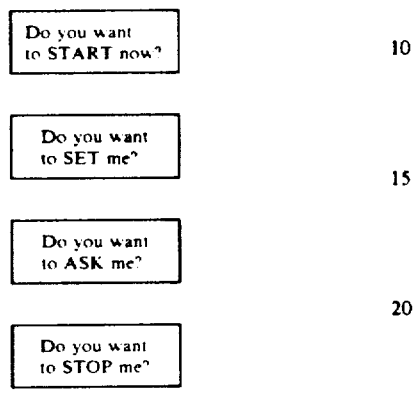

until one question is answered O.K./YES. The display then commences to autoscroll questions in the appropriate next branch of the hierarchical tree of questions.

The autoscrolling of the display datums, or questions, is controlled by an autoscroller control circuit, typically a microprocessor. The microprocessor typically simulates to its own operating firmware program the occurrence of an equal condition as would normally, in other man-machine interfaces, be expected from manual actuation of a NO/NEXT switch. Such actuations of a NO/NEXT switch would indicate "currently displayed datum is not adopted, advance to next datum". In the present interface these actuations are simulated, at a predetermined rate, by firmware. The NO/NEXT switch assumes a new function, now called NO (only) which serves to accelerate the simulated actuations, and resultant presentation of datums.

The microwave user will always know all choices possible because all questions will automatically self-advance (after a pause to let the user accept or reject the question's premise). Control options will cycle in a continuous loop until the user selects one of the options by activating the OK/YES switch. Under certain conditions, such as during a cooking cycle, the control options could be limited so that, for example, only the "STOP ME?" question might be displayed. To remind the user that he/she must present OK/YES to select an option, a microwave oven may present a blinking question mark (?) or "OK" symbol displayed on screen along with each option as the options are displayed one at a time.

A hierarchical tree for control and parameterization of a microwave oven might be constructed, at least at initial levels of the hierarchy, substantially as shown on Table 1. The nodes of the hierarchy are not expressed as questions in order to make the structure of the hierarchical tree more visible. However, it should be understood that all nodes can be, and are, preferably expressed as questions complete with a question mark (or other identifying indicia).

In accordance with the invention the asked questions may be global or specific. A global question asks whether a user desires to adopt a particular course of machine control.

TABLE 1

HIERARCHY OF CONTROL FOR A MICROWAVE OVEN

START?
SET ME?
    COOK?
        BY TIME?
            SET TIME (HOURS CYCLE)
            SET TIME (MINUTES CYCLE)
            SET LEVEL (LEVELS CYCLE)
        BY TEMPERATURE?
            SET TEMP (TEMPERATURES CYCLE)
            SET LEVEL (LEVELS CYCLE)
        BY "AUTO-COOK"?
            BAKE - PRESET PROGRAM #1?
            ROAST - PRESET PROGRAM #1?
            SLO COOK - PRESET PROGRAM #1?
            SIMMER - PRESET PROGRAM #1?
            (ETC.)
    DEFROST?
        TIMED DEFROST?
            SET TIME (HOURS CYCLE)
            SET TIME (MINUTES CYCLE)
            SET LEVEL (LEVELS CYCLE)
        PULSED DEFROST?
            SET TIME (HOURS CYCLE)
            SET TIME (MINUTES CYCLE)
            SET LEVEL (LEVELS CYCLE)
    TIMING?
        SET CLOCK
            SET HOUR OF DAY (HOURS CYCLE)
            SET MINUTE OF HOUR (MINUTES CYCLE)
        SET START TIME
            SET HOUR OF DAY (HOURS CYCLE)
            SET MINUTE OF HOUR (MINUTES CYCLE)
ASK ME?
    DIRECTIONS?
        ABOUT USING OVEN?
        ABOUT TIMED COOKING?
        ABOUT COOK TO TEMP?
        ABOUT "AUTO-COOKING"?
        ABOUT TIMED DEFROST?
        ABOUT SETTING CLOCK?
    COOKING HISTORY?
    MONTHLY POWER USE?
    OVEN SELF-TEST?
STOP ME?

For example, "Do you want to start?", "Do you want to set me?", "Do you want to ask me?", and "Do you want to stop?" would besuitable global questions for the control of a microwave oven. Specific questions ask whether a user adopts a particular datum for input to the machine. For example a display that autoscrolls through times of 12:00 midnight?, 1:00 a.m.?, 2:00 a.m.?, 3:00 a.m.?, etc. is asking the user to select an hour which he/she desires to enter into the machine. All questions both global and specific are always explicit, and never implicit.

Efficient recovery from inadvertent erroneous responses can always be made. Although an erroneous response to a global question may not be immediately subject to retraction, intermediary levels in the hierarchy of questions occasionally contain escape questions, as appropriate, which, when responded to affirmatively, result in a reversion of the hierarchical questioning to previous levels, and typically to the root level.

In any case, the present invention further contemplates user confirmation of his/her responses. Affirmative responses to specific questions at the leaf level are particularly subject to confirmation. This confirmation is itself occasionally in the form of an affirmation question followed by a disaffirmation question. (If desired, these confirmation questions can be considered to exist at the leaf level, and prior specific questions can be considered to exist at the twig, or branch level.) An affirmation question seeks ratification of the prior responses. It autoscrolls to a disaffirmation question asking if the answer now developed, and/or the control branching previously undertaken because of successive affirmative responses, is now disavowed.

If the prior affirmative responses are disavowed, in whole or in part, then the machine will revert to questioning on a previous hierarchical level. When the hierarchy is deep, and the levels many, the machine will typically revert to questioning at an intermediary branch, twig, or leaf level. From these levels it is always possible to retrench still further, and ultimately back to the root level questions. When the hierarchy is shallow, and the levels few, the disavowal of prior responses that results from an affirmative response to the disaffirmation question typically results in reversion to the root level questioning.

Certain attributes of the hierarchy shown in Table 1 are immediately observable. First, the number of levels in the hierarchy that are entered during any one programming episode varies with the response to certain questions. An affirmative response to the "START?" or "STOP?" question is an end in of itself, and does not normally cause progression further into the hierarchy (forebearing the conduct of confirmation, discussed below). For other responses, such as the setting of cooking time, more extensive levels of the hierarchy are entered.

Second, confirmation questioning (which is only implicit in Table 1) is performed or not performed as appropriate. An affirmative response to the "START ME?" or "STOP ME?" questions will typically not result in the conduct of confirmation, and the microwave will typically immediately respond by simply starting or stopping. Curiously, even as the microwave oven does so start or stop the root level questions will still cycle. This means the user does not derive feedback to his affirmative response from the display which continues to cycle. It is thus typical to turn on a light upon starting, or turn off a light and sound a bell upon stopping in order to provide feedback to the user that his command was accepted.

Next, it may be noted that some final, or leaf level, questions have to do with control, e.g. "Do you want directions about timed cooking?". Meanwhile other leaf level questions have to do with data, e.g. "Do you want timed cooking for 0 hours 0 minutes?, Do you want timed cooking for 1 hours 0 minutes?", etc. Control and data are both forms of information. The questioning method of the present invention permits the machine acceptance of both control and data by the user's affirmative responses.

Next, it may be noted that the nature, and conduct, of confirmation is not rigorous. Confirmation varies. Sometimes the user is not offered the opportunity to confirm his directives. Instead, the machine simply starts, or simply stops, or simply commences to display help messages, all as the user's affirmative response has directed. In other words the user need not both make an affirmation, and subsequently affirm his/her affirmation, just to start (or stop) the microwave. The user need not press OK/YES twice to start (or stop).

Sometimes, however, the user will be offered the opportunity to confirm his directives. For example, the user will be posited a confirmation question such as "Time cook 1 hour 25 minutes, OK?". The "OK?" portion of the message means "do you confirm".

When confirmation is offered then disavowal is usually by the optional NO switch (if implemented), but may be by an affirmative response to a disaffirmation question. This subtle point deserves consideration. All control and data that is entered into a machine by a man using the man-machine interface in accordance with the present invention can be achieved solely by selective affirmative responses to questions, each by actuation of the OK/YES switch. The "NO" switch is not required. Confirmation could be by use only of the OK/YES switch. In such a case the question "Time Cook 1 hour 25 minutes, OK?" would be followed by "Reset time cook?". If the previously entered time is desired to be disavowed then it is obviously the second question that would be answered OK/YES.

A "NO" switch is, however, commonly used for disaffirmation during confirmation questioning because application of the fundamental principles of the present invention need not be, is desired not to be, and is not intended to transpire in a hidebound and iconoclastic manner. For example, consider the elective conduct of confirmation questioning. Confirmation is typically not required after a directive (e.g., "START!", "STOP!") nor after simple selection sequences (e.g., "Cook?", "Defrost?"). Confirmation is usually required after related entries, such as time-of-day, that are made piecemeal. The general "look and feel" of the man-machine interface to the user during confirmation is such that the user seldom thinks about whether he is being asked about matters de novo or is instead being asked to confirm his/her prior responses. All communication proceeds normally, and naturally.

The same principles of flexibly maintaining smooth communication are applicable to the machine treatment of actuations of the optional NO, HELP, or STOP switches. Suppose a powered-on microwave oven is cycling through its root level questions (shown at the left most column of FIG. 1) and someone is pressing, and repressing, the optional "STOP" switch. What is it likely that this person wants? Does the person want to continually revert to the first root level question "Do you want to START me?"? Of course not. The question person, perhaps in a panic stricken state, is probably trying to turn off the microwave. This turn-off would otherwise be accomplished by an affirmative response (depressing the OK/YES pushbutton switch) to the root level question "Do you want to STOP me?". In accordance with the probable user intent, the implementation of a man-machine interface in accordance with the present invention is not hidebound in insisting that all control and communication must invariably transpire through the OK/YES switch. Instead, the interface will generally respond to each switch as is appropriate for the current progress of questioning in the hierarchy of questions in consideration of the operational state of the machine. For the example of pressing the "STOP" switch on the microwave at its root hierarchical level, the microwave oven will be turned off. The user is not concerned with an analysis of the logic, and logical consistency, of the machine function. To him or her the machine response appears normal, and friendly.

The man-machine interface in accordance with the present invention cannot be misdirected sufficiently so as reach a communications impasse between man and machine. A machine, in accordance with the present invention, that is programmed to ask the hierarchy of questions simply considers, for each question, what a user probably wants if he/she activates any of the OK-/YES, NO, HELP, or STOP switches while that question is displayed. A program jump table is constructed accordingly. All jumps are taken not to some program location wherein the machine sits deadenly, waiting for input from a user who doesn't or can't understand where the machine is and what he/she must do next, but instead to a program location that causes the cycling of questions. The interface never, never goes "dead" or "dumb".

The ability of the man-machine interface in accordance with the present invention to adroitly step up and down the staircase levels of a hierarchical tree no matter what switch is pushed is one reason why people who have never seen or exercised the interface, and who commonly make many "mistakes" in their attempts to use the interface, can nonetheless accomplish satisfactory machine control and parameterization by use of the interface.

The autoscrolled presentations of the hierarchically organized questions and the optional help messages constitute a sufficiently powerful form of man-machine interfacing so as to be, in many cases, self-teaching. A person who has never seen a VCR, a microwave oven, an irrigation controller, or any other machine employing a man-machine interface in accordance with the present invention is anticipated to be able to attain some success at communicating with the machine totally without instruction. Hitherto challenging machine control and parameterization exercises like setting the time-of-day clock on a VCR are anticipated to be extremely straightforward.

2.0 Features and Benefits of the Preferred Embodiment of Man-Machine Interface in Accordance with the Present Invention The preferred embodiment of a man-machine interface in accordance with the present invention is incorporated in an irrigation controller. This irrigation controller in accordance with the present invention is light-energized with a built-in incident light collector. It exhibits sufficient energy storage to drive a custom CMOS ultra-low-power microcomputer with 32K RAM memory and to cycle up to eight (8) ultra-low-power irrigation valves up to sixteen (16) times per twenty-four (24) hour period. This provides complete independence from any need for AC power, saving on energy and installation costs and permitting the controller to be located closer to the valves.

An easy to read two-line LCD display with automatic prompting (questioning) in accordance with the present invention is implemented. The user is guided through the programming process with easy to understand two-line "prompts," thus substantially eliminating confusion, mistakes, and requirements to repeatedly reference printed or human authority.

Two-button programming with "best guess" defaults is used for all settings. All programming is done by answering simple questions with OK or NO answers in accordance with the present invention. The controller automatically gives the user "best guess" defaults where applicable.

An on-line help feature in accordance with the present invention gives directions and information for each operational mode and parameter insertion. These on-line help messages are available at any time by pressing a HELP key.

The design is modular in that multiple 8-valve-station controller units can be integrated together. The individual 8-valve-station controller units can be networked together into optionally radio-linked centrally controlled systems, or, alternatively, multiple unrelated controllers on various sites can be centrally managed by optional multi-programming equipment.

Each of the 8 stations for a single controller unit can be independently programmed within one of six different runtime modes (Mini, Autosplit, Ration, ISC, One-Time, and Special. This gives the Irrigation Controller great programming flexibility. Options for (i) simplified "Mini" setups, (ii) "Autosplit" setups with automatically programmed split cycles and sequential non-overlapping operation, (iii) "Ration" setups for odd/even (day of month) water rationing, (iv) "ISC" setups with complete independence between stations, (v) "Special" setup for lights, fountains, and pump-start relays, (vi) periodic or one-time "Add-on Soak Cycle" setups, and (vii) for multiple "Add-on Syringe Cycle" setups are implemented.

Controller timing control of the irrigation valves is from 1 minute to 240 minutes in one minute increments. Thus one minute precision in starting or stopping irrigation is combined with the ability to set watering durations of up to 4 hours for each start time. One-time or periodic "soak cycles" can have a duration of up to 8 hours.

A calendar is maintained based on "perpetual calendar" data in permanent memory. Schedules may be established for specific days or every "so many" days. This permits flexible day cycles for irrigation, and allows different stations to operate on different day cycles.

Up to 128 automatic starts per day are enabled, thereby meeting the most demanding applications.

The controller's split cycle capability permits watering times to be split into up to 16 substantially equal increments. This minimizes runoff and puddling by splitting the programmed watering duration into shorter cycles each of which is separated by a programmable minimum "off" time.

A System Budgeting Factor of 10 to 200% acts to determine the numbers of split cycles. The System (water) Budgeting Factor increases or decreases the number of split cycles instead of acting as a total duration multiplier which can lead to runoff and puddling. Monthly budgeting with preset default values for each month is also available. This allows an entire year's scheduling to be set up.

An Integrated Moisture Sensor control with programmable "wet" and "dry" trigger levels is optionally implemented for each valve station. This keeps the soil moisture level for each valve within the optimal range for the growth of the type of vegetation being watered by that valve, instead of merely using the optional moisture sensors as switches to override cycle starts.

Automatic sequential program generation permits "Excluded Time Intervals". The controller automatically generates a sequential matrix of start times for all active valves and split irrigation cycles based on user input for determined total watering durations by valve, either site information selection or operator entered number of split cycles, and on any user-defined "Excluded Time Intervals" when no watering is desired.

For very simple applications a "Mini" setup is available. This simple setup mode is extremely easy to use, and it is designed for applications where some of the more sophisticated features of the controller are not needed.

All valve stations can be programmed totally independent of one another in the "ISC" setup mode. This allows individual stations to be watered at different times on different days, and it also allows several stations to be running simultaneously for special applications where there are no hydraulic pressure or supply limitations. Another option, the "Special setup", can be used for control of non-valve devices such as pumps, or lighting equipment.

One-time or periodic "Soak" cycles can be overlaid on any regular watering program. This feature can be used for watering in fertilizer, for periodically deep watering trees and shrubs in turf areas, and for periodically leaching salts in drip applications.

Multiple daily cooling or frost-wipe "Syringe" cycles can be overlaid on any regular watering program for any preprogrammed month(s) when needed. These cycles help prevent wilting and scorching of plant materials during hot summer months or damage from freezing or morning dew in cold weather months.

Even and odd days can be automatically excluded as watering days in the "Ration" setup mode. This allows for odd/even water rationing schedules to be easily programmed where this is mandated by law.

A programmable "Delay Start" permits watering to be suspended for up to 14 days during rainy weather, and at the end of the programmed "Rain Delay" the regular watering schedule will automatically resume.

A special "View Info" mode allows the user to review all settings or to view an event report which displays the controller history and current operational setup. This permits the user to easily review the current controller settings or to view a list of the last 128 events (watering cycles, program changes, etc.) in chronological order starting from the earliest event.

Built-in wire continuity and short testing, system self-test and report functions are implemented. The user is alerted if shorted or open valve wires exist, and the unit performs a self-diagnostic test when requested.

A "Test Sequence" allows each valve to be operated in sequence for one to ten minutes. This allows the irrigation system to be easily periodically tested. The STOP key lets the operator immediately stop the test sequence if broken sprinklers or pipes are found.

Both valve stations and sensors can be operated automatically, semi-automatically, or manually. In semiautomatic mode, all or selected valves can be run once using the "One-Time" setup. This allows the user to do a onetime soak for watering in fertilizer or new plantings. The controller then automatically reverts to the automatic "Run" mode.

Three level access codes provide security and render the controller useless if stolen. Separate codes for gardeners, supervisors, and factory personnel insure that only authorized individuals can change the controller settings, and that codes can be easily changed as operating personnel change.

2.1 Functions Performed by the Preferred Embodiment of an Irriqation Controller In Accordance with the Present Invention The preferred embodiment of an irrigation controller in accordance with the present invention (i) receives specified information; (ii) makes decisions and performs calculations based on the specified information; (iii) typically displays the decisions and results derived in order that such may be, if desired, manually changed or modified; (iv) generates irrigation schedules for one or more irrigation stations in accordance with calculated results and (v) conducts irrigation in accordance with the generated schedules.

Information may be specified to the controller by manual data entry or by the download of information (and/or firmware operating programs) through communication ports of the controller.

The calculations are performed by a microprocessor, embedded within one of the Application Specific Integrated Circuits of the controller, that operates under control of firmware instructions resident within any of ROM, RAM, and EE memories of the controller.

2.1.1 Basic Function of Settinq Up an Irriqation Schedule

The preferred embodiment of an irrigation controller in accordance with the present invention accepts high level information regarding the irrigation site and equipment. This high level information typically concerns (i) soil type, (ii) type of sprinkler or irrigation head, and (iii) terrain.

From these informational inputs a table lookup is performed to determine (i) the maximum "on" time of an individual irrigation watering time and (ii) the minimum "off" time between successive irrigation cycles. A typical table with times in minutes is as follows:

TABLE 1

| HEAD TYPE | Lookup Table for "On" and "Off" Times of Irrigation Split Cycles | | | | | | | | |
|---|---|---|---|---|---|---|---|---|---|
| | MAX ON | | | | | | MIN OFF | | |
| | LEVEL SAND | HILLY SAND | LEVEL LOAM | HILLY LOAM | LEVEL CLAY | HILLY CLAY | SAND | LOAM | CLAY |
| FLAT SPRAY | 3 | 3 | 6 | 3 | 3 | 2 | 30 | 30 | 30 |
| LAWN SPRAY | 5 | 5 | 9 | 5 | 5 | 3 | 30 | 30 | 30 |
| ROTOR | 8 | 8 | 16 | 8 | 8 | 5 | 30 | 30 | 30 |
| IMPACT | 8 | 8 | 16 | 8 | 8 | 5 | 30 | 30 | 30 |
| STREAM SPR | 8 | 8 | 16 | 8 | 8 | 5 | 30 | 30 | 30 |
| MICROSPRAY | 10 | 10 | 20 | 10 | 10 | 7 | 30 | 30 | 30 |
| DRIP | 30 | 30 | 60 | 30 | 30 | 30 | 30 | 30 | 30 |

(The maximum ON values in this lookup table were calculated by dividing the maximum precipitation rate for each type of sprinkler into the minimum percolation rate typical for each type of soil, and multiplying by 60 to convert to minutes. Since sandy soils require more frequent irrigation than loam soils because of their low moisture holding capacity, the same maximum ON values were used for sand as for clay even though sand has a much higher percolation rate than clay. Loam has the proper balance of percolation rate and moisture holding capacity, and thus the maximum ON times for loam are longer than for either sand or clay. The minimum OFF times are based on field observation.)

The preferred embodiment of the irrigation controller further receives, e.g., by manual data input, a specification of the desired total irrigation time duration for each station. The controller calculates the number of irrigation cycles within the irrigation schedule for that station as:

$$\text{\# cycles} = \frac{\text{total irrigation time duration}}{\text{maximum "on" time duration}}$$

For example, for a station irrigating hilly terrain, loam, soil, with a microspray irrigation head the number of cycles for a total irrigation watering time of 30 minutes is:

$$\text{number of cycles}_{station\ n} = \frac{30\ \text{min}}{10\ \text{min}} = 3\ \text{cycles (of 10 min each)}$$

The irrigation controller may optionally display the irrigation cycle time and number of cycles. The number of cycles may be fractional. In such cases the duration of the last cycle is truncated, so that the total of all the split cycles always exactly equals the duration entered by the user.

The preferred embodiment of the irrigation controller then proceeds by use of (i) the minimum irrigation "off" time, and (ii) the maximum irrigation "on" time that now becomes the duration of an optimal, normal, non-partial irrigation cycle (both quantities derived by table lookup) and (iii) the calculated number of irrigation cycles, to generate the irrigation schedules. The manner of this schedule generation is to (i) allocate irrigation cycles for any one station as "on" times followed by "off" times until the calculated number of irrigation cycles ensue, insofar as (ii) the necessary and prioritized scheduling of irrigation cycles for other stations permits. These rules are best illustrated by example. If, for example, station 1 is a sole station that should, in accordance with the previous example of hilly terrain loam soil with a microspray irrigation head, irrigate for 3 cycles of 10 minutes, each cycle separated by 30 minutes between cycles, an irrigation schedule would be generated as follows:

| Time | | Station #1 | Station #2 | ... | Station #8 |
|---|---|---|---|---|---|
| 12:00 | mid. | on | off | | off |
| 12:05 | | — | — | | — |
| 12:10 | | off | — | | — |
| 12:15 | | — | — | | — |
| 12:20 | | — | — | | — |
| 12:25 | | — | — | | — |
| 12:30 | | — | — | | — |
| 12:35 | | — | — | | — |
| 12:40 | | — | — | | — |
| 12:45 | | — | — | | — |
| 12:50 | | — | — | | — |
| 12:55 | | on | — | | — |
| 1:00 | am | — | — | | — |
| 1:05 | | off | — | | — |
| 1:10 | | — | — | | — |
| 1:15 | | — | — | | — |
| 1:20 | | — | — | | — |
| 1:25 | | — | — | | — |
| 1:30 | | — | — | | — |
| 1:35 | | — | — | | — |
| 1:40 | | — | — | | — |
| 1:45 | | — | — | | — |
| 1:50 | | on | — | | — |
| 1:55 | | — | — | | — |
| 2:00 | | off | — | | — |
| 2:05 | | — | — | | — |

| Time | Station #1 | Station #2 | ... | Station #8 |
|---|---|---|---|---|
| etc | | | | |

The last irrigation by station #1 was during the period 1:50 to 2:00 a.m. The cycle recommences the following day.

If station #2 is also enabled under the same circumstances the combined irrigation schedules will be as follows:

| Time | | Station #1 | Station #2 | ... | Station #8 |
|---|---|---|---|---|---|
| 12:00 | mid. | on | off | | off |
| 12:05 | | — | — | | — |
| 12:10 | | off | on | | — |
| 12:15 | | — | — | | — |
| 12:20 | | — | off | | — |
| 12:25 | | — | — | | — |
| 12:30 | | — | — | | — |
| 12:35 | | — | — | | — |
| 12:40 | | — | — | | — |
| 12:45 | | — | — | | — |
| 12:50 | | — | — | | — |
| 12:55 | | on | — | | — |
| 1:00 | am | — | — | | — |
| 1:05 | | off | on | | — |
| 1:10 | | — | — | | — |
| 1:15 | | — | off | | — |
| 1:20 | | — | — | | — |
| 1:25 | | — | — | | — |
| 1:30 | | — | — | | — |
| 1:35 | | — | — | | — |
| 1:40 | | — | — | | — |
| 1:45 | | — | — | | — |
| 1:50 | | on | — | | — |
| 1:55 | | — | — | | — |
| 2:00 | | off | on | | — |
| 2:05 | | — | — | | — |
| | | etc. | | | |

The last irrigation was by station #2 was during the period 2:00 to 2:10 a.m. The cycles recommence the following day.

If the full eight stations are all enabled under the same circumstances then the combined irrigation schedules will be as follows:

| Time | | Station #1 | Station #2 | ... | Station #8 |
|---|---|---|---|---|---|
| 12:00 | mid. | on | off | | off |
| 12:05 | | — | — | | — |
| 12:10 | | off | on | | — |
| 12:15 | | — | — | | — |
| 12:20 | | — | off | | — |
| 12:25 | | — | — | | — |
| 12:30 | | — | — | | — |
| 12:35 | | — | — | | — |
| 12:40 | | — | — | | — |
| 12:45 | | — | — | | — |
| 12:50 | | — | — | | — |
| 12:55 | | — | — | | — |
| 1:00 | am | — | — | | — |
| 1:05 | | — | — | | — |
| 1:10 | | — | — | | on |
| 1:15 | | — | — | | — |
| 1:20 | | on | — | | off |
| 1:25 | | — | — | | — |
| 1:30 | | off | on | | — |
| 1:35 | | — | — | | — |
| 1:40 | | — | off | | — |
| 1:45 | | — | — | | — |
| 1:50 | | — | — | | — |
| 1:55 | | — | — | | — |
| 2:00 | | — | — | | — |
| 2:05 | | — | — | | — |

-continued

| Time | Station #1 | Station #2 | ... | Station #8 |
|------|------------|------------|-----|------------|
| etc  |            |            |     |            |

The last irrigation by station #1 was during the period form 2:40 to 2:50 a.m. The last irrigation overall was by station #8 during the period from 3:50 to 4:00 a.m. In total, eight stations have irrigated for a total of 30 minutes each during 4 chronological hours.

The goal of the staggered starts is to (i) operate one irrigation station at a time with (ii) a minimum amount of dead time on all stations consonant with (iii) operating each station in accordance with its maximum "on" and minimum "off" times while (iv) prioritizing between stations in accordance with their numbers. Each successive station is looked at in turn to see if an irrigation cycle for that station will properly fit within a window within the combined schedules, and if so the cycle is scheduled and the station will water. Which station's cycle to insert in any given window is determined by (i) which station has had the longest wait for a turn to have an irrigation cycle, and if two stations have equal waits then by (ii) the lowest numbered station first.

2.1.2 Exclusionary Periods

The preferred embodiment of an irrigation controller in accordance with the present invention accepts the specification, normally by user input, of one or more exclusion time intervals during which irrigation is not to transpire from any station. The specification is normally in the form of interval start and stop times, which are the corresponding, times that irrigation is stopped and permissively restarted. The scheduling of irrigation cycles simply works around these one or more exclusion time intervals. An irrigation cycle may start before an exclusion interval, be suspended (off) during the exclusion interval, and resume to completion after the exclusion interval. This in essence adds an extra split watering cycle.

2.1.3 Budgeting of Irrigation

The preferred embodiment of an irrigation controller in accordance with the present invention accepts specification of a budget factor. The controller uses this budget factor to calculate a new, budgeted, total irrigation time duration as budgeted total irrigation time duration = budget factor × total irrigation time duration For example, if the budget factor is 200% and a station's total irrigation time is 1 hour, then $$\text{budgeted total irrigation time duration} = 200\% \times 1 \text{ hour} = 2 \text{ hours}$$

The controller then proceeds to calculate a budgeted number of irrigation cycles in consideration of the maximum "on" time derived from the table lookup as $$\text{bugeted number of cycles} = \frac{\text{budgeted total irrigation time duration}}{\text{maximum "on" time duration}}$$

For example, for the hilly terrain loam soil irrigated with a microspray irrigation head:

$$\text{budgeted number of cycles} = \frac{2 \text{ hours}}{10 \text{ minutes}} = 12 \text{ cycles}$$

This should be compared to the 6 cycles during which irrigation would normally transpire. The creation of irrigation schedules for the adjusted (budgeted) number of irrigation cycles transpires normally. There is also a Monthly Budget feature that allows a different budget to be set for each month of the year. Defaults are provided for each month.

2.1.4 Deep Soak Cycles

The preferred embodiment of an irrigation controller in accordance with the present invention accepts programming of a deep soak cycle for a selected station that overrides, supplants, and substitutes for all normal irrigation that might otherwise normally be scheduled for the station upon a particular day.

The (i) time duration, (ii) first occurrence, and (iii) periodicity days of the soak cycle are specified to the irrigation controller. The soak duration can be automatically calculated from site information, or user entered. For example, a particular, station might be programmed to conduct a 1 hour soak cycle every 30 days from a set day. Upon the set day, and each 30 days thereafter, the composite irrigation schedules will be routinely computed in a normal manner as if the particular station had only one irrigation period of duration 1 hour. All other irrigation cycles at other stations may be shifted in time-of-day but will otherwise proceed normally. Any base irrigation cycles that fall on a soak day for any particular station are skipped. Syringe cycles, if programmed, can fall on a soak day (see below).

2.1.5 Syringe Cycles

Syringe cycles are implemented in the preferred embodiment of an irrigation controller in accordance with the present invention as a separate schedule, automatically generated, that is (i) prioritized above the normal irrigation schedules. Syringe cycles are programmed in common for all stations based on one (only) set of input information for all parameters, except the syringe cycle duration. (They are not, however, conducted simultaneously.)

The controller accepts specification of the (i) syringe cycle duration by station, (ii) start time of the first station',s (i.e., station #1) initial syringe cycle occurrence, (iii) start time of the first station's final syringe cycle occurrence, (iv) periodicity of the syringe cycles in the defined time interval, and, (v) active months during which syringe cycles are to be performed. The controller schedules syringe cycles of the indicated duration starting at the initial start time for station #1 followed by station #2 continuing up to station #8. After the proscribed time interval the syringe cycles repeat, and so continue until the last sequence of eight cycles upon the eight stations. This schedule is enabled only for the designated months.

For example, 1 minute duration syringe cycles might be specified to occur every two hours during a syringe period starting at 10:00 a.m. and ending with a 6:00 p.m. start time. Eight minutes of syringes would transpire, one minute per station, from 10:00 to 10:09 a.m. Another series would transpire from 12:00 noon to 12:09 p.m. The final series would be from 6:00 to 6:09 p.m. Each of these series would suspend any other irrigation cycle otherwise in progress. Each suspended cycle will conclude to its full scheduled duration at the end of the current series of syringe cycles.

2.2 Overview of the Preferred Embodiment of an Irrigation Controller

The preferred embodiment of an irrigation controller in accordance with the present invention uses Light Energized Irrigation Technology (LEIT TM) It can operate with the amount of incident light available in northern latitudes on a worstcase cloudy winter's day without needing any of the batteries, external solar panels, or the A.C. power connections required for traditional controllers. It is also extremely flexible and versatile in its operation.

A diagrammatic view of the preferred embodiment of the controller, with its cover plate removed and operator's panel area exposed, is shown in FIG. 1. Controller 1 is typically attached to post 2. An array of photovoltaic devices 10 (not shown) is located under transparent lid 11 to case 12.

Various electrical connectors are presented. A valve connector block 13 permits electrical connection by wires (not shown) to up to eight (8) electrically actuated valves. A control key socket 14 accepts a pluggable POWERKEY ® power source (not shown), being a 9 vdc battery suitably packaged so as to plug into socket 14. A digital accessory connector 15 permits communication connection to a multiprogramming unit (not shown) that may upload and download programs into the controller 1 (among other alternative ways of programming controller 1). The connector 15 is a standard type, and may, under firmware control within controller 1, interface to further devices. A sensor connector block 16 permits connection of up to eight (8) optional soil moisture sensors or other sensing devices. These soil moisture sensors, and the control proceeding therefrom, are not taught within this specification for being unimportant to the present invention.

A control panel 20 contains a liquid crystal display (LCD) 21 for showing information, questions, and directives. The control panel 20 also contains pushbutton switches 22-25. A STOP switch 22 stops the present controller 1 operation and turns off any valves previously turned on. A HELP switch 23 causes the controller 1 to display more information and/or instructions, keyed to the current operation or displayed questions, in LCD 21. The NO switch 24 and the OK switch 25 are used to answer controller-presented questions about the installation and the parameters of irrigation (e.g., the watering schedule) and to enable selectable readout of controller stored data.

The controller 1 is controlled in its operation by firmware running on a special Application Specific Integrated Circuit (ASIC) that includes a microprocessor. The explanation of the controller 1 hardware is contained in major sections 3-5 of this specification. The firmware executed by controller 1 is attached as Appendix A to this specification. This major section 2 deals with the user interface to controller 1, and serves to show its many unique aspects in accordance with the present invention.

The term "programming" used throughout this specification includes actions performed at the operator interface to the controller 1—actions normally but not necessarily performed in the field—by which the controller 1 is parameterized and directed in its programmed operation. The firmware itself is, of course, also "programmed". In some cases the act of "programming" at the operator's panel will alter the flow, as well as the parameters used, within the firmware; thus constituting a form of "programming" at the process control level. The word "programming" is used to refer to the total compendium of operator/programmer interface to, and control of, irrigation controller 1. The word includes actions more exactingly thought of as parameterization (typically done in the field), as well as actions more exactingly thought of as coding (typically done in the factory or depot).

2.3 Talking to the Irrigation Controller

The key features of the user interface to the irrigation controller in accordance with the present invention are as follows:

2.3.1 All Data Entry and Review is Accomplished by Using Only Two Keys

These two keys are labeled "OK" and "NO". Two other supplemental keys are present on the control panel for the LEIT Irrigation on Controllers. These keys are the "HELP" and "STOP" keys. The "HELP" key provides context sensitive help messages, and the "STOP" key serves as the universal "exit" or "stop current action" key.

2.3.2 The User is Prompted

The user is always prompted with what to do next, either in the form of questions that allow the user to make OK (yes) or NO decisions, or self-advancing menus and data entry screens. For example:

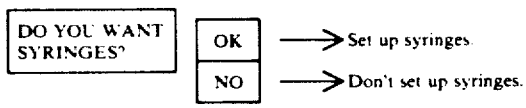

A complete listing of the different messages that are, at times, displayed by the irrigation controller in accordance with the present invention is attached to the present specification as Appendix B.

2.3.3 The User Always Knows His/Her Choices

The user always knows all the choices possible because all menus and number entry screens automaticlaly self-advance (after a pause to let the user accept or reject the default value). Menu options cycle in a continuous loop until the user selects one of the options by pressing the OK key. To remind the user that he must press OK to select an option, there is a blinking $^O$K symbol displayed on screen along with each option as the options are displayed one at a time.

Likewise, when numbers are to be entered, the numbers cycle in a continuous loop, so the user always knows the entire range of possible numbers. All number entry and menu selection can be done with one key, since the user can enter a number or make a menu selection just by waiting for the appropriate number or menu item to appear on the display, and then pressing OK. A blinking underline (_) acts as a cursor to tell the user which number is being entered when multiple sets of numbers are displayed on the same screen. For example:

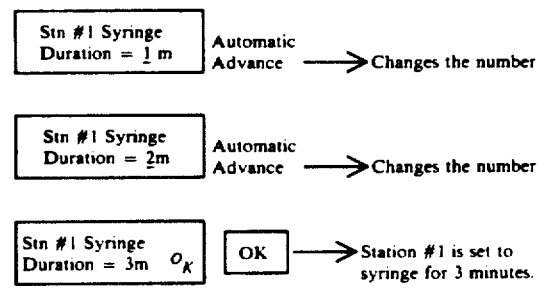

2.3.4 The Display May be Accelerated

Advanced users do not need to wait for the appropriate menu item or number to appear on the display, since the NO key doubles as an advance key. Pressing the NO key once advances the menu or number entry screen to the next menu item or number. Holding the NO key down causes the automatic advancing action to speed up, so that the user can get to the desired menu item or number more quickly. For example:

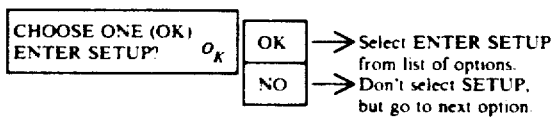

After the user advances the display by pressing the "NO" key (or waits for it to automatically advance), the display reads:

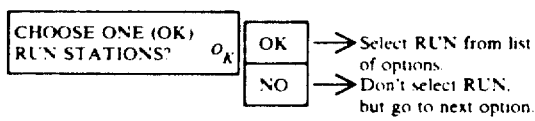

2.3.5 Each Entry Is Confirmed or Rejected

After each entry is made by pressing the OK key, the user is given a chance to either confirm or reject the entry by the use of confirm screens. These confirm screens show the information that was just entered, followed by a blinking $^OK$ character. Pressing the OK key confirms the entry, whereas pressing the NO key rejects it and allows the user to go back to the data entry screen to change the entry. For example:

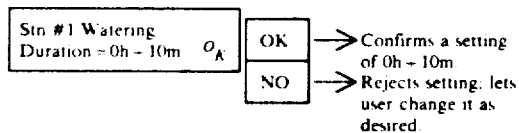

After entering the new setting, users again get a confirming screen to let them accept or reject the new setting.

2.3.6 Repetitive Information May Be Copied

When repetitive information is being entered, the user interface allows information to be copied to greatly reduce the required number of keystrokes. For example, if Station #1 is set to water on Monday, Wednesday, and Friday (with Tuesday, Thursday, Saturday, and Sunday as off days), the user gets the following question:

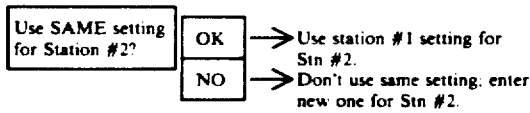

This saves a loss of time in re-entering the information for each station. If the user wants to change the setting, he/she just presses NO and the controller will automatically go back to the appropriate data entry screen for Station #2. If the user copies the setting to the next station in error, however, then he/she can go back and change the setting. This is because the user automatically gets a confirm screen after copying the settings to the next station.

2.3.7 The STOP and HELP Keys

Besides the OK and NO keys, there is a HELP key for getting instructions from the controller, and a STOP key for stopping whatever the controller is doing.

2.3.7.1 Using the HELP key

The user may press the HELP key at any time to ask the controller for more information about what to do next. When the user is finished reading the message, he/she will be asked if he/she wants to "Repeat the message?" Pressing NO removes the help message and returns to what was previously displayed. See FIG. 1 for the location of the keys.

2.3.7.2 Using the STOP key

Whenever the POWERKEY TM power source is inserted, the STOP key will stop whatever the controller is doing, no matter which mode it is in at the time. All the controller keys, including the STOP key, are inactive whenever the controller is actually running (or idling) by itself with the POWERKEY TM power source removed, that is, in either the AUTOMATIC, SEMIAUTOMATIC or STAY IDLE/OFF modes.

If the user is entering or retrieving information in one of the set up modes, STOP will also cancel any scheduling entries the user has made and return the user to the main option list (CHOOSE ONE (OK)) screen. This is not the normal way to exit a mode, and should be used only when necessary. Normally, the user will use the STOP key only if he/she changes his/her mind and wants to start completely over again.

3.0 Controller Functions

The operation of the irrigation controller is organized into four main groups of functions called "Modes". These Modes are ENTER SETUP, RUN STATIONS, STAY IDLE/OFF, and VIEW INFO. Table 2 shows the the functions of these four Modes. Each of these modes is further organized into sub-modes.

The controller can only be operating in one Mode at a time. For example, if the user wants to enter a new setup, same time.

3.1.1 Using the Menus

In order to use one of the Modes, the user starts at the "Main Menu" Screen (which reads "CHOOSE ONE (OK)") and selects one of the Modes by using the NO and OK keys as described earlier. If the Mode has several functions, the user selects one of the functions in the same way. For example, in RUN STATIONS Mode the user selects whether he/she wants to use Automatic Run, Semi-Auto Run, or Manual Run. When the user is finished using the Mode, the controller will ask "EXIT now?" and if the user presses OK the "main menu" screen will be displayed again.

There are 4 main options used in setting up and running the controller. These options are chosen from a self-advancing list by pressing the OK key. The STOP key always abandons the current screen and returns to the "Main Menu".

A brief description of the 4 Main-Functions or Modes of the Controller follows:

The first mode is ENTER SETUP. This mode lets the user enter SCHEDULES or ALTERNATE SCHEDULES to tell the controller when and how to run each valve or station. The ENTER SETUP mode also lets the user set up the SYSTEM to fit his/her site and specific application.

TABLE 2.

Functional Mode Specification

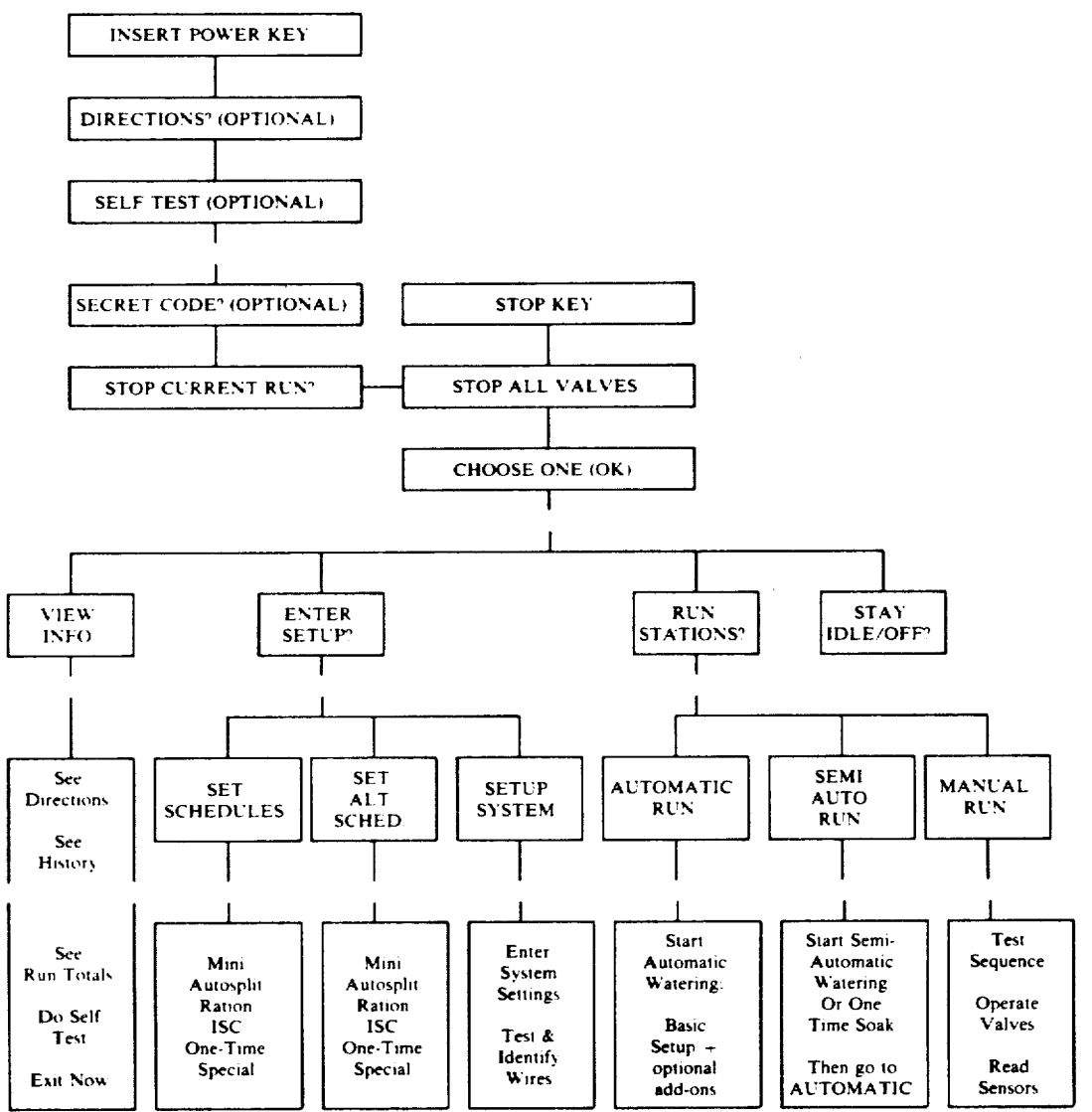

NOTE
Removing POWERKEY power source anytime before SELECT FUNCTION will continue Current Function (e.g., Automatic or Semi-Auto)
NOTE
STOP KEY inactive from time POWERKEY power source inserted until after SECRET CODES are entered. Whenever STOP KEY is active, it always turns off any valves that are on, and returns to CHOOSE ONE (OK) option list The second mode is RUN STATIONS. It lets the user run stations in 3 ways: AUTOMATIC, SEMI-AUTOMATIC, and MANUAL. The AUTOMATIC RUN mode is the normal way to turn valves on and off as scheduled in the SET SCHEDULES mode. The SEMI-AUTO RUN mode lets the user do an immediate one-time soak or a normal watering cycle before reverting to the AUTOMATIC RUN mode. The MANUAL RUN mode allows the user to operate valves one at a time or a defined TEST SEQUENCE, and it lets the user take moisture sensor readings.

The third mode is STAY IDLE/OFF. No watering will occur if the user chooses "STAY IDLE/OFF". The controller will keep all the user's setups but none of them will be run.

The fourth mode is VIEW INFO. The VIEW INFO mode lets the user SEE HISTORY events by date, SEE DIRECTIONS, SEE RUN TOTALS or DO a system SELF TEST.

Before the user can begin watering, the user needs to complete both the SETUP SYSTEM and SET SCHEDULES modes. The user then chooses RUN STATIONS, followed by either AUTOMATIC RUN, SEMI-AUTO RUN, or MANUAL RUN.

3.1.2 Initializing the Irriqation Controller

The user opens the POWERKEY ® power source by removing its screws. The user snaps in a fresh 9V battery (alkaline type) and reassembles the POWERKEY ® power source. The user unlocks and opens the controller's front cover and inserts the POWERKEY ® power source by gently pressing it into the socket located at the lower left of the controller. Since the internal light energy storage capacitor may not be fully charged, the controller may need a few moments of charging from the battery in the POWERKEY® power source. Once initially charged, the system will operate from skylight energy alone, rain or shine, day and night, all year-round. Plugging the POWER-KEY® power source into the controller supplies extra energy to run the controller for communicating with the user. During this communication the display is constant enabled and the front panel is lighted for night time convenience.

While the unit is charging, the following message flashes intermittently:

```
Charging
Please wait...
```

When charging is completed, the display will then show:

```
Press OK when
most readable 1
```

The contrast of the display will change once a second. The user should press the OK key when the display is the most readable. The different contrast levels are numbered from 1 to 5 for convenience.

3.1.3 System Self Test

When the controller is accessed with the POWER-KEY® power source, the controller asks the user if he wants to perform a self-test. The test includes checking valves and sensors, and looking for broken or shorted wires.

The controller then displays the results of the test, the current date and time, and its present status. See the program listing of the Appendix for a description of status messages.

3.1.4 Optional Secret Codes

If an optional Secret code has been assigned, then a Secret code number must be entered in order to use the controller. The display reads:

```
ENTER SECRET
CODE = 000000
```

The user should enter the six digits by using the NO and OK key as described earlier. The irrigation controller will check to see if the entry matches the code that was entered during the Secret Code Set up. The controller gives two chances at entering the correct code. After that, it will not respond to any key presses for 10 minutes.

3.1.5 Optional Instruction Screens

The irrigation controller in accordance with the present invention has a built-in instruction manual that gives the user brief explanations of the keys and the controller operating modes. The 2-line instruction screens automatically change at a rate that is comfortable for reading. The first two screens present a Welcome Message and let the user decide whether or not he/she wants to view the instructions:

```
Welcome to the
Controller
```

```
Want Directions?
(Press OK or NO)
```

Once the user has started the automatic scrolling display of the built-in instruction screens, he or she can stop the process merely by pressing the STOP key.

3.2 How to Set Up The Irrigation Controller 3.2.1 Set Up Sequence

First time set up for the controller requires four steps:
1) Set the time and date,
2) Assign a Secret code (optional),
3) Enter Watering Schedule, and
4) Wire and assign stations for all valves and sensors.

Steps 1, 2, and 4 are done using the SETUP SYSTEM submode, and step 3 is done using the SET SCHEDULES sub-mode. Note that step 4 must be done in the field with the controller connected to its valves. Steps 1-3 may be done prior to field installation, but care must be taken to ensure an adequate light supply for the controller while it is waiting to be installed.

3.2.2 Setup System

The user should select the SETUP SYSTEM sub-mode from the ENTER SETUP SELECTION Screen. There are seven choices in this mode:

```
SETUP SYSTEM:           SETUP SYSTEM:
Set Time/Date?  OK  OR  Setup Sensors?  OK
```

```
SETUP SYSTEM:           SETUP SYSTEM:
Set Site Info?  OK  OR  Set User Codes?  OK
```

```
SETUP SYSTEM:           SETUP SYSTEM:
Do Wire Check?  OK  OR  Exit Now?       OK
```

```
SETUP SYSTEM:
Setup Stations?  OK
```

The user should press NO (or let the controller automatically advance) to switch between the screens and OK to select the operation shown on the screen.

3.2.2.1 Time Set Up

The user should select Set Time/Date from the SETUP SYSTEM menu to see or set the present time and date setting for the controller's internal clock. The display shows the current time and date:

```
Time is 10:00 am
FRI MAY 6,'88?
```

The user should verify the time by pressing OK. To change the time, the user pressure NO and the display will show:

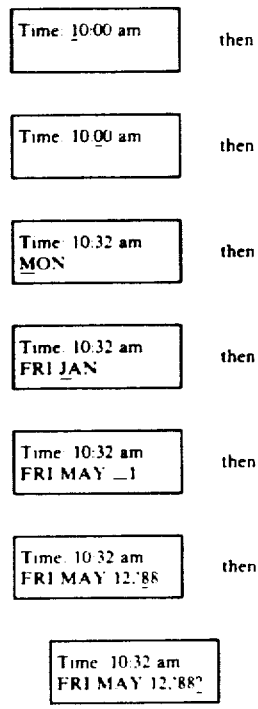

The user should enter the six settings: hours, minutes, day of the week, month, date, and year. The user should then press OK to confirm that the time and date are correct.

3.2.2.2 Set Site Info

Set Site Info lets the user enter information about the terrain, soil type, and sprinkler types being used for each station at the site being irrigated. This information is used by the controller to automatically calculate split ON times and soak durations.

The first screen reads:

```
Stn 1: Level sand,
flat sprays?  O_K
```

If this is incorrect for the particular site in question, the user presses NO and the screen changes to read:

```
Stn 1: Site Info
level sand?  O_K
```

The soil type and terrain automatically advance (level sand, hilly sand, level loam, hilly loam, level clay, and hilly clay) and when the appropriate choice is displayed the user presses OK.

The next screen reads:

```
Stn 1: Site Info
Flat sprays?  O_K
```

The sprinkler, types also automatically advance (flat sprays, lawn sprays, rotor heads, impact heads, stream sprays, microsprays, and drip emitters).

Again the user presses OK when the correct information for the station in question is displayed. The last screen for each station is a confirming screen:

```
Stn 1: Hilly loam,
lawn sprays?  O_K
```

3.2.2.3 Setup Stations

The user should employ this SETUP SYSTEM function to tell the controller which wires represent which station numbers. Unlike conventional controllers which have terminal strips that must be wired with station number 1 attached to the top terminal and station number 8 attached to the bottom one, the user can attach pairs of valve wires to the terminal strip of the irrigation controller in accordance with the present invention in any order that is convenient. The user can then assign station numbers to the wires as described below in the section on "Wire Checking".

3.3 Wire Checking

After a jacketed pair of wires has been run from each valve and sensor back to the controller, the user should select Do Wire Check from the SETUP SYSTEM menu. Checking of the valve wiring and sensor wiring are done separately.

3.3.1 Do Wire Check

The controller will check each valve wire and show its findings on the display:

```
Valves: VsVVVsoo
starting at top
```

The V sign means the valve was installed correctly, s means the wire is shorted, and o means that there is nothing connected to that valve position. The valve positions start at the top of the connector. Looking at the connector, the display above means:

V 1st position, Valve wired OK
s 2nd position, Wires shorted
V 3rd position, Valve wired OK
V 4th position, Valve wired OK
V 5th position, Valve wired OK
s 6th position, Wires shorted
o 7th position, Not connected to valve
o 8th position, Not connected to valve The user will not be able to assign station numbers to valves with shorted wires. If the user wants to ignore the short for now, then he/she should remove the shorted pair from the connector. The repair can be made and the number assigned later. Alternatively, it may be recognized that the user may intentionally create shorted valve wire pairs at the valve end, and the controller may be programmed to recognize removal of these shorts, exposing either a connected valve or open wire (station).

Valve positions showing no connection may be unused, or may indicate a broken wire. The controller does not know whether the user is simply not using all eight valves, or if the wiring is faulty. The user will need to decide if any action is called for those cases.

The display is constantly being updated. As a faulty wire is repaired, the display will change to show a good connection. When all positions that have valves are reading "V", the user should then press the OK key.

The user may of course press STOP at any time to abandon wire checking.

3.3.2 Assign Station Numbers

Setup Station allows the user to assign station numbers to the valve positions. The first display reads:

```
View Current
Station IDs?
```

The default ID is:

```
Current ID (from
TO?) 12345678   O_K
```

The next screen reads:

```
Enter new
Station IDs?
```

If the user wants to change the station ID numbers, he/she presses OK. The next screen reads

```
5 stations
wired ID all 5?
```

The controller display now reads:

```
Stn #s: --------
Unplug #1 to ID!
```

The actual station identification is done by visiting each valve location. The user should unplug the waterproof connector from the valve that he wants to be station #1 and then after 2 seconds plug it in again. Unplugging and replugging the wires at the valve will cause the controller to automatically assign station #1 to the pair of wires that is currently connected to that valve. The display shows valve numbers as the user assigns them. For example, if the pair of wires that come from the valve that the user wants to be station #1 are physically located in the third position down from the top on the valve wire terminal strip in the controller housing, then the display would read:

```
Stn #s: --1----
Unplug #2 to ID!
```

The user should now unplug and replug the waterproof connector from the valve that he/she wants to be station #2. The user should repeat this process until all the stations with wires attached have been assigned. During this process, the display shows the stations that have been assigned (indicated by numbers), along with those that are still unassigned (indicated by "—" signs).

```
Stn #s: 35142---
SAVE new ID ?
```

When all valves with wires attached have been assigned numbers, the user is asked if he wants to "SAVE new ID?" If no wires are attached to one or more of the terminal strips (or if there are wires attached, but there is a break in one of the wires causing an "open" condition), the controller will automatically assume that the user does not want to assign station numbers to the open terminals. If the user later adds wires (or repairs "open" wires, then he/she can go back into the SYSTEM SET UP mode and assign valve numbers to them.

After assigning numbers to all the valves connected to the controller, the user can then check the operation of the valves manually by using the MANUAL MODE.

3.4 How to Enter Watering Schedules

3.4.1 Schedule Set Up Types

There are five possible Watering Programs or Schedule Set Ups that can be used when programming the irrigation controller in accordance with the present invention. Each of these setups, in turn, has a REGULAR and an ALTERNATE version, so that the user can experiment with different programs without losing his/her original programs. This gives the user unparalleled scheduling flexibility.

The ALTERNATE Watering Set Ups can be used to program an alternate watering schedule for special situations such as plant establishment periods, or for setting up alternate trial schedules without having to alter the regular set ups for the controller. Functionally the Alternate Set Ups are identical to the regular set ups, and all the settings available in the regular set ups are available in the alternate set ups as well.

Of the five types of set ups, three of them are Basic Watering Setups that can be run by themselves. The last two are Optional Add-On Setups that can be run in combination with any one of the basic setups, but cannot be run by themselves. The choices for Basic Watering Setups appear on the screen in the following order:

```
SET SCHEDULES:          SET SCHEDULES:
Use Mini?    O_K   OR   Use Autosplit?  O_K
```

```
SET SCHEDULES:
Use Ration?  O_K
```

The two choices for Optional Add-On Setups are:

```
SET SCHEDULES:          SET SCHEDULES:
Use One-Time?  O_K  OR  Use Special?   O_K
```

When the user first selects SET SCHEDULES or SET ALT SCHED., the controller will show all six set up types in the above order. The user should select the BASIC SETUP that he/she wants to use for scheduling his/her irrigation system.

If the user wants to program any OPTIONAL ADD-ON SETUPS to take advantage of the controllers unique ONE-TIME soak and SPECIAL cycle features, then he/she should enter BASIC SETUP first, then come back to the SET SCHEDULES or ALT SCHED. mode and choose the appropriate ADD-ON SETUP (i.e., ONE-TIME, or SPECIAL).

3.4.1.1 The MINI Set Up

The user should select the MINI SETUP if his/her irrigation installation needs only the basic watering requirements of:
* What time to start watering
* How long to water
* How often to water If the MINI SETUP is selected then only one start time is available for each valve. After the start time for the first valve has been set, the start times for each of the other valves will be sequential. The MINI SETUP is very simple and easy to enter into the controller, but some of the more sophisticated features of the controller like split cycles are not available if this setup mode is chosen.

If the user wants to use split watering times, odd-/even rationing syringe cycles, periodic soak cycles, or if the user wants independent control of each individual station, then the user should select one of the other three basic setups.

Table 3 is a Watering Chart that the user can use for recording the information needed for the MINI Set Up. Answering the questions on the chart and then entering them into the controller with the SET SCHEDULES Mode will help the user to get a better overall picture of what he/she is doing until he/she gets accustomed to the controller's self-prompting data entry screens. The Water Chart will also be useful for keeping records of how a controller(s) is (are) programmed.

3.4.1.2 The AUTOSPLIT Set Up

The AUTOSPLIT Set Up will meet the user's need for most watering situations. The user can use this setup to program multiple watering cycles by automatically splitting the total (100%) watering duration (1 minute to 4 hours) that he/she sets into a number of short "Split Cycles" for erosion control and better water penetration. The controller automatically inserts the optimum length of each split ON cycle (ranging from 1 minute to 60 minutes), and the minimum length of time that the water is to remain OFF before the next split ON cycle for that station (ranging from 0 minute to 60 minutes). These maximum ON and minimum OFF times are determined from a built-in lookup table (Table 1 of Section 2.1.4.1) that has values calculated from the site information (soil type, sprinkler type, and terrain) entered in SETUP SYSTEM. The user can modify these maximum ON and minimum OFF times if desired.

TABLE 3

| Sample "MINI SET UP" Watering Chart | | | |
|---|---|---|---|
| (B) | Water Cycle: | | |
| | Water on specific days of the week? | | NO |
| | Water every "so many" days? | | YES |
| | VALVE #1 SETTING | ... | VALVE #8 SETTINGS |
| 100% Watering Dur. = 0 hrs + 20 min. | | 100% Watering Dur: = 4 hrs + 00 min. | |
| Watering Day Cycle = Every 2 days {OR} | | Watering Day Cycle = Every 10 days {OR} | |
| Watering Day Cycle = M W F Every 1 week | | Watering Day Cycle = Saturday Every 2 weeks | |
| Start Time = | | Start Time = | |

TABLE 3-continued

| Sample "MINI SET UP" Watering Chart | | | |
|---|---|---|---|
| (B) | Water Cycle: | | |
| | Water on specific days of the week? | | NO |
| | Water every "so many" days? | | YES |
| | VALVE #1 SETTING | ... | VALVE #8 SETTINGS |
| 5:30 am | | | Sequential |

With the AUTOSPLIT SETUP each station can be programmed with different splits, and even different watering day cycles. However, all valve stations will always operate sequentially to insure that each valve has sufficient pressure to operate at maximum efficiency. The user need only choose one start time for the first active station and the controller automatically calculates sequential start times for all the other active valves for each split ON time.

Normally valves will turn on one after another, except for days when only a few valves are active and the user has programmed a Minimum OFF time that is longer than the total duration of the active valves. In such cases, the next ON time will be delayed until that particular valve has been off for at least the Minimum OFF time. For days when most of the valves are active, the length of time between split ON times for any one valve is usually greater than the Minimum OFF Time, so that there are no delays between stations. Of course, if the user wants multiple repeat ON times without any delays between starts, then he/she can always set the Minimum OFF time to zero.

In cases where there are certain times during the day when the user does not want any watering to occur, the AUTOSPLIT Set Up allows the user to enter an "Excluded Time" period during which no watering will occur. Thus, if the user is irrigating a park where there is pedestrian traffic from 7:00 am to 6:00 pm, he/she could designate this time period as an Excluded Time, and any watering cycles that were not completed before 7:00 am would automatically be stopped at 7:00 am and resumed again at 6:00 pm. A sample "AUTOSPLIT SETUP" watering chart is contained in the following Table 4.

The user can also specify Syringe Cycles for one or more valves with the AUTOSPLIT Set Up. Syringe Cycles can be set up for summer cooling in hot desert areas, and for frost protection in cold winter areas. If the user chooses to use the Syringe Cycle feature, the controller will ask the user to specify the months in which he/she wants syringe cycles to occur. Whenever Syringe cycles are active, they will run every day in the months that the user has specified. The user can specify a separate duration (of 1-15 minutes for each selected valve) for Syringe Cycles, and the user can also specify the time period during the day when syringes are to occur, along with the time between Syringe Cycles. Syringe cycles can be programmed to occur during Excluded Times, if the user so desires. If a basic watering time for another valve occurs when a Syringe Cycle is scheduled, then the regular watering will be temporarily interrupted to complete the Syringe Cycle and then the remainder of the regular watering for the interrupted valve will be completed. This insures that the Syringe Cycles will always occur exactly when the user wants them without changing the total duration of any of the basic watering cycles.

TABLE 4

Sample "AUTOSPLIT SETUP" Watering Chart

| A* | Water Cycle | |
|---|---|---|
| | Water on specific days of the week? | NO |
| | Water every "so many" days | YES |

| STATION #1 SETTINGS | STATION #8 SETTINGS |
|---|---|
| 100% Duration: | 100% Duration: |
| 0 hr 20 min | 1 hr 00 min |
| Split ON Time | Split ON Time |
| 0 hr 5 min | 0 hr 15 min |
| Split OFF Time | Split OFF Time |
| 0 hr 30 min | 0 hr 30 min |
| Day Cycle = | Day Cycle = |
| Every 2 days | Every 10 days |
| Excluded Period | Excluded Period |
| FROM 7:30 am | FROM 7:30 am |
| TO 5:30 pm | TO 5:30 pm |
| Start Time = | Start Time = |
| 3:00 am | Sequential |

| VALVE #1 SYRINGE TIMES | VALVE #8 SYRINGE TIMES |
|---|---|
| Syr. Months: | Syr. Months: |
| JJAS | JJAS |
| Syr. Duration: | Syr. Duration: |
| 5 min | 5 min |
| Syringe Period: | Syringe Period: |
| FROM 10:00 am | FROM 10:00 am |
| TO 5:00 pm | TO 5:00 pm |
| Time between: | Time between: |
| 1 h + 00 m | 1 h + 00 m |

| VALVE #1 SOAK TIMES | VALVE #8 SOAK TIMES |
|---|---|
| Soak Duration: | Soak Duration: |
| 0 hr: 40 min | 2 hr: 0 min |
| Every 14 days | Every 30 days |

The user can also specify Soak Cycles for one or more valve stations with the AUTOSPLIT Set Up. Soak Cycles can be used for watering in fertilizer, for periodically leaching salts in drip applications, and for providing extra cycles for deep watering trees and shrubs. Soak Cycles ignore soil sensing and the Budgeting Factor, and they use the same split criteria (maximum On, and minimum OFF times) as the basic AUTOSPLIT Set Up. The controller automatically calculates the soak duration needed to water to a depth of two to three feet based on the entered site information. The lookup table used in the preferred embodiment of the controller is given in Table 5. If the user should program a Soak Cycle for a particular valve that occurs on the same day as one of the basic watering cycles for that valve, then the Soak Cycle automatically overrides the basic watering cycle on that day. This feature insures that the user will not miss a needed deep Soak Cycle because he/she inadvertently programmed that cycle at a time that happens to overlap a normal basic watering cycle.

The AUTOSPLIT Set Up allows the user to review the settings that he/she has entered. The controller will tell the user when he/she has finished entering the required information, and then it will ask the user if he/she wants to review any settings. Answering NO will skip the entire settings review process. Answering OK will give the user a series of questions to answer. Each question will allow the user to review one group of settings. There are questions for reviewing the Basic Set Up (100% Watering Duration, Number of Split Cycles, the Split ON and OFF settings, the Watering Day Cycle, and the Start Time and Excluded Times), the Syringe Set Up, and the Soak Set Up for all active stations.

TABLE 5

Soak Duration Lookup Table

| SOIL TYPE | SPRINKLER TYPE | PRECIP (IN/HR) | MAX ON (MINS) | # OF SPLITS | SOAK DURATION (MINS) | SOAK DEPTH (INS) | MAX ON (MINS) | # OF SPLITS | SOAK DURATION (MINS) | SOAK DEPTH (INS) |
|---|---|---|---|---|---|---|---|---|---|---|
| Sand | Flat Spray | 3.0 | 3 | 7 | 21 | 38 | 3 | 7 | 21 | 38 |
| Sand | Lawn Spray | 2.0 | 5 | 7 | 35 | 42 | 5 | 7 | 35 | 42 |
| Sand | Rotor Head | 1.2 | 8 | 7 | 56 | 41 | 8 | 7 | 56 | 41 |
| Sand | Impact Head | 1.2 | 8 | 7 | 56 | 41 | 8 | 7 | 56 | 41 |
| Sand | Stream Spray | 1.2 | 8 | 7 | 56 | 41 | 8 | 7 | 56 | 41 |
| Sand | Microspray | 0.9 | 10 | 7 | 70 | 38 | 10 | 7 | 70 | 38 |
| Sand | Drip Emitter | 0.3 | 30 | 7 | 210 | 38 | 30 | 7 | 210 | 38 |
| Loam | Flat Spray | 3.0 | 6 | 6 | 36 | 38 | 3 | 12 | 36 | 38 |
| Loam | Lawn Spray | 2.0 | 9 | 6 | 54 | 38 | 5 | 12 | 60 | 42 |
| Loam | Rotor Head | 1.2 | 16 | 6 | 96 | 40 | 8 | 12 | 96 | 40 |
| Loam | Impact Head | 1.2 | 16 | 6 | 96 | 40 | 8 | 12 | 96 | 40 |
| Loam | Stream Spray | 1.2 | 16 | 6 | 96 | 40 | 8 | 12 | 96 | 40 |
| Loam | Microspray | 0.9 | 20 | 6 | 120 | 38 | 10 | 12 | 120 | 38 |
| Loam | Drip Emitter | 0.3 | 60 | 6 | 360 | 38 | 30 | 12 | 360 | 38 |
| Clay | Flat Spray | 3.0 | 3 | 16 | 48 | 36 | 2 | 16 | 32 | 24 |
| Clay | Lawn Spray | 2.0 | 5 | 16 | 80 | 41 | 3 | 16 | 48 | 24 |
| Clay | Rotor Head | 1.2 | 8 | 16 | 128 | 39 | 5 | 16 | 80 | 24 |
| Clay | Impact Head | 1.2 | 8 | 16 | 128 | 39 | 5 | 16 | 80 | 24 |
| Clay | Stream Spray | 1.2 | 8 | 16 | 128 | 39 | 5 | 16 | 80 | 24 |
| Clay | Microspray | 0.9 | 10 | 16 | 160 | 36 | 7 | 16 | 112 | 26 |
| Clay | Drip Emitter | 0.3 | 30 | 16 | 480 | 36 | 30 | 16 | 480 | 36 |

When the user is finished with the Settings Review, the user is asked if he/she wants to "Review All ON Times?" Just as with the Settings Review, answering NO here will skip the entire ON Times Review process. Answering OK will give the user a few questions to answer relating to the ay that he/she wants to review, and the budget factor (normally 100%) that he/she would like to use for his/her review. Once the user has answered these questions then he/she will be able to review the ending time for the day and every split (or unsplit) ON time during the selected day for each active station. This will allow the user to know in advance exactly when each station will turn on, and it will also tell the user the duration for each ON time, the type of ON time (Basic Watering Basic Cycle=ON, Syringe Cycle=SYR, or Soak Cycle=SOAK), and the Split Cycle Number (for example, ON #2 of 4). Because the controller automatically prompts the user with all the right questions, it is easy to use these considerable capabilities.

3.4.1.3 The RATION Set Up

The RATION SETUP can be used in cases where here is mandatory "odd/even" water rationing in effect in the user's area. This setup is similar to the AUTOSPLIT SET UP, except that it allows the user to specify whether he/she wants watering to occur on "odd" or "even" days of the month. The controller automatically keeps track of the dates for each different month that the RATION SETUP is in effect, and only allows watering on either "odd" or "even" watering days as appropriate. In this setup the user can specify the interval between watering days with the obvious limitation that the time between watering days must always be divisable by two to avoid disrupting the odd-/even pattern. In other words, the user can specify watering ever other day, every fourth day, every tenth day, etc., but the user cannot water every third day, every seventh day, etc. All of the other features of the AUTOSPLIT SET UP are available in the RATION SETUP as well. Split Watering Cycles, Excluded Times, Syringe Cycles, Periodic Soak Cycles, and Soil Sensors can all be used in the RATION SETUP.

3.4.1.4 The ONE-TIME Set Up

This simple add-on set up is used for Semi-Automatic Watering and for setting up One-Time Soak cycles for watering in fertilizer or new landscape plantings. Basically with this set up all the user does is enter Durations and Split Cycles for each station and (optional) Excluded Times. The user can either enter normal durations like he/she would for the Autosplit Set Up, or he/she can enter automatically calculated extra long durations (with split cycles for runoff control) for a One-Time Deep Soak cycle. The user does not need to enter a start time for this set up. To use the ONE-TIME Set Up the user goes into the Semi-Automatic Mode and enters the basic set up that he/she wants to use. The controller does the One-Time Watering or Deep Soak Cycle when the user removes the POWERKEY™ power source as instructed on screen, and then reverts to the basic set up that the user has selected.

3.4.1.5 The SPECIAL Set Up

This add-on setup is for special situations, e.g., lights, fountains, pumps, or for running more than one station at a time. Only stations that have been assigned as SPECIAL in SETUP SYSTEM can be used for the SPECIAL Set Up. Thus, if the user wants to run lights, fountains, or pumps via an optional pump start relay unit, the user needs to complete SETUP SYSTEM before using the SPECIAL setup. Stations that have been assigned as valves in SETUP SYSTEM are skipped in the SPECIAL setup. Conversely, stations assigned as SPECIAL in SETUP SYSTEM are skipped in the Mini, Autosplit, Monthly, One-Time and Ration setups. Each station used with the SPECIAL Set Up can be programmed to operate multiple times on scheduled days, and more than one station can operate simultaneously.

3.5 Step-by-Step SETUP SCHEDULES Instructions

After selecting SET SCHEDULES the user sets up the valves in one of the following five ways:

1) Using the "MINI SETUP" Watering Set Up, or
2) Using the "AUTOSPLIT SETUP" Watering Set Up, or
3) Using the "RATION SETUP" Watering Set Up, or
4) Using the "ONE-TIME SETUP" Watering Set Up, or
5) Using the "SPECIAL SETUP" Watering Set Up The user need only to select and enter information for the set ups that are needed for a particular application or job site. If the user needs to enter information for several different types of setups, then he/she must select the appropriate setups one at a time from the SET SCHEDULES menu. If the user wants to add another setup at a later time, then he/she simply selects the setup(s) that he/she wants to add and enters the appropriate information. The user can enter information into all of the setups and still run whichever setup is needed at any particular time when the controller is in RUN STATIONS Mode.

Each of the five types of Set Ups has a regular and an alternate version. For example, the user can enter both an AUTOSPLIT and an ALTERNATE AUTOSPLIT setup, run the ALTERNATE AUTOSPLIT Set Up for a three month plant establishment period, and then switch to running the regular AUTOSPLIT Set Up. Likewise, the user can determine whether or not to actually use ADD-ON ONE-TIME or SPECIAL Set Ups at the time that the user puts the controller into the SEMI-AUTOMATIC or AUTOMATIC RUN Mode. Just because the user chooses a One-Time or a Special Set Up, he or she does not necessarily have to use these setups if site conditions do not require their use at any particular time. The user can turn them "on" and "off" in the SEMIAUTOMATIC or AUTOMATIC RUN Modes.

The "Mini" and "Autosplit" Valve Setups are next described in detail.

3.5.1 "MINI"0 Valve Set Up

If the user chooses MINI from the Set Schedules Menu (list of choices) then the display will show the following autoscrolling list of choices:

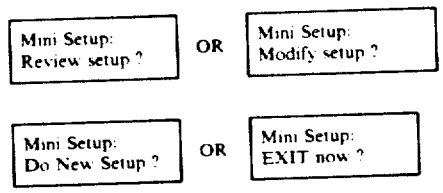

The actual display will depend upon whether or not the user has previously entered a MINI Set Up, i.e., if no Mini Setup exists the Review Setup and Modify Setup options are skipped. The NO key is used to switch back and forth between these screens (if necessary). "Do new setup" is selected by pressing OK.

The user next performs the set up for the valves themselves. The user is required to set up each active valve station by entering three settings for each station:

HOW LONG to water (100% Watering Duration)
HOW OFTEN to water (Watering Day Cycle), and
WHEN to start watering (Watering Start Time for first active station)

The user is first asked to set the 100% WATERING DURATION in hours and minutes for Valve Station 1. The display now reads:

```
Stn #1 Watering
Duration = _0h + 0m
```

The user must now enter the desired watering duration in hours and minutes. The duration that the user enters should be the length of time that the user wants to water under normal circumstances, that is, with a Water Budgeting Factor of 100%. If the user later changes the Water Budgeting Factor when he/she goes into the AUTOMATIC or SEMI-AUTO mode, the 100% duration entered here will be increased or decreased by the Water Budgeting Factor (BF). Thus, a BF of 140% will increase the duration by 40%, while a BF of 60% will decrease it by 40%.

The user can select watering durations from 1 minute up to a maximum of 4 hours by integral minutes. The NO key is used to set or change the hours setting first. The numbers automatically advance every 0.6 second after a 1 second delay. After the user accepts the hours setting by pressing OK, the minutes setting is changed in the same way. For example, if the user wants to water for 1 hour and 20 minutes the display should read:

```
M1 100% Watering
Duration = 1h + 20m    O_K
```

If the user enters a duration of 0h + 0m, the controller will ask:

```
NO Watering for
Station #1             O_K
```

After the user confirms the minutes for Station 1 by pressing OK, he/she is asked:

```
Use SAME setting
for STATION #2 ?
```

If the user presses OK, the controller automatically displays a confirming screen for Station 2 with the duration that he/she entered for Station 1. If the user wants to use a different duration for Station 2, the user should press NO to get a new entry screen for setting Station 2 hours and minutes.

This pattern is repeated for all eight valves. Each time the user is asked if he/she wants to use the same setting for the next station, and each time the user can either accept or change this setting.

When 100% Watering Durations have been entered for all the active valve stations, the controller asks the user to enter the appropriate Watering Day Cycle for each station. How the user sets the Watering Day Cycle depends upon whether the user selects a Specific Days or an Every "So Many" Days cycle:

```
M* Water Cycle :          M* Water Cycle :
Specific days ?    OR     So Many" days ?
```

The display will show the currently selected watering cycle. There are two types of watering cycles. If the user does not want the choice displayed, he or she then presses "NO" or waits 2 seconds and then the other choice will be displayed. The user presses "OK" to select the Water Cycle he or she wants to use.

In most cases watering every "so many" days (for example, every 3 days) gives the most consistent moisture levels for plants. However, in some cases it is necessary to avoid watering on certain days of the week. In those cases, the user should choose a Specific Days Water Cycle (for example, Monday-Wednesday-Friday). The Water Cycle that is choosen will apply to all the active valves for the MINI SETUP. The user cannot mix Specific Days and "So Many" Days Water Cycles.

If the "specific days" method was chosen, then the display reads:

```
Stn 1 ON: ------
ON days: MON ?    O_K
```

After a delay the MON? automatically changes to TUE? and the days continue to advance automatically. The user needs only to press OK for the days on which he/she wants to water. The controller automatically assumes NO watering is wanted if the NO key or automatic advance is used. If the user presses OK for Monday, the display reads:

```
Stn 1 ON: M------
ON days: TUE ?    O_K
```

The day(s) selected is (are) determined by its (their) place on the top line of the display. For example, the first T represents Tuesday, but the second T represents Thursday. Also the first S represents Saturday, and the second S represents Sunday. When all the days have been entered, the user is asked to confirm (or reject) the day settings. For example, if Monday, Wednesday, and Friday is entered, the display reads:

```
Stn 1 100% = 0h + 20m
Every M-W-F--    O_K
```

In the specific case that only one day is selected, the controller asks if the user wants to water on that day every week, every other week, etc. The display reads:

```
Stn 1 100% = 0h + 20m
Every 1 wk
```

The user can select a one to nine week repeat cycle interval. This, in essence, allows the user to water every 7, 14, 21, 28, 35, 42, 49, 56, or 63 days on a specific day of the week.

If the "Specific Days" method was not chosen, the display shows the "Every So Many Days" cycle:

```
Stn 1 100% = 0h + 20m
Every 1 days
```

As usual, the user must use the "NO" key (or let the numbers automatically advance) to change the setting and the "OK" key to select the desired one. "Every 1 days" means every day, "Every 2 days" means every other day, etc. The user can select watering day cycles from every day to every 90 days in one day increments.

After setting the watering day cycle for Station #1, the user is asked "Use SAME setting for Station #2?" The user can either do this or change the setting as desired. Thus, the user can water every day for Station #2 even though Station #1 waters every three days.

After setting the Day Cycle, the user is asked if he/she wants an Excluded Period, and is then asked for a Start Time for the controller generated watering sequence. Excluded Periods are a feature of the irrigation controller in accordance with the present invention. They permit a user to specify when NO watering is to occur. The user is first asked if he/she wants an Excluded Period:

```
Do you want an
Excluded Period?
```

If the user presses NO, all other questions on Excluded Periods are skipped. If the user does want an Excluded Period, he/she is then first asked to define the start time for the period:

```
Excluded Period:
12:Midn
```

The user should actuate the NO key (or let the numbers automatically advance) to set the beginning or "Excluded FROM Time" for his/her excluded time "window." As the user (or the controller) advances the hour, the am and pm indicator also changes. The user should be sure that the hour reads "am" if he/she wants the Excluded Time Interval to start in the morning (am), or else "pm" if the user wants it to be in the afternoon or evening (pm). When the user has set the correct am/pm hour, he/she should then press OK and set the minutes after the hour for the "Excluded FROM" Time. The user is next asked to enter the ending or "Excluded TO Time" for his/her excluded time "window":

```
Excluded Period:
10:00am-10. am
```

The "Excluded TO" time can never be before the "Excluded FROM" time, so the default value for the "Excluded TO" time is always the same as the "Excluded FROM" time. The user employs the NO key (or lets the numbers automatically advance) to set the "Excluded TO" time to meet his/her special needs. For example, if the user was irrigating a public park or golf course where no watering was wanted during times when people were likely to be playing on the turf areas, then the user might set an Excluded Time Interval FROM 7:00am TO 7:00pm.

The user is next asked to enter the Start Time for the Mini setup. The display shows:

```
Start Time each
ON day = 12:Midn
```

The default Start Time is always 12:Midnight, since this is the earliest possible hour that the controller can start watering. The user should change the hours by pressing the "NO" key until the hour desired (for example, 6:pm) is displayed (or let the controller automatically advance the hour), and then press "OK." The am/pm setting automatically changes as the user changes the hours, and Midnight and Noon are indicated for easy identification. If the user selects either Midnight or Noon as a Start Time, then the display changes to read:

```
Start Time each
ON day = 12:00am
```
For midnight, OR

```
Start Time each
ON day = 12:00pm
```
For noon

The user should change the minutes setting if desired by pressing the "NO" key (or letting the numbers autoscroll) until the time wanted is displayed (for example, 6:15 pm), and then press "OK." The display then reads:

```
Start Time each
ON day = 6:15pm
```

Because the controller automatically calculates the start times for all the other valves, the Mini valve set up is now complete. The valves will always operate sequentially without overlap even if the user later sets the Water Budgeting Factor up to its maximum of 200%.

The display now reads:

```
Mini setup:
SAVING new setup
```

After a 2 second delay the following auto-scrolling menu appears:

```
Mini Setup:           Mini Setup:
Review Setup?  OK  OR  Modify Setup?  OK
```

```
Mini Setup:           Mini Setup:
Do New Setup?  OK  OR  Exit now?     OK
```

If the user selects "Review Setup" from the menu, he/she can view, but not change, some or all of the current settings. "Modify Setup" also allows the user to step through some or all of the settings, but pressing NO when in modify mode allows the user to go back and change the currently displayed setting.

If the user elects to review the settings, the display will read:

```
Review
Basic setup ?
```

The user should confirm that he/she wants to review the basic setup by pressing "OK." The display will then show the 100% Watering Durations, split cycle criteria and Watering Day Cycles for each of the valves in turn. Each screen has a blinking "$O_K$" character at the end, to remind the user that he/she needs to press OK to see the next screen. Depending on whether the "Specific Days" or "So Many" Days mode is selected, the display format will vary as shown below:

| | |
|---|---|
| Stn 1 100% = 1h + 20m<br>every M-W-F-S  $O_K$ | for specific days with multiple days per week selected |

OR

| | |
|---|---|
| Stn 1 100% = 1h + 20m<br>on Mon @2wks  $O_K$ | for specific days with only one day selected, where @2 wks = every 2 wks |

OR

| | |
|---|---|
| Stn 1 100% = 1h + 20m<br>Every 2 days  $O_K$ | for "so many" days mode |

The user should press "OK" to review the settings for the next valve station. The user should keep pressing "OK" to view the settings for all the active valves. Pressing "NO" while in this "review" mode will allow the user to jump to the next review item. For example, pressing "NO" when reviewing durations, jumps to the day cycle review screens. The user cannot change any settings in the review mode. To change settings the user needs to select Modify Setup or Do New Setup to start the MINI setup over again. Modify Setup works like Review Setup, except that each item has a blinking "?", and pressing "NO" allows the user to go back and change the displayed setting.

The user is next asked if he/she wants to review the controller generated start time sequence for all the active valve stations:

> Review daily
> schedule ?

If the user wants to skip this start time review, then he/she should press "NO". The user will then be returned to the Review/Modify/Do New Setup/EXIT now screen. If the user decides to proceed with reviewing the daily schedule, then he/she will be asked the following question:

> Water Budget
> to use = 100% ?

The user should press "OK" to confirm a Budget Factor of 100%, or use the "NO" key to change the Budget Factor to the desired value. The Budget Factor can range from 10% to 200% in 10% increments. The user is next asked to set which day he/she would like to review. If the controller is in "So Many" Days mode, the screen reads:

> Review for
> Day = #1 whereas in "Specific Days" mode the screen reads:

> Review for
> Day = MON

In either case, the user should select the appropriate day number or name by pressing the "NO" key, and then hitting "OK" to confirm his/her selection. In the "So Many" Days mode, the controller will always water on day #1. For example, if the user has set up his/her program for every other day (every 2 days), day numbers 1, 3, 5, etc. will be active watering days, while no watering will occur on day numbers 2, 4, 6, etc. Likewise, for every third day watering (every 3 days), day numbers 1, 4, 7, etc. will be active watering days, and no watering will occur on the days between these active watering days (i.e., day numbers 2, 3, 5, 6, etc.).

In the case of "Specific Days" the user is then asked an additional question:

> Review MON
> for week = #1

Suppose that the user has set up his/her schedule for watering on Monday every other week. The controller will always water the first week, so the active watering weeks will be week #1 and week #3, while no watering will occur for week #2 and week #4.

After the user has set the budget and day for review, he/she will get the following message screen:

> Press OK to see
> ending time   $O_K$

When the user presses OK, the following screen is displayed:

> Watering ends
> at 6:17 pm   $O_K$

After pressing OK again, the following screen appears:

> Press OK for to
> see each ON time   $O_K$

The user should press "OK" and the Start Time for the first active valve will be displayed as follows:

> Stn 1 ON 1 of 1 =
> 1h + 20m @ 6:15pm   $O_K$

The user should Press "OK" again and the controller generated start time for station #2 will be displayed:

```
Stn 2 ON #1 of 1 =
0h - 15m @ 7:35pm    OK
```

The user should keep pressing "OK" to view the start times for all the other valve stations. When the review is finished the display reads:

```
Mini setup
Review setup ?    OK
```

The user should press "OK" to start the review process over again.

3.5.2 AUTOSPLIT VALVE SET UP

This station setup is called AUTOSPLIT because the 100% watering durations that the user sets are split into shorter repeat cycles whose length is automatically determined based upon user entered information about the site. The controller automatically calculates the next available start time for each successive station and for each additional split watering cycle, starting at the start time that the user specifies and automatically skipping over any specified "excluded time" when no watering is desired. This automatic sequential start time generation allows the user to get maximum utilization of the time available for irrigation, and it prevents hydraulic problems that could occur if several station run times were to overlap.

Besides Split Watering Cycles and excluded watering times, this setup has many other powerful features. The user can set a different watering day cycle for every valve station if he/she so desires, can program multiple syringe cycles for any station for any desired months of the year, can program periodic deep soak cycles for any station, and with optional soil sensors can program "soak" and "dry" limits for integrated soil moisture sensing.

With all these powerful features, the AUTOSPLIT setup is still easy to program because the controller prompts the user with all the right questions, and gives him or her the best guess "default" answers for all the questions. Help is available every step of the way merely by pressing the HELP key. After the user has entered all the information, he/she can then review all the settings that were entered and can also review the repeat start times for all the valve stations that the controller automatically calculates.

If the user wants to experiment with making changes to the AUTOSPLIT setup without losing his or her original setup, there is even an ALTERNATE AUTOSPLIT setup available. The "AUTOSPLIT" and "ALTERNATE AUTOSPLIT" SETUPS are done in exactly the same way.

Before proceeding with entering the schedule by station the user should consider what he/she wants each station to accomplish, and what kind of plants it will be watering. A station represents a valve and a moisture sensor, if sensors are being used. If the user assigns station numbers (as is suggested in Setup System) according to the desired types of watering schedules for the different types of plant materials, then entering these different types of schedules becomes much easier. That is because the controller asks the user if he/she wants to use the same setting for the next station. This allows information entered for one station to be copied to the next station. If stations with similar types of schedules are grouped together by station number, this makes it much easier for the user to enter the necessary information.

For example, assume that stations 1 through 5 are turf stations that the user wants to water on Monday, Wednesday, and Friday, and stations 6 through 8 are shrub stations that the user wants to water on Saturday every other week. Once the user enters the 100% Duration and the Watering Days Cycle for Station #1, the displayed 100% Durations and Watering Days will initially be the same for Stations 2 through 6, and the start times for Stations 2 through 6 will be sequential. Thus, the default Start Time for Station #2 will be the ending time for Station #1, etc. When the user changes to a different Watering Day Cycle for Station #6 (instead of accepting the default cycle from Station #1), the Start Time that the user enters for the AUTOSPLIT setup automatically becomes the start time for the first active station on the new Watering Day Cycle (i.e., Station #6), and the automatically generated start times for Stations 7 and 8 are sequential from this start time.

The information needed to set up the stations is summarized in the Autosplit Watering Chart (Table 6). For most of the items on the Watering Chart, the stations are set up one after another, following the Watering Chart horizontally from row to row. When questions pertaining to each item have been answered for all eight stations, the controller moves down to the next row in the Watering Chart. However, where several different items are related, the related questions are all asked for the first station and then the same series of questions is repeated for each subsequent station in turn.

The first item that needs to be set for each station is the 100% WATERING DURATION. The display screen for Station #1 reads:

```
Stn 1 100% Watering
Duration = 0h - 0m
```

The user should set the total length of time in hours and minutes that he/she wants Station #1 to run for each irrigation day. The user should keep in mind that each start time can be split into shorter "split" watering times for erosion and runoff control.

The irrigation controller permits the user to set a 100% Duration anywhere from 1 minute to 4 hours. If the user sets the BUDGETING FACTOR to anything other than 100% when the controller is in the RUN or SEMI-AUTO mode, then the 100% Duration set here will automatically be multiplied by the Budgeting Factor. Depending on whether the Budgeting Factor is greater than or less than 100%, it can increase or decrease the actual total duration for each station. Thus, with a 100% Duration setting of 40 minutes, the actual total duration would be 60 minutes with a Budgeting Factor of 150% or 20 minutes with a Budgeting Factor of 50%.

Even though the total watering duration is increased when the user increases the Budgeting Factor, there is no danger of runoff or erosion with the controller in accordance with the present invention because individual Split Watering Cycles will never be longer than the maximum ON time that the user designates (see below). When the user increases the Budgeting Factor, then more Split ON Times will occur, each separated by the minimum OFF time that the user has specified (see below). Likewise, when the user decreases the Budgeting Factor, then fewer Split ON Times will occur but each Split ON Time will never be longer than the maximum Split ON Time that the user has designated (although the last Split ON Time may be shorter than the maximum ON time if the 100% Duration does not split into an even number of Split Watering Cycles).

The user should also be aware that by use of soil sensors the actual total run time for any given station may be shorter than the 100% Duration that is set. The soil sensors can terminate a watering cycle in the middle, or eliminate a split start time completely, if there is adequate moisture in the soil.

After the user has set the 100% Duration for Station #1, he/she will be asked:

```
Use SAME setting
for Station #2?
```

Pressing NO allows the user to change the setting, and pressing OK takes the user to the confirm screen for Station #2:

```
Stn 2 100% Watering
Duration = 1h+5m   O_K
```

After the 100% Duration settings have been entered for all eight stations, the next display deals with SPLIT WATERING CYCLES and reads:

```
Press O_K to split
using site info   O_K
```

This screen is for information only, since splits are mandatory. Split cycles divide the 100% Watering Duration split into several shorter watering cycles. The Split Watering feature is useful for newly seeded areas, slopes, or anywhere heavy soils exist to reduce runoff and erosion. If the user presses NO, a help message automatically appears that explains splits and how they work. After OK is pressed the next screen reads:

```
Stn 1: View
Site info ?
```

This allows the user to view (but not to change) the site information (terrain and soil type, and sprinkler type) entered in Setup System. A typical site info screen might be:

```
Stn 1: hilly loam,
lawn sprays    O_K
```

If the user presses OK (or NO) in response to this question, the display jumps to the next screen:

```
Using site info
to auto-split ...
```

This screen tells the user that the controller is going to use the site information to automatically enter the best maximum ON, minimum OFF, and number of splits for the current station. A typical example for the next screen is:

```
Stn 1: 5 splits
@ 3m ON, 30m OFF   O_K
```

If the user presses OK, the automatically generated split criteria are confirmed. If the user wants to change these settings, he/she can press NO. This allows the user to directly change first the maximum ON time, then the minimum OFF time, followed by a new confirming screen. The sequence of screens for this direct modification process is as follows:

```
Stn 1 100% = 0H+15m
@ _3m ON, 30m OFF
```

```
Stn 1 100% = 0h=15m
@ 5m ON, 30m OFF
```

```
Stn 1: 3 splits
@ 5m ON, 30m OFF   O_K
```

Each Split ON Time can range from 1 minute to 60 minutes (for drip applications), and it is not necessary for the Split ON Time to divide evenly into the 100% Duration that the user has set. If the Split ON Time does not divide evenly into the 100% Duration, the controller automatically shortens the length of the last Split ON Time. For example, if the user's 100% Duration were set at 1 hour+5 minutes (65 minutes) and if the user entered a value of 10 minutes for the Split ON Time, then the controller would run six ten minute Split ON Times and then the last ON time would only be 5 minutes. The automatically entered Split ON Times for various combinations of soil, terain, and sprinklers built into the controller are as shown in previous Table 1 of Section 2.1.4.1.

The split criteria confirming screen tells the user how many Split Watering Cycles the controller will perform with the 100% Watering Duration and Split ON Time that has been entered. If the user wants to change the number of watering cycles, he/she can do so by pressing NO. The user will be taken back to the screen for directly entering the Split ON Time, and the user can decrease the number of Split Watering Cycles by increasing the Split ON Time, or the user can increase the number of split cycles by decreasing the Split ON Time. For example, if the 100% Duration was 1 hour+5 minutes (65 minutes) and the user changed the Split ON Time from 10 minutes to 5 minutes, then 13 Split Watering Cycles would result instead of 7. If the displayed number of split ONs is acceptable, the user then presses OK.

The Split OFF Time is the minimum time between Split ON Times. The user should set the Minimum OFF Time for long enough to allow the water from the Split ON Times to soak into the soil. Usually the pre-set value of 30 minutes is adequate, but the Minimum OFF can be set anywhere from 0 to 60 minutes.

The Watering Day Cycle is set up next. Like in the Mini setup the user is first asked whether to use "Specific Days" or "So Many Days" If the "Specific Days" method was chosen, then the display reads:

```
Stn 1 ON: ------
On days MON ?  O_A
```

The user should press the keys to select which days to turn on for station 1:

```
NO    Make the displayed day an OFF day and move
      to the next day
OK    Make the displayed day a watering day and move
      to the next day
```

Just as with the MINI setup, the day selected is determined by its place on the display. For example, the first T represents Tuesday, but the second T represents Thursday. Thus, M—T—S— would designate Monday, Thursday, and Saturday as the desired watering days. Also, like with the Mini setup, the days automatically advance, so that the user only needs to use the OK key.

In the specific case that only one day is selected, the controller then asks the user if it is wanted to water on that day every week, every other week, etc. The display reads:

```
Stn 1 ON M------
MON every 1 wks
```

The user can select a one to nine week repeat cycle. This in essence allows the user to water every 7, 14, 21, or 28, 35, 42, 49, 56, or 63 days on a specific day of the week.

If the "Specific Days" method was not chosen, the display shows the "Every So Many Days" cycle:

```
Stn 1 100% = 1h - 5m
Every 1 days
```

The user should select how many days are wanted between watering days for station 1. "Every 1 days" means every day, "Every 2 days" means every other day, etc. Watering day cycles can be anywhere from 1 to 90 days in increments of 1 day.

After setting the Day Cycle, the user is asked if he/she wants an Excluded Period, and is then asked for a Start Time for the controller generated watering sequence. Excluded Periods are a feature of the irrigation controller in accordance with the present invention. They permit a user to specify when NO watering is to occur. The user is first asked if he/she wants an Excluded Period:

```
Do you want an
Excluded Period?
```

If the user presses NO, all other questions on Excluded Intervals are skipped. If the user does want an Excluded Period, he/she is then first asked to define the start time for the period:

```
Excluded Period:
12:Midn
```

The user should actuate the NO key (or let the numbers automatically advance) to set the beginning or "Excluded FROM Time" for his/her excluded time "window." As the user (or the controller) advances the hour, the am and pm indicator also changes. The user should be sure that the hour reads "am" if he/she wants the Excluded Time Interval to start in the morning (am), or else "pm" if the user wants it to be in the afternoon or evening (pm). When the user has set the correct am/pm hour, he/she should then press OK and set the minutes after the hour for the "Excluded FROM" Time. The user is next asked to enter the ending or "Excluded TO Time" for your excluded time "window":

```
Excluded Period.
10:00am-10:  am
```

The "Excluded TO" time can never be before the "Excluded FROM" time, so the default value for the "Excluded TO" time is always the same as the "Excluded FROM" time. The user employs the NO key (or lets the numbers automatically advance) to set the "Excluded TO" time to meet his/her special needs. For example, if the user was irrigating a public park or golf course where no watering was wanted during times when people were likely to be playing on the turf areas, then the user might set an Excluded Time Interval FROM 7:00am TO 7:00pm.

The next screen lets the user enter the Start Time for the AUTOSPLIT automatically generated watering sequence. All the user needs to do is enter one Start Time, and the controller automatically calculates the start times for all stations for each Split ON Time, taking into account Excluded Times, and Minimum OFF times.

```
Start Time each
ON day =0 12:Midn
```

The earliest Start Time that the user can set for the day's watering is at 12:Midnight, so the controller automatically gives this time as the default Start Time. The maximum amount of time available for watering each day is 23 hours and 59 minutes. Accordingly, if long 100% or Soak (see below) Watering Durations or a long Excluded Period (which decreases the amount of available time for watering) have been set, the user must set the Start Time early enough to complete the day's watering before 11:59pm. If the user sets the Start Time too late, then an error message will result when the setup is completed. If the user wants to water only in the middle of the night, then the Start Time should be set at 12:Midnight and a long excluded time such as FROM 3:00 am TO 10:00 pm would be set. What results is watering from midnight to 3:00 am with the rest of the daily watering being finished from 10:00 pm until all the split ON times have been completed. This accomplishes the same thing as watering from 10:00 pm on one day until 3:00 am on the next (which is something that you cannot do with the controller because it treats each 24 hour entity starting at 12:00 midnight as a separate day).

After setting the Start Time for the basic watering schedule, the user is next asked if he/she wants Optional Syringe Cycles:

```
Do you want
Syringe Cycles ?
```

The user may set multiple Syringe Cycles with 1-15 minutes per cycle and with the ability to specify which part of the day and which months of the year that syringing is to occur. Thus, the user is able to set cooling syringes for desert areas to automatically syringe for say 5 minutes every hour from 9:00 am until 6:00 pm every day during the hot months of July, August, and September.

The controller further performs optional Soak Cycles. The question is asked:

```
Do you want
a Soak Cycle ?
```

The user may set up periodic Soak Cycles for deep watering trees in lawns, leaching salts in drip applications, etc. These Soak Cycles will permit the user to program durations of up to 8 hours per valve with repeat cycles ranging from once a week to once every 63 days (in Specific Days mode) or from 1 day to 90 days (in "So Many Days" mode). The user is able to program different Soak cycles for each different valve station. The first screen reads:

```
Stn 1: Do Soak?
(100% = 0h + 15m)
```

Like with split cycles, the soak duration is automatically calculated based on the user entered site info.

The following screen tells the user that this is going to occur:

```
Use site info
to calculate   O_K
```

If the user presses NO, a HELP message explains further what the controller is doing. Pressing OK gives the user the following typical screen:

```
Stn 1 SOAK = 2h + 8m
with 16 8m ONs   O_K
```

If the user does not like the controller calculated soak duration, he/she can press NO and then modify the hours and minutes as desired.

After the Syringe and Soak Cycle information has been entered (or skipped if the user does not want to use these features), all the information that the controller needs to automatically calculate the AUTOSPLIT watering schedule will have been entered. If the user's set up is good, that is, if the user has not made any errors such as programming more hours than are available in a day, etc.), the display reads:

```
Autosplit setup:
SAVING new setup
```

The Review Set/Modify Setup/Do New Setup/Exit Now autoscrolling menu screen now appears. Pressing OK when the screen reads "Review Setup?" permits the user to enter the Review Settings mode which permits viewing some or all of the information that was entered in a systematic way. Pressing NO here skips all the questions and display screens dealing with Reviewing Settings. If the user presses OK, then he/she is first asked if he/she wants to "Review Basic Setup?"

3.5.3 Review Basic Setup

```
Review
Basic Setup ?
```

If the user presses OK, 100% Duration for Station #1 is shown.

```
Stn #1 Watering
Duration = 0h + 5m   O_K
```

The user should press OK to see the Duration setting for Station #2, etc. If the user does not want to continue reviewing these settings or if the user wants to go forward and look at the next group of settings, for example, split cycle criteria, then the user should press NO and the controller will jump forward to the next block of settings.

When the user has finished reviewing the Duration settings, the Split Cycle Criteria that have been entered will be shown next (by station).

```
Stn 1: 2 Splits
@ 3m ON, 30m OFF   O_K
```

After the user finishes reviewing the split maximum ON's and minimum OFF's for each station, the watering day cycles are reviewed.

```
Stn 1 100% = 0h + 5m
every 2 days      O_K
```
for "so many days" mode

OR

```
Stn 1 100% = 0h + 5m
on M-W-F--        O_K
```
for "specific days" mode

Next the Start Time and Excluded Period that have been entered are shown:

> Excluded Period
> none entered    OK

> Start Time each
> ON day = 12:00am    OK

Since the start and excluded times apply to all 8 stations, these review screens appear only once (i.e., it is not repeated for each of the 8 valve stations).

Display screens are also available to view the Syringe and Soak setups.

After all the settings have been reviewed (or after the user presses NO for the Review Settings question), it is permitted to review all the controller generated start times for any day that the user chooses to review. The user will get a screen that reads:

> Review
> daily schedule ?

If the user does not want to review all the ON times, he/she should then press NO and the controller will revert back to the Review Setup?/Modify Setup?/Do New Setup?/Exit Now? autoscrolling screen. If the user presses OK, then he/she will have to answer several more questions before it is possible to actually start reviewing the ON times for each valve station. The first question is:

> Water Budget
> to use = 100%

The user should press the NO key to set the Budget Factor for this review anywhere from 10% to 200% in 10% increments, or should press OK to accept the default Budget of 100%. The Budget Factor does NOT affect syringe and soak watering times; it only affects the basic watering program. The user can review the ON times at any budget that is wanted. Changing this setting, however, has NO effect on the Budget Factor that is actually used when the controller is running. The user may set the actual run-time Budget Factor when the user next causes the controller to enter the AUTOMATIC RUN or SEMI-AUTO RUN Mode.

The user should next tell the controller which day the user would like to review. In "So Many" Days mode, the display reads:

> Review for
> Day = # 1

The user should remember that in "So Many" Days mode, watering always occurs on Day #1 whether the day cycle is set to every day or every 30 days. For every other day watering schedules, days 1, 3, 5, etc. will be watering days and days 2, 4, 6, etc. will be "off" days when no watering occurs.

For Specific Days Mode, the display reads:

> Review for
> Day = SAT

Once the user has picked the specific day that he/she wants to review, the user is then asked for the week that he/she wants to view:

> Review Sat
> for Week = # 1

The user should select either week 1, 2, 3, etc., up to 9 for review. The user should remember that he/she can program watering on Saturday every other week if so desired, so that in weeks 1 and 3 watering would occur on Saturday, while in weeks 2 and 4 no watering would occur in this example.

With the optional Syringe and Soak features, the user is able to review Syringe and Soak ON Times if Syringes or Soaks are scheduled for the day being reviewed.

Once the user has answered these preliminary questions, the user will get the following message screen:

> Press OK to see
> ending time    OK

After viewing the ending time for the day, the next screen reads:

> Press OK for
> each ON Time

The user should press OK in order to display the first ON Time for station #1 (if station #1 is an active valve) for the day selected (if any ON times exist). Pressing OK again will display the first ON Time for station #2, etc. All the Split ON Times for all the active valve stations will be sequentially displayed until all the ON Times for the day have been displayed or until the user presses STOP to stop the review process (or NO to get back to the Review Setup?/Modify Setup?/Do New Setup?/EXIT now? menu screen).

The display screen for reviewing the generated sequence of ON times tells the user the station number, the split cycle number, the watering duration for that particular split ON, and the actual time that the station in question comes on. Generated starts are also differentiated as to whether they are a basic watering Split ON Time, a Soak Cycle Split ON Time, or a Syringe ON Time by the first line of the display:

> Stn 1 ON 1 of 7
> 0h + 10m @10:00am    OK

For Basic Watering Split ON Times; OR

```
┌─────────────────────────┐
│ Stn 1 SOAK 1 of 13      │
│ 0h+10m @10:00am    O_K  │
└─────────────────────────┘   For Soak Cycle Split ON Times;
                                             OR ┌─────────────────────────┐
│ Stn 1 Syr 1 of 10       │
│ 0h- 5m @12:30pm    O_K  │   For Syringe ON Times.
└─────────────────────────┘
```

Pressing NO at any time during this review process takes the user back to the Review Setup?/Modify Setup?/Do New Setup?/Exit Now? autoscrolling menu screen (where the user can press OK to start the generated sequence review over again for a different day or for a different Budget Factor). This review process will permit the user to view everything in advance, so the user always knows exactly what the controller is going to do on any given day. Of course, the user can skip this review process completely just by answering NO to the first question.

If the user selects Modify Setup instead of Review Setup, he/she can selectively change settings by stepping through a similar sequence of screens. Pressing OK confirms the displayed setting, and pressing NO takes the user back to the original data entry screen.

3.6 How to Automatically Run the Controller 3.6.1 Automatic Run Mode

After finishing SET SCHEDULES, the user should select the RUN STATIONS mode, then he/she should choose AUTOMATIC RUN from the autoscrolling menu. The display then reads:

```
┌─────────────────┐
│ Do you want to  │
│ delay watering? │
└─────────────────┘
```

Pressing OK allows the user to set a day of from 1 to 14 days before automatic watering actually begins. This is useful as a "rain delay" when the user wants to not run the controller during a rainy period, but then wants it to resume automatic operation without having to visit the controller again. The next screen reads:

```
┌─────────────────┐
│ Delay watering  │
│ for _1 days     │
└─────────────────┘
```

The rain delay can be set for anywhere from 1 to 14 days. The next screen reads:

```
┌─────────────────┐
│ View Active     │
│ Station #s ?    │
└─────────────────┘
```

If the user presses OK, the following screen is displayed:

```
┌─────────────────┐
│ Using: 12345678 │
│ Is this OK ?    │
└─────────────────┘
```

If the user wants to disable one or more stations, he should press NO and the display will change to read:

```
┌─────────────────┐
│ Using: -------- │
│ Use Stn 1 ?     │
└─────────────────┘
```

The user should press OK if he/she wants to use station #1, or NO if he/she does do not want to use this station. If the user presses OK, the display reads:

```
┌─────────────────┐
│ Using: 1------- │
│ Use Stn # 2 ?   │
└─────────────────┘
```

Note that there is now a "1" instead of a "−" for station #1, indicating that this station is now active. After a delay the station number automatically advances to Stn #2, and a "−" is automatically inserted on the top line. Thus, the user needs only press OK for the stations that he/she wants enabled. The user should repeat this process until all the desired valves are turned on (number displayed) or off ("−" sign displayed) as desired. When the user has made his/her entry for station #8, the display will read something like:

```
┌─────────────────┐
│ Using: 1-345678 │
│ Is This OK ?    │
└─────────────────┘
```

The user should press OK to confirm that he/she indeed wants station 2 disabled, or NO if he/she wants to go back and change his/her settings.

The user should use this Enable/Disable set up to tell the controller which valve stations that he/she wants to be active (enabled). The controller comes pre-set with all the stations active. A user's installation, however, may require less than eight valve stations or the user may need to inactivate (disable) one or more of the stations while he/she repairs his/her irrigation system. In such cases, the user can temporarily inactivate one or more valves. Any disabled valves will be skipped when the controller is actually running, and any previously scheduled watering times for the inactivated valves will be skipped.

After the enable/disable setup has been completed (or skipped if the default is accepted), the user is asked to choose which previously entered schedule setup that he/she wants to run. The next screen reads:

```
┌─────────────────────┐
│ AUTOMATIC RUN:      │
│ Mini Setup ?    O_K │
└─────────────────────┘
```

The second line of the displays automatically advances after a delay, and the user needs to press OK when the appropriate setup is displayed. The last choice on the autoscrolling menu is "EXIT now?", and the user can select this option if he/she decides not to start the automatic run until later. After the setup is chosen, the next screen reads:

```
┌─────────────────┐
│ Water Budget    │
│ to use = 100%   │
└─────────────────┘
```

The user needs to either accept the default value for the water budget, or select a new value anywhere from 10% to 200% in increments of 10%. The next screen reads:

```
To water, take
Power Key out'
```

The user then needs only to remove the POWER-KEY ™ power source to begin automatic watering. The controller will now run with the chosen watering setup in it, and valves will turn on the next time a start time occurs.

3.7 How to Manually Run the Controller
3.7.1 Manual Mode

The user should select MANUAL Mode to turn the valves on or off independent of the timer, to run a timed Test Sequence for checking the irrigation system, or to read the soil moisture sensors.

There are four choices in MANUAL Mode:

```
MANUAL RUN              MANUAL RUN
Run Stations?    OK  OR Run Test Seq?   OK
```

```
MANUAL RUN              MANUAL RUN
Read Sensors?    OK  OR EXIT Now        OK
```

The user should press OK to select the operation shown on the screen, or NO to switch between screens. If STOP is pressed, then all valves will be turned OFF, and the main "CHOOSE ONE (OK)" function select screen will be displayed.

3.7.1.1 Manual Valve Operation

Select "Run Stations" from the MANUAL RUN Mode to manually operate the valves. The display reads:

```
Stn # --------
Turn #1 ON ?       where - = off and number = on
```

The status of all the valves is shown on the first line of the display. The valves are shown in order ;the valve number displayed means the valve is on, and — means the valve is off.

The second line of the display shows the condition of any one valve. In the example above, the user can press OK to turn valve #1 ON, or NO to leave it OFF. If the user presses OK, the display changes to read:

```
Stn #: 1-------
Turn #1 OFF ?
```

Pressing OK again, station #1 turns OFF and the display changes to read:

```
Stn # --------
Go to Stn #2 ?
```

If the user again presses OK, the display changes to read:

```
Stn # --------
Turn #2 ON ?
```

If the user presses NO, the display changes to read:

```
Stn # --------
Go to Stn #3 ?
```

If the user doesn't press OK or NO, the display auto-scrolls after a pause between three different screens:

```
Stn # --------           Stn # --------
Turn #2 ON?       OR    Go to Stn #3 ?
```

```
Stn # --------
EXIT now ?
```

If a valve is already on, the first menu choice is:

```
Stn #: -2------
Turn #2 OFF ?
```

Pressing OK will shut if off, while pressing NO or letting the menu auto-scroll will allow the user to move on to station 3 with station 2 still running.

Once a valve is manually turned on, it will stay on until the user either 1) turns it off as described above, 2) presses the STOP key, or 3) removes the POWER-KEY ™ power source. Normally, the user should only use the second and third ways of manually turning a valve off in emergencies. Pressing the STOP key in Manual Mode takes the user back to the main function select menu screen.

When the user has finished turning ON and OFF stations in MANUAL RUN, the menu choice "EXIT now" is chosen. If any stations are still on when the user chooses to exit, the following screen is displayed:

```
All stations ON
Turning OFF now
```

3.8 How to Review System History With View Info Mode
3.8.1 Reviewing System History The user may review the performance of the controller by entering VIEW INFO mode and selecting See History. The controller stores the last 128 significant events in chronological order, ending with the most recent event. An event can be a valve start, a status event, or a programming event. The user must press OK to see the next screen, or STOP to end the history review.

The data stored from each valve start is displayed as follows:

```
Stn 1  10:00am
0h - 15m        °K
```

The history shows the station number, the starting time, and the actual ON time used.

4.0 Functional Description of the U1 ASIC Device

Figure 3A:
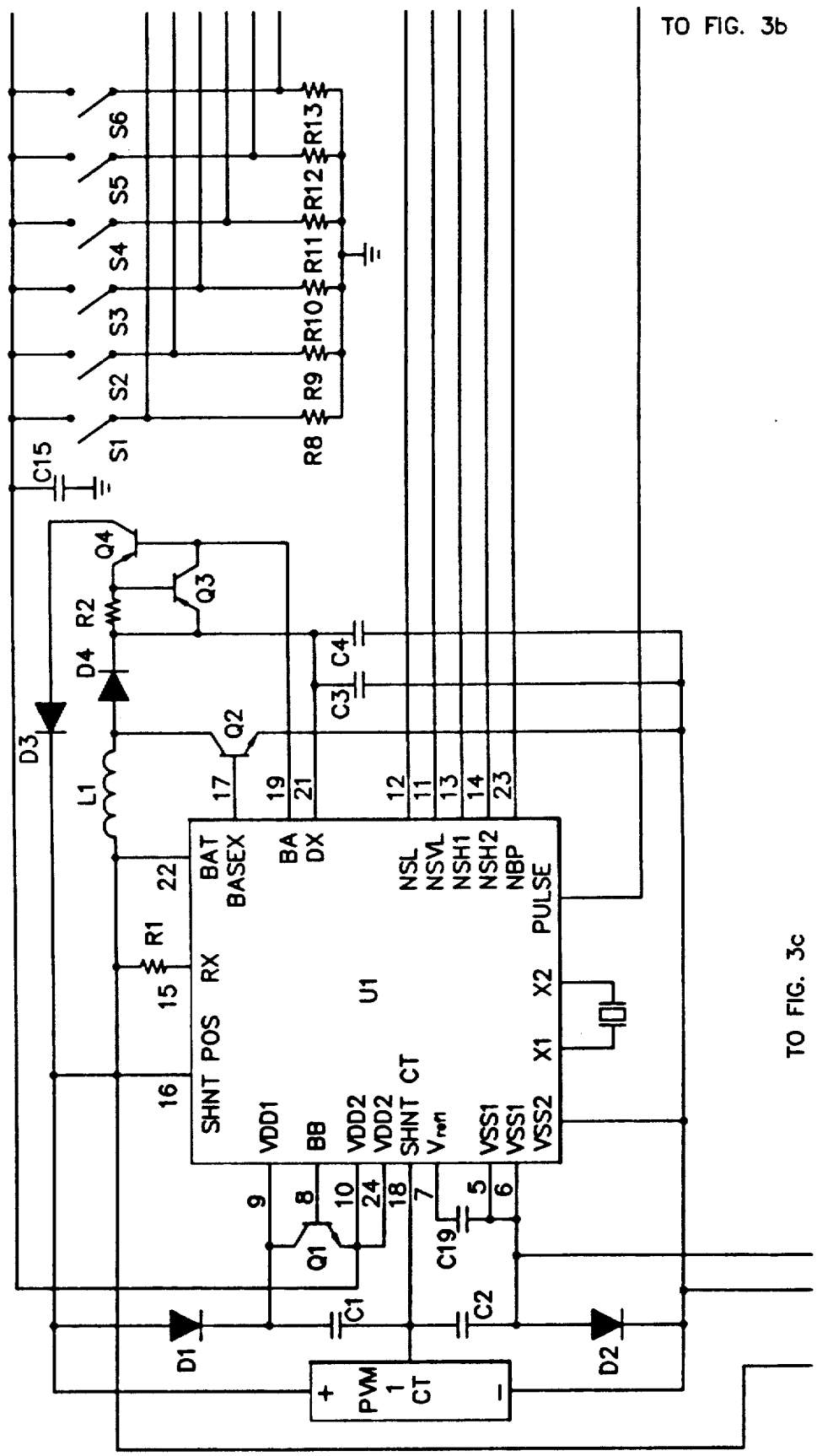
Figure 3B:
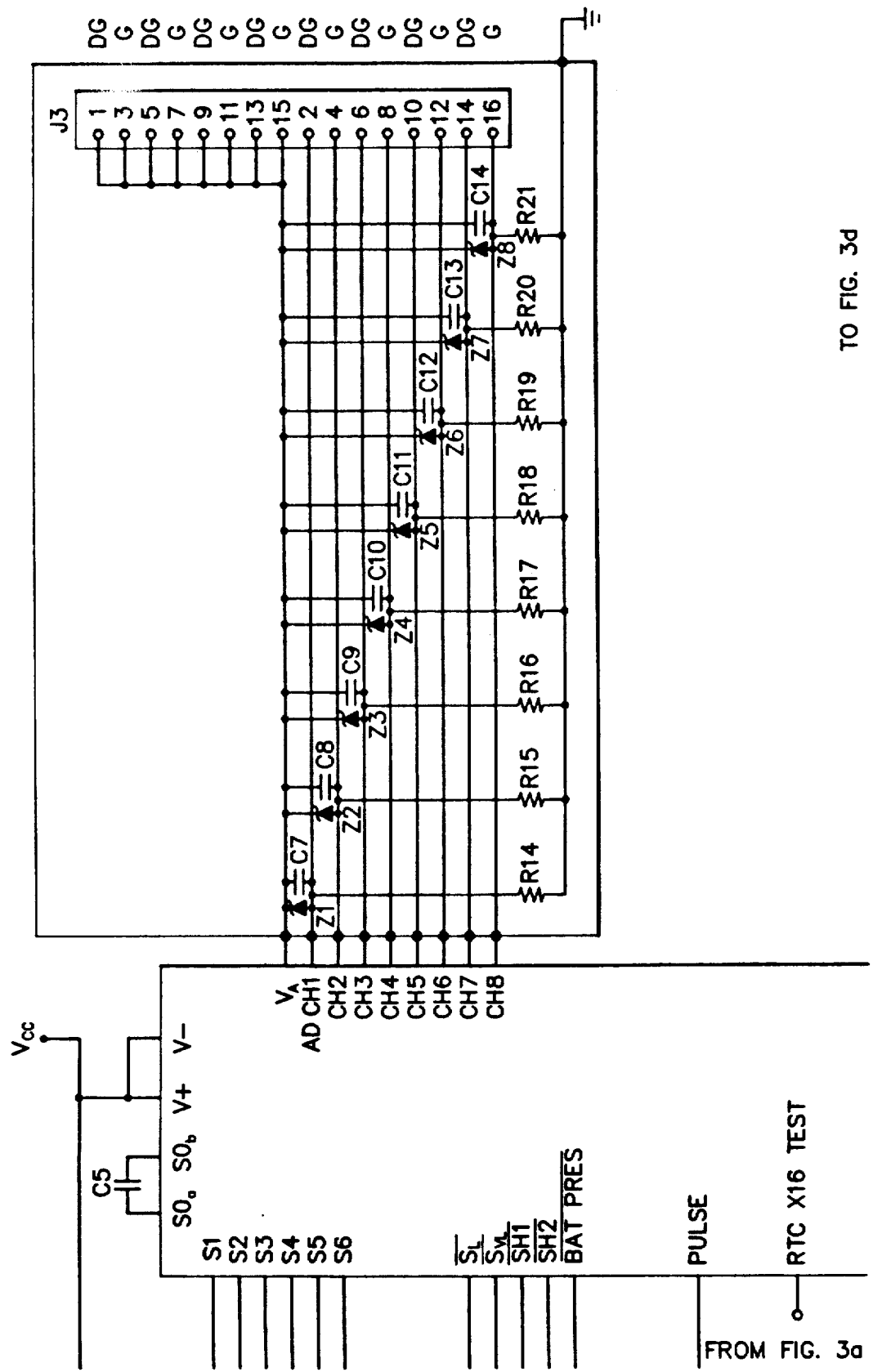
Figure 3D:
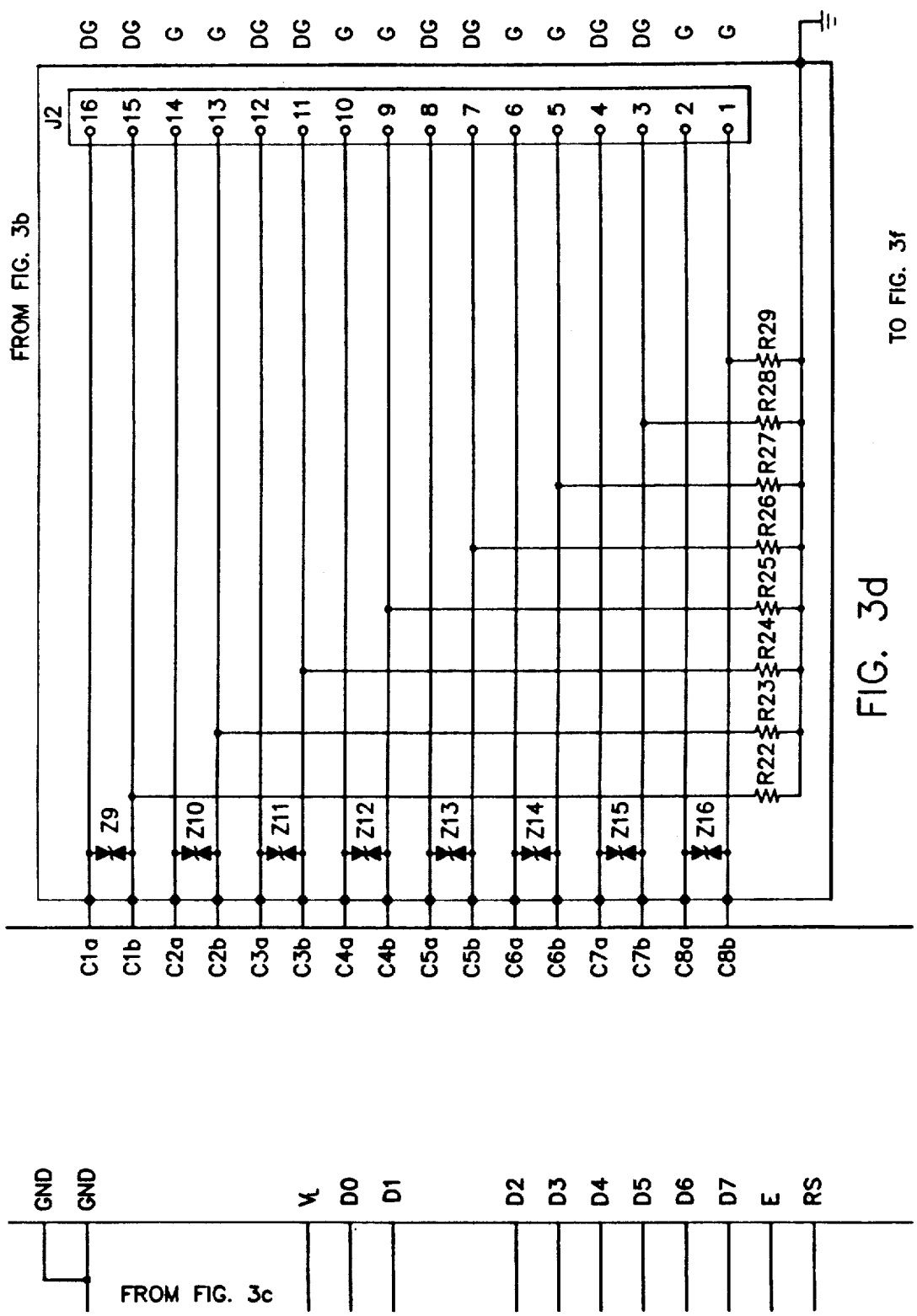
Figure 3E:
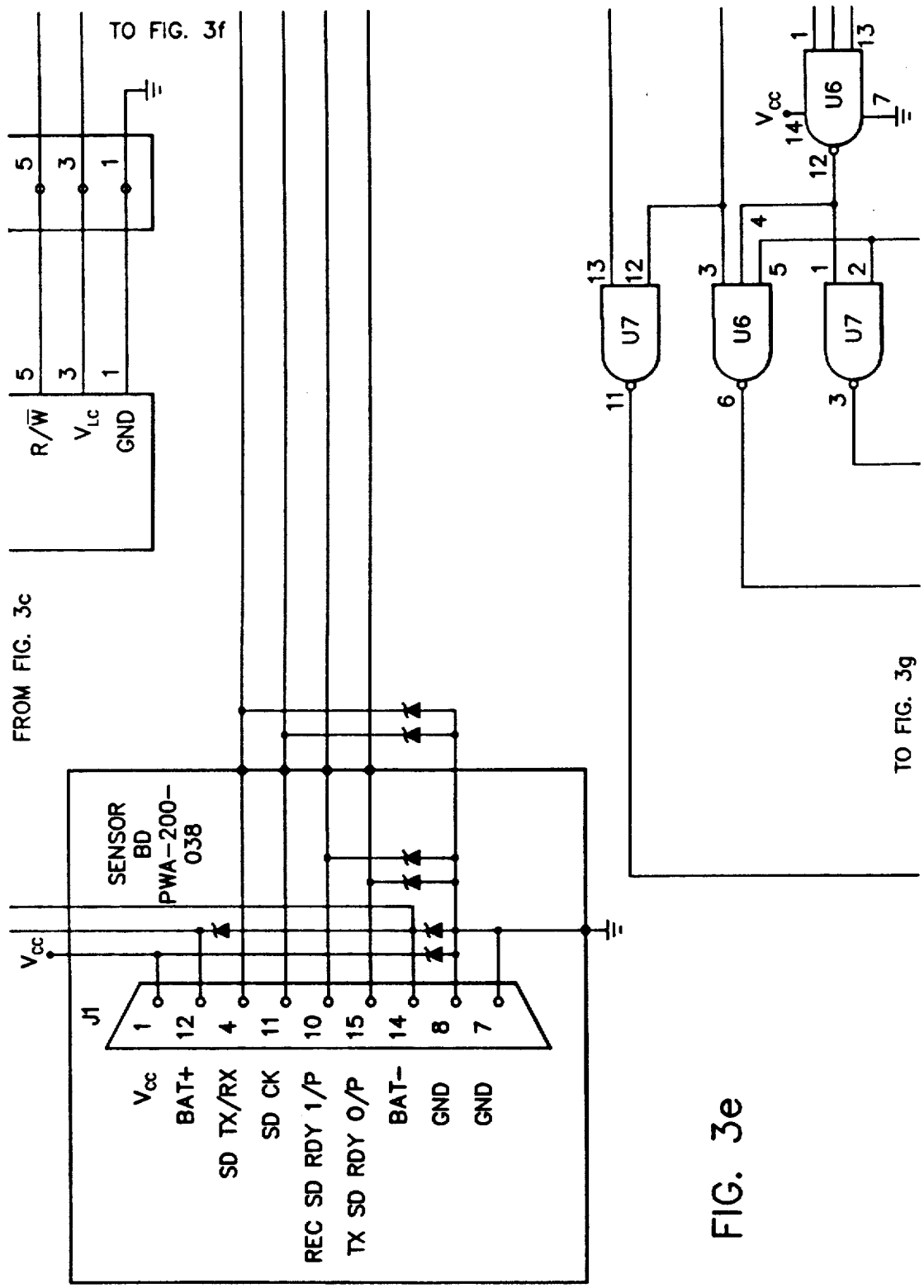

The block diagram of FIG. 4 shows the overall architecture of the first, U1, Application Specific Integrated Circuit (ASIC) used within the preferred embodiment of the irrigation controller in accordance with the present invention. The detail function of ASIC U1 is essentially unimportant for the purposes of the present invention, and is included within this specification only for purposes of completeness. The photovoltaic module (PVM, shown in FIG. 3a), SUPERCAPS C1 and C2 (shown in FIG. 3a) and ASIC U1 (shown in FIG. 3a) may be considered to simply be the implementation of a special form of a light-energized power supply. The general implementation of an a.c. or battery source power supply is, of course, routine in the electrical arts.

The U1 ASIC device is used to generate a 5 volt power supply using power from a photovoltaic modult or battery. Power is stored by charging very large supercapacitors ("SUPERCAPS") to 10.8 volts. The stored energy is then used for operation during dark periods. Because the energy stored in the SUPERCAPS = $\frac{1}{2} CV_{cap}^2$, the run time duration of the controller during conditions of darkness is greatly affected by how closely the maximum charge voltage can be brought to the maximum tolerable voltage for the SUPERCAP components. Therefore, to increase the dark run time, the "SUPERCAPS" are very carefully monitored, so that they may be charged to a maximum value without being over-charged.

The U1 ASIC device is designed to use minimal power while providing five (5) functions:

First, it monitors SUPERCAP voltages and shunts the charging current if they are over-charged. The monitoring holds this voltage to within $\pm/-1.75\%$.

Second, it provides a 5 volt $+/-2.5\%$, 0-65 mA output voltage to power other electronics.

Third, it provides status signals indicating the condition of the power supply.

Fourth, it provides a 2 kHz, 30 us pulse for use as a time base.

Fifth, it steps up a 9 volt battery to 17 volts to charge the SUPERCAPS and provide current during programming of other electronics. (Power consumption is less of a concern in this mode.)

Sampling capacitors are used to monitor the various capacitor and power supply voltages, allowing the use of only one comparator to conserve current. CrSi 100 k$\Omega$/ resistors are used to minimize analog currents.

The voltage reference is trimmed using on-chip metal fuses.

There are 3 potential 'most positive' voltages and two potential 'most negative' voltages, making substrate connections difficult. This is handled by using bipolar junction isolation that employs the isolated n- regions as separate CMOS substrates. This allows the CMOS circuitry to operate from several supplies, any one of which could be at the highest potential at different times.

The logic generally runs from VSS1 (0V) to VDD2 (0-5V), level shifting where required. Analog references run from VSS1 to VDD1 (0-11V). Switching regulator components run from VSS2 ($-0.7$ to $+5.5$ V) to VBAT (0 to 15 V). The upper shunt transistor is connected to a voltage which can range from 0 to VDD1+0.7V.

4.1 VREF1 Voltage Reference

The VREF1 circuit X4 is a voltage reference for monitoring supercaps, system low, and system very low. The circuit requires no op-amps, reducing offset error. NMOS transistors at collectors of non bandgap transistors are used to eliminate early voltage effects. The circuit has a buffered output which multiplies the bandgap voltage and is trimmed to 1.50 volts. This trimming is with on-chip metal fuses. The trim range is approximately $1.5+/-0.1$ volts with minimum steps of 3 mV. An extra $+/-1$ LSB is provided in case original trim is incorrect. The circuit temperature coefficient is 60 ppm/°C. typical, 150 ppm/°C. worst case.

4.2 IBIAS & XTAL BIAS Bias Current Generator

The IBIAS & XTAL BIAS circuit X1 generates 20 nA bias currents for other cells, and 100 nA bias (voltage) for xtal oscillator. It generates buffered 2 Vth voltage "VLOW" used to run the xtal oscillator and high-order dividers at low current. CrSi and p-resistors are combined to match TC of Vbe. The bias varies approximately $+/-28\%$ over all parameters.

4.3 XTAL OSC & HIGH ORDER DIVIDERS

The XTAL & 2 kHz DIVIDERS circuit X2 generates a clock for capacitor switch sequencing. It uses a low current oscillator (CASC1 from TCJ) running from the second Vth supply voltage called VLOW. Internal trim capacitors are added to the crystal pins and are metal mask trimmable. Dividers to 2 kHz run from VLOW, then are level shifted to VSS1, VDD2 (0 to 5V). This avoids level shifting at 32 kHz, conserving current.

Circuit input PULSE receives a 2 kHz 30 microsecond pulse used for on and off chip timing. Circuit input NSTROBE receives a 2 kHz, 15 us negative pulse occurring 60 us after PULSE and is used for on chip timing. The level shifters use approx. 30 nA each at 2 kHz.

4.4 SAMPLING SWITCH DECODE

The SS DECODE circuit X3 is clocked by input PULSE. A one-shot is used to effectively generate a non-overlapped clock for the switch output signals. All switch signals are disabled (by inputs E and NE) for 0.6 to 4 us after each clock.

Switch sequencing samples the upper supercap, lower supercap, system low, and system very low in that order. Inputs NSC1, NSC2, NSSL, NSSVL define which voltage is being sampled. Each voltage is sampled once every 7.8 ms.

Input NCMP_CLK is the comparator clock. Input NCMP_ON powers down the comparator during unused periods.

4.5 SAMPLING CAP ARRAY & SWITCHES

The CAP ARRAY & SWITCHES circuit X5 contains sampling capacitors that are basically unit sizes. Due to the variety of voltages sampled, fractions of units are required. Poly etch tolerance can cause approximately 0.2% ratio error.

Inputs S1, S2, S3, S8 and S9 require signals level shifted above VSS2 (the normal logic level is VSS1, VDD2). Inputs S1, S2, S3, S8, S9 must save bodies tied to VSS1 & VDD1. All other switches may be tied to VSS1, VDD2. Note that this includes p-channel bodies, since they are isolated from the substrate in this process.

Sampling occurs such that the node OUT should remain at the reference voltage level if the sampled voltage is at its exact trip point. This avoids parasitic capacitance effects at this high-impedance node.

100 mV of hysteresis is added to the SL and SVL tests by switching between two slightly different capacitor values.

Figure 5A:
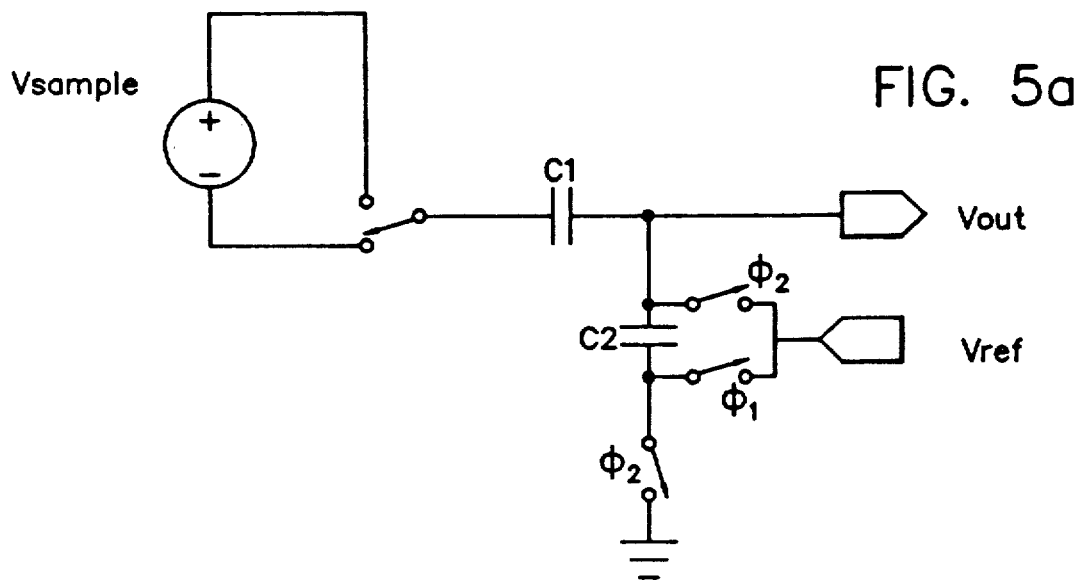
FIG. 5a is a simplified electrical schematic diagram of the sampling capacitor array and switches used in ASIC U1.

A simplified electrical schematic of the CAP ARRAY & SWITCHES circuit X5 illustrating its function is shown in FIG. 5a. In operation, $V_{OUT}=V_{REF}$ if $V_{SAMPLE}C1 = V_{REF}C2$.

4.6 SAMPLING COMPARATOR

The SCOMP circuit X7 compares output from the capacitor array to the reference voltage. It is inherently offset compensated. It's response time is less than 25 us.

Figure 5B:
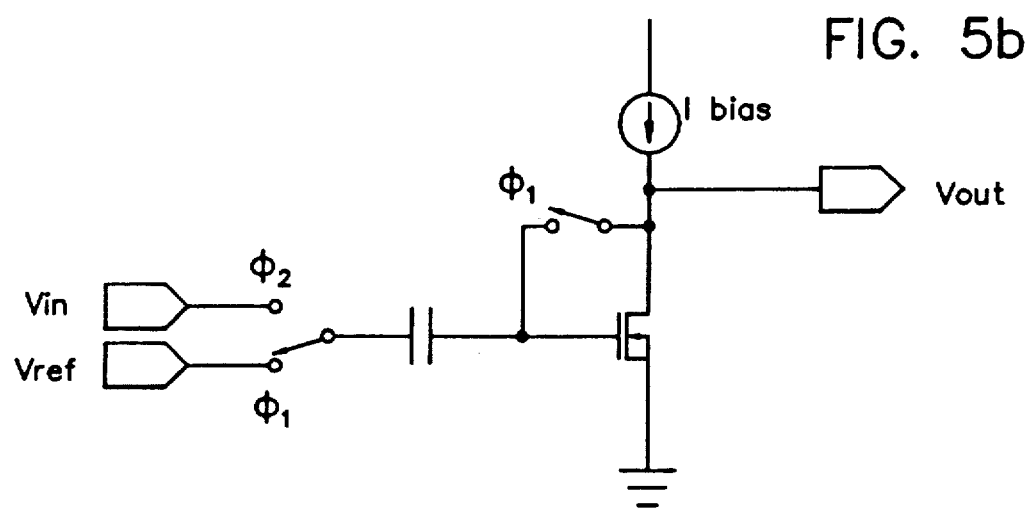
FIG. 5b is a simplified electrical schematic diagram of a sampling comparator used in ASIC U1.

A simplified electrical schematic of the SCOMP circuit X7 illustrating its function is shown in FIG. 5b. Phase 1 shorts the n-channel so that its gate voltage moves to the voltage where it carries exactly the current source current. The input capacitor is shorted to VREF and stores the difference between this gate voltage and VREF. Phase 2 opens the n-channel and connects the capacitor to the input voltage. If the input voltage is different from the reference, the gate is forced higher or lower, pulling the output of the current source down or allowing the current source to pull up.

4.7 COMPARATOR DATA LATCHES

The COMP DL circuit X11 stores the output of the comparartor in the latch corresponding to the voltage being tested. It is clocked by input NSTROBE.

4.8 WAIT TIMERS

The WT TIMER circuit X12 is used as a "timed hysteresis" when the SUPERCAP voltages are sampled.

When near the trip voltage, the capacitors will tend to be above the trip voltage when charging, and immediately fall below the trip voltage when the charging current is shunted away. This is due to approximately 7Ω internal resistance in the SUPERCAPS.

The SUPERCAPS are sampled every 7.8 ms, and under the above conditions would alternate charging-/discharging at a 50% duty cycle. A typical charge current of 20 mA would average 10 mA, while a typical load current is 12 mA continuous, resulting in a net energy loss. This would result in the capacitor charging to less than its maximum value by the internal I-R drop.

To avoid this situation, the comparator data latch is disabled for 3×7.8 ms after it comes out of a shunt mode. This results in a 3:1 charge to shunt ratio, ensuring that the net charge current is positive.

4.9 SHUNT TRANSISTORS

The SHUNT TRANSISTORS X10 shunt up to 70 mA away from the SUPERCAP when the maixmum voltage is exceeded. The SHUNT TRANSISTORS X10 have a resistance of approximately 3.5Ω.

4.10 SWITCHING REGULATOR

The SWITCHING REGULATOR circuit X9 provides 17 volts from a 9 volt battery. The inductor shorting transistor of the circuit is off-chip (the IC is not required to handle the 17 volts).

Output NBP signals the VDD2, VSS1 logic when a battery is attached to the BAT, VSS2 terminals.

Figure 5C:
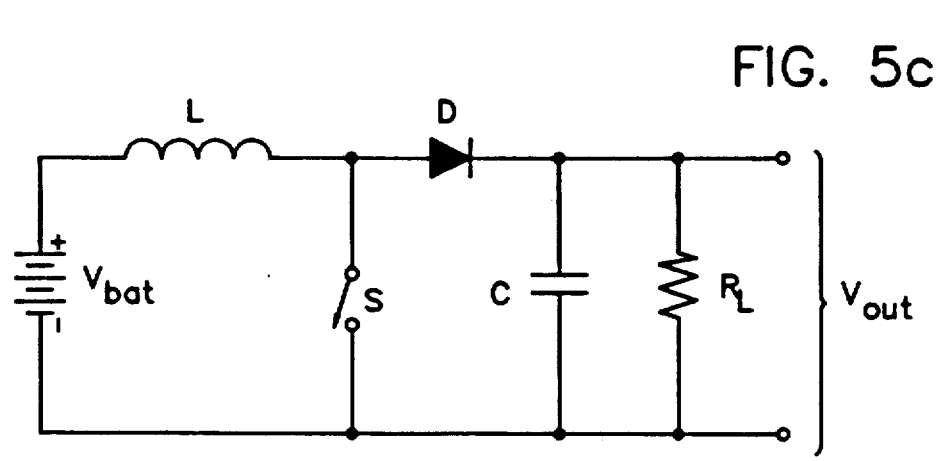
FIG. 5c is a simplified electrical schematic diagram of a step-up DC-to-DC converter used in the switching regulator of ASIC U1.

A simplified electrical schematic of a step-up DC-to-DC Converter circuit used in SWITCHING REGULATOR circuit X9 and illustrating its function is shown in FIG. 5c. When switch S is closed the battery voltage is applied across the inductor L. Charging current flows through the inductor, building up a magnetic field, increasing as the switch is held closed. While the switch is closed, the diode D is reverse biased (open circuit) and current is supplied to the load by the capacitor C. Until the switch is opened the inductor current will increase linearly to a maximum value determined by the battery voltage, inductor value, and the amount of time the switch is held closed ($I_{PEAK}=V_{BAT}/L \times T_{ON}$). When the switch is opened, the magnetic field collapses, and the energy stored in the magnetic field is converted into a discharge current which flows through the inductor in the same direction as the charging current. Because there is no path for current to flow through the switch, the current must flow through the diode to supply the load and charge the output capacitor.

If the switch is opened and closed repeatedly, at a rate much greater than the time constant of the output RC, then a constant DC voltage will be produced at the output.

4.10.1 SWITCHING REGULATOR BIAS

The internal bias of SWITCHING REGULATOR circuit X9 is used only for biasing switching regulator components. The bias is provided by a Standard 5 uA bias cell type A54020. Its absolute value is not critical.

4.10.2 VREF2

The SWITCHING REGULATOR circuit X9 has an internal reference for monitoring switching regulator output voltage. The reference is provided by a standard cell reference type A53000 that is modified to use CrSi.

The reference circuit is chosen to keep non collectors at positive voltage. (Switching regulator can have voltages below the substrate voltage VSS1.)

The value and temperature coefficient of the circuit are not critical, and trim is not required.

4.10.3 RC OSC

The SWITCHING REGULATOR circuit X9 has an internal clock for switching the regulator at approx. 25 kHz. The clock is divided from 50 kHz to give a 50% duty cycle. It employs a standard cell reference type A55010 that is modified for CrSi. An approximate 150 kΩ external resistor is required.

4.10.4 SWITCHING REGULATOR COMPARATOR

The SWITCHING REGULATOR circuit X9 has a comparator that uses positive feedback for an improved response time of 3.5 us maximum.

4.11 VREG

The 5V REGULATOR circuit X6 provides a 5 volt +/− 2 5% regulated output for external electronics as well as VDD2 for internal logic. An external NPN is used to avoid thermal effects on the IC.

4.12 LOW VOLTAGE RESET

The LOW RESET circuit X8 resets the entire UI ASIC. The power supply can (under various light conditions) take minutes to hours for power up, which eliminates normal power-on-reset circuits. This circuit must ensure that all outputs are valid until the analog circuits are operational.

The output holds all latches in reset until the bias, reference, and regulator circuits are all running at levels acceptable for operation.

4.13 Preferred Technology for the U1 ASIC

The U1 ASIC is suitably implemented in BIPOLAR-CMOS technology available from several semiconductor foundaries. It is typically implemented in the BICMOS process of Micro-Rel Division of Medtronic, Inc., 2343 W. 10th Place, Tempe, Ariz. 85281.

5.0 FUNCTIONAL DESCRIPTION OF THE U2 ASIC DEVICE

Figure 6A:
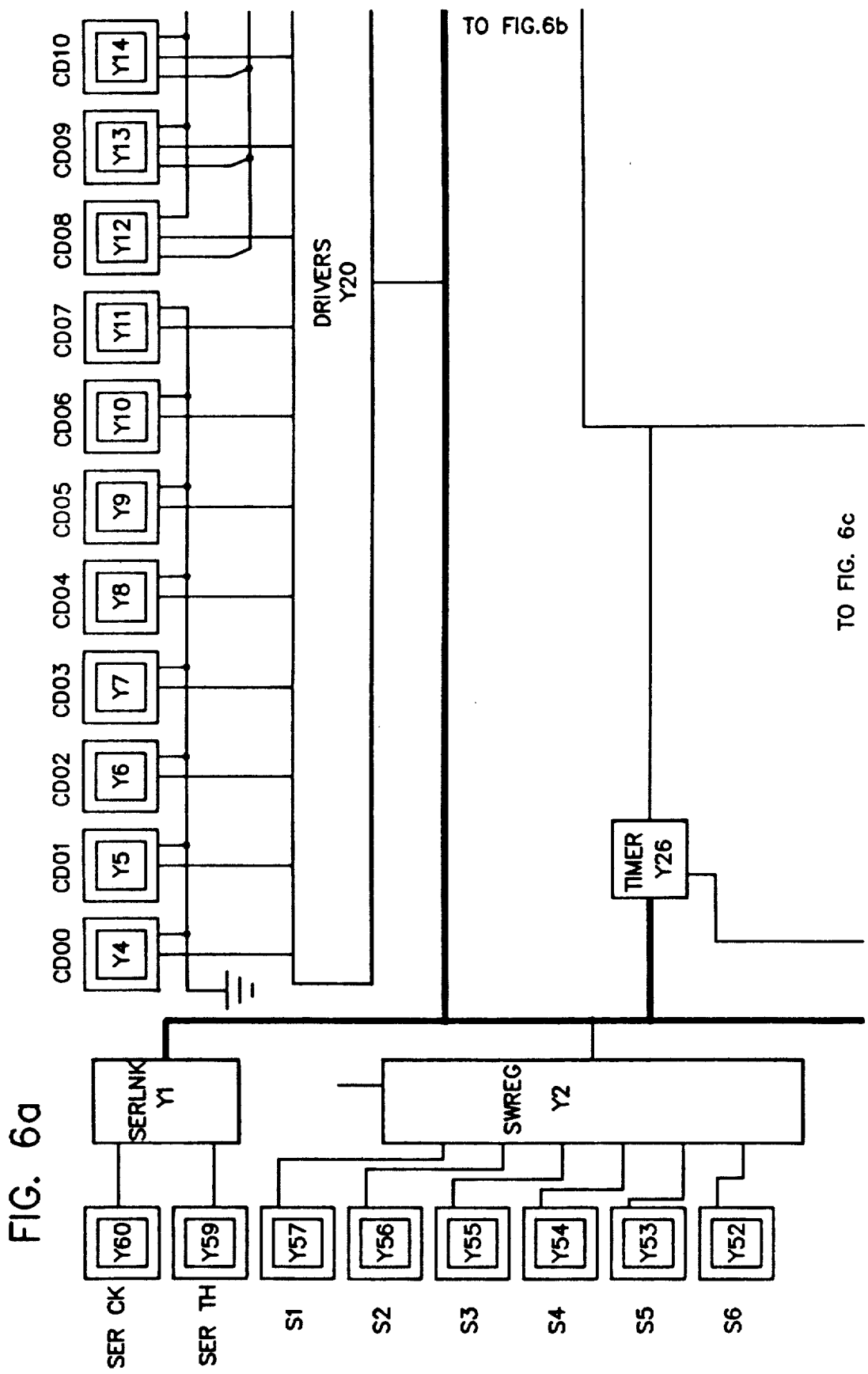
FIG. 6, consisting of FIG. 6a through 6d, is a block diagram of a second, U2, Application Specific Integrated Circuit (ASIC) used in the preferred embodiment of an irrigation controller in accordance with the present invention.
Figure 6C:
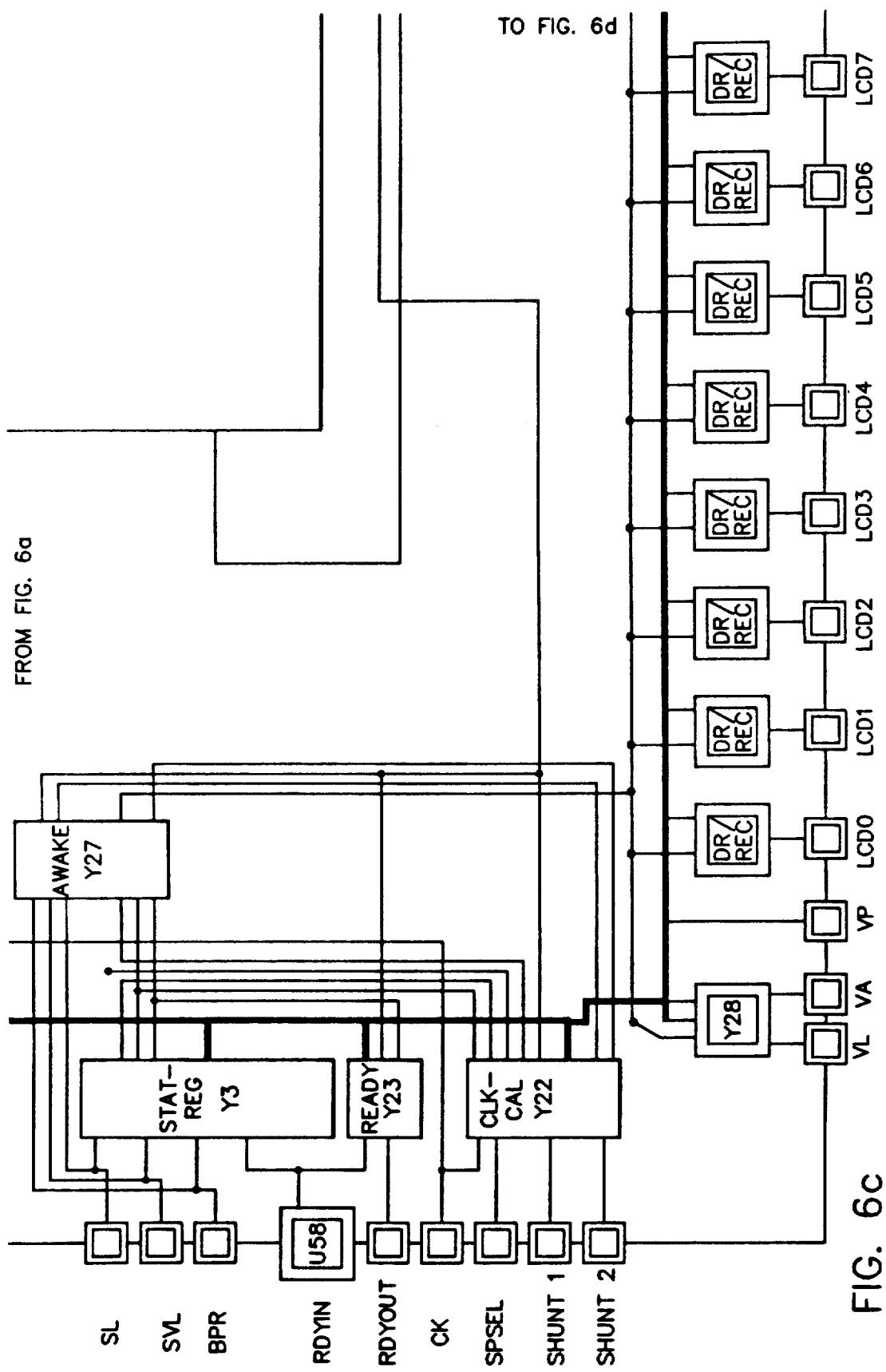

The block diagram of FIG. 6, consisting of FIG. 6a through FIG. 6f, shows the overall architecture of the second, U2, Application Specific Integrated Circuit (ASIC) used within the preferred embodiment of the irrigation controller in accordance with the present invention.

The U2 ASIC device is concerned with calculation, command, and control. It is primarily digital in operation, and may be considered to be a specialized microprocessor with substantial analog as well as digital I/O capabilities. The diagram of the U2 ASIC device shows the detailed interconnection of the various functional blocks.

5.1 U2 ASIC Device Architecture

5.1.1 Microprocessor

The central microprocessor Y31 of the U2 ASIC device is a NCR 65CX02 macrocell. It employs an 8-bit datapath structure controlled by an internal programmable logic array (PLA) using 8-bit instructions and having a 16-bit addressing capability. Importantly, all circuitry internal to the microprocessor is completely static and complementary so that the clock signal may be frozen and only leakage current will be consumed. It has a clock speed of 455 KHz and a 2.2 microsecond cycle time.

The microprocessor Y31 executes the instruction repertoire of commercially available microprocessor type 6502. The mnemonic codes for the instructions of this repertoire, such mnemonic codes as appear with the firmware program listing attached as Appendix A to this specification, are commonly recognized mnemonics, and a complete description of the microprocessor type 6502 instruction repertoire, are contained, among numerous other places, in the book "6502 Assembly Language Programming" by Lance A. Leventhal, published in 1979 by Osborne/McGraw Hill, 630 Bancroft Way, Berkeley, Calif. 94710. It will be recognized that, consonant with the modest computational requirements of an irrigation controller, the relatively simple 6502 microprocessor macrocell is not the sole type that could be employed, and that many microprocessors including types commonly incorporated in ASICs are suitable for use within the irrigation controller in accordance with the present invention.

The firmware instructions executed by microprocessor Y31 occupy memory addresses in accordance with the following memory map table:

| | |
|---|---|
| 00-3F | I/O Parts |
| 40-7FFF | RAM Memory U5 (shown in FIG. 3h) |
| 8000-FFFF | ROM Memory U4 (shown in FIG. 3f) |

The operand fields of the firmware instructions are interpretable in accordance with the following memory map table:

| | | |
|---|---|---|
| 00 | O | Microprocessor power off |
| 01 | O | RTC counter clear |
| 02 | O | A/D power, 1=on, 0=off |
| 03 | O | A/D interface, 1=enable, 0=disable |
| 04 | O | LCD power, 1=on, 0=off |
| 05 | O | LCD interface, 1=enable, 0=disable |
| 06 | O | Valve select byte |
| | | bits 0-2 - valve #, + side |
| | | bits 3-5 - valve #, − side |
| | | bit 6 - polarity, 0=normal, 1=reversed 07 |
| 08 | O | Valve enable, 1=on, 0=off |
| 08 | O | TIMER hi byte latch |
| 09 | O | TIMER lo byte latch |
| 0A | O | TIMER control, 1=on, 0=off |
| 0B | O | RTC, 1=10 seconds, 0=1 minute |
| 0C | O | Serial clock |
| 0D | O | TIMER load |
| 0E | O | Write serial data out |
| 0F | O | Serial output ready |
| 10 | I | RTC counter hi byte |
| 11 | I | RTC counter lo byte |
| 12 | I | Status register 1 |
| | | bit 0 - 0=external battery present |
| | | bit 1 - 1=watchdog timeout |
| | | bit 2 - 0=system power low |
| | | bit 3 - 0=system power very low |
| | | bit 4 - 0=RTC pulse |
| | | bit 5 - 1=battery low or caps charging |
| | | bit 6 - 1=serial data link present |
| | | bit 7 - 0=serial data link ready |
| 13 | I | Status register 2 |
| | | bit 0 - Switch 1, 1=pressed STOP |
| | | bit 1 - Switch 2 |
| | | bit 2 - Switch 3 |
| | | bit 3 - Switch 4 HELP |
| | | bit 4 - Switch 5 NO |
| | | bit 5 - Switch 6 OK |
| | | bit 6 - |
| | | bit 7 - 0=A/D end of conversion |
| 14 | I | Read serial data in |
| 15 | I | Read A/D converter |
| 16 | I | Load serial shift register |
| 17 | I | Clear input ready latch |
| 18 | I | LCD busy flag & address counter (RS=0) |
| | | bit 7 - 1=busy |
| 19 | O | LCD instruction register (RS=0) |
| | I | LCD read data (RS=1) |
| | O | LCD write data (RS=1) |
| 1A | O | LCD contrast select (0-7) |
| 1B | O | Clear watchdog timer |
| 1C | O | Clock RTC counter |
| 1D | I/O | EEPROM |
| 1E | O | Coil test drivers |
| 1F | O | Sensor test drivers |
| 20 | O | Start A/D channel 0, sensor 1 |
| 21 | O | Start A/D channel 1, sensor 2 |
| 22 | O | Start A/D channel 2, sensor 3 |
| 23 | O | Start A/D channel 3, sensor 4 |
| 24 | O | Start A/D channel 4, sensor 5 |
| 25 | O | Start A/D channel 5, sensor 6 |
| 26 | O | Start A/D channel 6, sensor 7 |
| 27 | O | Start A/D channel 7, sensor 8 |
| 28 | O | Start A/D channel 8, valve 1 |
| 29 | O | Start A/D channel 9, valve 2 |
| 2A | O | Start A/D channel 10, valve 3 |
| 2B | O | Start A/D channel 11, valve 4 |
| 2C | O | Start A/D channel 12, valve 5 |
| 2D | O | Start A/D channel 13, valve 6 |
| 2E | O | Start A/D channel 14, valve 7 |
| 2F | O | Start A/D channel 15, valve 8 |
| 30-3F | | |
| 40-FF | | Zero page variables, pointers, and tables |
| 100-1FF | | Stack |
| 200-3FF | | Program variables |
| 8000 | | ROM start |
| FFFA-FFFB | | NMI vector |
| FFFC-FFFD | | RESET vector |
| FFFE-FFFF | | IRQ vector |

5.1.2 Drivers

The coil drivers Y20 work in pairs to supply relatively large bidirectional current pulses to operate electromagnetically actuated valves. Only one pair of coil drivers is active at a time, as specified by the contents of the data bus. Additionally, the output (coil) drivers have the capability to sink a regulated current for testing and programming purposes.

5.1.3 Timer

The timer Y26 consists of two 8-bit latches on the data bus and a 16-bit down counter which is clocked at 2 kHz. Loading of the counter and latches is under the control of the processor. When the counter reaches zero, a processor interrupt is generated.

5.1.4 ADC

The Analog-to-digital converter Y43 receives signals from external sensors and from the valves, a total of 16 channels in all, which are converted to digital information and placed on the data bus. The selection of the channel to be digitized is made on the basis of the contents of the address bus. The converted data is expressed as an eight-bit fraction. For the eight channels originating at the sensors and for the eight channels originating at the coils, this fraction is the ratio of the input voltage to the full power supply. All 16 ADC inputs may be pulled to ground through a poly resistor and an n-channel switch which together constitute a nominal 330 ohm resistance. The resistors associated with the eight channels originating at the sensors are enabled individually (as determined by the contents of the data bus) upon command of the processor. The performance specifications of the Analog-to-digital (A/D) Converter are as follows:

a. Resolution/Accuracy
- 8 bits ± one-half $LSB$ for $VIN = 1(Vd)$
- 8 bits ± one $LSB$ for $VIN = \frac{1}{2}(Vd)$ b. Conversion Time - $\frac{8}{f_{osc}}$, $n$ where $n = 8$ or $9$ depending upon whether the conversion is full scale or half scale c. Operating Current - 3 mA maximum d. Analog Reference - Digital Supply Voltage $(Vd)$ e. Analog Inputs $(Vin)$ - Each input voltage is ratio-metric with the digital supply voltage $(Vd)$ where:
$Vin$ for full scale = $1(Vd)$ for A/D channels 1 through 8
$Vin$ for full scale = $1(Vd)$ for A/D channels 9 through 16

5.1.5 Clock/Calendar

This clock/calendar Y22 provides several timing functions. It generates a 2 second timing tick at 10 second or 1 minute intervals.

It keeps watch on the status of the programmer battery by generating a "Battery Low" status bit if either of two "Supercap Shunt" signals are absent for more than 64 second during programming activity.

It counts up to 65535 ticks while the processor is in a low voltage shutdown mode so as to provide calendar memory. The calendar contents may be placed on the data bus.

It maintains a 128 second dead-man timer which can generate a hardware reset if the processor fails.

5.1.6 Switch Register

The switch register Y2 acts as an interface between six external configuration switches and the data bus. An additional input is the end-of-conversion signal from the analog-to-digital converter.

5.1.7 Status Register

The status register Y3 makes the following internal flags available to the processor as data on the data bus: Battery Present, Dead-man timeout, System Low, System Very Low, Real Time Clock Tick, Battery Low, Serial Data Link Present, and External Ready.

5.1.8 Serial Data Link

The serial data link Y1 provides high speed synchronous two-way communication between the device and a remote data transceiver. Data is loaded or retrieved via the data bus under control of the processor. Transmission of serial data is also directly controlled by the processor.

5.1.9 Ready

These circuits Y23 provide handshaking between the processor and an external device (such as a serial data link) through the status register and data bus.

5.1.10 Wakeup

The wakeup circuit Y27, upon stimulation by either the Serial Data Link Present or the clock/calendar time-tic or the Battery Present signals, starts the main system oscillator and then after a 500 microsecond delay, removes the system reset. Upon stimulation by the System Very Low signal or by the processor, the wakeup circuit immediately causes the system to be reset. The dead-man timeout signal will cause a 30 microsecond reset pulse to occur at two second intervals until the processor resets it.

5.1.11 Main Oscillator

The main oscillator Y25 uses an external capacitor and a charge-discharge scheme to produce a high-speed clock for the processor. This oscillator can be shut down to conserve power. It will restart immediately upon command. The frequency of oscillations is determined by the size of the external capacitor. The relationship between capacitor size and frequency, as well as the frequency stability over changes in operating environment, may be tailored in consideration of the operational environment within which the irrigation controller is used.

5.1.12 LCD Interface

The LCD interface Y29 consists of a latch on the data bus and the control circuitry needed to operate an external liquid crystal display and the DAC. The LCD interface can be configured to function as the 6502 Data I/O port. The interface is configured in this way only during a special test mode. Under processor control, a flip flop is set which alters the internal logic paths so that the LCD bus will be configured as a 6502 Data I/O port. This special test feature allows the 6502 to be tested independently of the peripheral logic.

5.1.13 DAC

The four bit digital-to-analog converter Y32 provides a voltage, as specified by the contents of the data bus, through the LCD interface for contrast control of the external liquid crystal display.

The performance specification of the DAC are as follows:

a. Resolution: 4 bits
b. Accuracy: $\pm\frac{1}{2}$ LSB for all voltage steps
c. Vout = n(0.147) where $0 \leq n \leq 15$
d. Io (min) = 500 uA sink for Vout = 0V ± 50 mV
e. Vo (max) = ±50 mV for Io = 500 uA for the DAC setting D3 = D2 = D1 = D0 = 0

5.1.14 Address Decoding

The address decoder circuit Y38 uniquely maps all internal functions into page zero of the processor's memory space. The decoder produces timing and control signals for these internal circuits as well as for reading and writing of external memory.

5.1.15 Power Switching

The power switch circuit Y28 controls the power for the external ROM and display as well as the internal analog functions in order to conserve power and to permit the irrigation controller to enter a "sleep" mode.

5.1.16 Resistor Control

The resistor control circuit U42 permits reconfiguration of the sensor and coil interfaces to enable communication upon each of the A/D channel lines so that integrity of both valve coils and moisture elements may be self-tested. This is accomplished by selectively switching a low value resistor between the channel signal line and ground.

5.2 U2 ASIC Input/Output Description

5.2.1 CD0-CD1—Coil Driver Outputs

These pins operate in pairs, one pair at a time, when driving the coils of the electromagnetically actuated valves. One pin of the pair goes high while the other goes low in order to provide bidirectional current. Inactive coil driver pairs assume a high impedance state. When the coil is deenergized the driver circuitry must absorb the energy of the collapsing field. CD8-CD15 also function as analog inputs to the ADC. These pins have the additional capability of sinking a regulated current for testing and programming purposes.

5.2.2 ADC0-ADC15 Analoq Inputs to the ADC

These pins provide information from the coils and sensors whose integrity the processor must evaluate. ADC8-ADC15 are shared with the 8 valve lines CD8-CD15. ADC0-ADC7 are shared with the 8 sensor lines. All these 166 lines have the capability of sinking a regulated current for testing purposes. 5.2 3 SL—System Low An active low input indicates that the condition of the power supply is such that further operation will soon be impossible. The processor, upon receiving this signal, will immediately turn off all valves in anticipation of approaching shutdown.

5.2.4 SVL—System Very Low

An active low signal indicates that the condition of the power supply is such that further operation is impossible. Upon receiving this signal the processor will immediately go into hibernation. After approximately 100 milliseconds, a hardware system reset will occur independently of the processor.

5.2.5 SH0, SH1—Supercap Shunt Signals

If either of these signals persists in the high state for longer than 64 seconds, a Battery Low status will be generated.

5.2.6 BPR—Battery Present

An active low signal indicates that a battery is connected to the power supply so that the processor may run continuously.

5.2.7 S1-S6—Switch Inputs

Active high inputs with internal pulldowns go directly to the switch register.

5.2.8 A0-A14—Address Outputs

The external RAM and ROM are addressed by these pins. A0-A7 in conjunction with ALE also functions as D0-D7.

5.2.9 D0-D7—Bidirectional Data Bus

The external RAM and ROM use these lines for transferring data to and from the device. The lower address bits are multiplexed with the data on these lines in conjunction with the ALE signal.

5.2.10 ALE—Address Latch Enable

When this signal is high, data transfers may take place on the D0-D7 pins. When this signal is low, these same pins are used as A0-A7 outputs.

5.2.11 RDYIN—Ready Input

This signal appears as one of the bits of the status register. RDYIN provides handshaking protocol from a distant serial data link. A low-to-high transition of this signal sets the Serial Data Link Present status bit low. The signal is provided with an internal pulldown.

5.2.12 RDYOUT—Ready Output

This signal passes the contents of data bus bit zero out of the device under control of the processor to provide handshaking protocol to a distant serial data link.

5.2.13 CEROM—ROM Chip Enable

This signal is used to enable the outputs of the external ROM onto the D0-D7 pins.

5.2.14 LCD0-LCD7—Liquid Crystal Data

These bidirectional signals transfer data to and from the external liquid crystal display. They are provided with internal pulldowns.

5.2.15 LCDEN—LCD Enable

This output signal enables the external liquid crystal display. This output signal can be made to exhibit high impedance with an internal pulldown.

5.2.16 LCDRS—LCD Register Select

This output signal informs the external LCD module that either data or command appears on the data inputs. This output signal can be made high impedance with an internal pulldown.

5.2.17 LCDRD—LCD Read

This output signal controls the direction of data flow to or from the external liquid crystal display. This output signal can be made to exhibit high impedance with an internal pulldown.

5.2.18 VLCD Analog Output From the DAC to the External Liquid Crystal Display This analog output signal is used to control the display contrast.

5.2.19 VL—Switched Power to the External Liquid Crystal Display

When this signal is switched on it provides current from the device power input VDD. When it is switched off, it sinks current into the device power return VSS.

5.2.20 VA—Switched Power to the External Sensors

When this signal is switched on, it provides current from the device power input VDD. When it is switched off, it sinks current into the device power return VSS.

5.2.21 VP—Switched Power to the External ROM

When this signal is switched on, it provides current from the device power input VDD. When it is switched off, it sinks current into the device power return VSS.

5.2.22 Serial Clock—Clock Input/Output for Serial Data Transfer

When driven by the device for outward data transmission, this signal alternatively assumes a low impedance high state and a low impedance low state. If the low state persists for more than 20 to 40 nanoseconds then the signal remains at a high impedance with an internal pulldown. In this last state, the pin may be driven by an external source for inward data transfer (reception). The clocks generated by this pin may have a rate of up to 32,000 Hertz. This pin may be loaded with up to 300 picofarads capacitance.

5.2.23 Serial Data—Data Input/Output for Serial Data Transfer

When driven by the device for outward data transmission, this signal assumes a low impedance state whenever the Serial Clock is high, and then, if the clock low state persists for more than 20 to 40 nanoseconds, a high impedance with an internal pulldown. In this last state, the pin may be driven by an external source for inward data transfer (reception). The data generated by this pin may have a rate of up to 32,000 bits per second. This pin may be loaded with up to 300 picofarads.

5.2.24 C01, C02—Capacitor Connections

Provides a connection for a capacitor whose value determines the frequency of the Main Oscillator.

5.2.25 READ (WRITENOT)—R/W Signal From the Processor

Indicates whether a memory read or memory write cycle is in progress.

5.2.26 PH12—Processor Clock

This signal is high during the active portion of the processor's operation. When low, the processor is precharging its internal busses. This signal must logically combine with Read and the appropriate address decode to create the control signals to apply to external memory.

5.2.27 CSE2—EEPROM Chip Select

This signal is used in conjunction with READ and PH12 for external EEPROM operations.

5.2.28 RSTB Processor Reset

This active-low signal indicates that the processor is shut down and may be used to initialize external circuitry to the correct state for processor startup.

5.2.29 PAGE0—Page Zero

This pin goes high when the address bus is in address area 0040H through 7FFFH inclusive.

5.2.30 VDD—Device positive supply.

5.2.31 VSS—Device negative supply.

5.2.32 CK—Real-Time Clock Input for Clock Calendar Timer

The frequency is nominally 2 Khz with a 30u second high-going pulse.

5.2.33 SPSEL

When SPSEL=1, the chip requires a 32 Khz time base on the CK input. When SPSEL=0, the chip requires a 2 Khz time base on the CK input.

5.3 ASIC U2 Power Supply Requirements

| Parameter | Symbol | Min | Max | Units |
|---|---|---|---|---|
| Power supply All circuitry active | VDD A | 4.5 | 5.5 | V |
| Power Supply | VDD B | 2.00 | 5.5 | V |
| Real time clock, interrupt, and battery low detection circuitry operative. All other circuits are at a static, defined logic level (therefore, not being clocked). | | | | |
| Active Supply Current | Ia | | 6.0 | mA |
| VDD = 5.5 v, 2 Khz Real time clock running, main oscillator running, processor, ADC, LCD interface logic running (only), DAC running, coil drivers in high-impedance state, external interface circuitry to EEPROM, ROM and RAM is active, however, the active current of the EEPROM, ROM and RAM is not included. | | | | |
| Quiescent Supply Current | Iq | | 1.5 | uA |
| VDD = 5.5 v, Real time clock running, main oscillator stopped, processor stopped, coil drivers in high-impedance state, ADC, LCD, DAC are all powered off. External EEPROM and ROM are powered off. External RAM is at a static, defined logic level (therefore, not being clocked). The quiescent current of the RAM is not included in Iq. | | | | |

5.4 ASIC U2 Signal Pin Requirements

Unless otherwise state, the following characteristics apply over the applicable operating power supply range as specified above. All pins are protected against electrostatic discharge.

| Parameter | Symbol | Min | Max | Unit |
|---|---|---|---|---|
| Capacitance of Inputs | Ci | | 10 | pF |

-continued

| Parameter | Symbol | Min | Max | Unit |
|---|---|---|---|---|
| Capacitance of Outputs | Co | | 10 | pF |
| Capacitance of Tristate | Ct | | 10 | pF |
| Input Leakage Current | Iil | −1 | +1 | uA |
| Tristate Leakage Current | Itl | −1 | +1 | uA |
| Passive Pulldown Current (@ Vih = VDD) | Ipd | −1 | −30 | uA |
| Active Pulldown Current (@ Vi = 2.5 v) | Irpd | −4 | −12 | mA |
| VA, VL, VP | | | | |
| Output High Voltage | Voh | VDD −0.3 | VDD +0.3 | V |
| Output Low Voltage | Vol | −0.3 | +0.4 | V |
| Output High Current (@ Voh = VDD −0.3 V) | Ioh | −6.0 | | mA |
| Output Low Current | Iol | 6.0 | | mA |
| VLCD | | | | |
| Output Voltage Range | Volcd | 0.0 | 2.2 | V |
| Output Current (@ Vol = 0.05 V) | Ioled | +0.5 | | mA |
| Coil Driver Pins | | | | |
| Input Voltage Range | | See ADC8-ADC15 below | | |
| Output Pair Drop (@ I = 45 mA, Vdd = 4.5 v) | Vdr | 0.0 | 1.0 | V |
| ADC0-ADC15 | | | | |
| Input resistance | Rin | 10 Meg | | Ohm |
| Input Voltage Range | Vina | −0.0 | VDD | V |
| C01, C02 | | | | |
| Output High Voltage | Voh | 0.5 | VDD +0.3 | V |
| Output Low Voltage | Vol | −0.3 | 0.4 | V |
| Output High Current (@ Voh = 2.5 V) | Ioh | −4.0 | −12.0 | mA |
| Output Low Current (@ Vol = 0.4 V) | Iol | 4.0 | | mA |
| All Other Pins | | | | |
| Input High Voltage | Vih | 2.0 | VDD +0.3 | V |
| Input Low Voltage | Vil | −0.3 | 0.8 | V |
| Output High Voltage | Voh | VDD −0.5 | VDD +0.3 | V |
| Output Low Voltage | Vol | −0.3 | +0.4 | V |
| Output High Current (@ Voh - VDD −0.5 V) | Ioh | −2.0 | | mA |
| Output Low Current (@ Vol = 4.0 V) | Iol | 4.0 | | mA |

5.5 ASIC U2 Mechanical Characteristics 5.5.1 Package Requirements

The device is packaged in an 84-pin plastic leaded chip carrier. The package life exceeds 20 years.

5.5.2 Environmental Requirements

The limits below represent the environmental limits to which the device will ordinarily be subjected.

| Rating | Value | Unit |
|---|---|---|
| Storage Temperature | −40 to +85 | deg C. |
| Operating Temperature | −10 to +70 | deg C. |
| Lead Temperature (4 min soldering) | 250 | deg C. |
| Humidity | 85/85 | deg C./percents |

5.6 Preferred Technology for Implementation of the U2 ASIC

Figure 2:
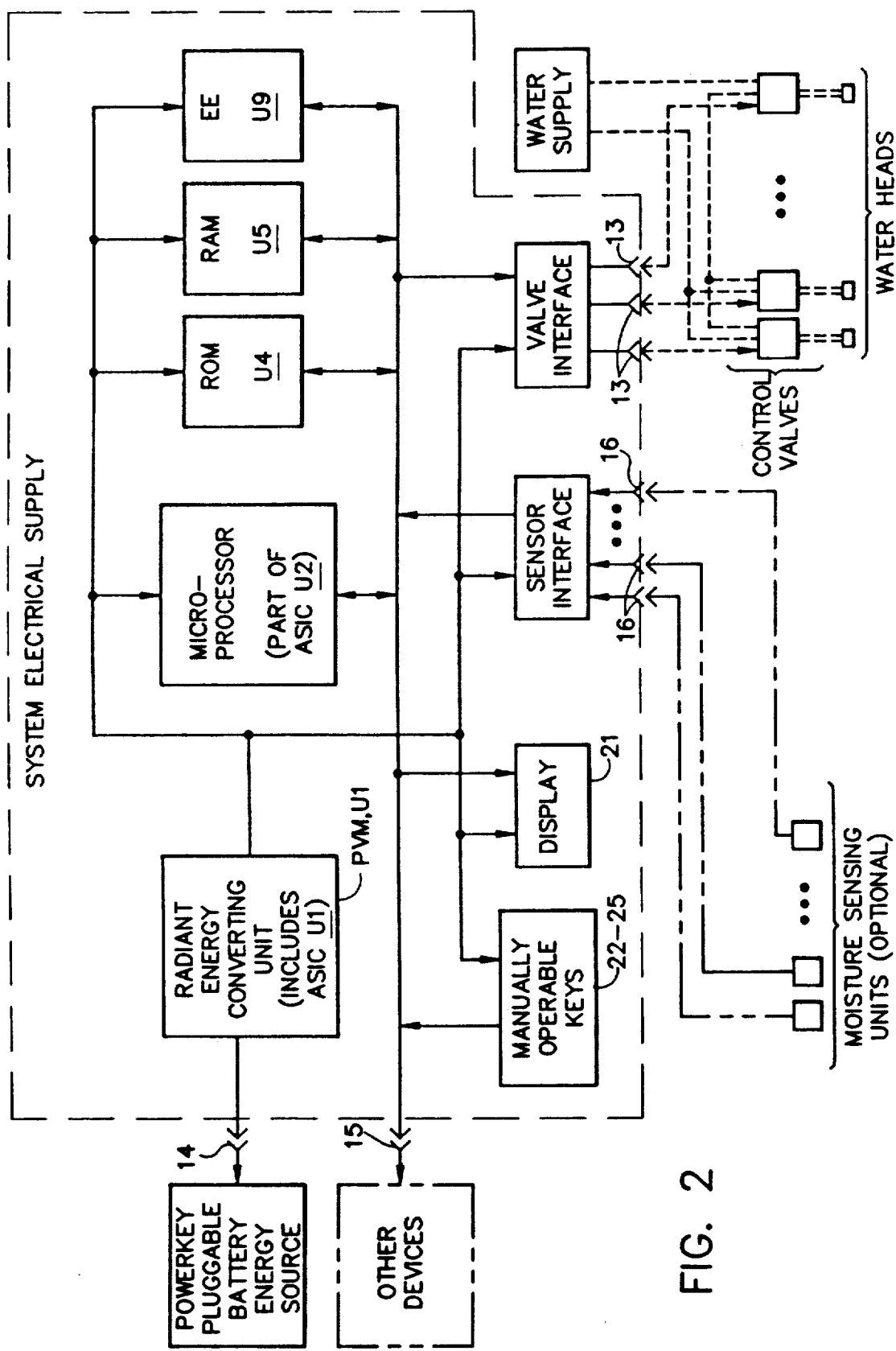
FIG. 2 is a pictorial diagram of the irrigation controller in accordance with the present invention previously seen in FIG. 1.

The preferred embodiment of ASIC U2 is preferably implemented in the CMOS technology of NCR Corporation, Dayton, Ohio. This technology, and the design rules and standard cells therein, is discussed in the "NCR ASIC Data Book" for Jan. 1987. The equivalent technologies of other manufacturers will be realized to be equally suitable. It will be understood that the irrigation system of FIG. 2 could also be implemented using standard integrated circuit and microprocessor components in combination with a control program corresponding to that of attachment A. Such a system could be used alternately to implement the present method.

6.0 Variations and Adaptations of the Invention

Although the present invention has been taught in the context of electrical circuits that are fairly sophisticated for employing both a predominantly digital ASIC (ASIC U2), it should be understood that the functionality of the preferred embodiment of an irrigation controller in accordance with the present invention is readily realizable by diverse alternative designs. In particular, the core microprocessor of the preferred embodiment of the invention is 100% compatible with industry standard type 6502. All firmware appended to this specification will execute on a 6502 microprocessor, and is readily convertible to alternative microinstruction repertoires executing on alternative microprocessors. The circuits by which data is manually input to the microprocessor and displayed, and the control of irrigation valves, are, in the preferred embodiment of the invention, powered and sequenced to states of activity in a highly unique manner. Nonetheless, it will be recognized that alternative implementations of these circuits, particularly as consume higher power and/or operate at higher or continuous duty cycles, are readily realizable by a practitioner of the electrical design arts. Accordingly, the present invention should be considered in terms of the functions that it performs, and not solely in terms of any particular embodiment for realizing these functions.

Considering these functions performed, the present invention will be recognized to be embodied in methods and in an apparatus for controlling irrigation at one or more watering stations. In accordance with the invention irrigation parameters selected from one or more of: soil type, irrigation head type, terrain type, total irrigation time per watering station, exclusionary periods, water budgeting information, deep soak cycles, and syringe cycles preentered into an irrigation controller. A maximum on time for an individual irrigation cycle and a minimum off time between irrigation cycles are determined in response to and as a function of selected ones of the entered irrigation parameters. The irrigation cycles for each watering station are scheduled in accordance with and as a function of at least some of the entered irrigation parameters as well as the determined on and off times. Each watering station is controlled in accordance with its respective scheduled irrigation cycles.

In accordance with these and other aspects and attributes of the present invention, the invention should be determined by the scope of the following claims, only, and not solely in accordance with those particular embodiments within which the invention has been taught.

APPENDIX A

IRRIGATION CONTROLLER FIRMWARE
PROGRAM LISTING

```
'Controller Firmware, Version 2.89'
2588 A.D. 6502 Macro Assembler  -  Version '4.81b
-----------------------------------------------

Input  Filename : leit.asm
                 Output Filename : leit.obj

1                         TITLE   'Controller Firmware, Version 2.89'
  2
  3                      ;   by Dennis Kaiser
  4                      ;   SOLATROL, Inc.
  5                      ;   San Diego, CA,  1 Sep 88
  6
  7                      ;   Code for the 65C82 processor
  8                      ;   Clock speed 455 KHz, cycle time 2.2 microseconds
  9
 10   0000                   CHIP       65C82
 11                          MACLIST    OFF
 12                          ASCLIST    OFF
 13   0000                   INCLUDE    EQUATES.ASM
 14                      ;---------------------------------
 15                      ;   MEMORY MAP
 16                      ;---------------------------------
 17
```

```
18            ;00-3F          I/O
19            ;40-7FFF        RAM
20            ;8000-FFFF      ROM
21
22            ;00             O  Microprocessor power off
23            ;01             O  RTC counter clear
24            ;02             O  A/D power, 1=on, 0=off
25            ;03             O  A/D interface, 1=enable, 0=disable
26            ;04             O  LCD power, 1=on, 0=off
27            ;05             O  LCD interface, 1=enable, 0=disable
28            ;06             O  Valve select byte
29            ;                       bits 0-2 - valve #, + side
30            ;                       bits 3-5 - valve #, - side
31            ;                       bit 6 - polarity, 0=normal, 1=reversed
32            ;07             O  Valve enable, 1=on, 0=off
33            ;08             O  TIMER hi byte latch
34            ;09             O  TIMER lo byte latch
35            ;0A             O  TIMER control, 1=on, 0=off
36            ;0B             O  RTC, 1=10 seconds, 0=1 minute
37            ;0C             O  Serial clock
38            ;0D             O  TIMER load
39            ;0E             O  Write serial data out
40            ;0F             O  Serial output ready
41            ;10             I  RTC counter hi byte
42            ;11             I  RTC counter lo byte
43            ;12             I  Status register 1
44            ;                       bit 0 - 0=external battery present
45            ;                       bit 1 - 1=watchdog timeout
46            ;                       bit 2 - 0=system power low
47            ;                       bit 3 - 0=system power very low
48            ;                       bit 4 - 0=RTC pulse
49            ;                       bit 5 - 1=battery low or caps charging
50            ;                       bit 6 - 1=serial data link present
51            ;                       bit 7 - 0=serial data link ready
52            ;13             I  Status register 2
53            ;                       bit 0 - Switch 1, 1=pressed STOP
54            ;                       bit 1 - Switch 2
55            ;                       bit 2 - Switch 3
56            ;                       bit 3 - Switch 4 HELP
57            ;                       bit 4 - Switch 5 NO
58            ;                       bit 5 - Switch 6 OK
59            ;                       bit 6 -
60            ;                       bit 7 - 0=A/D end of conversion
61            ;14             I  Read serial data in
62            ;15             I  Read A/D converter
63            ;16             I  Load serial shift register
64            ;17             I  Clear input ready latch
65            ;18             I  LCD busy flag & address counter (RS=0)
66            ;                       bit 7 - 1=busy
67            ;               O  LCD instruction register (RS=0)
68            ;19             I  LCD read data (RS=1)
69            ;               O  LCD write data (RS=1)
70            ;1A             O  LCD contrast select (0-7)
71            ;1B             O  Clear watchdog timer
72            ;1C             O  Clock RTC counter
73            ;1D             IO EEPROM
74            ;1E             O  Coil test drivers
```

```
75                  ;1F          0 Sensor test drivers
76                  ;20          0 Start A/D channel 0, sensor 1
77                  ;21          0 Start A/D channel 1, sensor 2
78                  ;22          0 Start A/D channel 2, sensor 3
79                  ;23          0 Start A/D channel 3, sensor 4
80                  ;24          0 Start A/D channel 4, sensor 5
81                  ;25          0 Start A/D channel 5, sensor 6
82                  ;26          0 Start A/D channel 6, sensor 7
83                  ;27          0 Start A/D channel 7, sensor 8
84                  ;28          0 Start A/D channel 8, valve 1
85                  ;29          0 Start A/D channel 9, valve 2
86                  ;2A          0 Start A/D channel 10, valve 3
87                  ;2B          0 Start A/D channel 11, valve 4
88                  ;2C          0 Start A/D channel 12, valve 5
89                  ;2D          0 Start A/D channel 13, valve 6
90                  ;2E          0 Start A/D channel 14, valve 7
91                  ;2F          0 Start A/D channel 15, valve 8
92                  ;30-3F
93                  ;40-FF       Zero page variables, pointers, and tables
94                  ;100-1FF     Stack
95                  ;200-3FF     Program variables
96                  ;8000        ROM start
97                  ;FFFA-FFFB   NMI vector
98                  ;FFFC-FFFD   RESET vector
99                  ;FFFE-FFFF   IRQ vector
100
101
102                 ;----------------------------------
103                 ;    VARIABLES, ZERO PAGE
104                 ;----------------------------------
105
106                 ;RAM LOCATIONS
107   0000                        PAGE0
108   0040                        ORG   $40
109   0040          CKSUM         DS    1        ;checksum value
110   0041          LSB           DS    1        ;general purpose register
111   0042          MSB           DS    1        ;general purpose register
112   0043          MSGPTR        DS    2        ;16 bit message pointer
113   0045          ADCHANNEL     DS    1        ;A/D channel number
114   0046          TIMCTR        DS    1        ;down counter for TIMER int
115   0047          TIMCTR2       DS    1        ;another one
116   0048          CURSOR        DS    1        ;LCD cursor address
117   0049          VALVE         DS    1        ;valve number
118   004A          SENSOR        DS    1        ;sensor number
119   004B          E2WR          DS    1        ;byte to send to EEPROM
120   004C          E2MASK        DS    1        ;byte to EEPROM interface
121   004D          E2ADDR        DS    1        ;address in EEPROM (0-3FH)
122   004E          MULTIPLIER    DS    1        ;math variables
123   004F          MULTIPLICAND  DS    1
124   0050          PRODUCT       DS    2
125   0052          DIVIDEND      DS    2
126   0054          DIVISOR       DS    2
127   0056          QUOTIENT      DS    2
128   0058          MODE          DS    2        ;present menu selection
129   005A          MENUPTR       DS    2        ;menu info ptr
130
131   005C          KEYREG        DS    1        ;the present key
```

```
132  005D    KEYPRESS     DS    1     ;a good key
133  005E    KEYMASK      DS    1     ;keyboard enable mask
134  005F    REPCTR       DS    1     ;repeat counter
135  0060    REPEAT_MASK  DS    1     ;which keys to repeat
136  0061    IBFR         DS    10    ;input buffer
137  006B    INTCTR       DS    1     ;counts INTs for scrolling or blinking
138  006C    BLINK        DS    1     ;tells INT to blink or scroll
139  006D    FLAGS        DS    1     ;bit 0 - 1=power key in
140                                   ;bit 1 - 1=serial data link
141                                   ;bit 2 - 1=SL
142                                   ;bit 3 - 1=help in progress
143                                   ;bit 4 -
144                                   ;bit 5 -
145                                   ;bit 6 - 1=cursor on
146                                   ;bit 7 - toggle for blinking "?"
147  006E    REPEAT_RATE  DS    1     ;rep rate for repeat key
148  006F    DIGIT        DS    3     ;3 digits ASCII to display
149  0072    HELPNUM      DS    1     ;index into scrolling msgs
150  0073    CTR          DS    2     ;16 bit counter
151  0075    SRCPTR       DS    2     ;source pointer
152  0077    DESTPTR      DS    2     ;destination pointer
153  0079    ERROR        DS    1     ;passing errors from subroutines
154  007A    STARTCTR     DS    1     ;the current start
155  007B    STARTPTR     DS    2     ;pointer to start times in object pgm
156  007D    VCTR         DS    18    ;duration down counters
157  008F    TR           DS    18    ;time remaining for watering
158  00A1    SECCTR       DS    2     ;counts seconds
159  00A3    HPTR         DS    18    ;history pointers for valve starts
160  00B5    HREAD        DS    2     ;read pointer in history
161  00B7    HWRITE       DS    2     ;write pointer in history
162  00B9    HDATE        DS    2     ;date of last history entry
163  00BB    SOURCE       DS    1     ;the setup in use
164  00BC    R1           DS    1     ;local use registers
165  00BD    R2           DS    1
166  00BE    R3           DS    1
167  00BF    R4           DS    1
168  00C0    TARGET       DS    9     ;target soil moistures
169  00C9    DEFAULT      DS    6     ;storage for defaults
170  00CF    OFFSET       DS    4     ;next available start time
171  00D3    SECRET       DS    1     ;secret code type
172  00D4    CONTRAST     DS    1     ;LCD contrast
173  00D5    SCREENS      DS    1     ;how many screens to display
174  00D6    SCREEN       DS    1     ;the current screen displayed
175  00D7    SUB          DS    1     ;which sub source in use
176  00D8    ALTCLK       DS    2     ;clock for semi-auto to use
177  00DA    EMCLK        DS    2     ;clock for emulation to use
178  00DC    WATERCLK     DS    2     ;actual clock in use
179  00DE    POSITION     DS    1     ;valve/sensor connector location
180  00DF    ADDATA       DS    2     ;AD reading
181  00E1    R5           DS    1
182  00E2    INTCMD       DS    1     ;command for interrupt (send NO keys)
183  00E3    CMDCTR       DS    1     ;repeat counter for auto NO key
184  00E4    STTS         DS    1     ;status byte at reset
185  00E5    R6           DS    1
186
187          ;----------------------------------
188          ;    VARIABLES, NON ZERO-PAGE
189          ;----------------------------------
```

```
190
191   0000                         DATA
192   0200                         ORG    $0200
193   0200      CKDATA    DS    16    ;checksum data
194   0210      AD        DS    16    ;16 bytes of AD readings
195   0220      TIMEON    DS    18    ;how long valve was on
196   0232      S         DS     2    ;start time for valve
197   0234      E         DS     2    ;end time for valve
198   0236      WT        DS     2    ;watering time for valve
199   0238      NXTTIME   DS    18    ;next watering time while generating
200   024A      BASETYPE  DS     9    ;0=base watering, 2=soak
201   0253      SNUM      DS     1    ;number of syringes (end-start / how often)
202   0254      NSPLIT    DS     9    ;# of starts generated for each valve
203   025D      SL        DS     1    ;1=System Low flag
204   025E      IDBFR     DS     9    ;bfr to edit valve/sensor IDs
205   0267      CHKFLAG   DS     1    ;flag to generator
206   0268      VSYR      DS     9    ;number of syringes displayed
207   0271      NSYR      DS     1    ;total number of syringes
208   0272      REVIEW    DS     1    ;new, review, or modify schedules
209   0273      SEL1      DS     1    ;temp storage in select routines
210   0274      SEL2      DS     1
211   0275      CHARGING  DS     1    ;contrast for charging msg
212
213                       ;------------------------------------
214                       ;     SYSTEM BLOCK
215                       ;------------------------------------
216
217   0276      SYSTEM_BLOCK:
218
219   0276      HOUR      DS     1    ;real time clock
220   0277      MINUTE    DS     1
221   0278      DOW       DS     1
222   0279      MONTH     DS     1
223   027A      DAY       DS     1
224   027B      YEAR      DS     1
225   027C      DIM       DS     1    ;number of days in the month
226   027D      VS        DS     9    ;valve status
227                                   ;bit 7 - 0=no ID
228                                   ;bit 6 - 0=disabled
229                                   ;bit 5 - 1=master valve
230                                   ;bit 4 - 0=off, 1=on
231                                   ;bit 3-0 - station type
232   0286      SS        DS     9    ;sensor status
233   028F      DRY_LEVEL DS     9
234   0298      SOAK_LEVEL DS    9
235   02A1      RAIN      DS     1    ;rain sensor, 0=disabled
236   02A2      CODES     DS     1    ;0=secret codes disabled
237   02A3      CODE1     DS     4    ;4 ASCII bytes
238   02A7      CODE2     DS     4
239   02AB      CODE3     DS     4
240   02AF      CID       DS     6    ;controller ID
241   02B5      FAILSAFE  DS     4    ;hour, minute, duration(2) for backup pgm
242   02B9      VALVEID   DS     9    ;valve position and polarity
243   02C2      SENSORID  DS     9    ;same deal for sensors
244   02CB      TERRAIN   DS     9    ;terrain
245   02D4      SPRINKLER DS     9    ;sprinkler type
246   02DD                DS     9    ;spares
247   02E6                DS    20    ;spares
```

```
248                                                    ;end of SYSTEM SETTINGS
249                    ;          -----------
250                    ;   total        132
251
252                    ;-----------------------------------
253                    ;      RUN BLOCK
254                    ;-----------------------------------
255
256   02FA             RUN_BLOCK:
257
258   02FA             SETUPS       DS      3       ;which setups to run
259   02FD             RAIN_DELAY   DS      1       ;# of days to wait before run
260   02FE             GLOBAL       DS      1       ;% of watering
261   02FF             BUDGET       DS      9       ;individual budgeting
262   0308                          DS      18      ;spares
263   031A             DAYNUM       DS      4       ;day to generate
264                                                 ;byte 0-1=day # or wk #, byte 2=specific days
265   031E             WCLK         DS      1       ;which clk to use
266                                                 ;0=RTC, 1=Altclk, 2=Emclk
267                                                 ;end of RUN SETTINGS
268   031F             RUNNING      DS      1       ;condition of RUN
269                                                 ;0 = no watering
270                                                 ;1 = ready to run when key out
271                                                 ;2 = start or resume watering
272                                                 ;3 = running
273                                                 ;4 = waiting for midnite
274                                                 ;5 = halted by menu, can resume
275                                                 ;6 = halted by SL, must start new
276                    ;          -----------
277                    ;   total        38
278
279                    ;-----------------------------------
280                    ;      SOURCE STORAGE
281                    ;-----------------------------------
282
283   0900                          ORG     $0900
284   0900             SRC1         DS      172     ;Mini set up
285   09AC             SRC2         DS      172     ;Auto-split set up
286   0A58             SRC3         DS      172     ;Ration set up
287   0B04             SRC4         DS      172     ;ISC set up
288   0BB0             SRC5         DS      172     ;One time set up
289   0C5C             SRC6         DS      172     ;Special set up
290   0D08             SRC7         DS      4       ;Failsafe setup
291   0D0C             SRC8         DS      1024    ;ISC starts
292   110C             SRC9         DS      1024    ;Special starts
293                    ;          -----------
294                    ;   total        3084
295
296                    ;-----------------------------------
297                    ;      OBJECT STORAGE
298                    ;-----------------------------------
299
300                                                 ;this is the source currently in use
301   1540                          ORG     $1540
302   1540             OBJBASE:
303   1540             SOURCE_TYPE  DS      1       ;source type
304   1541             CYCLE_TYPE   DS      1       ;0=so many, 1=specific, 2=odd, 3=even
```

```
305  1542              MAXON         DS    9      ;maximum on time
306  154B              MINOFF        DS    9      ;minimum off time for splits
307  1554              XFROM         DS    2      ;excluded time, from-to
308  1556              XTO           DS    2
309  1558
310  1558              DUR1          DS    18     ;base durations
311  156A              CYCLE1        DS    18     ;base cycles
312  157C              BASE_START    DS    2      ;time of first start
313
314  157E              DUR2          DS    18     ;syringe durations
315  1590              CYCLE2        DS    18     ;cycles (daily if syringe)
316  15A2              ACTIVE_MONTH  DS    13     ;months to syringe
317  15AF              SYRINGE_START DS    2      ;time to start syringing
318  15B1              SYRINGE_END   DS    2      ;time to end syringes
319  15B3              SOFTEN        DS    2      ;how often to syringe
320  15B5              DUR3          DS    18     ;soak durations
321  15C7              CYCLE3        DS    18     ;soak cycles
322  15D9                            DS    19     ;spares
323                    ;             -----------
324                    ;   total          172
325
326  15EC              NSTARTS       DS    1      ;number of starts
327  15ED              GENTIME       DS    2      ;time to generate a new schedule
328  15EF              DONETIME      DS    2      ;end of watering for the day
329  15F1              STARTS        DS    1024   ;128 starts @ 8 bytes each
330                                                ;END OF OBJECT STORAGE
331                    ;----------------------------------
332                    ;     OTHER RAM STORAGE
333                    ;----------------------------------
334
335  1A00                            ORG   $1A00
336  1A00              BFR           DS    512    ;serial interface bfr
337  1C00              HISTORY       DS    1016   ;127 history entries @ 8 bytes each
338  1FF8              HEND          DS    8      ;end of history buffer
339
340                    ;----------------------------------
341                    ;     CONSTANTS
342                    ;----------------------------------
343
344                    ;I/O ADDRESSES
345  00E6                            PAGE0
346        0000        POWER_OFF     EQU   0      ;processor power off
347        0001        RTC_CLR       EQU   1      ;clear RTC counter
348        0002        AD_POWER      EQU   2      ;A/D power
349        0003        AD_ENABLE     EQU   3      ;A/D enable
350        0004        LCD_POWER     EQU   4      ;LCD power
351        0005        LCD_ENABLE    EQU   5      ;LCD enable
352        0006        VALVE_SETUP   EQU   6      ;valve select
353        0007        VALVE_ENABLE  EQU   7      ;valve enable
354        0008        TIMER_MSB     EQU   8      ;TIMER hi byte
355        0009        TIMER_LSB     EQU   9      ;TIMER lo byte
356        000A        TIMER         EQU   $0A    ;TIMER on/off
357        000B        RTC           EQU   $0B    ;Real time clock
358        000C        SERIAL_CLK    EQU   $0C    ;Serial interface clock
359        000D        TIMER_LOAD    EQU   $0D    ;load TIMER msb,lsb into TIMER
360        000E        SERIAL_OUT    EQU   $0E    ;output serial data
```

```
361    000F              SO_RDY        EQU    $0F              ;serial output ready
362    0010              RTC_MSB       EQU    $10              ;RTC counter hi byte
363    0011              RTC_LSB       EQU    $11              ;RTC counter lo byte
364    0012              STATUS1       EQU    $12              ;1st status byte
365    0013              STATUS2       EQU    $13              ;2nd status byte
366    0014              SERIAL_IN     EQU    $14              ;serail data in
367    0015              AD_DATA       EQU    $15              ;read A/D data
368    0016              SO_LOAD       EQU    $16              ;load serial shift register
369    0017              SI_CLR        EQU    $17              ;clear serial in ready
370    0018              LCD_STATUS    EQU    $18              ;LCD register 0
371    0018              LCD_CMD       EQU    $18
372    0019              LCD_DATA      EQU    $19              ;LCD register 1
373    001A              LCD_CONTRAST  EQU    $1A              ;LCD contrast
374    001B              WATCHDOG      EQU    $1B              ;Watchdog timer
375    001C              RTC_TEST      EQU    $1C              ;RTC counter clock
376    001D              E2            EQU    $1D              ;EEPROM
377    001E              WCVALVES      EQU    $1E              ;Wire check drivers for valves
378    001F              WCSENSORS     EQU    $1F              ;Wire check drivers for sensors
379    0020              ADBASE        EQU    $20              ;A/D base address
380
381
382                      ;OTHER CONSTANTS
383
384    0040              NEG           EQU    01000000B
385    0000              POS           EQU    0
386    0040              SI_PRESENT    EQU    01000000B        ;serial device plugged in
387    0002              E2CS          EQU    2                ;bit for EEPROM chip select
388    0001              E2SK          EQU    1                ;bit for EEPROM serial clock
389    0080              E2READ_CMD    EQU    10000000B        ;EEPROM read command
390    0040              E2WRITE_CMD   EQU    01000000B        ;EEPROM write command
391    00C0              E2ERASE_CMD   EQU    11000000B        ;EEPROM erase command
392    0030              E2EWEN_CMD    EQU    00110000B        ;EEPROM erase/write enable cmd
393    0019              PERSEC        EQU    25               ;how many INTs per second
394    000A              SLOW_REPEAT   EQU    10               ;how many INT routines to repeat key
395    0006              BLINK_RATE    EQU    6                ;to blink
396    0007              SRATE1        EQU    7                ;scrolling blank time
397    003E              SRATE2        EQU    62               ;scroll msg time
398    0078              SRATE3        EQU    120              ;last msg time
399    0064              SRATE4        EQU    100              ;self test msg time
400    0003              FAST_REPEAT   EQU    3                ;fast time set up repeat
401    0020              OKKEY         EQU    00100000B        ;switch 6
402    0010              NOKEY         EQU    00010000B        ;switch 5
403    0008              HELPKEY       EQU    00001000B        ;switch 4
404    0001              STOPKEY       EQU    00000001B        ;switch 1
405    0040              LINE2         EQU    $40              ;cursor addr for display line 2
406    0030              ASCMASK       EQU    00110000B        ;change 0-9 to ASCII
407    0080              VID           EQU    10000000B        ;valve ID bit in VS
408    0040              VEN           EQU    01000000B        ;enable bit in VS
409    0032              ADWAIT        EQU    50               ;ms to wait before read (coil test)
410
411    0000              RREVIEW       EQU    0                ;review byte in schedule setup
412    0001              RMODIFY       EQU    1
413    0002              RNEW          EQU    2
414
415   '2000                            DATA                    ;16 bit constants
416
```

```
417             ;----------------------------------
418             ;     MACROS
419             ;----------------------------------
420
421             DBLW:   MACRO   A0              ;multiply word by 2
422                     CLC
423                     ROL     A0
424                     ROL     A0+1
425                     ENDM
426
427             DBL:    MACRO   A0              ;multiply byte by 2
428                     CLC
429                     ROL     A0
430                     ENDM
431
432             DBLX:   MACRO                   ;multiply index by 2
433                     PHA
434                     CLC
435                     TXA
436                     ROL     A
437                     TAX
438                     PLA
439                     ENDM
440
441             RTC10:  MACRO                   ;set up RTC for 10 seconds
442                     LDA     #1
443                     STA     RTC
444                     ENDM
445
446             RTC60:  MACRO                   ;set up RTC for 60 seconds
447                     LDA     #0
448                     STA     RTC
449                     ENDM
450
451             RTC_PULSE: MACRO                ;check for RTC timeout
452                     LDA     STATUS1
453                     AND     #00010000B
454                     ENDM
455
456             SET:    MACRO   A0              ;store a 1 to memory
457                     LDA     #1
458                     STA     A0
459                     ENDM
460
461             MESSAGE: MACRO A0               ;display msg
462                     LDX     #A0
463                     JSR     DISPLAY_MSG
464                     ENDM
465
466             CURSOR_OFF: MACRO               ;display on, no cursor or blink
467                     LDX     #5
468                     JSR     CMD
469                     ENDM
470
471             CURSOR_ON: MACRO                ;display on, show cursor
472                     LDX     #3
473                     JSR     CMD
```

```
474                ENDM
475
476      SET_CURSOR: MACRO      A0        ;move cursor to address
477                LDA       #A0
478                JSR       LCD_ADDR
479                ENDM
480
481      BACKUP:  MACRO      A0           ;backup cursor
482                LDA       #A0
483                JSR       DEC_LCD_ADDR
484                ENDM
485
486      SKIP:    MACRO      A0           ;move cursor ahead
487                LDA       #A0
488                JSR       INC_LCD_ADDR
489                ENDM
490
491      BLT:     MACRO      A0           ;branch if A<M
492                BCC       A0
493                ENDM
494
495      BGE:     MACRO      A0           ;branch if A>=M
496                BCS       A0
497                ENDM
498
499      ADD16:   MACRO      A0,A1,A2     ;A2=A0+A1, 16 bits
500                CLC
501                LDA       A0
502                ADC       A1
503                STA       A2
504                LDA       A0+1
505                ADC       A1+1
506                STA       A2+1
507                ENDM
508
509      INC16:   MACRO      A0           ;increment a 16 bit number
510                CLC
511                LDA       A0
512                ADC       #1
513                STA       A0
514                LDA       A0+1
515                ADC       #0
516                STA       A0+1
517                ENDM
518
519      MOV16:   MACRO      A0,A1        ;move 16 bits from A0 to A1
520                LDA       A0
521                STA       A1
522                LDA       A0+1
523                STA       A1+1
524                ENDM
525
526      LDW:     MACRO      A0,A1        ;load 16 bits of immediate data
527                LDA       #<A1
528                STA       A0
529                LDA       #>A1
530                STA       A0+1
```

```
531              ENDM
532
533    SLOW:  MACRO   A0              ;repeat a key slowly
534            LDA    #SLOW_REPEAT
535            STA    REPEAT_RATE
536            LDA    #A0
537            STA    REPEAT_MASK
538            ENDM
539
540    FAST:  MACRO   A0              ;repeat a key quickly
541            LDA    #FAST_REPEAT
542            STA    REPEAT_RATE
543            LDA    #A0
544            STA    REPEAT_MASK
545            ENDM
546
547    HELP:  MACRO   A0              ;do scrolling message
548            LDA    #A0             ;and ask for repeat
549            STA    HELPNUM
550            JSR    HELP_MSG
551            ENDM
552
553    SCROLL: MACRO  A0              ;do scrolling message
554            LDA    #A0
555            STA    HELPNUM
556            JSR    SCROLL_MSG
557            ENDM
558
559    SELECT: MACRO  A0,A1            ;set up for get number
560            STA    IBFR             ;selection in A
561            LDA    #A0
562            STA    IBFR+1
563            LDA    #A1
564            STA    IBFR+2
565            JSR    GETNUM
566            ENDM
567
568    SELECT_MUL: MACRO A0,A1,A2      ;select msg, medium speed, underline
569            STA    IBFR
570            LDA    #A0
571            STA    IBFR+1
572            LDA    #A1
573            STA    IBFR+2
574            LDA    #A2
575            STA    IBFR+3
576            JSR    GETMUL
577            ENDM
578
579    SELECT_SOK: MACRO A0,A1,A2      ;select msg, slow speed, OK char
580            STA    IBFR
581            LDA    #A0
582            STA    IBFR+1
583            LDA    #A1
584            STA    IBFR+2
585            LDA    #A2
586            STA    IBFR+3
587            JSR    GETSOK
```

```
588                 ENDM
589
590     SELECT_MOK: MACRO A0,A1,A2    ;select msg, medium speed, OK char
591                 STA     IBFR
592                 LDA     #A0
593                 STA     IBFR+1
594                 LDA     #A1
595                 STA     IBFR+2
596                 LDA     #A2
597                 STA     IBFR+3
598                 JSR     GETMOK
599                 ENDM
600
601     UL:     MACRO                 ;turn on blinking underline
602             SET     BLINK
603             STZ     INTCTR
604             ENDM
605
606     QM:     MACRO                 ;turn on blinking question mark
607             LDA     #2
608             STA     BLINK
609             STZ     INTCTR
610             ENDM
611
612     OK:     MACRO                 ;turn on blinking OK char
613             LDA     #5
614             STA     BLINK
615             STZ     INTCTR
616             ENDM
617
618     NOBLINK: MACRO                ;kill all blinking
619             STZ     BLINK
620             STZ     INTCTR
621             ENDM
622
623     SHR16:  MACRO   A0            ;shift 16 bits right (divide by 2)
624             CLC
625             ROR     A0+1
626             ROR     A0
627             ENDM
628
629     ANSLOW: MACRO                 ;auto NO key on slow
630             LDA     #1
631             STA     INTCMD
632             ENDM
633
634     ANMED:  MACRO                 ;auto NO key on medium
635             LDA     #2
636             STA     INTCMD
637             ENDM
638
639     ANFAST: MACRO                 ;auto NO key on fast
640             LDA     #3
641             STA     INTCMD
642             ENDM
643
644     ANOFF:  MACRO                 ;auto NO key off
```

```
645                            STZ     INTCMD
646                            ENDM
647
648
649
650
651
652  2000                      INCLUDE  CYCLE.ASM
653                      ;----------------------------------
654                      ;    START OF CODE
655                      ;----------------------------------
656  8000                      CODE
657  8000                      ORG     $8000
658
659                      ;----------------------------------
660                      ;    POWER ON
661                      ;----------------------------------
662
663  8000  A2 FF         RESET:  LDX     #$FF          ;init stack pointer
664  8002  9A                    TXS
665  8003  78                    SEI
666  8004  64 6D                 STZ     FLAGS
667  8006  A5 12                 LDA     STATUS1       ;save status
668  8008  85 E4                 STA     STTS
669  800A  29 80                 AND     #%10000000    ;if SVL, then forget everything
670  800C  D0 03                 BNE     RS0
671  800E  4C CB 81              JMP     DEATH
672  8011  85 1B         RS0:    STA     WATCHDOG      ;clear the dog
673  8013  20 CB A2              JSR     CALCSUM       ;if RAM OK, then not first time on
674  8016  C5 40                 CMP     CKSUM
675  8018  D0 03                 BNE     RAMNG
676  801A  4C A0 80              JMP     RAMOK
677
678  801D  A5 E4         RAMNG:  LDA     STTS          ;RAM no good, must be first time on
679  801F  29 01                 AND     #%00000001    ;can't do anything until
680  8021  F0 03                 BEQ     RS2
681  8023  4C CB 81              JMP     DEATH
682  8026  A5 E4         RS2:    LDA     STTS          ;Battery is present!
683  8028  29 20                 AND     #%00100000    ;now wait until BATT LOW gone
684  802A  F0 03                 BEQ     INITIALIZE
685                                                    ;(future flash message here)
686  802C  4C CB 81              JMP     DEATH
687
688                      INITIALIZE:                   ;fully charged, let's go
689                                                    ;(ignore EEPROM for now)
690
691                                                    ;cold start
692  802F  A2 0F                 LDX     #15           ;store checksum data bytes
693  8031  64 40                 STZ     CKSUM
694  8033  18                    CLC
695  8034  8A            NIT1:   TXA
696  8035  9D 00 02              STA     CKDATA,X
697  8038  65 40                 ADC     CKSUM
698  803A  85 40                 STA     CKSUM
699  803C  CA                    DEX
700  803D  D0 F5                 BNE     NIT1
701
```

```
702  803F  A2 00              LDX   #0            ;init system block
703  8041  BD 80 F7    NIT2:  LDA   SSTBL,X       ;from default table
704  8044  9D 76 02           STA   HOUR,X
705  8047  E8                 INX
706  8048  E0 67              CPX   #$03
707  804A  D0 F5              BNE   NIT2
708  804C  A2 00              LDX   #0            ;init run block
709  804E  BD F4 F7    NIT7:  LDA   RUNTBL,X      ;from default table
710  8051  9D FA 02           STA   SETUPS,X
711  8054  E8                 INX
712  8055  E0 0E              CPX   #14
713  8057  D0 F5              BNE   NIT7
714  8059  9C 1F 03           STZ   RUNNING
715  805C  9C 50 02           STZ   SL            ;clear SL flag
716  805F                     RTC60
720  8063  85 01              STA   RTC_CLR       ;clear RTC counter
721  8065  64 A1              STZ   SECCTR
722  8067  64 A2              STZ   SECCTR+1      ;seconds counter
723  8069  64 E2              STZ   INTCMD
724  806B  A9 09              LDA   #$09          ;clear out source RAM area ($0900-$153F)
725  806D  85 78              STA   DESTPTR+1
726  806F  64 77              STZ   DESTPTR
727  8071  A0 00              LDY   #0
728  8073  A9 00       NIT4:  LDA   #0
729  8075  91 77       NIT5:  STA   (DESTPTR),Y
730  8077  C8                 INY
731  8078  D0 FB              BNE   NIT5
732  807A  E6 78              INC   DESTPTR+1
733  807C  A5 78              LDA   DESTPTR+1
734  807E  C9 15              CMP   #$15
735  8080  D0 F1              BNE   NIT4
736  8082  91 77       NIT6:  STA   (DESTPTR),Y
737  8084  C8                 INY
738  8085  C0 28              CPY   #40
739  8087  D0 F9              BNE   NIT6
740
741  8089                     LDW   HWRITE,HISTORY ;init history pointer
747  8091  A9 00       NIT3:  LDA   #0            ;clear all entries
748  8093  92 B7              STA   (HWRITE)
749  8095  20 12 AA           JSR   INC_HWRITE
750  8098  90 F7              BCC   NIT3
751  809A  20 71 AA           JSR   HOPEND        ;store the default date
752  809D  4C AD B3           JMP   PROGIN
753
754
755                    RAMOK:                     ;wakeup, not the first time on
756  80A0  64 E2              STZ   INTCMD
757  80A2  20 D6 A4           JSR   READ_RTC      ;if more than 1 RTC, then SVL happened
758  80A5  A5 42              LDA   MSB
759  80A7  D0 0D              BNE   RS21
760  80A9  A5 41              LDA   LSB
761  80AB  C9 02              CMP   #2
762  80AD                     BGE   RS21
765  80AF  F0 2F              BEQ   RS22          ;no minutes passed
766  80B1  20 EF A4           JSR   UPDATE_CLOCK  ;else inc clock by 1 min.
767  80B4  80 2A              BRA   RS22
768
```

```
769  80B6  A9 01    RS21:  LDA  #$01            ;tell history about SVL
770  80B8  20 CE AA        JSR  HOPENF
771  80BB  20 F9 A4        JSR  CLR_RTC
772  80BE  A5 42    RS23:  LDA  MSB             ;while RTC>60,
773  80C0  D0 08           BNE  RS24
774  80C2  A5 41           LDA  LSB
775  80C4  F0 1A           BEQ  RS22
776  80C6  C9 3C           CMP  #60
777  80C8                  BLT  RS25
780  80CA  A9 3C    RS24:  LDA  #60             ;update clock in <=60 min. chunks
781  80CC  85 61    RS25:  STA  IBFR
782  80CE  20 00 A5        JSR  BUMP_CLOCK
783  80D1  38              SEC
784  80D2  A5 41           LDA  LSB
785  80D4  E5 61           SBC  IBFR
786  80D6  85 41           STA  LSB
787  80D8  A5 42           LDA  MSB
788  80DA  E9 00           SBC  #0
789  80DC  85 42           STA  MSB
790  80DE  80 DE           BRA  RS23
791
792  80E0  A5 E4    RS22:  LDA  STTS
793  80E2  29 04           AND  #00000100B      ;if SL,
794  80E4  D0 1F           BNE  RS10
795  80E6  AD 5D 02        LDA  SL
796  80E9  D0 17           BNE  RS16
797  80EB  20 CB AD        JSR  ISRUNNING       ;if running,
798  80EE  90 08           BCC  RS2A
799  80F0  20 34 83        JSR  HALT_RUN        ;then suspend watering
800  80F3  A9 06           LDA  #6
801  80F5  8D 1F 03        STA  RUNNING
802  80F8  A9 00    RS2A:  LDA  #$00
803  80FA  20 CE AA        JSR  HOPENF          ;tell history (only once)
804  80FD                  SET  SL
808  8102  4C CB 81 RS16:  JMP  DEATH
809
810  8105  AD 5D 02 RS10:  LDA  SL              ;no SL now
811  8108  F0 15           BEQ  RS17
812  810A  9C 5D 02        STZ  SL              ;but there was one, recover
813  810D  AD 1F 03        LDA  RUNNING         ;if running was halted,
814  8110  C9 06           CMP  #6
815  8112  D0 08           BNE  RS17
816  8114  9C 1A 03        STZ  DAYNUM          ;then start over
817  8117  9C 1B 03        STZ  DAYNUM+1
818  811A  A9 02           LDA  #2
819  811C  8D 1F 03        STA  RUNNING
820
821  811F  A5 E4    RS17:  LDA  STTS
822  8121  29 40           AND  #SI_PRESENT
823  8123  D0 0A           BNE  RS15
824  8125  A5 E4           LDA  STTS            ;serial link present
825  8127  A5 E4           LDA  STTS
826  8129  29 80           AND  #10000000B      ;if ready
827  812B  F0 00           BEQ  RS14
828                                              ;serivce serial port
829  812D  A5 17    RS14:  LDA  SI_CLR          ;else clear it
830
```

```
831    812F   A5 E4         RS15:    LDA     STTS
832    8131   29 01                  AND     #00000001B
833    8133   D0 43                  BNE     RS11
834    8135   A5 E4                  LDA     STTS            ;battery is present
835    8137   29 20                  AND     #00100000B
836    8139   D0 03                  BNE     RS12
837    813B   4C AD 83               JMP     PROGIN          ;and fully charged
838                          RS12:                           ;batt is low
839    813E   EE 75 02               INC     CHARGING        ;change contrast
840    8141   AD 75 02               LDA     CHARGING
841    8144   C9 0B                  CMP     #11
842    8146                          BLT     RS1A
845    8148                          SET     CHARGING
849    814D   AD 75 02      RS1A:    LDA     CHARGING
850    8150   4A                     LSR     A
851    8151   B0 22                  BCS     RS1B
852    8153   20 32 A3               JSR     LCD_ON
853    8156   20 40 A3               JSR     DISPLAY_ON
854    8159   20 85 A3               JSR     DISPLAY_CLR
855    815C                          MESSAGE 8               ;& say so
859    8161   AD 75 02               LDA     CHARGING
860    8164   4A                     LSR     A
861    8165   AA                     TAX
862    8166   BD 86 F8               LDA     CONTRAST_TBL,X
863    8169   85 1A                  STA     LCD_CONTRAST
864    816B   A0 FA                  LDY     #250            ;give user time to see msg
865    816D   20 C0 A2               JSR     WAITMS
866    8170   A0 FA                  LDY     #250
867    8172   20 C0 A2               JSR     WAITMS
868    8175   4C BA 81      RS1B:    JMP     SHUT_DOWN
869
870                         RS11:                            ;woke up by RTC
871    8178   4C CB 81      RS13:    JMP     DEATH           ;or watchdog
872
873                                  ;------------------------------
874                                  ;   ORDERLY SHUT-DOWN
875                                  ;------------------------------
876
877                         BATT_LOW:                        ;battery is low
878    817B   20 39 A4               JSR     TIMER_OFF
879    817E   20 B2 A3               JSR     DKCLR
880    8181                          MESSAGE 72              ;alert the user
884    8186   20 F3 05               JSR     SLFWAIT
885    8189   20 B2 A3               JSR     DKCLR
886    818C   20 E5 9F               JSR     FLASH
887    818F                          MESSAGE 90
891    8194   20 F3 05               JSR     SLFWAIT
892    8197   A9 02                  LDA     #$02
893    8199   20 CE AA               JSR     HOPENF
894    819C   20 F3 05               JSR     SLFWAIT
895    819F   80 19                  BRA     SHUT_DOWN
896
897                         NO_BATT:                         ;battery removed
898    81A1   A9 03                  LDA     #$03            ;tell history
899    81A3   20 CE AA               JSR     HOPENF
900    81A6   AD 1F 03               LDA     RUNNING
901    81A9   C9 01                  CMP     #1              ;if ready to run
```

```
902   81AB  D0 0D              BNE     SHUT_DOWN
903   81AD  20 39 A4           JSR     TIMER_OFF
904   81B0  A9 02              LDA     #2              ;give it the go ahead
905   81B2  8D 1F 83           STA     RUNNING
906   81B5  A9 05              LDA     #$05            ;tell history start watering
907   81B7  20 CE AA           JSR     HOPENF
908
909                    SHUT_DOWN:                      ;nite nite
910   81BA  20 39 A4           JSR     TIMER_OFF
911   81BD  20 7D A3           JSR     DISPLAY_OFF
912   81C0  20 23 A4           JSR     AD_OFF
913   81C3  20 CB AD           JSR     ISRUNNING       ;if not running,
914   81C6  B0 03              BCS     DEATH
915   81C8  20 9D A4           JSR     ALL_VALVES_OFF  ;then kill valves
916   81CB  85 00      DEATH:  STA     0               ;processor power off
917   81CD  80 FC              BRA     DEATH           ;shouldn't get here
918
919                    ;-------------------------------
920                    ;      WATERING ROUTINE
921                    ;-------------------------------
922
923
924   81CF  20 CB AD   WATER:  JSR     ISRUNNING       ;Service starts in OBJECT
925   81D2  B0 03              BCS     CY20            ;if watering,
926   81D4  4C AA 82           JMP     CY99
927
928                    ;Y0:    LDA     WCLK            ;which mode?
929                    ;       CMP     #1
930                    ;       BNE     CY20
931                    ;
932                    ;Y10:   INC16   ALTCLK          ;SEMI-AUTO MODE
933                    ;       MOV16   ALTCLK,WATERCLK
934                    ;
935                    ;       LDA     DAYNUM          ;if daynum=0
936                    ;       ORA     DAYNUM+1
937                    ;       BNE     CY15
938                    ;       JSR     INCDAYNUM       ;then start watering now
939                    ;       JSR     GENERATE
940                    ;       LDA     GENTIME
941                    ;       STA     WATERCLK
942                    ;       STA     ALTCLK
943                    ;       LDA     GENTIME+1
944                    ;       STA     WATERCLK+1
945                    ;       STA     ALTCLK+1
946                    ;
947                    ;Y15:   LDA     DONETIME        ;if watering done
948                    ;       CMP     WATERCLK
949                    ;       BNE     CY30
950                    ;       LDA     DONETIME+1
951                    ;       CMP     WATERCLK+1
952                    ;       BNE     CY30
953                    ;       STZ     WCLK            ;then change to auto mode
954                    ;       LDA     NSTARTS         ;wait for next base start
955                    ;       STA     STARTCTR
956                    ;
957                    CY20:                           ;AUTO MODE
958   81D7                     MOV16   HOUR,IBFR+4     ;use real time
```

```
964   81E1  20 B3 AB              JSR    HM2MIN
965   B1E4                        MOV16  OFFSET,WATERCLK
971   81EC  AD 1F 03              LDA    RUNNING
972   B1EF  C9 02                 CMP    #2
973   81F1  D0 3E                 BNE    CY2A
974                                                      ;running=2
975   81F3  AD FD 02              LDA    RAIN_DELAY     ;dec rain delay if any
976   81F6  F0 11                 BEQ    CY2D
977   81F8  A5 DC                 LDA    WATERCLK       ;if midnight
978   81FA  05 DD                 ORA    WATERCLK+1
979   81FC  D0 08                 BNE    CY2E
980   81FE  CE FD 02              DEC    RAIN_DELAY
981   8201  AD FD 02              LDA    RAIN_DELAY
982   8204  F0 03                 BEQ    CY2D
983   8206  4C AA 82    CY2E:     JMP    CY99
984   8209  AD 1A 03    CY2D:     LDA    DAYNUM
985   820C  0D 1B 03              ORA    DAYNUM+1
986   820F  F0 0A                 BEQ    CY2B
987
988   8211  20 DE AD              JSR    GENERATE       ;resume previous run
989   8214  A9 03                 LDA    #3
990   8216  8D 1F 03              STA    RUNNING
991   8219  80 16                 BRA    CY2A
992
993   821B  20 58 83    CY2B:     JSR    INCDAYNUM      ;new run, day=1
994   821E  20 DE AD              JSR    GENERATE
995   8221  A5 7A                 LDA    STARTCTR       ;if 1st start passed,
996   8223  F0 07                 BEQ    CY2C
997   8225  A9 04                 LDA    #4             ;then wait till next midnight
998   8227  8D 1F 03              STA    RUNNING
999   822A  80 05                 BRA    CY2A
1000  822C  A9 03       CY2C:     LDA    #3             ;otherwise get going now
1001  822E  8D 1F 03              STA    RUNNING
1002
1003              CY2A:                                  ;running=3 or 4
1004  8231  A5 DC                 LDA    WATERCLK
1005  8233  05 DD                 ORA    WATERCLK+1
1006  8235  D0 0B                 BNE    CY29
1007                                                     ;it's midnight
1008  8237  20 58 83    CY25:     JSR    INCDAYNUM      ;it's a new day
1009  823A  20 DE AD              JSR    GENERATE
1010  823D  A9 03                 LDA    #3
1011  823F  8D 1F 03              STA    RUNNING
1012
1013              CY29:                                  ;service valves
1014  8242  AD 1F 03              LDA    RUNNING        ;if not waiting
1015  8245  C9 04                 CMP    #4
1016  8247  F0 61                 BEQ    CY99
1017
1018  8249        CY30:            SET    VALVE         ;1st service active valves
1022  824D  A6 49       CY31:     LDX    VALVE
1023  824F  BD 7D 02              LDA    VS,X
1024  8252  29 10                 AND    #00010000B
1025  8254  F0 2B                 BEQ    CY35           ;valve is not on, try next
1026  8256  A6 49                 LDX    VALVE          ;valve is on
1027  8258                        DBLX
1035  825E  FE 20 02              INC    TIMEON,X       ;inc time on
```

```
1036  8261  D0 83                    BNE    CY32
1037  8263  FE 21 02                 INC    TIMEON+1,X
1038  8266  38           CY32:       SEC                    ;dec time remaining
1039  8267  B5 8F                    LDA    TR,X
1040  8269  E9 01                    SBC    #1
1041  826B  95 8F                    STA    TR,X
1042  826D  B5 98                    LDA    TR+1,X
1043  826F  E9 00                    SBC    #0
1044  8271  95 98                    STA    TR+1,X
1045  8273  B5 8F                    LDA    TR,X           ;if no time remaining, then done
1046  8275  15 98                    ORA    TR+1,X
1047  8277  F0 02                    BEQ    CY34
1048  8279  80 03                    BRA    CY35           ;check for sensor limit here
1049  827B  20 12 83     CY34:       JSR    VALVEOFF       ;so turn this one off
1050  827E  E6 49        CY35:       INC    VALVE          ;check the next valve
1051  8280  A5 49                    LDA    VALVE
1052  8282  C9 09                    CMP    #9
1053  8284  D0 C7                    BNE    CY31
1054
1055  8286  AD EC 15     CY40:       LDA    NSTARTS        ;2nd, service new starts
1056  8289  C5 7A                    CMP    STARTCTR
1057  828B  F0 1D                    BEQ    CY70           ;no more to do
1058
1059  828D  B2 7B        CY41:       LDA    (STARTPTR)     ;see if time to do next start
1060  828F  C5 DC                    CMP    WATERCLK
1061  8291  D0 17                    BNE    CY70
1062  8293  A0 01                    LDY    #1
1063  8295  B1 7B                    LDA    (STARTPTR),Y
1064  8297  C5 DD                    CMP    WATERCLK+1
1065  8299  D0 0F                    BNE    CY70           ;nope, nothing to do yet
1066                                                        ;time is now
1067                                                        ;check if sensors allow turn on
1068  829B  A0 02                    LDY    #2             ;turn valve on
1069  829D  B1 7B                    LDA    (STARTPTR),Y
1070  829F  85 49                    STA    VALVE
1071  82A1  20 AB 82                 JSR    VALVEON
1072  82A4  20 F7 A9     CY50:       JSR    NEXTSTART      ;go to the next start
1073  82A7  4C 86 82                 JMP    CY40           ;see if that one is for now
1074
1075                     CY70:                              ;3rd, service master valve(s)
1076
1077  82AA  60           CY99:       RTS
1078
1079                                 ;----------------------------------
1080                                 ;     VALVE MANAGEMENT
1081                                 ;----------------------------------
1082
1083                     VALVEON:                           ;start up a valve start
1084  82AB  A6 49                    LDX    VALVE          ;clear time on
1085  82AD                           DBLX
1093  82B3  9E 20 02                 STZ    TIMEON,X
1094  82B6  9E 21 02                 STZ    TIMEON+1,X
1095  82B9  A0 04                    LDY    #4             ;set up duration
1096  82BB  B1 7B                    LDA    (STARTPTR),Y
1097  82BD  95 8F                    STA    TR,X
1098  82BF  C8                       INY
1099  82C0  B1 7B                    LDA    (STARTPTR),Y
```

```
1100    82C2    95 98                   STA     TR+1,I
1101
1102                    HOPENV:                         ;open history for a valve start
1103    82C4    AD 7A 02                LDA     DAY     ;stamp date if needed
1104    82C7    C5 BA                   CMP     HDATE+1
1105    82C9    D0 07                   BNE     H04
1106    82CB    AD 79 02                LDA     MONTH
1107    82CE    C5 B9                   CMP     HDATE
1108    82D0    F0 03                   BEQ     H05
1109    82D2    20 71 AA        H04:    JSR     HOPEND
1110    82D5    A6 49           H05:    LDX     VALVE
1111    82D7                            DBLX
1119    82DD    A5 B7                   LDA     HWRITE
1120    82DF    95 A3                   STA     HPTR,X  ;save the addr
1121    82E1    A5 B8                   LDA     HWRITE+1
1122    82E3    95 A4                   STA     HPTR+1,X
1123    82E5    20 68 AA                JSR     GETHPTR ;access the entry with HPTR
1124    82E8    A5 49                   LDA     VALVE
1125    82EA    09 20                   ORA     #%00100000
1126    82EC    92 A3                   STA     (HPTR)  ;key= valve# open
1127    82EE    A0 01                   LDY     #1
1128    82F0    AD 76 02                LDA     HOUR
1129    82F3    91 A3                   STA     (HPTR),Y
1130    82F5    C8                      INY
1131    82F6    AD 77 02                LDA     MINUTE
1132    82F9    91 A3                   STA     (HPTR),Y
1133    82FB    C8                      INY
1134    82FC    A9 80                   LDA     #$80    ;soil moisture at start
1135    82FE    91 A3                   STA     (HPTR),Y
1136    8300    C8                      INY
1137    8301    A9 00                   LDA     #0      ;time on
1138    8303    91 A3                   STA     (HPTR),Y
1139    8305    C8                      INY
1140    8306    91 A3                   STA     (HPTR),Y
1141    8308    C8                      INY
1142    8309    91 A3                   STA     (HPTR),Y ;soil moisture at stop
1143    830B    20 12 AA                JSR     INC_HWRITE ;move write ptr to next entry
1144                                                    ;if sensors, get reading
1145                                                    ;write it to history
1146    830E    20 59 A4                JSR     VON     ;then turn the selected valve on
1147    8311    60                      RTS
1148
1149                    VALVEOFF:                       ;finish a valve start
1150    8312    20 8C A4                JSR     VOFF    ;turn the valve off
1151    8315    20 68 AA                JSR     GETHPTR
1152                                                    ;if sensors, get reading
1153                                                    ;write it to history
1154    8318    A6 49                   LDX     VALVE   ;write actual watering time to history
1155    831A                            DBLX
1163    8320    A0 04                   LDY     #4
1164    8322    BD 20 02                LDA     TIMEON,X
1165    8325    91 A3                   STA     (HPTR),Y
1166    8327    C8                      INY
1167    8328    BD 21 02                LDA     TIMEON+1,X
1168    832B    91 A3                   STA     (HPTR),Y
1169
```

```
1170  832D  B2 A3              LDA    (HPTR)        ;close history entry
1171  832F  29 DF              AND    #110111111B
1172  8331  92 A3              STA    (HPTR)
1173  8333  60                 RTS
1174
1175              HALT_RUN:                         ;SL entry
1176  8334  20 39 A4           JSR    TIMER_OFF     ;no INT
1177  8337              SET    VALVE
1181  833B  A6 49    STR1:    LDX    VALVE         ;turn off all valves with history
1182  833D  BD 7D 02           LDA    VS,X
1183  8340  29 10              AND    #00010000B
1184  8342  F0 03              BEQ    STR2
1185  8344  20 12 83           JSR    VALVEOFF
1186  8347  E6 49    STR2:    INC    VALVE
1187  8349  A5 49              LDA    VALVE
1188  834B  C9 09              CMP    #9
1189  834D  D0 EC              BNE    STR1
1190  834F  60                 RTS
1191
1192              INCDAYNUM:                        ;move DAYNUM array to next day
1193  8350  AD 1A 03           LDA    DAYNUM        ;if 0, init aray
1194  8353  0D 1B 03           ORA    DAYNUM+1
1195  8356  F0 3E              BEQ    FIRSTDAY
1196  8358  AD 41 15           LDA    CYCLE_TYPE
1197  835B  D0 12              BNE    IDN1
1198  835D              INC16  DAYNUM        ;so many days
1207  836E  60                 RTS
1208  836F  EE 1D 03  IDN1:    INC    DAYNUM+3      ;specific days
1209  8372  AD 1D 03           LDA    DAYNUM+3
1210  8375  C9 08              CMP    #8
1211  8377  D0 16              BNE    IDN3
1212  8379              SET    DAYNUM+3      ;a new week
1216  837E              INC16  DAYNUM
1225  838F  AD 7B 02  IDN3:    LDA    DOW           ;save today's day of week
1226  8392  8D 1C 03           STA    DAYNUM+2
1227  8395  60                 RTS
1228
1229              FIRSTDAY:                         ;init DAYNUM array
1230  8396  AD 41 15           LDA    CYCLE_TYPE
1231  8399  D0 06              BNE    FD1
1232  839B              SET    DAYNUM        ;so many days
1236  83A0  60                 RTS
1237              FD1:                              ;specific days
1238  83A1              SET    DAYNUM+3      ;today becomes the first day of the week
1242  83A6              SET    DAYNUM        ;of the first week
1246  83AB  80 E2              BRA    IDN3
1247
1248
1249
1250
1251  83AD              INCLUDE       PWRKEY.ASM
1252
1253              ;--------------------------------
1254              ;     POWER KEY INSTALLED
1255              ;--------------------------------
1256
1257  83AD  A5 6D    PROGIN:  LDA    FLAGS         ;Power key is in, system charged
```

```
1258  83AF  09 01            ORA    #00000010
1259  83B1  85 6D            STA    FLAGS
1260                                                ;init key manager
1261  83B3  A9 20            LDA    #00100000B     ;enable only OK key
1262  83B5  85 5E            STA    KEYMASK
1263  83B7  64 5C            STZ    KEYREG         ;no key in process
1264  83B9  20 92 A3         JSR    KEY_RESET      ;no blinking or repeats
1265
1266  83BC  64 D3     PG0:   STZ    SECRET         ;no secret code entered yet
1267  83BE  20 28 A4         JSR    TIMERON        ;enable INT
1268  83C1  A9 04            LDA    #$04           ;tell history key is in
1269  83C3  20 CE AA         JSR    HOPENF
1270
1271  83C6  20 32 A3  PG1:   JSR    LCD_ON         ;fire LCD up
1272  83C9  20 40 A3         JSR    DISPLAY_ON
1273  83CC  20 85 A3         JSR    DISPLAY_CLR    ;select contrast
1274  83CF                   MESSAGE 0
1278  83D4  A9 01     PG4:   LDA    #1
1279  83D6  85 D4            STA    CONTRAST       ;start with default contrast
1280  83D8  A6 D4     PG2:   LDX    CONTRAST
1281  83DA  BD 86 F8         LDA    CONTRAST_TBL,X ;send contrast to LCD
1282  83DD  85 1A            STA    LCD_CONTRAST
1283  83DF                   SET_CURSOR LINE2+14
1287  83E4  A5 D4            LDA    CONTRAST
1288  83E6  20 9C A6         JSR    02D
1289  83E9  A9 19            LDA    #PERSEC
1290  83EB  85 46            STA    TIMCTR         ;wait 1 sec. between contrasts
1291  83ED  20 06 AB  PG3:   JSR    GETKEY
1292  83F0  C9 20            CMP    #OKKEY
1293  83F2  F0 0E            BEQ    PG10           ;OK key
1294  83F4  A5 46            LDA    TIMCTR
1295  83F6  D0 F5            BNE    PG3
1296  83F8  E6 D4            INC    CONTRAST       ;timed out
1297  83FA  A5 D4            LDA    CONTRAST
1298  83FC  C9 06            CMP    #6
1299  83FE                   BGE    PG4
1302  8400  80 D6            BRA    PG2
1303
1304
1305                         ;----------------------------------
1306                         ;     DIRECTIONS
1307                         ;----------------------------------
1308
1309  8402  20 92 A3  PG10:  JSR    KEY_RESET      ;Want directions?
1310  8405  A9 39            LDA    #00111001B     ;enable all keys
1311  8407  85 5E            STA    KEYMASK
1312  8409  A9 0A            LDA    #10
1313  840B  85 72            STA    HELPNUM
1314  840D  20 22 AB         JSR    SCROLL_MSG
1315  8410  B0 29            BCS    SELFTEST       ;key pressed, abort
1316  8412                   SET_CURSOR 15
1320  8417                   ON
1325  841D  20 9F AB  PG12:  JSR    GETHKEY
1326  8420  C9 10            CMP    #NOKEY
1327  8422  F0 17            BEQ    SELFTEST
1328  8424  C9 20            CMP    #OKKEY
1329  8426  D0 F5            BNE    PG12
```

```
1330  8428  A9 0B              LDA    #11
1331  842A  85 72              STA    HELPNUM
1332  842C  20 74 AB    PG11:  JSR    HELP_MSG      ;show new msg at HELPNUM
1333                                                ;returns when msg read
1334  842F  B0 D1              BCS    PG10          ;end directions if aborted
1335  8431  A5 72              LDA    HELPNUM       ;do next message
1336  8433  C9 17              CMP    #23           ;until last msg
1337  8435  F0 CB              BEQ    PG10
1338  8437  E6 72              INC    HELPNUM
1339  8439  80 F1              BRA    PG11
1340
1341
1342                        ;--------------------------------
1343                        ;       SELF TEST
1344                        ;--------------------------------
1345
1346                        SELFTEST:                ;do system self test
1347  843B  20 82 A3           JSR    DKCLR
1348  843E                     MESSAGE 124
1352  8443                     SET_CURSOR LINE2+14
1356  8448                     ON
1361  844E  20 9F AB    SLF0:  JSR    GETHKEY
1362  8451  C9 10              CMP    #NOKEY
1363  8453  D0 03              BNE    SLF6
1364  8455  4C 29 86           JMP    SECRET_CODE   ;don't want test
1365  8458  C9 20       SLF6:  CMP    #OKKEY
1366  845A  F0 0D              BEQ    SLF
1367  845C  C9 08              CMP    #HELPKEY
1368  845E  D0 EE              BNE    SLF0
1369  8460                     HELP   24
1374  8467  80 D2              BRA    SELFTEST
1375
1376                                                ;test valve wiring
1377                                                ;IBFR=opens, IBFR+1=shorts,
1378                                                ;IBFR+2=not assigned
1379  8469  20 82 A3    SLF:   JSR    DKCLR
1380  846C  20 39 A4           JSR    TIMER_OFF     ;disable INT
1381  846F                     MESSAGE 114
1385  8474  20 8E A4           JSR    AD_ON
1386  8477                     SET    WCVALVES      ;drivers on
1390  847B                     SET    VALVE         ;start at valve 1, A/D channel 8
1394                        SLF5:                   ;test valve if assigned
1395  847F  A6 49              LDX    VALVE         ;update assignment byte
1396  8481  BD 7D 02           LDA    VS,X
1397  8484  89 80              BIT    #VID
1398  8486  F0 05              BEQ    SLF10
1399  8488  18                 CLC                  ;assigned,
1400  8489  66 63              ROR    IBFR+2
1401  848B  80 09              BRA    SLF7          ;go test it
1402  848D  38          SLF10: SEC                  ;not assigned,
1403  848E  66 63              ROR    IBFR+2
1404  8490  A9 C8              LDA    #200          ;pretend a good coil
1405  8492  85 41              STA    LSB
1406  8494  80 18              BRA    SLF8
1407
1408  8496  BD B9 02    SLF7:  LDA    VALVEID,X     ;use AD channel based on position
1409  8499  29 07              AND    #00000111B
```

```
1410  849B  09 08                    ORA      #00000100B
1411  849D  85 45                    STA      ADCHANNEL
1412  849F  BD B9 02                 LDA      VALVEID,X
1413  84A2  20 C7 A4                 JSR      VHI           ;bring valve line high based on position
1414  84A5  A0 32                    LDY      #ADWAIT       ;settle
1415  84A7  20 C0 A2                 JSR      WAITMS
1416  84AA  20 3D A4                 JSR      READ          ;let's see what's out there
1417  84AD  85 41                    STA      LSB
1418  84AF  64 07                    STZ      VALVE_ENABLE  ;valve line dismissed
1419  84B1  A5 41          SLF0:     LDA      LSB
1420  84B3  C9 A8                    CMP      #168          ;if <=3.3 volts
1421  84B5                           BGE      SLF1
1424  84B7  38                       SEC                    ;then line open
1425  84B8  80 01                    BRA      SLF2
1426  84BA  18             SLF1:     CLC                    ;not open
1427  84BB  66 61          SLF2:     ROR      IBFR
1428  84BD  A5 41                    LDA      LSB
1429  84BF  C9 E6                    CMP      #230          ;if >4.5 volts
1430  84C1                           BLT      SLF3
1433  84C3  38                       SEC                    ;then line shorted
1434  84C4  80 01                    BRA      SLF4
1435  84C6  18             SLF3:     CLC                    ;not shorted
1436  84C7  66 62          SLF4:     ROR      IBFR+1
1437                                                         ;otherwise coil is present
1438  84C9  E6 49                    INC      VALVE         ;do all 8 valves
1439  84CB  A5 49                    LDA      VALVE
1440  84CD  C9 09                    CMP      #9
1441  84CF  D0 AE                    BNE      SLF5
1442  84D1  64 1E                    STZ      WCVALVES      ;drivers off
1443  84D3  20 23 A4                 JSR      AD_OFF
1444  84D6  20 28 A4                 JSR      TIMERON       ;enable INT
1445
1446  84D9  20 F3 85                 JSR      SLFWAIT
1447  84DC  20 82 A3                 JSR      DKCLR
1448  84DF  B2 5A                    LDA      (MENUPTR)     ;show current mode
1449  84E1  C9 02                    CMP      #2
1450  84E3  D0 19                    BNE      SLF22         ;running
1451  84E5  20 9F A1                 JSR      DISP_SOURCE
1452  84E8                           BACKUP   1
1456  84ED  A9 20                    LDA      #' '
1457  84EF  20 18 A3                 JSR      DCHAR
1458  84F2                           SET_CURSOR LINE2
1462  84F7                           MESSAGE  70
1466  84FC  80 05                    BRA      SLF23
1467  84FE           SLF22:          MESSAGE  71           ;or idle
1471  8503  20 F3 85       SLF23:    JSR      SLFWAIT
1472
1473  8506  A5 61          SLF30:    LDA      IBFR          ;if no shorts or opens,
1474  8508  05 62                    ORA      IBFR+1
1475  850A  D0 0E                    BNE      SLF35
1476  850C  20 82 A3                 JSR      DKCLR
1477  850F                           MESSAGE  106          ;then show good status
1481  8514  20 F3 85                 JSR      SLFWAIT
1482  8517  4C A4 85                 JMP      SLF60
1483
1484  851A  20 39 A4       SLF35:    JSR      TIMER_OFF
```

```
1485  851D  A5 61            LDA    IBFR         ;if any opens
1486  851F  F0 3E            BEQ    SLF40
1487  8521  20 82 A3         JSR    DKCLR
1488  8524                   SET    VALVE        ;then show them
1492  8528                   MESSAGE 107
1496  852D                   SET_CURSOR LINE2
1500  8532  A9 23            LDA    #'#'
1501  8534  20 18 A3         JSR    DCHAR
1502  8537  66 61     SLF36: ROR    IBFR
1503  8539  90 0C            BCC    SLF37
1504  853B  A5 49            LDA    VALVE
1505  853D  09 30            ORA    #ASCMASK
1506  853F  20 18 A3         JSR    DCHAR
1507  8542  A9 2C            LDA    #','
1508  8544  20 18 A3         JSR    DCHAR
1509  8547  E6 49     SLF37: INC    VALVE
1510  8549  A5 49            LDA    VALVE
1511  854B  C9 09            CMP    #9
1512  854D  D0 E8            BNE    SLF36
1513  854F                   BACKUP 1
1517  8554  A9 20            LDA    #' '
1518  8556  20 18 A3         JSR    DCHAR
1519  8559  20 28 A4         JSR    TIMERON
1520  855C  20 F3 85         JSR    SLFWAIT
1521
1522  855F  20 39 A4  SLF40: JSR    TIMER_OFF
1523  8562  A5 62            LDA    IBFR+1       ;if any shorts
1524  8564  F0 3E            BEQ    SLF60
1525  8566  20 82 A3         JSR    DKCLR
1526  8569                   SET    VALVE        ;then show them
1530  856D                   MESSAGE 108
1534  8572                   SET_CURSOR LINE2
1538  8577  A9 23            LDA    #'#'
1539  8579  20 18 A3         JSR    DCHAR
1540  857C  66 62     SLF46: ROR    IBFR+1
1541  857E  90 0C            BCC    SLF47
1542  8580  A5 49            LDA    VALVE
1543  8582  09 30            ORA    #ASCMASK
1544  8584  20 18 A3         JSR    DCHAR
1545  8587  A9 2C            LDA    #','
1546  8589  20 18 A3         JSR    DCHAR
1547  858C  E6 49     SLF47: INC    VALVE
1548  858E  A5 49            LDA    VALVE
1549  8590  C9 09            CMP    #9
1550  8592  D0 E8            BNE    SLF46
1551  8594                   BACKUP 1
1555  8599  A9 20            LDA    #' '
1556  859B  20 18 A3         JSR    DCHAR
1557  859E  20 28 A4         JSR    TIMERON
1558  85A1  20 F3 85         JSR    SLFWAIT
1559
1560  85A4            SLF60:
1561  85A4  20 39 A4  SLF70: JSR    TIMER_OFF
1562  85A7  20 82 A3         JSR    DKCLR        ;show system time and version
1563  85AA  A2 05            LDX    #5
1564  85AC  BD 76 02  SLF71: LDA    HOUR,X       ;move current time to working area
1565  85AF  95 65            STA    IBFR+4,X
```

```
1566  85B1  CA                       DEI
1567  85B2  10 F8                    BPL       SLF71
1568  85B4  20 BE A5                 JSR       DISPTIME
1569  85B7                           SKIP      1
1573  85BC                           MESSAGE   110
1577  85C1                           SET_CURSOR LINE2
1581  85C6  20 7A A5                 JSR       DISPLAY_DOW
1582  85C9                           SKIP      2
1586  85CE  20 84 A5                 JSR       DISPLAY_DATE
1587  85D1  20 28 A4                 JSR       TIMERON
1588  85D4  20 F3 85                 JSR       SLFWAIT
1589
1590  85D7  20 B2 A3                 JSR       DKCLR
1591  85DA                           MESSAGE   113          ;or repeat self test?
1595  85DF                           ON
1600  85E5  20 9F A8       SLF88:    JSR       GETHKEY
1601  85E8  C9 10                    CMP       #NOKEY
1602  85EA  F0 30                    BEQ       SECRET_CODE
1603  85EC  C9 20                    CMP       #OKKEY
1604  85EE  D0 F5                    BNE       SLF88
1605  85F0  4C 69 84                 JMP       SLF
1606
1607                       SLFWAIT:                         ;wait the normal scroll time
1608  85F3  A9 64                    LDA       #SRATE4
1609  85F5  85 BD                    STA       R2
1610  85F7  A0 28          SLFW0:    LDY       #40
1611  85F9  20 C8 A2                 JSR       WAITMS
1612  85FC  20 9F A8                 JSR       GETHKEY
1613  85FF  C6 BD                    DEC       R2
1614  8601  D0 F4                    BNE       SLFW0
1615  8603  60                       RTS
1616
1617                       ISVALVE:                         ;test valve POSITION
1618                                                        ;in: AD and MCVALVES must be on
1619                                                        ;out: LSB have reading, carry set if valve
1620  8604  A5 DE                    LDA       POSITION
1621  8606  29 07                    AND       #00000111B
1622  8608  09 08                    ORA       #00001000B
1623  860A  85 45                    STA       ADCHANNEL
1624  860C  A5 DE                    LDA       POSITION
1625  860E  20 C7 A4                 JSR       VHI
1626  8611  A0 32                    LDY       #ADWAIT      ;settle
1627  8613  20 C8 A2                 JSR       WAITMS
1628  8616  78                       SEI
1629  8617  20 3D A4                 JSR       READ         ;let's see what's out there
1630  861A  64 07                    STZ       VALVE_ENABLE ;valve line dismissed
1631  861C  58                       CLI
1632  861D  C9 A8                    CMP       #168         ;if <3.3 volts
1633  861F                           BLT       ISV2         ;then line open
1636  8621  C9 E6          ISV0:     CMP       #230         ;if >=4.5 volts
1637  8623                           BGE       ISV2         ;then line shorted
1640  8625  38             ISV1:     SEC                    ;otherwise valve is present
1641  8626  60                       RTS
1642  8627  18             ISV2:     CLC                    ;no valve
1643  8628  60                       RTS
1644
1645
```

```
1646                          ;------------------------------------
1647                          ;      SECRET CODE
1648                          ;------------------------------------
1649
1650                          SECRET_CODE:                ;enter secret code
1651
1652   8629  20 CB AD                 JSR     ISRUNNING   ;if running,
1653   862C  90 18                    BCC     FSTOP
1654   862E  20 82 A3         PRO610: JSR     DKCLR
1655   8631                           MESSAGE 101         ;verify that user wants to STOP
1659   8636  20 86 AB         PRO611: JSR     GETKEY
1660   8639  C9 08                    CMP     #HELPKEY
1661   863B  D0 F9                    BNE     PRO611
1662   863D                           HELP    24
1667   8644  80 E8                    BRA     PRO610
1668
1669
1670
1671
1672   8646                           INCLUDE  MENU.ASM
1673                          ;------------------------------------
1674                          ;      MAIN MENU SCREEN
1675                          ;------------------------------------
1676
1677                          FSTOP:                      ;exit from some mode or entry via key in
1678   8646  A2 FF                    LDX     #$FF        ;re-init stack
1679   8648  9A                       TXS
1680   8649  20 82 A3                 JSR     DKCLR       ;restore display and keys
1681   864C  58                       CLI                 ;enable interrupts
1682   864D  64 07                    STZ     VALVE_ENABLE
1683   864F  20 23 A4                 JSR     AD_OFF
1684   8652  20 9D A4                 JSR     ALL_VALVES_OFF
1685   8655  90 08                    BCC     FS2
1686   8657  20 82 A3                 JSR     DKCLR       ;turn off valves
1687   865A                           MESSAGE 125
1691   865F  20 A7 AB                 JSR     MSGWAIT
1692   8662  20 CB AD         FS2:    JSR     ISRUNNING   ;if cycling
1693   8665  90 18                    BCC     MAIN_MENU
1694   8667  A9 06                    LDA     #$06        ;then tell history
1695   8669  20 CE AA                 JSR     HOPENF
1696   866C  20 82 A3                 JSR     DKCLR
1697   866F                           MESSAGE 69
1701   8674  20 34 B3                 JSR     HALT_RUN    ;and stop it
1702   8677  A9 05                    LDA     #5
1703   8679  8D 1F 03                 STA     RUNNING
1704   867C  20 28 A4                 JSR     TIMERON
1705   867F  20 A7 AB                 JSR     MSGWAIT
1706
1707                          MAIN_MENU:                  ;jumping off place into modes
1708   8682  20 E0 90                 JSR     ALL_ENABLE  ;enable all valves
1709   8685  20 28 A4                 JSR     TIMERON
1710   8688  20 82 A3                 JSR     DKCLR       ;welcome aboard
1711   868B                           MESSAGE 115
1715   8690  A9 39                    LDA     #00111001B  ;all keys enabled
1716   8692  85 5E                    STA     KEYMASK
1717   8694                           OK
1722   869A  20 86 AB         MS9:    JSR     GETKEY
```

```
1723  869D  C9 20              CMP    #OXKEY
1724  869F  F0 0D              BEQ    MS10
1725  86A1  C9 8B              CMP    #HELPKEY
1726  86A3  D0 F5              BNE    MS9
1727  86A5                     HELP   13
1732  86AC  80 D4              BRA    MAIN_MENU
1733  86AE              MS10:  SET    MODE
1737  86B2  64 59              STZ    MODE+1
1738  86B4  4C 8E AC           JMP    GETMENU
1739
1740                    ;------------------------------
1741                    ;     MAIN MENU - IDLE
1742                    ;------------------------------
1743
1744                    IDLE_MODE:                    ;do nothing mode
1745  86B7  20 82 A3           JSR    DKCLR
1746  86BA                     MESSAGE 4
1750  86BF  A9 3A              LDA    #':'
1751  86C1  20 18 A3           JSR    DCHAR
1752  86C4                     SET_CURSOR LINE2
1756  86C9  A9 01              LDA    #1
1757  86CB                     SELECT_SOK 1,2,104
1767  86DC  B0 19              BCS    IM4
1768  86DE  C9 02              CMP    #2
1769  86E0  D0 03              BNE    IM1
1770  86E2  4C 46 86           JMP    FSTOP
1771
1772  86E5  20 82 A3    IM1:   JSR    DKCLR
1773  86E8                     MESSAGE 99                ;wait for power key gone
1777  86ED  9C 1F 03           STZ    RUNNING
1778  86F0  20 B6 AB    IM9:   JSR    GETKEY             ;or STOP
1779  86F3  C9 8B              CMP    #HELPKEY
1780  86F5  D0 F9              BNE    IM9
1781  86F7              IM4:   HELP   21
1786  86FE  80 B7              BRA    IDLE_MODE
1787
1788                    ;------------------------------
1789                    ;     SET UP ALT SCHEDULES
1790                    ;------------------------------
1791
1792
1793                    ;------------------------------
1794                    ;     SET UP SYSTEM
1795                    ;------------------------------
1796
1797                    SETUP_SYSTEM:                    ;select function
1798
1799                    ;------------------------------
1800                    ;     set date & time
1801                    ;------------------------------
1802
1803                    SET_TIME:                        ;set up time and day
1804  0700  78                 SEI
1805  0701  A2 05              LDX    #5
1806  0703  BD 76 02    ST10:  LDA    WORK,X            ;move current time to working area
1807  0706  95 65              STA    BFR+4,X
1808  0708  CA                 DEX
1809  0709  10 F8              BPL    ST10
1810  070B  58                 CLI
```

```
1811  870C  20 82 A3    STI1:   JSR     DKCLR           ;show working time and date
1812  870F                      MESSAGE 89
1816  8714  20 BE A5              JSR     DISPTIME
1817  8717                      SET_CURSOR LINE2
1821  871C  20 7A A5              JSR     DISPLAY_DOW
1822  871F                      SKIP    2
1826  8724  20 84 A5              JSR     DISPLAY_DATE
1827  8727                      OK
1832  8728  20 B6 AB    STI2:   JSR     GETKEY          ;wait for an answer
1833  872B  F0 FB                BEQ     STI2
1834  872D  C9 20                CMP     #OKKEY
1835  872F  F0 0D                BEQ     STIOK           ;time good, exit
1836  8731  C9 10                CMP     #NOKEY
1837  8733  F0 21                BEQ     STI10           ;change time
1838  8735                      HELP    39
1843  873C  80 C9                BRA     STI1
1844  873E  78         STIOK:   SEI
1845  873F  A2 05                LDX     #5              ;OK key, keep time as displayed
1846  8741  B5 65      ST9:     LDA     IBFR+4,X
1847  8743  9D 76 02             STA     HOUR,X
1848  8746  CA                   DEX
1849  8747  10 F8                BPL     ST9
1850  8749  AE 79 02             LDX     MONTH
1851  874C  BD 88 F7             LDA     DAYTBL,X
1852  874F  8D 7C 02             STA     DIM
1853  8752  58                   CLI
1854  8753  4C BE AC             JMP     GETMENU
1855
1856  8756  20 82 A3   STI10:   JSR     DKCLR           ;change time
1857  8759                      MESSAGE 89
1861  875E                      SET_CURSOR 8            ;get time
1865  8763  20 7C A7             JSR     GETTIME
1866  8766  90 09                BCC     STI12
1867  8768             STIH:    HELP    39
1872  876F  80 E5                BRA     STI10
1873  8771             STI12:   SET_CURSOR LINE2        ;get day of week
1877  8776  A5 67                LDA     IBFR+6
1878  8778                      SELECT_NUL 1,7,91
1888  8789  B0 DD                BCS     STIH
1889  878B  85 67                STA     IBFR+6
1890
1891  878D             STI30:   NOBLINK                 ;input the date
1895  8791                      SET_CURSOR LINE2+5
1899  8796  A5 68                LDA     IBFR+7
1900  8798                      SELECT_NUL 1,12,77
1910  87A9  B0 BD                BCS     STIH
1911  87AB  85 68      STI33:   STA     IBFR+7          ;keep selection
1912  87AD                      SET_CURSOR LINE2+9
1916  87B2                      NOBLINK
1920  87B6                      SET     IBFR+1          ;select day based on days in month
1924  87BA  A6 68                LDX     IBFR+7
1925  87BC  BD 88 F7             LDA     DAYTBL,X
1926  87BF  85 63                STA     IBFR+2
1927  87C1  A5 69                LDA     IBFR+8          ;default=present day,
1928  87C3  85 61                STA     IBFR
1929  87C5  DD 88 F7             CMP     DAYTBL,X        ;unless > present day,
1930  87C8  F0 06                BEQ     STI35
1931  87CA                      BLT     STI35
```

```
1934  87D1                            SET       IBFR          ;then start at day=1
1938  87D5  20 F9 A8    STI35:  JSR   GETNUM
1939  87D8  90 03               BCC   STI36
1940  87DA  4C 6D 87            JMP   STIH
1941  87DD  85 69       STI36:  STA   IBFR+8        ;keep day
1942  87DF                      NOBLINK
1946  87E3                      SET_CURSOR LINE2+11
1950  87E8  A9 2C               LDA   #','
1951  87EA  20 10 A3            JSR   DCHAR
1952  87ED  A9 27               LDA   #$27
1953  87EF  20 10 A3            JSR   DCHAR
1954  87F2  A5 6A               LDA   IBFR+9
1955  87F4                      SELECT 0,99        ;select year
1963  8801  90 03               BCC   STI34
1964  8803  4C 6D 87            JMP   STIH
1965  8806  85 6A       STI34:  STA   IBFR+9        ;keep year
1966  8808  4C 8C 87            JMP   STI1          ;verify
1967
1968                            ;--------------------------------
1969                            ;    set site info
1970                            ;--------------------------------
1971
1972                            SET_SITE:           ;set up site parameters
1973
1974
1975  880B  64 49               STZ   VALVE
1976  880D  20 A7 9E    S2SKIP: JSR   NITVALVE
1977  8810  90 03               BCC   S2NEXT
1978  8812  4C F4 88            JMP   S2END
```

Wed Sep 14 1988 14:41

'Controller Firmware, Version 2.09'

```
1979  8815              S2NEXT:
1980  8815  A6 49               LDX   VALVE         ;start with existing site info
1981  8817  BD CB 82            LDA   TERRAIN,X
1982  881A  85 CB               STA   DEFAULT+2
1983  881C  BD D4 82            LDA   SPRINKLER,X
1984  881F  85 CC               STA   DEFAULT+3
1985  8821  4C 94 88            JMP   S2CONFIRM
1986
1987              S2ENTRY:                          ;enter new site info
1988  8824  20 82 A3            JSR   DKCLR
1989  8827  20 4E A1            JSR   DSTA
1990  882A  A9 3A               LDA   #':'
1991  882C  20 10 A3            JSR   DCHAR
1992  882F                      MESSAGE 213
1996  8834                      SET_CURSOR LINE2
2000  8839  A5 CB               LDA   DEFAULT+2
2001  883B                      SELECT_SOK 1,6,215   ;select terrain
2011  884C  90 09               BCC   SS26
2012  884E                      HELP  36
2017  8855  80 CD               BRA   S2ENTRY
2018  8857  A5 61       SS26:   LDA   IBFR
2019  8859  85 CB               STA   DEFAULT+2
2020  885B  20 82 A3            JSR   DKCLR
```

```
2021  885E  20 4E A1              JSR     DSTA
2022  8861  A9 3A                 LDA     #':'
2023  8863  20 10 A3              JSR     DCHAR
2024  8866                        MESSAGE 213
2029  886B                        SET_CURSOR LINE2
2032  8870  A5 CC                 LDA     DEFAULT+3
2033  8872                        SELECT_SOK 1,7,221    ;select sprinkler type
2043  8883  90 B9                 BCC     SS2H
2044  8885                        HELP    36
2049  888C  80 96                 BRA     S2ENTRY
2050  888E  A5 61         SS2H:   LDA     IBFR
2051  8890  85 CC                 STA     DEFAULT+3
2052  8892  80 00                 BRA     S2CONFIRM
2053
2054                      S2CONFIRM:                    ;show default and confirm
2055  8894  20 82 A3              JSR     DKCLR
2056  8897  20 E5 9F              JSR     FLASH
2057  889A  20 4E A1              JSR     DSTA
2058  889D  A9 3A                 LDA     #':'
2059  889F  20 10 A3              JSR     DCHAR
2060  88A2  A5 CB                 LDA     DEFAULT+2
2061  88A4  18                    CLC
2062  88A5  69 D6                 ADC     #214
2063  88A7  AA                    TAX
2064  88A8  20 D7 A2              JSR     DISPLAY_MSG
2065  88AB                        BACKUP  1
2069  88B0  A9 2C                 LDA     #','
2070  88B2  20 10 A3              JSR     DCHAR
2071  88B5                        SET_CURSOR LINE2
2075  88BA  A5 CC                 LDA     DEFAULT+3
2076  88BC  18                    CLC
2077  88BD  69 DC                 ADC     #220
2078  88BF  AA                    TAX
2079  88C0  20 D7 A2              JSR     DISPLAY_MSG
2080  88C3                        OK
2085  88C9  20 06 A8      S2C:    JSR     GETKEY
2086  88CC  C9 20                 CMP     #OKKEY
2087  88CE  F0 15                 BEQ     S2OK
2088  88D0  C9 10                 CMP     #NOKEY
2089  88D2  D0 03                 BNE     S2P
2090  88D4  4C 24 88              JMP     S2ENTRY
2091  88D7  C9 08         S2P:    CMP     #HELPKEY
2092  88D9  D0 EE                 BNE     S2C
2093  88DB                        HELP    76
2098  88E2  4C 94 88              JMP     S2CONFIRM
2099
2100  88E5  A6 49         S2OK:   LDX     VALVE         ;default is confirmed
2101  88E7  A5 CB                 LDA     DEFAULT+2
2102  88E9  9D CB 02              STA     TERRAIN,X
2103  88EC  A5 CC                 LDA     DEFAULT+3
2104  88EE  9D D4 02              STA     SPRINKLER,X
2105  88F1  4C 0D 88              JMP     S2SKIP
2106
2107  88F4  4C 8E AC      S2END:  JMP     GETMENU
2108
2109                              ;------------------------
2110                              ;    wire checking
2111                              ;------------------------
2112
```

```
2113   88F7                WIRE_CHECK:
2114   88F7                WIRE_CHECKV:
2115   88F7   20 82 A3             JSR     DKCLR           ;part 1, fix all shorts
2116   88FA                        MESSAGE 152
2120   88FF   20 0E A4             JSR     AD_ON
2121   8902                        SET     WCVALVES        ;drivers on
2125   8906   64 61                STZ     IBFR            ;IBFR=which positions have valves
2126   8908                        OK
2131   890E                LV30:   SET_CURSOR 0
2135   8913   64 DE                STZ     POSITION        ;start at top position
2136   8915   64 BE                STZ     R3              ;no shorts yet
2137   8917   64 62                STZ     IBFR+1
2138
2139   8919   20 04 86    LV35:    JSR     ISVALVE         ;check AD line
2140   891C   C9 A8                CMP     #168            ;if <=3.3 volts
2141   891E   B0 07                BCS     LV31
2142   8920   18                   CLC                     ;then line open
2143   8921   66 62                ROR     IBFR+1
2144   8923   A9 6F                LDA     #'o'
2145   8925   80 14                BRA     LV33
2146   8927   C9 E6       LV31:    CMP     #230            ;if >4.5 volts
2147   8929   90 0B                BCC     LV32
2148   892B                        SET     R3              ;then line shorted
2152   892F   18                   CLC
2153   8930   66 62                ROR     IBFR+1
2154   8932   A9 78                LDA     #'x'
2155   8934   80 05                BRA     LV33
2156   8936   38          LV32:    SEC                     ;otherwise coil is present
2157   8937   66 62                ROR     IBFR+1
2158   8939   A9 56                LDA     #'V'
2159   893B   20 10 A3    LV33:    JSR     DCHAR
2160   893E   A0 64                LDY     #100            ;1/10 duty cycle to avoid power drain
2161   8940   20 C0 A2             JSR     WAITMS
2162   8943   20 06 AB    LV36:    JSR     GETKEY          ;check keyboard after each read
2163   8946   C9 20                CMP     #OKKEY
2164   8948   F0 1B                BEQ     LV40
2165   894A   C9 08                CMP     #HELPKEY
2166   894C   D0 09                BNE     LV37
2167   894E                        HELP    109
2172   8955   80 A0                BRA     WIRE_CHECKV
2173   8957   E6 DE       LV37:    INC     POSITION
2174   8959   A5 DE                LDA     POSITION        ;do all 8 valves
2175   895B   C9 08                CMP     #8
2176   895D   D0 BA                BNE     LV35
2177   895F   A5 62                LDA     IBFR+1
2178   8961   85 61                STA     IBFR
2179   8963   80 A9                BRA     LV30
2180
2181   8965   64 1E       LV40:    STZ     WCVALVES        ;drivers off
2182   8967   20 23 A4             JSR     AD_OFF
2183   896A   4C BE AC             JMP     GETMENU
2184
2185                      ;--------------------------------
2186                      ;   station set up
2187                      ;--------------------------------
2188
2189   896D                STATION_SETUP:
2190
```

```
2191                        VASSIGN:              ;assign valve IDs
2192  896D  20 82 A3   LV50: JSR     DKCLR        ;view current ID?
2193  8970                   MESSAGE 171
2197  8975                   OK
2202  897B  20 86 AB   LV51: JSR     GETKEY
2203  897E  C9 20            CMP     #OKKEY
2204  8980  F0 11            BEQ     LV60
2205  8982  C9 10            CMP     #NOKEY
2206  8984  F0 39            BEQ     LV70
2207  8986  C9 08            CMP     #HELPKEY
2208  8988  D0 F1            BNE     LV51
2209  898A                   HELP    110
2214  8991  80 DA            BRA     LV50
2215
2216  8993  20 82 A3   LV60: JSR     DKCLR        ;show the current IDs
2217  8996                   MESSAGE 173
2221  899B  20 48 AC         JSR     VID2BFR
2222  899E  20 6A AC         JSR     DISPID
2223  89A1                   OK
2228  89A7  20 86 AB   LV61: JSR     GETKEY       ;wait for key
2229  89AA  C9 20            CMP     #OKKEY
2230  89AC  F0 11            BEQ     LV70
2231  89AE  C9 10            CMP     #NOKEY
2232  89B0  F0 0D            BEQ     LV70
2233  89B2  C9 08            CMP     #HELPKEY
2234  89B4  D0 F1            BNE     LV61
2235  89B6                   HELP    110
2240  89BD  80 D4            BRA     LV60
2241
2242  89BF  20 82 A3   LV70: JSR     DKCLR        ;enter new ID?
2243  89C2                   MESSAGE 172
2247  89C7                   OK
2252  89CD  20 86 AB   LV71: JSR     GETKEY
2253  89D0  C9 20            CMP     #OKKEY
2254  89D2  F0 14            BEQ     LV75
2255  89D4  C9 10            CMP     #NOKEY
2256  89D6  D0 03            BNE     LV7B
2257  89D8  4C 8E AC         JMP     GETMENU
2258  89DB  C9 08      LV7B: CMP     #HELPKEY
2259  89DD  D0 EE            BNE     LV71
2260  89DF                   HELP    111
2265  89E6  80 D7            BRA     LV70
2266
2267  89E8             LV75: SET     VALVE        ;enter new ID
2271  89EC  20 85 AC         JSR     CLR_IDBFR
2272
2273  89EF  20 8E A4         JSR     AD_ON
2274  89F2                   SET     NCVALVES     ;drivers on
2278  89F6  64 DE            STZ     POSITION     ;find which positions have valves
2279  89F8  64 66            STZ     IBFR+5
2280  89FA  20 04 86   LV80: JSR     ISVALVE
2281  89FD  66 66            ROR     IBFR+5       ;set bit in IBFR+5 if valve present
2282  89FF  E6 DE            INC     POSITION
2283  8A01  A5 DE            LDA     POSITION
2284  8A03  C9 08            CMP     #8
2285  8A05  D0 F3            BNE     LV80
2286
```

```
2287  8AB7  64 E1              STZ      R5            ;R5 = how many stations present
2288  8AB9  A5 66              LDA      IBFR+5
2289  8ABB  A2 08              LDX      #8
2290  8ABD  6A          LV7J:  ROR      A
2291  8ABE  90 02              BCC      LV7K
2292  8AC0  E6 E1              INC      R5
2293  8AC2  CA          LV7K:  DEX
2294  8AC3  D0 F8              BNE      LV7J
2295
2296  8AC5  A5 E1              LDA      R5
2297  8AC7  D0 09              BNE      LV7C
2298  8AC9                     HELP     34            ;no stations
2303  8ACC  80 9D              BRA      LV70
2304  8ACE  20 82 A3    LV7C:  JSR      DKCLR         ;ID all?
2305  8AD1  A5 E1              LDA      R5
2306  8AD3  09 30              ORA      #ASCMASK
2307  8AD5  20 18 A3           JSR      DCHAR
2308  8AD8                     MESSAGE  27
2312  8ADD  A5 E1              LDA      R5
2313  8ADF  09 30              ORA      #ASCMASK
2314  8AE1  20 18 A3           JSR      DCHAR
2315  8AE4                     QM
2320  8AEA  20 06 AB    LV7D:  JSR      GETKEY
2321  8AED  C9 20              CMP      #OKKEY
2322  8AEF  F0 3C              BEQ      LV7G
2323  8AF1  C9 18              CMP      #NOKEY
2324  8AF3  F0 0D              BEQ      LV76
2325  8AF5  C9 08              CMP      #HELPKEY
2326  8AF7  D0 F1              BNE      LV7D
2327  8AF9                     HELP     112
2332  8AFC  80 CC              BRA      LV7C
2333
2334  8AFE  A5 E1       LV76:  LDA      R5            ;don't ID all
2335  8B00  C9 01              CMP      #1
2336  8B02  D0 03              BNE      LV7L
2337  8B04  4C BF 89           JMP      LV70
2338  8B07  20 82 A3    LV7L:  JSR      DKCLR
2339  8B0A                     MESSAGE  199           ;how many to ID then?
2343  8B0F  A9 01              LDA      #1
2344  8B11  85 61              STA      IBFR
2345  8B13  85 62              STA      IBFR+1
2346  8B15  A5 E1              LDA      R5            ;must be <= valves present
2347  8B17  85 63              STA      IBFR+2
2348  8B19  20 F9 A8           JSR      GETNUM
2349  8B1C  90 09              BCC      LV7A
2350  8B1E                     HELP     112
2355  8B25  80 D7              BRA      LV76
2356  8B27  85 E1       LV7A:  STA      R5            ;in R5
2357
2358  8B29  A5 66       LV76:  LDA      IBFR+5
2359  8B2B  85 61              STA      IBFR
2360
2361  8B2D  A5 61       LV81:  LDA      IBFR          ;IBFR=which positions have valves to ID
2362  8B2F  F0 09              BEQ      LV8A          ;done when all positions are IDed
2363  8B31  A5 49              LDA      VALVE         ;or # of stations IDed
2364  8B33  38                 SEC
2365  8B34  E9 01              SBC      #1
2366  8B36  C5 E1              CMP      R5
```

| | | | | | | |
|---|---|---|---|---|---|---|
|2367|8A90|D0 03| |BNE|LV7H| |
|2368|8A92|4C 8D 8B|LV8A:|JMP|LV90| |
|2369|8A95|20 82 A3|LV7H:|JSR|DKCLR|;show current status|
|2370|8A98| | |MESSAGE|174| |
|2374|8A9D| | |SET_CURSOR|LINE2+8| |
|2378|8AA2|20 61 A1| |JSR|DVALVE| |
|2379|8AA5| | |SET_CURSOR|8| |
|2383|8AAA|20 6A AC| |JSR|DISPID| |
|2384|8AAD|A5 61|LV82:|LDA|IBFR|;look for a valve open|
|2385|8AAF|85 62| |STA|IBFR+1| |
|2386|8AB1|A9 08| |LDA|#8| |
|2387|8AB3|85 45| |STA|ADCHANNEL| |
|2388|8AB5|64 DE| |STZ|POSITION| |
|2389|8AB7|66 62|LV83:|ROR|IBFR+1|;if position has a valve,|
|2390|8AB9|90 46| |BCC|LV88| |
|2391|8ABB|64 BE| |STZ|R3| |
|2392| | | | | | |
|2393|8ABD|A5 BE|LVLP:|LDA|R3| |
|2394|8ABF|D0 0B| |BNE|LVL1| |
|2395|8AC1|20 04 86| |JSR|ISVALVE|;1st look for open|
|2396|8AC4|B0 1F| |BCS|LV87|;nope|
|2397|8AC6| | |SET|R3|;yes|
|2401|8ACA|80 19| |BRA|LV87| |
|2402|8ACC|20 04 86|LVL1:|JSR|ISVALVE|;then look for valve present again|
|2403|8ACF|90 14| |BCC|LV87| |
|2404| | | | | | |
|2405|8AD1|A6 DE|LV86:|LDX|POSITION|;valve returns|
|2406|8AD3|A5 49| |LDA|VALVE| |
|2407|8AD5|9D 5E 02| |STA|IDBFR,X|;store it's position|
|2408|8AD8|A6 DE| |LDX|POSITION|;remove bit from IBFR|
|2409|8ADA|A5 61| |LDA|IBFR| |
|2410|8ADC|3D 76 F8| |AND|BITOFF,X| |
|2411|8ADF|85 61| |STA|IBFR| |
|2412|8AE1|E6 49| |INC|VALVE|;look for next valve|
|2413|8AE3|80 A0| |BRA|LV81|;after updating display|
|2414| | | | | | |
|2415|8AE5|20 06 AB|LV87:|JSR|GETKEY|;check for key pressed|
|2416|8AE8|C9 08| |CMP|#HELPKEY| |
|2417|8AEA|D0 0A| |BNE|LV89| |
|2418|8AEC| | |HELP|113| |
|2423|8AF3|4C 85 8A| |JMP|LV81| |
|2424|8AF6|A0 64|LV89:|LDY|#100|]wait for power to recover|
|2425|8AF8|20 C0 A2| |JSR|WAITMS| |
|2426|8AFB|A5 BE| |LDA|R3| |
|2427|8AFD|F0 02| |BEQ|LV88|;no open, try next position|
|2428|8AFF|80 BC| |BRA|LVLP|;keep waiting for valve|
|2429| | | | | | |
|2430| | |LV88:| | |;next position|
|2431|8B01|E6 45| |INC|ADCHANNEL| |
|2432|8B03|E6 DE| |INC|POSITION| |
|2433|8B05|A5 DE| |LDA|POSITION| |
|2434|8B07|C9 0B| |CMP|#8| |
|2435|8B09|D0 AC| |BNE|LV83| |
|2436|8B0B|80 A0| |BRA|LV82| |
|2437| | | | | | |
|2438|8B0D|64 1E|LV90:|STZ|NCVALVES|;ID done|
|2439|8B0F|20 23 A4| |JSR|AD_OFF| |
|2440|8B12|20 82 A3| |JSR|DKCLR| |
|2441|8B15| | |MESSAGE|175| |

```
2445  8B1A                              SET_CURSOR 8
2449  8B1F   20 6A AC                   JSR      DISPID
2450  8B22                              SET_CURSOR LINE2+8
2454  8B27                              OK
2459  8B2D   20 86 AB       LV91:  JSR      GETKEY
2460  8B30   C9 10                 CMP      #NOKEY          ;reject it and do over
2461  8B32   D0 03                 BNE      LV93
2462  8B34   4C BF 89              JMP      LV70
2463  8B37   C9 20          LV93:  CMP      #OKKEY          ;or accept it
2464  8B39   F0 0D                 BEQ      LV95
2465  8B3B   C9 08          LV92:  CMP      #HELPKEY
2466  8B3D   D0 EE                 BNE      LV91
2467  8B3F                         HELP     114
2472  8B46   80 C5                 BRA      LV90
2473
2474                         LV95:                          ;save new ID, enable all ICed valves
2475  8B48   20 16 AC              JSR      BFR2VID
2476  8B4B   4C 8E AC              JMP      GETMENU
2477
2478                         ;--------------------------------
2479                         ;       sensor set up
2480                         ;--------------------------------
2481
2482
2483                         ;--------------------------------
2484                         ;       secret codes
2485                         ;--------------------------------
2486
2487  8B4E                   SET_CODES:
2488  8B4E   20 82 A3              JSR      DKCLR           ;temporary code to reset RAM
2489  8B51                         MESSAGE 170
2493  8B56   20 86 AB       SCO1:  JSR      GETKEY          ;allow for STOP key
2494  8B59   A5 13                 LDA      STATUS2
2495  8B5B   29 38                 AND      #001110000B     ;look for HELP-NO-OK
2496  8B5D   C9 38                 CMP      #001110000B
2497  8B5F   D0 F5                 BNE      SCO1
2498  8B61   A5 13          SCO2:  LDA      STATUS2         ;wait for keys released
2499  8B63   D0 FC                 BNE      SCO2
2500  8B65   20 39 A4              JSR      TIMER_OFF
2501  8B68   20 7D A3              JSR      DISPLAY_OFF
2502  8B6B   64 40                 STZ      CKSUM
2503  8B6D   4C 00 80              JMP      RESET
2504
2505
2506                         ;--------------------------------
2507                         ;       HISTORY
2508                         ;--------------------------------
2509
2510                         HIST:                          ;history display
2511                                                        ;KEY (1st byte):
2512                                                        ;00XXVVVV    Valve start
2513                                                        ;01MMMMMM    Menu start
2514                                                        ;11MMMMMM    Function start
2515                                                        ;10XXXXXX    Time & Date stamp
2516
2517  8B70   20 82 A3              JSR      DKCLR           ;welcome msg
2518  8B73                         MESSAGE 180
2522  8B78                         OK
```

```
2527  887E  20 06 AB      HIB:   JSR    GETKEY
2528  88B1  C9 20                CMP    #OKKEY
2529  88B3  F0 0D                BEQ    HIA
2530  88B5  C9 0B                CMP    #HELPKEY
2531  88B7  D0 F5                BNE    HIB
2532  88B9                       HELP   7
2537  88B0  80 DE                BRA    HIST
2538
2539  88B2                HIA:   MOV16  HWRITE,HREAD
2545  889A  20 3C AA      HI0:   JSR    INC_HREAD      ;find oldest entry
2546  889D  B2 B5                LDA    (HREAD)
2547  889F  F0 F9                BEQ    HI0
2548  88A1  64 41                STZ    LSB
2549
2550  88A3  20 82 A3      HI2:   JSR    DKCLR          ;show a new history screen
2551  88A6  E6 41                INC    LSB
2552  88A8  A5 41                LDA    LSB
2553  88AA  20 85 A6             JSR    D3D
2554  88AD  A9 29                LDA    #')'
2555  88AF  20 10 A3             JSR    DCHAR
2556  88B2  B2 B5                LDA    (HREAD)
2557  88B4  29 C0                AND    #11000000B
2558  88B6  F0 11                BEQ    DH1            ;valve entry
2559  88B8  C9 C0                CMP    #11000000B
2560  88BA  D0 03                BNE    HI1
2561  88BC  4C 2A 8C             JMP    DH20           ;function entry
2562  88BF  C9 80         HI1:   CMP    #10000000B
2563  88C1  D0 03                BNE    HI3
2564  88C3  4C B6 8C             JMP    DH30           ;date and time entry
2565  88C6  4C CF 8C      HI3:   JMP    DH50           ;menu entry
2566
2567  88C9  A9 56         DH1:   LDA    #'V'           ;valve entry
2568  88CB  20 10 A3             JSR    DCHAR          ;show valve
2569  88CE  B2 B5                LDA    (HREAD)
2570  88D0  29 0F                AND    #00001111B
2571  88D2  09 30                ORA    #ASCMASK
2572  88D4  20 10 A3             JSR    DCHAR
2573  88D7  A9 3A                LDA    #':'
2574  88D9  20 10 A3             JSR    DCHAR
2575  88DC                       SKIP   1
2579  88E1  A0 01                LDY    #1             ;show time valve started
2580  88E3  B1 B5                LDA    (HREAD),Y
2581  88E5  85 65                STA    IBFR+4
2582  88E7  C8                   INY
2583  88E8  B1 B5                LDA    (HREAD),Y
2584  88EA  85 66                STA    IBFR+5
2585  88EC  20 BE A5             JSR    DISPTIME
2586  88EF                       SET_CURSOR LINE2
2590  88F4  A0 04                LDY    #4             ;show duration
2591  88F6  B1 B5                LDA    (HREAD),Y
2592  88F8  85 CF                STA    OFFSET
2593  88FA  C8                   INY
2594  88FB  B1 B5                LDA    (HREAD),Y
2595  88FD  85 D0                STA    OFFSET+1
2596  88FF  20 CF AB             JSR    MIN2HM
2597  8C02  20 F3 A5             JSR    DISPDURATION
2598  8C05                       OK
2603  8C0B  20 06 AB      DH14:  JSR    GETKEY
2604  8C0E  C9 20                CMP    #OKKEY
```

```
2605  8C10  D0 03              BNE     DH15
2606  8C12  4C 09 8D            JMP     DH90
2607  8C15  C9 10      DH15:   CMP     #NOKEY
2608  8C17  D0 03              BNE     DH16
2609  8C19  4C 13 8D            JMP     DH99
2610  8C1C  C9 08      DH16:   CMP     #HELPKEY
2611  8C1E  D0 EB              BNE     DH14
2612  8C20                     HELP    64
2617  8C27  4C A3 8B            JMP     H12
2618
2619              DH20:                        ;function entry
2620  8C2A  A0 01              LDY     #1
2621  8C2C  B1 B5              LDA     (HREAD),Y    ;hour
2622  8C2E  85 65              STA     IBFR+4
2623  8C30  C8                 INY
2624  8C31  B1 B5              LDA     (HREAD),Y    ;minute
2625  8C33  85 66              STA     IBFR+5
2626  8C35  20 BE A5            JSR     DISPTIME
2627  8C38                     SET_CURSOR LINE2
2631  8C3D  B2 B5              LDA     (HREAD)       ;mode
2632  8C3F  29 0F              AND     #00001111B
2633  8C41  18                 CLC                   ;show function 0-F
2634  8C42  69 A3              ADC     #163
2635  8C44  AA                 TAX
2636  8C45  20 D7 A2            JSR     DISPLAY_MSG
2637  8C48  B2 B5              LDA     (HREAD)       ;show dead time if SVL
2638  8C4A  29 0F              AND     #00001111B
2639  8C4C  C9 01              CMP     #1
2640  8C4E  D0 11              BNE     DH23
2641  8C50  A0 04              LDY     #4
2642  8C52  B1 B5              LDA     (HREAD),Y
2643  8C54  85 CF              STA     OFFSET
2644  8C56  C8                 INY
2645  8C57  B1 B5              LDA     (HREAD),Y
2646  8C59  85 D0              STA     OFFSET+1
2647  8C5B  20 CF AB            JSR     MIN2HM
2648  8C5E  20 F3 A5            JSR     DISPDURATION
2649  8C61        DH23:        OK
2654  8C67  20 86 AB   DH24:   JSR     GETKEY
2655  8C6A  C9 20              CMP     #OKKEY
2656  8C6C  D0 03              BNE     DH25
2657  8C6E  4C 09 8D            JMP     DH90
2658  8C71  C9 10      DH25:   CMP     #NOKEY
2659  8C73  D0 03              BNE     DH26
2660  8C75  4C 13 8D            JMP     DH99
2661  8C78  C9 08      DH26:   CMP     #HELPKEY
2662  8C7A  D0 EB              BNE     DH24
2663  8C7C                     HELP    66
2668  8C83  4C A3 8B            JMP     H12
2669
2670  8C86        DH30:        MESSAGE 100          ;time and date stamp
2674  8C8B                     SET_CURSOR LINE2
2678  8C90  A0 01              LDY     #1
2679  8C92  B1 B5              LDA     (HREAD),Y    ;day of week
2680  8C94  85 67              STA     IBFR+6
2681  8C96  C8                 INY
2682  8C97  B1 B5              LDA     (HREAD),Y    ;month
2683  8C99  85 68              STA     IBFR+7
2684  8C9B  C8                 INY
```

```
2685  8C9C  B1 B5              LDA    (HREAD),Y     ;day
2686  8C9E  85 69              STA    IBFR+8
2687  8CA0  C8                 INY
2688  8CA1  B1 B5              LDA    (HREAD),Y     ;year
2689  8CA3  85 6A              STA    IBFR+9
2690  8CA5  20 7A A5           JSR    DISPLAY_DOW
2691  8CA8                     SKIP   2
2695  8CAD  20 84 A5           JSR    DISPLAY_DATE
2696  8CB0                     OK
2701  8CB6  20 06 AB    DH31:  JSR    GETKEY
2702  8CB9  C9 20              CMP    #OKKEY
2703  8CBB  F0 4C              BEQ    DH90
2704  8CBD  C9 10              CMP    #NOKEY
2705  8CBF  F0 52              BEQ    DH99
2706  8CC1  C9 08              CMP    #HELPKEY
2707  8CC3  D0 F1              BNE    DH31
2708  8CC5                     HELP   65
2713  8CCC  4C A3 8B           JMP    H12
2714
2715                    DH50:                       ;menu entry
2716  8CCF  A0 01              LDY    #1
2717  8CD1  B1 B5              LDA    (HREAD),Y     ;hour
2718  8CD3  85 65              STA    IBFR+4
2719  8CD5  C8                 INY
2720  8CD6  B1 B5              LDA    (HREAD),Y     ;minute
2721  8CD8  85 66              STA    IBFR+5
2722  8CDA  20 8E A5           JSR    DISPTIME
2723  8CDD                     SET_CURSOR LINE2
2727  8CE2  A0 04              LDY    #4
2728  8CE4  B1 B5              LDA    (HREAD),Y     ;show msg #
2729  8CE6  AA                 TAX
2730  8CE7  20 07 A2           JSR    DISPLAY_MSG
2731  8CEA                     OK
2736  8CF0  20 06 AB    DH54:  JSR    GETKEY
2737  8CF3  C9 20              CMP    #OKKEY
2738  8CF5  F0 12              BEQ    DH90
2739  8CF7  C9 10              CMP    #NOKEY
2740  8CF9  F0 18              BEQ    DH99
2741  8CFB  C9 08              CMP    #HELPKEY
2742  8CFD  D0 F1              BNE    DH54
2743  8CFF                     HELP   66
2748  8D06  4C A3 8B           JMP    H12
2749
2750  8D09  20 3C AA    DH90:  JSR    INC_HREAD     ;OK key
2751  8D0C  B2 B5              LDA    (HREAD)
2752  8D0E  F0 03              BEQ    DH99          ;zero key means HWRITE has been reached
2753  8D10  4C A3 8B           JMP    H12
2754
2755  8D13  20 B2 A3    DH99:  JSR    BKCLR         ;end of history
2756  8D16                     MESSAGE 50
2760  8D1B  20 A7 AB           JSR    MSGWAIT
2761  8D1E  20 A7 AB           JSR    MSGWAIT
2762  8D21  4C BE AC           JMP    GETMENU
2763
2764                    ;----------------------------
2765                    ;    SEMI-AUTO RUN
2766                    ;----------------------------
2767
```

```
2768  8D24                  SEMI_MODE:
2769  8D24                          HELP    0
2774  8D2B  4C BE AC                JMP     GETMENU
2775                        ;       STZ     RAIN_DELAY
2776                        ;       SET     WCLK
2777                        ;       JMP     RM20
2778
2779                        ;---------------------------------
2780                        ;       AUTOMATIC RUN
2781                        ;---------------------------------
2782
2783                        AUTO_MODE:                      ;start watering
2784  8D2E  9C 1E 03                STZ     WCLK
2785  8D31  9C FD 02                STZ     RAIN_DELAY
2786  8D34  20 82 A3                JSR     OKCLR           ;want to delay?
2787  8D37                          MESSAGE 130
2791  8D3C                          ON
2796  8D42  20 B6 AB        RM0:    JSR     GETKEY
2797  8D45  C9 10                   CMP     #NOKEY
2798  8D47  F0 3B                   BEQ     RM20
2799  8D49  C9 20                   CMP     #OKKEY
2800  8D4B  F0 0D                   BEQ     RM1
2801  8D4D  C9 08                   CMP     #HELPKEY
2802  8D4F  D0 F1                   BNE     RM0
2803  8D51                          HELP    116
2808  8D58  80 D4                   BRA     AUTO_MODE
2809  8D5A  20 82 A3        RM1:    JSR     OKCLR           ;yes, select delay
2810  8D5D                          MESSAGE 131
2814  8D62                          SET_CURSOR LINE2+4
2818  8D67  A9 01                   LDA     #1
2819  8D69                          SELECT  1,14
2827  8D76  90 09                   BCC     RM2
2828  8D78                          HELP    116
2833  8D7F  80 AD                   BRA     AUTO_MODE
2834  8D81  8D FD 02        RM2:    STA     RAIN_DELAY
2835
2836  8D84  20 D4 BF        RM20:   JSR     EDVALVE         ;any valves to disable?
2837
2838                        RM25:                           ;ask if continue previous run
2839                                                        ;(if object area unchanged)
2840                                                        ;save daynum
2841
2842                        RM30:                           ;select base set up
2843  8D87  20 82 A3                JSR     OKCLR
2844  8D8A  A0 01                   LDY     #1
2845  8D8C  B1 5A                   LDA     (MENUPTR),Y
2846  8D8E  C9 10                   CMP     #$10
2847  8D90  D0 07                   BNE     RM31
2848  8D92                          MESSAGE 17              ;auto
2852  8D97  80 05                   BRA     RM32
2853  8D99                  RM31:   MESSAGE 18              ;semi-auto
2857  8D9E  A9 3A           RM32:   LDA     #':'
2858  8DA0  20 1B A3                JSR     OCHAR
2859  8DA3                          SET_CURSOR LINE2
2863  8DAB  A9 01                   LDA     #1
2864  8DAA                          SELECT_SOK 1,0,203
2874  8DBB  90 09                   BCC     RM33
2875  8DBD                          HELP    118
2888  8DC4  80 C1                   BRA     RM30
```

```
2881  BDC6  C9 08      RM33:  CMP   #8
2882  BDC8  D0 03             BNE   RM39
2883  BDCA  4C 46 86          JMP   FSTOP
2884  BDCD  85 BB      RM39:  STA   SOURCE
2885  BDCF  20 B3 A1          JSR   ISSOURCE      ;error if empty setup
2886  BDD2  B0 09             BCS   RM36
2887  BDD4                    HELP  71
2892  BDDB  80 AA             BRA   RM30
2893  BDDD  20 F6 A6   RM36:  JSR   OBJCLEAR      ;move source to object area
2894  BDE0  20 07 A7          JSR   S20.
2895  BDE3  A0 01             LDY   #1            ;error if semi-auto and specific days
2896  BDE5  B1 5A             LDA   (MENUPTR),Y
2897  BDE7  29 F0             AND   #01111000B
2898  BDE9  C9 10             CMP   #00010000B
2899  BDEB  F0 0F             BEQ   RM40
2900  BDED  AD 41 15          LDA   CYCLE_TYPE
2901  BDF0  F0 0A             BEQ   RM40
2902  BDF2                    HELP  108
2907  BDF9  4C 87 BD          JMP   RM30
2908
2909                   RM40:                      ;select add-on one-time
2910
2911                   RM50:                      ;select add-on special
2912
2913  BDFC  20 2E A0   RM60:  JSR   ENTER_GLOBAL  ;enter budget
2914
2915  BDFF  20 DE AD   RM70:  JSR   GENERATE      ;check out selected setup at budget
2916  8E02  90 0C             BCC   RM80
2917  8E04  18                CLC
2918  8E05  A5 79             LDA   ERROR         ;no good, show error
2919  8E07  69 49             ADC   #73
2920  8E09  85 72             STA   HELPNUM
2921  8E0B  20 74 AB          JSR   HELP_MSG
2922  8E0E  80 EC             BRA   RM60
2923
2924  8E10             RM80:
2925  8E10  9C 1A 03          STZ   DAYNUM        ;do new watering
2926  8E13  9C 1B 03          STZ   DAYNUM+1
2927
2928  8E16  20 82 A3   RM90:  JSR   DKCLR         ;give programmer out msg
2929  8E19                    MESSAGE 116
2933  8E1E                    SET   RUNNING       ;we're ready to run
2937  8E23  20 86 AB   RM95:  JSR   GETKEY
2938  8E26  C9 88             CMP   #HELPKEY
2939  8E28  D0 F9             BNE   RM95          ;wait for programmer removed or STOP
2940  8E2A  A0 01             LDY   #1
2941  8E2C  B2 5A             LDA   (MENUPTR)
2942  8E2E  29 F0             AND   #01111000B
2943  8E30  C9 10             CMP   #00010000B
2944  8E32  F0 09             BEQ   RM96
2945  8E34                    HELP  120           ;SEMI-AUTO mode
2950  8E3B  80 D9             BRA   RM90
2951  8E3D             RM96:  HELP  119           ;AUTO mode
2956  8E44  80 D8             BRA   RM90
2957
2958
2959
```

```
2960                              ;------------------------------
2961                              ;     manual valves
2962                              ;------------------------------
2963
2964  8E46              MMV:      SET       VALVE        ;Manual Mode - Valves
2968  8E4A  20 82 A3              JSR       DKCLR
2969  8E4D                        ANSLOW
2973  8E51  20 85 A3    MMV0:     JSR       DISPLAY_CLR
2974  8E54  20 85 8F              JSR       DISPVS
2975  8E57                        SET_CURSOR LINE2       ;show second line
2979  8E5C  A6 49                 LDX       VALVE
2980  8E5E  BD 7D 02              LDA       VS,X
2981  8E61  89 10                 BIT       #00010000B
2982  8E63  D0 07                 BNE       MM8
2983  8E65                        MESSAGE   201
2987  8E6A  80 05                 BRA       MM6
2988  8E6C              MM8:      MESSAGE   200
2992  8E71              MM6:      SET_CURSOR LINE2+7
2996  8E76  20 6A A1              JSR       DV
2997  8E79                        SET_CURSOR LINE2+13
3001  8E7E                        OK
3006  8E84  20 06 AB    MM7:      JSR       GETKEY
3007  8E87  C9 20                 CMP       #OKKEY
3008  8E89  F0 11                 BEQ       MM10
3009  8E8B  C9 10                 CMP       #NOKEY
3010  8E8D  F0 23                 BEQ       MM20
3011  8E8F  C9 0B                 CMP       #HELPKEY
3012  8E91  D0 F1                 BNE       MM7
3013  8E93                        HELP      63
3018  8E9A  80 AA                 BRA       MMV
3019  8E9C
3020  8E9C  A6 49       MM10:     LDX       VALVE        ;OK key, toggle ON/OFF
3021  8E9E  BD 7D 02              LDA       VS,X
3022  8EA1  89 10                 BIT       #00010000B
3023  8EA3  F0 05                 BEQ       MM12
3024  8EA5  20 BC A4              JSR       VOFF
3025  8EA8  80 08                 BRA       MM20
3026  8EAA  20 59 A4    MM12:     JSR       VON
3027  8EAD  64 E3                 STZ       CMDCTR       ;auto NO does initial delay again
3028  8EAF  4C 51 8E              JMP       MMV0
3029
3030  8EB2  A5 49       MM20:     LDA       VALVE        ;do next valve?
3031  8EB4  85 E1                 STA       R5
3032  8EB6  20 A7 9E              JSR       NXTVALVE
3033  8EB9  90 04                 BCC       MM22
3034  8EBB                        SET       VALVE        ;start over
3038  8EBF  20 85 A3    MM22:     JSR       DISPLAY_CLR
3039  8EC2  20 05 8F              JSR       DISPVS
3040  8EC5                        SET_CURSOR LINE2
3044  8ECA                        MESSAGE   202
3048  8ECF                        BACKUP    2
3052  8ED4  20 6A A1              JSR       DV
3053  8ED7                        OK
3058  8EDD  20 06 AB    MM21:     JSR       GETKEY
3059  8EE0  C9 20                 CMP       #OKKEY
3060  8EE2  D0 05                 BNE       MM24
3061  8EE4  64 E3                 STZ       CMDCTR       ;yes, init auto NO
3062  8EE6  4C 51 8E              JMP       MMV0
```

```
3063  8EE9  C9 10        MM24:    CMP     #NOKEY
3064  8EEB  D0 0A                 BNE     MM23
3065  8EED  A5 E1                 LDA     RS
3066  8EEF  85 49                 STA     VALVE       ;no, back to previous valve
3067  8EF1  20 98 AD              JSR     ISEXIT      ;see if want out
3068  8EF4  4C 51 8E              JMP     MMV0        ;no
3069  8EF7  C9 08        MM23:    CMP     #HELPKEY
3070  8EF9  D0 E2                 BNE     MM21
3071  8EFB                        HELP    63
3076  8F02  4C 46 8E              JMP     MMV
3077
3078                     DISPVS:                      ;display valve status line
3079  8F05                        MESSAGE 61
3083  8F0A  A2 01                 LDX     #1
3084  8F0C  BD 7D 02     MMV3:    LDA     VS,X
3085  8F0F  89 10                 BIT     #00010000B
3086  8F11  F0 05                 BEQ     MMV1
3087  8F13  8A                    TXA                 ;valve is on, show valve #
3088  8F14  09 30                 ORA     #ASCMASK
3089  8F16  80 02                 BRA     MMV2
3090  8F18  A9 2D        MMV1:    LDA     #'-'        ;valve off, show -
3091  8F1A  20 10 A3     MMV2:    JSR     DCHAR
3092  8F1D  E8                    INX                 ;do all 8
3093  8F1E  E0 09                 CPX     #9
3094  8F20  D0 EA                 BNE     MMV3
3095  8F22  60                    RTS
3096
3097                     ;---------------------------------
3098                     ;       manual test sequence
3099                     ;---------------------------------
3100
3101  8F23  20 82 A3     MMT:     JSR     DKCLR       ;Test sequence for valves
3102  8F26                        MESSAGE 117
3106  8F2B                        SET_CURSOR LINE2
3110  8F30  A9 02                 LDA     #2          ;get duration, default=2
3111  8F32                        SELECT  1,30
3119  8F3F  90 09                 BCC     MMT1
3120  8F41                        HELP    27          ;no help yet
3125  8F48  80 D9                 BRA     MMT
3126  8F4A               MMT1:    SET     VALVE       ;start with valve 1
3130  8F4E  20 82 A3     MMT2:    JSR     DKCLR
3131  8F51                        MESSAGE 118
3135  8F56  20 5C A1              JSR     DVALVEMSG   ;show valve # and status
3136  8F59                        SET_CURSOR LINE2
3140  8F5E  A6 49                 LDX     VALVE
3141  8F60  BD 7D 02              LDA     VS,X
3142  8F63  89 80                 BIT     #VID
3143  8F65  F0 02                 BEQ     MMT3
3144  8F67  80 0C                 BRA     MMT10
3145
3146  8F69  A2 77        MMT3:    LDX     #119        ;no ID
3147  8F6B  80 02                 BRA     MMT6
3148  8F6D  A2 79        MMT5:    LDX     #121        ;master valve
3149  8F6F  20 07 A2     MMT6:    JSR     DISPLAY_MSG
3150  8F72  4C C3 BF              JMP     MMTNEXT
3151
3152  8F75  20 59 A4     MMT10:   JSR     VON         ;a good valve, turn it on
3153  8F78  A5 61                 LDA     IBFR        ;start countdown
3154  8F7A  85 42                 STA     MSB
```

```
3155  8F7C  64 A1              STZ   SECCTR
3156  8F7E  64 41              STZ   LSB
3157  8F80                     MESSAGE 122          ;show that valve is on
3161  8F85         MMT11:      SET_CURSOR LINE2+4   ;show time remaining
3165  8F8A  A5 42              LDA   MSB
3166  8F8C  20 C2 A6           JSR   D2NS
3167  8F8F  A9 3A              LDA   #':'
3168  8F91  20 10 A3           JSR   DCHAR
3169  8F94  A5 41              LDA   LSB
3170  8F96  20 C2 A6           JSR   D2NS
3171  8F99  A5 A1  MMT12:      LDA   SECCTR         ;if new second, show it
3172  8F9B  C5 41              CMP   LSB
3173  8F9D  F0 10              BEQ   MMT15
3174  8F9F  85 41              STA   LSB
3175  8FA1  A5 41              LDA   LSB            ;if new minute, dec minute
3176  8FA3  10 E0              BPL   MMT11
3177  8FA5  C6 42              DEC   MSB
3178  8FA7  A9 3B              LDA   #59
3179  8FA9  85 41              STA   LSB
3180  8FAB  85 A1              STA   SECCTR
3181  8FAD  80 D6              BRA   MMT11
3182  8FAF  20 B6 AB  MMT15:   JSR   GETKEY         ;wait until STOP key
3183  8FB2  A5 42              LDA   MSB            ;or no more time
3184  8FB4  05 41              ORA   LSB
3185  8FB6  D0 E1              BNE   MMT12
3186  8FB8  20 8C A4           JSR   VOFF           ;then valve off
3187  8FBB  20 C8 A3           JSR   CLR_LINE2
3188  8FBE                     MESSAGE 123
3192
3193  8FC3  20 A7 AB MMTNEXT:  JSR   MSGWAIT        ;leave msg on a bit
3194  8FC6  E6 49              INC   VALVE
3195  8FC8  A5 49              LDA   VALVE
3196  8FCA  C9 03              CMP   #3
3197  8FCC  F0 03              BEQ   MMTX
3198  8FCE  4C 4E 8F           JMP   MMT2
3199  8FD1  4C 8E AC MMTX:     JMP   GETMENU
3200
3201
3202                           ;-----------------------------
3203                           ;     SUBROUTINES
3204                           ;-----------------------------
3205
3206
3207                   EDVALVE:                      ;subroutine to enable/disable valves
3208  8FD4  20 82 A3           JSR   DKCLR
3209  8FD7                     MESSAGE 132
3213  8FDC                     ON
3218  8FE2  20 B6 AB EDV1:     JSR   GETKEY
3219  8FE5  C9 10              CMP   #NOKEY
3220  8FE7  D0 01              BNE   EDV2
3221  8FE9  60                 RTS
3222  8FEA  C9 20    EDV2:     CMP   #OKKEY
3223  8FEC  F0 0D              BEQ   EDV3
3224  8FEE  C9 08              CMP   #HELPKEY
3225  8FF0  D0 F0              BNE   EDV1
3226  8FF2                     HELP  50
3231  8FF9  80 D9              BRA   EDVALVE
3232
```

```
3233  8FFB  A2 08       EDV3:  LDX   #8              ;move current valve status to bfr
3234  8FFD  BD 7D 02    SVA:   LDA   VS,X
3235  9000  9D 5E 02           STA   IDBFR,X
3236  9003  CA                 DEX
3237  9004  D0 F7              BNE   SVA
3238  9006  20 82 A3    SV0:   JSR   DKCLR           ;verify current status
3239  9009  20 A3 98           JSR   DISPEV
3240  900C                     SET_CURSOR LINE2
3244  9011                     MESSAGE 128
3248  9016                     ON
3253  901C  20 86 AB    SV4:   JSR   GETKEY
3254  901F  C9 20              CMP   #OKKEY
3255  9021  D0 0C              BNE   SV5
3256  9023  A2 08              LDX   #8              ;ok, save IDBFR to VS
3257  9025  BD 5E 02    SVB:   LDA   IDBFR,X
3258  9028  9D 7D 02           STA   VS,X
3259  902B  CA                 DEX
3260  902C  D0 F7              BNE   SVB
3261  902E  60                 RTS
3262  902F  C9 10       SV5:   CMP   #NOKEY
3263  9031  F0 0D              BEQ   SV10            ;no, modify
3264  9033  C9 08              CMP   #HELPKEY
3265  9035  D0 E5              BNE   SV4
3266  9037                     HELP  59
3271  903E  80 DC              BRA   SV4
3272  9040
3273  9040  20 C9 98    SV10:  JSR   ALL_DISABLE
3274  9043  64 49              STZ   VALVE
3275  9045  20 82 A3           JSR   DKCLR
3276  9048                     ANSLOW
3280  904C  80 4D              BRA   SV20
3281  904E  20 85 A3    SV13:  JSR   DISPLAY_CLR     ;use this station?
3282  9051  20 A3 98           JSR   DISPEV
3283  9054                     SET_CURSOR LINE2
3287  9059                     MESSAGE 129
3291  905E  20 3D A1           JSR   DSTA#
3292  9061  A9 3F              LDA   #'?'
3293  9063  20 10 A3           JSR   DCHAR
3294  9066                     OK
3299  906C  20 86 AB    SV11:  JSR   GETKEY
3300  906F  C9 10              CMP   #NOKEY
3301  9071  F0 12              BEQ   SV12
3302  9073  C9 20              CMP   #OKKEY
3303  9075  F0 1A              BEQ   SV15
3304  9077  C9 08              CMP   #HELPKEY
3305  9079  D0 F1              BNE   SV11
3306  907B                     HELP  60
3311  9082  4C D4 8F           JMP   EDVALVE
3312  9085  A6 49       SV12:  LDX   VALVE           ;disable valve
3313  9087  BD 5E 02           LDA   IDBFR,X
3314  908A  29 BF              AND   #10111111B
3315  908C  9D 5E 02           STA   IDBFR,X
3316  908F  80 0A              BRA   SV20
3317  9091  A6 49       SV15:  LDX   VALVE           ;enable valve
3318  9093  BD 5E 02           LDA   IDBFR,X
3319  9096  09 40              ORA   #01000000B
3320  9098  9D 5E 02           STA   IDBFR,X
3321  909B  20 A7 9E    SV20:  JSR   NITVALVE        ;next valve
```

```
3322  909E  90 AE              BCC    SV13
3323  90A0  4C 86 90            JMP    SV0
3324
3325                 DISPEV:                          ;display enabled valves
3326  90A3                      MESSAGE 127
3330  90AB                      SET    LSB
3334  90AC  A6 41    SV1:       LDX    LSB
3335  90AE  BD 5E 82             LDA    IDBFR,X
3336  90B1  89 40               BIT    #VEN
3337  90B3  F0 06               BEQ    SV2
3338  90B5  A5 41               LDA    LSB
3339  90B7  09 30               ORA    #ASCMASK
3340  90B9  80 02               BRA    SV3
3341  90BB  A9 2D    SV2:       LDA    #'-'
3342  90BD  20 10 A3  SV3:      JSR    DCHAR
3343  90C0  E6 41               INC    LSB
3344  90C2  A5 41               LDA    LSB
3345  90C4  C9 09               CMP    #9
3346  90C6  D0 E4               BNE    SV1
3347  90C8  60                  RTS
3348
3349                 ALL_DISABLE:                     ;disable valve bfr
3350  90C9                      SET    VALVE
3354  90CD  A6 49    ADI1:      LDX    VALVE
3355  90CF  BD 5E 82             LDA    IDBFR,X
3356  90D2  29 BF               AND    #10111111B
3357  90D4  9D 5E 82             STA    IDBFR,X
3358  90D7  E6 49               INC    VALVE
3359  90D9  A5 49               LDA    VALVE
3360  90DB  C9 09               CMP    #9
3361  90DD  D0 EE               BNE    ADI1
3362  90DF  60                  RTS
3363
3364                 ALL_ENABLE:                      ;enable all valves
3365  90E0                      SET    VALVE
3369  90E4  A6 49    AEN1:      LDX    VALVE
3370  90E6  BD 7D 82             LDA    VS,X
3371  90E9  09 40               ORA    #01000000B
3372  90EB  9D 7D 82             STA    VS,X
3373  90EE  E6 49               INC    VALVE
3374  90F0  A5 49               LDA    VALVE
3375  90F2  C9 09               CMP    #9
3376  90F4  D0 EE               BNE    AEN1
3377  90F6  60                  RTS
3378
3379                 ;--------------------------------------------------
3380
3381
3382  90F7  20 82 A3  ID10:     JSR    DKCLR           ;show the current IDs
3383  90FA                      MESSAGE 173
3387  90FF  20 4B AC             JSR    VID2BFR
3388  9102  20 6A AC             JSR    DISPID
3389  9105  20 06 AB  ID11:     JSR    GETKEY          ;wait for key
3390  9108  C9 20               CMP    #OKKEY
3391  910A  F0 11               BEQ    ID12
3392  910C  C9 10               CMP    #NOKEY
3393  910E  F0 0D               BEQ    ID12
3394  9110  C9 08               CMP    #HELPKEY
```

```
3395  9112  D0 F1              BNE       IQ11
3396  9114                     HELP      113
3401  911B  88 DA              BRA       IQ10
3402  911D  4C 46 86    IQ12:  JMP       FSTOP
3403
3404                          ;----------------------------------------
3405
3406
3407
3408
3409  9120                      INCLUDE   SCHED.ASM
3410                          ;----------------------------------------
3411                          ;        SETUP SCHEDULES
3412                          ;----------------------------------------
3413
3414                  SETUP_SCHEDULES:            ;set up programs
3415                                              ;SOURCE  1=Mini
3416                                              ;        2=Autosplit
3417                                              ;        3=Ration
3418                                              ;        4=ISC
3419                                              ;        5=One Time
3420                                              ;        6=Special
3421                                              ;        7=Failsafe
3422
3423                  GETREVIEW:                  ;find out if new, modify or review
3424  9120  A0 01              LDY       #1
3425  9122  B1 5A              LDA       (MENUPTR),Y  ;get source from MENUPTR
3426  9124  29 0F              AND       #00001111B
3427  9126  85 BB              STA       SOURCE
3428  9128  A9 02              LDA       #RNEW
3429  912A  8D 72 02           STA       REVIEW       ;0=review, 1=modify, 2=new, 3=exit
3430  912D  20 F6 A6           JSR       OBJCLEAR     ;clear object area
3431  9130  20 B3 A1           JSR       ISSOURCE     ;if source exits,
3432  9133  90 36              BCC       GETR4
3433  9135  20 87 A7           JSR       S20          ;move saved source to object area
3434  9138  20 82 A3   GETR2:  JSR       DKCLR        ;get review type
3435  913B  20 9F A1           JSR       DISP_SOURCE
3436  913E                     SET_CURSOR LINE2
3440  9143  A9 00              LDA       #0
3441  9145                     SELECT_SOK 0,3,135
3451  9156  90 09      GETR3:  BCC       GETR1
3452  9158                     HELP      83
3457  915F  B0 D7              BRA       GETR2
3458  9161  C9 03      GETR1:  CMP       #3
3459  9163  D0 03              BNE       GETR5
3460  9165  4C 46 86           JMP       FSTOP
3461  9168  8D 72 02   GETR5:  STA       REVIEW
3462  916B  60         GETR4:  RTS
3463
3464  916C  A5 79      VSUERR: LDA       ERROR        ;error in valve set up
3465  916E  18                 CLC                    ;explain it
3466  916F  69 49              ADC       #73
3467  9171  85 72              STA       HELPNUM
3468  9173  20 74 AB           JSR       HELP_MSG
3469  9176  60                 RTS
3470
3471
```

```
3472         ;--------------------------------
3473         ;     ration schedule
3474         ;--------------------------------
3475
3476
3477         ;--------------------------------
3478         ;     isc schedule
3479         ;--------------------------------
3480                                        t
3481
3482         ;--------------------------------
3483         ;     mini schedule
3484         ;--------------------------------
3485         ;--------------------------------
3486         ;     auto-split schedule
3487         ;--------------------------------
3488
3489  9177              VM0:   SET   DAYNUM      ;init day # for review
3493  917C  9C 18 03          STZ   DAYNUM+1
3494  917F  9C 1C 03          STZ   DAYNUM+2
3495
3496  9182  20 2B 91   VM1:   JSR   GETREVIEW   ;new, review, or modify?
3497
3498  9185  AD 72 02          LDA   REVIEW
3499  9188  C9 02             CMP   #RNEW
3500  918A  F0 08             BEQ   VM20
3501  918C  20 0E 92          JSR   ISBASICR
3502  918F  B0 03             BCS   VM20
3503  9191  4C B3 91          JMP   VM25
3504
3505  9194  20 45 94   VM20:  JSR   BLOCK1      ;enter durations
3506
3507  9197  A5 BB             LDA   SOURCE      ;enter split criteria
3508  9199  C9 02             CMP   #2          ;if auto-split
3509  919B  D0 03             BNE   VM22
3510  919D  20 18 95          JSR   BLOCK2      ;get split info
3511
3512  91A0  AD 72 02   VM22:  LDA   REVIEW      ;if new, then get cycle type
3513  91A3  C9 02             CMP   #RNEW
3514  91A5  D0 03             BNE   VM21
3515  91A7  20 76 9E          JSR   ENTER_CYCLE_TYPE
3516
3517  91AA  20 78 96   VM21:  JSR   BLOCK3      ;enter base cycles
3518  91AD  20 84 98          JSR   BLOCK4      ;enter excluded time
3519  91B0  20 DE 99          JSR   BLOCK5      ;enter starting time
3520
3521  91B3  A5 BB      VM25:  LDA   SOURCE
3522  91B5  C9 02             CMP   #2          ;if auto-split
3523  91B7  D0 15             BNE   VM90
3524  91B9  AD 72 02          LDA   REVIEW
3525  91BC  C9 02             CMP   #RNEW
3526  91BE  F0 08             BEQ   VM30
3527  91C0  20 47 92          JSR   ISSOAKR
3528  91C3  B0 03             BCS   VM30
3529  91C5  4C CE 91          JMP   VM90
3530
3531  91C8  20 6C 9A   VM30:  JSR   BLOCK10     ;enter soak durations
3532  91CB  20 7C 96          JSR   BLOCK11     ;enter soak cycles
3533
```

```
3534  91CE  AD 72 02   VM90:    LDA    REVIEW      ;if new or modified,
3535  91D1  C9 00               CMP    #REVIEW
3536  91D3  F0 2C               BEQ    VM100
3537  91D5  20 13 B3            JSR    CHECK       ;check for errors
3538  91D8  90 06               BCC    VM91
3539  91DA  20 6C 91            JSR    VSUERR      ;show error
3540  91DD  4C 01 92            JMP    VM100
3541                    VM91:                      ;else store away good setup
3542  91E0  20 82 A3            JSR    DKCLR
3543  91E3  20 9F A1            JSR    DISP_SOURCE
3544  91E6                      SET_CURSOR LINE2
3548  91EB                      MESSAGE 179
3552  91F0  20 A7 AB            JSR    MSGWAIT
3553  91F3  20 A7 AB            JSR    MSGWAIT
3554  91F6  A5 BB               LDA    SOURCE
3555  91F8  8D 40 15            STA    OBJBASE
3556  91FB  20 31 A7            JSR    O2S
3557  91FE  4C 82 91            JMP    VM1
3558
3559  9201  AD 72 02   VM100:   LDA    REVIEW      ;if review
3560  9204  C9 00               CMP    #REVIEW
3561  9206  D0 03               BNE    VM199
3562  9208  20 7C 92            JSR    DAILY       ;review daily schedule
3563  920B  4C 82 91   VM199:   JMP    VM1
3564           :
3565
3566                    ;--------------------------
3567                    ;    review routines
3568                    ;--------------------------
3569
3570                    ISBASICR:                   ;Review or Modify basic setup?
3571  920E  20 82 A3            JSR    DKCLR       ;return carry set if yes
3572  9211  AD 72 02            LDA    REVIEW
3573  9214  18                  CLC
3574  9215  69 9C               ADC    #156
3575  9217  AA                  TAX
3576  9218  20 D7 A2            JSR    DISPLAY_MSG
3577  921B                      SET_CURSOR LINE2
3581  9220                      MESSAGE 158
3585  9225                      ON
3590  922B  20 86 AB   RE10:    JSR    GETKEY
3591  922E  C9 20               CMP    #OKKEY
3592  9230  F0 13               BEQ    REYES
3593  9232  C9 10               CMP    #NOKEY
3594  9234  F0 0D               BEQ    RENO
3595  9236  C9 08               CMP    #HELPKEY
3596  9238  D0 F1               BNE    RE10
3597  923A                      HELP   84
3602  9241  80 CB               BRA    ISBASICR
3603  9243  18         RENO:    CLC
3604  9244  60                  RTS
3605  9245  38         REYES:   SEC
3606  9246  60                  RTS
3607
3608                    ISSOAKR:                    ;Review or Modify soak setup?
3609  9247  20 82 A3            JSR    DKCLR       ;return carry set if yes
3610  924A  AD 72 02            LDA    REVIEW
3611  924D  18                  CLC
```

| | | | | | | |
|---|---|---|---|---|---|---|
| 3612 | 924E | 69 9C | | ADC | #156 | |
| 3613 | 9250 | AA | | TAX | | |
| 3614 | 9251 | 20 D7 A2 | | JSR | DISPLAY_MSG | |
| 3615 | 9254 | | | SET_CURSOR LINE2 | | |
| 3619 | 9259 | | | MESSAGE 160 | | |
| 3623 | 925E | | | ON | | |
| 3628 | 9264 | 20 06 AB | RSK0: | JSR | GETKEY | |
| 3629 | 9267 | C9 20 | | CMP | #OKKEY | |
| 3630 | 9269 | F0 DA | | BEQ | REYES | |
| 3631 | 926B | C9 18 | | CMP | #NOKEY | |
| 3632 | 926D | F0 D4 | | BEQ | RENO | |
| 3633 | 926F | C9 0B | | CMP | #HELPKEY | |
| 3634 | 9271 | D0 F1 | | BNE | RSK0 | |
| 3635 | 9273 | | | HELP | 76 | |
| 3640 | 927A | 80 CB | | BRA | ISSOAKR | |
| 3641 | | | | | | |
| 3642 | | | DAILY: | | | ;review daily schedule |
| 3643 | 927C | 20 82 A3 | | JSR | DKCLR | |
| 3644 | 927F | | | MESSAGE 154 | | |
| 3648 | 9284 | | | ON | | |
| 3653 | 928A | 20 06 AB | RE21: | JSR | GETKEY | |
| 3654 | 928D | C9 20 | | CMP | #OKKEY | |
| 3655 | 928F | F0 14 | | BEQ | RE20 | |
| 3656 | 9291 | C9 18 | | CMP | #NOKEY | |
| 3657 | 9293 | D0 03 | | BNE | RE22 | |
| 3658 | 9295 | 4C 44 94 | | JMP | RE199 | |
| 3659 | 9298 | C9 0B | RE22: | CMP | #HELPKEY | |
| 3660 | 929A | D0 EE | | BNE | RE21 | |
| 3661 | 929C | | | HELP | 90 | |
| 3666 | 92A3 | 80 D7 | | BRA | DAILY | |
| 3667 | | | | | | |
| 3668 | 92A5 | 20 2E A0 | RE20: | JSR | ENTER_GLOBAL | ;enter budget settings |
| 3669 | | | RE90: | | | ;enter day to review |
| 3670 | 92A8 | 20 82 A3 | | JSR | DKCLR | |
| 3671 | 92AB | 64 49 | | STZ | VALVE | |
| 3672 | 92AD | | | MESSAGE 142 | | |
| 3676 | 92B2 | AD 41 15 | | LDA | CYCLE_TYPE | |
| 3677 | 92B5 | D0 26 | | BNE | RE91 | |
| 3678 | 92B7 | AD 1A 03 | | LDA | DAYNUM | ;enter so many days |
| 3679 | 92BA | | | SELECT 1,99 | | |
| 3687 | 92C7 | 90 09 | | BCC | RE92 | |
| 3688 | 92C9 | | | HELP | 94 | |
| 3693 | 92D0 | 80 D6 | | BRA | RE90 | |
| 3694 | 92D2 | 8D 1A 03 | RE92: | STA | DAYNUM | |
| 3695 | 92D5 | 9C 1B 03 | | STZ | DAYNUM+1 | |
| 3696 | 92D8 | 9C 1C 03 | | STZ | DAYNUM+2 | |
| 3697 | 92DB | 80 64 | | BRA | RE120 | |
| 3698 | 92DD | | RE91: | BACKUP 1 | | ;enter specific day |
| 3702 | 92E2 | AD 1C 03 | | LDA | DAYNUM+2 | |
| 3703 | 92E5 | | | SELECT_NOK 1,7,91 | | |
| 3713 | 92F6 | 90 09 | | BCC | RE93 | |
| 3714 | 92F8 | | | HELP | 92 | |
| 3719 | 92FF | 80 A7 | | BRA | RE90 | |
| 3720 | 9301 | 8D 1C 03 | RE93: | STA | DAYNUM+2 | |
| 3721 | | | | | | |
| 3722 | 9304 | 20 82 A3 | | JSR | DKCLR | ;enter which week |
| 3723 | 9307 | | | MESSAGE 143 | | |
| 3727 | 930C | | | SET_CURSOR 11 | | |

```
3731  9311  A5 61                LDA    IBFR
3732  9313  18                   CLC
3733  9314  69 5A                ADC    #90
3734  9316  AA                   TAX
3735  9317  20 07 A2             JSR    DISPLAY_MSG
3736  931A                       SET_CURSOR LINE2+11
3740  931F  AD 1A 03              LDA    DAYNUM
3741  9322                       SELECT 1,10
3749  932F  90 0A                BCC    RE94
3750  9331                       HELP   93
3755  9338  4C A8 92             JMP    RE98
3756  933B  8D 1A 03     RE94:   STA    DAYNUM
3757  933E  9C 1B 03             STZ    DAYNUM+1
3758
3759                    RE120:                          ;generate schedule
3760  9341  64 49                STZ    VALVE
3761  9343  20 DE AD             JSR    GENERATE
3762  9346  90 0D                BCC    RE30
3763  9348  A5 79                LDA    ERROR           ;error in valve set up
3764  934A  18                   CLC                   ;explain it
3765  934B  69 49                ADC    #73
3766  934D  85 72                STA    HELPNUM
3767  934F  20 74 AB             JSR    HELP_MSG
3768  9352  4C 44 94             JMP    RE199
3769
3770  9355  20 82 A3     RE30:   JSR    DKCLR           ;press OK msg
3771  9358  64 49                STZ    VALVE
3772  935A                       MESSAGE 153
3776  935F                       OK
3781  9365  20 06 AB     RE31:   JSR    GETKEY
3782  9368  C9 20                CMP    #OKKEY
3783  936A  F0 14                BEQ    RE122
3784  936C  C9 10                CMP    #NOKEY
3785  936E  D0 03                BNE    RE33
3786  9370  4C C9 93             JMP    RE100
3787  9373  C9 08        RE33:   CMP    #HELPKEY
3788  9375  D0 EE                BNE    RE31
3789  9377                       HELP   107
3794  937E  80 D5                BRA    RE30
3795
3796  9380  AD EC 15     RE122:  LDA    NSTARTS         ;show ending time
3797  9383  D0 0A                BNE    RE125           ;if any starts to show
3798  9385                       HELP   69
3803  938C  4C 44 94             JMP    RE199
3804  938F  20 82 A3     RE125:  JSR    DKCLR
3805  9392                       MESSAGE 182
3809  9397                       MOV16  DONETIME,OFFSET
3815  93A1  20 CF AB             JSR    MIN2HM
3816  93A4  20 BE A5             JSR    DISPTIME
3817  93A7                       OK
3822  93AD  20 06 AB     RE123:  JSR    GETKEY
3823  93B0  C9 20                CMP    #OKKEY
3824  93B2  F0 15                BEQ    RE100
3825  93B4  C9 10                CMP    #NOKEY
3826  93B6  D0 03                BNE    RE124
3827  93B8  4C 44 94             JMP    RE199
3828  93BB  C9 08        RE124:  CMP    #HELPKEY
3829  93BD  D0 EE                BNE    RE123
3830  93BF                       HELP   107
```

```
3835  93C6  4C 41 93            JMP      RE120
3836
3837                   RE100:                           ;review starts
3838  93C9  20 82 A3   RE102:   JSR      DKCLR         ;press OK msg
3839  93CC  64 49               STZ      VALVE
3840  93CE                      MESSAGE  161
3844  93D3                      OK
3849  93D9  20 86 AB   RE101:   JSR      GETKEY
3850  93DC  C9 20               CMP      #OKKEY
3851  93DE  F0 14               BEQ      RE110
3852  93E0  C9 10               CMP      #NOKEY
3853  93E2  D0 03               BNE      RE103
3854  93E4  4C 44 94            JMP      RE199
3855  93E7  C9 08      RE103:   CMP      #HELPKEY
3856  93E9  D0 EE               BNE      RE101
3857  93EB                      HELP     95
3862  93F2  80 D5               BRA      RE102
3863
3864                   RE110:                           ;show the starts
3865  93F4  20 07 AA            JSR      FIRSTSTART    ;init STARTPTR
3866  93F7  AD EC 15            LDA      NSTARTS
3867  93FA  D0 0A               BNE      RE112
3868  93FC                      HELP     69
3873  9403  4C 44 94            JMP      RE199
3874  9406  85 73      RE112:   STA      CTR
3875  9408  A2 08               LDX      #8
3876  940A  74 7D      RE113:   STZ      VCTR,X        ;clear valve counters
3877  940C  9E 68 02            STZ      VSYR,X
3878  940F  CA                  DEX                    ;(# of starts for each valve)
3879  9410  D0 F8               BNE      RE113
3880  9412  A5 73      RE111:   LDA      CTR
3881  9414  D0 03               BNE      RE117
3882  9416  4C 44 94            JMP      RE199
3883  9419  20 4F 9F   RE117:   JSR      SHOW_START
3884  941C                      OK
3889  9422  20 86 AB   RE114:   JSR      GETKEY
3890  9425  C9 20               CMP      #OKKEY
3891  9427  F0 14               BEQ      RE115
3892  9429  C9 10               CMP      #NOKEY
3893  942B  D0 03               BNE      RE116
3894  942D  4C 44 94            JMP      RE199
3895  9430  C9 08      RE116:   CMP      #HELPKEY
3896  9432  D0 EE               BNE      RE114
3897  9434                      HELP     95
3902  943B  80 8C               BRA      RE102
3903  943D  20 F7 A9   RE115:   JSR      NEXTSTART
3904  9440  C6 73               DEC      CTR
3905  9442  80 CE               BRA      RE111
3906
3907  9444  60         RE199:   RTS
3908
3909                   ;----------------------------------
3910                   ;      schedule entry blocks
3911                   ;----------------------------------
3912
3913                   BLOCK1:                          ;enter 100% durations for all valves
3914  9445  64 49               STZ      VALVE
3915  9447  20 A7 9E   B1SKIP:  JSR      NXTVALVE
```

```
3916  944A  90 03              BCC      B1NEXT
3917  944C  4C 17 95            JMP      B1END
3918  944F  AD 72 02   B1NEXT:  LDA      REVIEW
3919  9452  C9 02               CMP      #RNEW
3920  9454  D0 06               BNE      B1E
3921  9456  64 C9               STZ      DEFAULT         ;new input
3922  9458  64 CA               STZ      DEFAULT+1
3923  945A  80 14               BRA      B1ENTRY
3924  945C  A6 49     B1E:      LDX      VALVE           ;modify or review input
3925  945E                      DBLX
3933  9464  BD 58 15            LDA      DUR1,X
3934  9467  85 C9               STA      DEFAULT
3935  9469  BD 59 15            LDA      DUR1+1,X
3936  946C  85 CA               STA      DEFAULT+1
3937  946E  80 31               BRA      B1CONFIRM
3938
3939                  B1ENTRY:                           ;enter a new duration
3940  9470  20 82 A3            JSR      DKCLR
3941  9473  20 3D A1            JSR      DSTA#
3942  9476                      MESSAGE  37
3946  947B                      MOV16    DEFAULT,OFFSET
3952  9483  20 CF AB            JSR      MIN2HM
3953  9486  20 45 AB            JSR      GETDURATION     ;get it in hours, minutes format
3954  9489  B0 0D               BCS      B1F
3955  948B  20 B3 AB            JSR      HM2MIN
3956  948E                      MOV16    OFFSET,DEFAULT
3962  9496  80 09               BRA      B1CONFIRM
3963  9498            B1F:      HELP     54
3968  949F  80 CF               BRA      B1ENTRY
3969
3970                  B1CONFIRM:                         ;show default and confirm
3971  94A1  20 82 A3            JSR      DKCLR
3972  94A4  A5 C9               LDA      DEFAULT
3973  94A6  05 CA               ORA      DEFAULT+1
3974  94A8  F0 1B               BEQ      B1A
3975  94AA  20 3D A1            JSR      DSTA#
3976  94AD                      MESSAGE  37
3980  94B2                      MOV16    DEFAULT,OFFSET
3986  94BA  20 CF AB            JSR      MIN2HM
3987  94BD  20 F3 A5            JSR      DISPDURATION
3988  94C0  80 0D               BRA      B1B
3989  94C2            B1A       MESSAGE  147             ;no watering
3993  94C7                      SET CURSOR LINE2
3997  94CC  20 55 A1            JSR      DSTATION#
3998  94CF  20 E4 A1  B1B:      JSR      CONFIRM_BLINK
3999  94D2  20 06 AB  B1C:      JSR      GETKEY
4000  94D5  C9 20               CMP      #OKKEY
4001  94D7  F0 16               BEQ      B1OK
4002  94D9  C9 10               CMP      #NOKEY
4003  94DB  D0 09               BNE      B1I
4004  94DD  AD 72 02            LDA      REVIEW          ;no key ends review
4005  94E0  C9 00               CMP      #RREVIEW
4006  94E2  D0 BC               BNE      B1ENTRY
4007  94E4  80 31               BRA      B1END
4008  94E6  C9 00     B1I:      CMP      #HELPKEY
4009  94E8  D0 E8               BNE      B1C
4010  94EA  20 CD A1            JSR      CONFIRM_HELP
4011  94ED  80 B2               BRA      B1CONFIRM
4012
```

```
4813  94EF  A6 49      B1OK:   LDX     VALVE           ;default is confirmed
4014  94F1             DBLX
4022  94F7  A5 C9              LDA     DEFAULT
4023  94F9  9D 58 15           STA     DUR1,X
4024  94FC  A5 CA              LDA     DEFAULT+1
4025  94FE  9D 59 15           STA     DUR1+1,X
4026  9501  20 A7 9E           JSR     NXTVALVE
4027  9504  90 02              BCC     B1D
4028  9506  80 0F              BRA     B1END           ;next valve if any
4029  9508  AD 72 02   B1D:    LDA     REVIEW          ;if new,
4030  950B  C9 02              CMP     #RNEW
4031  950D  D0 05              BNE     B1Z
4032  950F  20 72 A1           JSR     ISCOPY          ;copy to next valve?
4033  9512  B0 8D              BCS     B1CONFIRM       ;yes
4034  9514  4C 4F 94   B1Z:    JMP     B1NEXT          ;no
4035
4036  9517  60         B1END:  RTS
4037
4038                           ;----------------------------
4039
4040                   BLOCK2:                         ;enter split criteria
4041  9518  AD 72 02           LDA     REVIEW
4042  951B  C9 02              CMP     #RNEW
4043  951D  D0 26              BNE     BK2C
4044  951F  20 82 A3           JSR     DKCLR           ;press OK to split
4045  9522                     MESSAGE 214
4049  9527                     OK
4054  952D  20 06 AB   BK2A:   JSR     GETKEY
4055  9530  C9 20              CMP     #OKKEY
4056  9532  F0 11              BEQ     BK2C
4057  9534  C9 10              CMP     #NOKEY
4058  9536  F0 04              BEQ     BK2B
4059  9538  C9 08              CMP     #HELPKEY
4060  953A  D0 F1              BNE     BK2A
4061  953C             BK2B:   HELP    61
4066  9543  80 D3              BRA     BLOCK2
4067
4068
4069  9545  64 49      BK2C:   STZ     VALVE           ;entry of MAXON/MINOFF
4070  9547  20 A7 9E   B2SKIP: JSR     NXTVALVE
4071  954A  90 03              BCC     B2NEXT
4072  954C  4C 77 96           JMP     B2END
4073
4074  954F  A6 49      B2NEXT: LDX     VALVE           ;skip valves with 0 duration
4075  9551             DBLX
4083  9557  BD 58 15           LDA     DUR1,X
4084  955A  1D 59 15           ORA     DUR1+1,X
4085  955D  F0 EB              BEQ     B2SKIP
4086  955F  AD 72 02           LDA     REVIEW
4087  9562  C9 02              CMP     #RNEW
4088  9564  D0 20              BNE     B2E
4089
4090                    ;      JSR     USESPLIT        ;split this station?
4091                    ;      BCC     B2NO
4092  9566  20 4A A2           JSR     SHOW_SITE       ;new input, show site info
4093  9569  A6 49              LDX     VALVE
4094  956B  BD C8 02           LDA     TERRAIN,X
4095  956E  85 CB              STA     DEFAULT+2       ;terrain
4096  9570  BD D4 02           LDA     SPRINKLER,X
```

```
4097  9573  85 CC              STA     DEFAULT+3       ;sprinkler type
4098  9575  20 F9 A1            JSR     GETONOFF        ;get ON/OFF from tables
4099  9578  20 82 A3            JSR     DKCLR
4100  957B                      MESSAGE 228
4104  9580  20 A7 A8            JSR     MSGWAIT
4105  9583  4C FB 95            JMP     B2CONFIRM
4106
4107  9586  A6 49       B2E:    LDX     VALVE           ;modify or review input
4108  9588  BD 42 15            LDA     MAXON,X
4109  958B  85 C9               STA     DEFAULT
4110  958D  BD 4B 15            LDA     MINOFF,X
4111  9590  85 CA               STA     DEFAULT+1
4112  9592  4C FB 95            JMP     B2CONFIRM
4113
4114                    B2ENTRY:                        ;enter new splits
4115                    ;       JSR     USESPLIT        ;use splits for this valve?
4116                    ;       BCS     B2YES
4117                    ;B2NO:  STZ     DEFAULT         ;no splits for this station
4118                    ;       STZ     DEFAULT+1
4119                    ;       JMP     B2CONFIRM
4120
4121  9595  20 82 A3    B2YES:  JSR     DKCLR           ;User entry of ON/OFF
4122  9598  20 4E A1            JSR     DSTA
4123  959B                      MESSAGE 28
4127  95A0  64 07               STZ     SUB
4128  95A2  20 BA 9E            JSR     SHOW_DUR
4129  95A5                      SET_CURSOR LINE2
4133  95AA                      MESSAGE 31
4137  95AF                      SET_CURSOR LINE2+8
4141  95B4  A5 CA               LDA     DEFAULT+1
4142  95B6  20 9C A6            JSR     B2O
4143  95B9                      SET_CURSOR LINE2+1
4147  95BE  A5 C9               LDA     DEFAULT         ;select MAXON
4148  95C0                      SELECT  1,60
4156  95CD  90 09               BCC     B2S
4157  95CF                      HELP    77
4162  95D6  80 BD               BRA     B2YES
4163  95D8  85 C9       B2S:    STA     DEFAULT
4164
4165                    B2O:                            ;select MINOFF
4166  95DA                      SET_CURSOR LINE2+8
4170  95DF  A5 CA               LDA     DEFAULT+1
4171  95E1                      SELECT  1,60
4179  95EE  90 09               BCC     B2R
4180  95F0                      HELP    78
4185  95F7  80 9C               BRA     B2YES
4186  95F9  85 CA       B2R:    STA     DEFAULT+1
4187
4188                    B2CONFIRM:                      ;show default and confirm
4189  95FB  20 82 A3            JSR     DKCLR
4190  95FE  A5 C9               LDA     DEFAULT
4191                    ;       BEQ     B2A
4192  9600  A6 49               LDX     VALVE
4193  9602  9D 42 15            STA     MAXON,X
4194  9605  64 07               STZ     SUB
4195  9607  20 6B A8            JSR     HOWMANY
4196                    ;       BEQ     B2A
```

```
4197  968A  20 4E A1          JSR    DSTA
4198  968D  A9 3A             LDA    #':'
4199  968F  20 10 A3          JSR    DCHAR
4200  9612                    SKIP   1
4204  9617  A5 56             LDA    QUOTIENT
4205  9619  20 B5 A6          JSR    D3D
4206  961C                    MESSAGE 25
4210  9621                    SET_CURSOR LINE2
4214  9626                    MESSAGE 31
4218  962B                    SET_CURSOR LINE2+1
4222  9630  A5 C9             LDA    DEFAULT
4223  9632  20 9C A6          JSR    D2D
4224  9635                    SET_CURSOR LINE2+8
4228  963A  A5 CA             LDA    DEFAULT+1
4229  963C  20 9C A6          JSR    D2D
4230  963F                    SET_CURSOR LINE2+15
4234  9644  80 00             BRA    B2B
4235              ;B2A:        JSR    DSTA             ;no MAION = no splits
4236              ;            MESSAGE 155
4237  9646  20 E4 A1   B2B:   JSR    CONFIRM_BLINK
4238  9649  20 06 AB   B2C:   JSR    GETKEY
4239  964C  C9 20             CMP    #OKKEY
4240  964E  F0 18             BEQ    B2OK
4241  9650  C9 10             CMP    #NOKEY
4242  9652  D0 0A             BNE    B2P
4243  9654  AD 72 02          LDA    REVIEW           ;no key ends review
4244  9657  C9 00             CMP    #RREVIEW
4245  9659  F0 1C             BEQ    B2END
4246  965B  4C 95 95          JMP    B2ENTRY
4247  965E  C9 08      B2P:   CMP    #HELPKEY
4248  9660  D0 E7             BNE    B2C
4249  9662  20 CD A1          JSR    CONFIRM_HELP
4250  9665  4C FB 95          JMP    B2CONFIRM
4251
4252  9668  A6 49      B2OK:  LDX    VALVE            ;default is confirmed
4253  966A  A5 C9             LDA    DEFAULT
4254  966C  9D 42 15          STA    MAION,X
4255  966F  A5 CA             LDA    DEFAULT+1
4256  9671  9D 4B 15          STA    MINOFF,X
4257  9674  4C 47 95          JMP    B2SKIP
4258
4259  9677  60         B2END: RTS
4260
4261              ;USESPLIT:
4262              ;            JSR    BKCLR            ;use splits for this valve?
4263              ;            JSR    DSTA
4264              ;            MESSAGE 30
4265              ;            SET_CURSOR LINE2+7
4266              ;            STZ    SUB
4267              ;            JSR    SHOW_DUR
4268              ;            SET_CURSOR 15
4269              ;            ON
4270              ;B2K:        JSR    GETKEY
4271              ;            CMP    #OKKEY
4272              ;            BEQ    B2M
4273              ;            CMP    #NOKEY
4274              ;            BEQ    B2L
4275              ;            CMP    #HELPKEY
4276              ;            BNE    B2K
4277              ;            HELP   61
```

```
4278                        ;       BRA     USESPLIT
4279                        ;B2H:   SEC                     ;return carry set to use split
4280                        ;       RTS
4281                        ;B2L:   CLC                     ;carry clear to skip split
4282                        ;       RTS
4283                        ;
4284
4285                        ;------------------------------
4286
4287                        BLOCK3:                         ;enter base cycles
4288    9678    64 D7                STZ    SUB
4289    967A    80 04                BRA    B311
4290
4291                        BLOCK11:                        ;enter soak cycles
4292    967C    A9 02                LDA    #2
4293    967E    85 D7                STA    SUB
4294
4295    9680    64 49       B311:    STZ    VALVE
4296    9682    64 E5                STZ    R6              ;1st station flag
4297    9684    20 A7 9E    B3SKIP:  JSR    NITVALVE
4298    9687    90 03                BCC    B3NEXT
4299    9689    4C 83 98             JMP    B3END
4300    968C    A6 49       B3NEXT:  LDX    VALVE           ;skip valves with 0 duration
4301    968E                         DBLX
4309    9694    A5 D7                LDA    SUB
4310    9696    F0 08                BEQ    B11A
4311    9698    BD 85 15             LDA    DUR3,X
4312    969B    1D B6 15             ORA    DUR3+1,X
4313    969E    80 06                BRA    B11B
4314    96A0    BD 58 15    B11A:    LDA    DUR1,X
4315    96A3    1D 59 15             ORA    DUR1+1,X
4316    96A6    F0 DC       B11B:    BEQ    B3SKIP
4317    96A8    AD 72 02             LDA    REVIEW
4318    96AB    C9 02                CMP    #RNEW
4319    96AD    D0 1C                BNE    B3E
4320
4321    96AF    A5 E5                LDA    R6              ;new input
4322    96B1    D0 06                BNE    B3AA            ;if not 1st valve,
4323    96B3                         SET    R6
4327    96B7    80 08                BRA    B3BB
4328    96B9    20 72 A1    B3AA:    JSR    ISCOPY          ;see if want to copy
4329    96BC    90 03                BCC    B3BB
4330    96BE    4C 14 98             JMP    B3CONFIRM
4331
4332    96C1    A9 01       B3BB:    LDA    #1              ;day or wk cycle
4333    96C3    85 C9                STA    DEFAULT
4334    96C5    A9 7F                LDA    #B01111111B     ;specific days
4335    96C7    85 CA                STA    DEFAULT+1
4336    96C9    80 26                BRA    B3ENTRY
4337    96CB    A6 49       B3E:     LDX    VALVE           ;modify or review input
4338    96CD                         DBLX
4346    96D3    A5 D7                LDA    SUB
4347    96D5    F0 0D                BEQ    B3CC
4348    96D7    BD C7 15             LDA    CYCLE3,X
4349    96DA    85 C9                STA    DEFAULT
4350    96DC    BD C8 15             LDA    CYCLE3+1,X
4351    96DF    85 CA                STA    DEFAULT+1
```

```
4352  96E1  4C 14 98            JMP     B3CONFIRM
4353  96E4  BD 6A 15    B3CC:   LDA     CYCLE1,X
4354  96E7  85 C9               STA     DEFAULT
4355  96E9  BD 6B 15            LDA     CYCLE1+1,X
4356  96EC  85 CA               STA     DEFAULT+1
4357  96EE  4C 14 98            JMP     B3CONFIRM
4358
4359               B3ENTRY:                            ;enter new cycle
4360  96F1  AD 41 15            LDA     CYCLE_TYPE
4361  96F4  D0 4D               BNE     B3T
4362  96F6  20 82 A3            JSR     DKCLR           ;show duration
4363  96F9  20 4E A1            JSR     DSTA
4364  96FC  A5 D7               LDA     SUB
4365  96FE  F0 07               BEQ     B11F
4366  9700                      MESSAGE 186
4370  9705  80 05               BRA     B116
4371  9707        B11F:         MESSAGE 28
4375  970C  20 BA 9E    B116:   JSR     SHOW_DUR
4376  970F                      SET_CURSOR LINE2
4380  9714                      MOV16   DEFAULT,IBFR
4386  971C  20 8F A6            JSR     DISPCYCLE       ;enter so many days
4387  971F                      SET_CURSOR LINE2+6
4391  9724  A5 C9               LDA     DEFAULT
4392  9726                      SELECT  1,90
4400  9733  90 09               BCC     B3U
4401  9735                      HELP    55
4406  973C  80 B3               BRA     B3ENTRY
4407  973E  85 C9       B3U:    STA     DEFAULT
4408  9740  4C 14 98            JMP     B3CONFIRM
4409
4410  9743        B3T:          SET     IBFR+6          ;enter specific days
4414  9747  64 CA               STZ     DEFAULT+1
4415  9749                      SET     DEFAULT
4419  974D  20 82 A3            JSR     DKCLR
4420  9750                      ANMED
4424  9754  20 85 A3    B3V:    JSR     DISPLAY_CLR
4425  9757  20 4E A1            JSR     DSTA
4426  975A                      MESSAGE 29
4430  975F  A9 3A               LDA     #':'
4431  9761  20 10 A3            JSR     DCHAR
4432  9764                      SKIP    1
4436  9769  A5 CA               LDA     DEFAULT+1       ;show days selected so far on line1
4437  976B  85 62               STA     IBFR+1
4438  976D  A9 08               LDA     #8
4439  976F  38                  SEC
4440  9770  E5 67               SBC     IBFR+6
4441  9772  AA                  TAX
4442  9773  18          B3A:    CLC
4443  9774  26 62               ROL     IBFR+1
4444  9776  CA                  DEX
4445  9777  D0 FA               BNE     B3A
4446  9779  20 69 A6            JSR     DSP
4447  977C                      SET_CURSOR LINE2
4451  9781                      MESSAGE 26
4455                                                    ;show day of week in IBFR+6
4456  9786  20 7A A5            JSR     DISPLAY_DOW
4457  9789                      SKIP    1
```

```
4461  978E  A9 3F              LDA    #'?'
4462  9790  20 10 A3           JSR    OCHAR
4463  9793              OK
4468  9799  20 06 A8   B3F:    JSR    GETKEY
4469  979C  C9 2B              CMP    #OKKEY
4470  979E  F0 15              BEQ    B3G
4471  97A0  C9 1B              CMP    #NOKEY
4472  97A2  F0 0E              BEQ    B3W
4473  97A4  C9 0B              CMP    #HELPKEY
4474  97A6  D0 F1              BNE    B3F
4475  97A8              HELP   72
4480  97AF  4C F1 96           JMP    B3ENTRY
4481  97B2  18         B3W:    CLC
4482  97B3  80 01              BRA    B3J
4483  97B5  38         B3G:    SEC                  ;bit set if watering day
4484  97B6  26 CA      B3J:    ROL    DEFAULT+1
4485  97B8  E6 67              INC    IBFR+6
4486  97BA  A5 67              LDA    IBFR+6        ;do all 7 days
4487  97BC  C9 08              CMP    #8
4488  97BE  D0 94              BNE    B3V
4489  97C0              ANOFF
4492  97C2  A2 01              LDX    #1
4493  97C4  BD 58 F8   B3I:    LDA    CBTBL,X       ;if not one specific day,
4494  97C7  C5 CA              CMP    DEFAULT+1
4495  97C9  F0 0B              BEQ    B3Y
4496  97CB  E8                 INX
4497  97CC  E0 0B              CPI    #8
4498  97CE  D0 F4              BNE    B3X
4499  97D0  4C 14 98           JMP    B3CONFIRM     ;then leave it a weekly cycle
4500
4501  97D3  86 67      B3Y:    STX    IBFR+6        ;else select # of weeks
4502  97D5  20 C8 A3           JSR    CLR_LINE2
4503  97D8  20 7A A5           JSR    DISPLAY_DOW
4504  97DB              SKIP   1
4508  97E0              MESSAGE 38
4512  97E5              SET_CURSOR LINE2+11
4516  97EA              MESSAGE 35
4520  97EF              SET_CURSOR LINE2+18
4524  97F4  A5 C9              LDA    DEFAULT
4525  97F6              SELECT 1,9
4533  9803  90 0A              BCC    B3Z
4534  9805              HELP   72
4539  980C  4C F1 96           JMP    B3ENTRY
4540  980F  85 C9      B3Z:    STA    DEFAULT
4541  9811  4C 14 98           JMP    B3CONFIRM
4542
4543              B3CONFIRM:                        ;show default and confirm
4544  9814  20 82 A3           JSR    DKCLR         ;show duration
4545  9817  20 4E A1           JSR    DSTA
4546  981A  A5 D7              LDA    SUB
4547  981C  F0 07              BEQ    B11J
4548  981E              MESSAGE 186
4552  9823  80 05              BRA    B11K
4553  9825      B11J:  MESSAGE 28
4557  982A  20 BA 9E   B11K:   JSR    SHOW_DUR
4558  982D              SET_CURSOR LINE2
4562  9832              MOV16  DEFAULT,IBFR
```

```
4568  983A  20 0F A6              JSR    DISPCYCLE
4569  983D  20 E4 A1        B3B:  JSR    CONFIRM_BLINK
4570  9840  20 86 AB        B3C:  JSR    GETKEY
4571  9843  C9 20                 CMP    #OKKEY
4572  9845  F0 17                 BEQ    B3OK
4573  9847  C9 10                 CMP    #NOKEY
4574  9849  D0 0A                 BNE    B3P
4575  984B  AD 72 02              LDA    REVIEW           ;no key ends review
4576  984E  C9 00                 CMP    #RREVIEW
4577  9850  F0 31                 BEQ    B3END
4578  9852  4C F1 96              JMP    B3ENTRY
4579  9855  C9 08          B3P:   CMP    #HELPKEY
4580  9857  D0 E7                 BNE    B3C
4581  9859  20 CD A1              JSR    CONFIRM_HELP
4582  985C  80 86                 BRA    B3CONFIRM
4583
4584  985E  A6 49          B30K:  LDX    VALVE            ;default is confirmed
4585  9860                        OBLX
4593  9866  A5 D7                 LDA    SUB
4594  9868  F0 0C                 BEQ    B11C
4595  986A  A5 C9                 LDA    DEFAULT
4596  986C  9D C7 15              STA    CYCLE3,X
4597  986F  A5 CA                 LDA    DEFAULT+1
4598  9871  9D C8 15              STA    CYCLE3+1,X
4599  9874  80 0A                 BRA    B11D
4600  9876  A5 C9          B11C:  LDA    DEFAULT
4601  9878  9D 6A 15              STA    CYCLE1,X
4602  987B  A5 CA                 LDA    DEFAULT+1
4603  987D  9D 6B 15              STA    CYCLE1+1,X
4604  9880  4C 84 96       B11D:  JMP    B3SKIP
4605
4606  9883  60             B3END: RTS
4607
4608                              ;--------------------------------
4609
4610                       BLOCK4:                        ;enter excluded time
4611  9884  AD 72 02              LDA    REVIEW
4612  9887  C9 02                 CMP    #RNEW
4613  9889  D0 0A                 BNE    B4E
4614  988B  64 C9                 STZ    DEFAULT          ;new input
4615  988D  64 CA                 STZ    DEFAULT+1
4616  988F  64 CB                 STZ    DEFAULT+2
4617  9891  64 CC                 STZ    DEFAULT+3
4618  9893  80 17                 BRA    B4ENTRY
4619                       B4E:                           ;modify or review input
4620  9895                        MOV16  XFROM,DEFAULT
4626  989F                        MOV16  XTO,DEFAULT+2
4632  98A9  4C 62 99              JMP    B4CONFIRM
4633
4634                       B4ENTRY:                       ;enter excluded time
4635  98AC  20 82 A3              JSR    BKCLR            ;want excluded time?
4636  98AF                        MESSAGE 49
4640  98B4                        ON
4645  98BA  20 86 AB       B4K:   JSR    GETKEY
4646  98BD  C9 20                 CMP    #OKKEY
4647  98BF  F0 1C                 BEQ    B4L
4648  98C1  C9 10                 CMP    #NOKEY
```

```
4649  98C3  D0 0B              BNE     B4N
4650  98C5  64 C9              STZ     DEFAULT      ;no excluded time
4651  98C7  64 CA              STZ     DEFAULT+1
4652  98C9  64 CB              STZ     DEFAULT+2
4653  98CB  64 CC              STZ     DEFAULT+3
4654  98CD  4C C2 99           JMP     B4OK
4655  98D0  C9 08       B4M:   CMP     #HELPKEY
4656  98D2  D0 E6              BNE     B4K
4657  98D4                     HELP    80
4662  98D8  80 CF              BRA     B4ENTRY
4663
4664  98DD  20 82 A3    B4L:   JSR     DKCLR        ;yes, enter FROM time
4665  98E0                     MESSAGE 4B
4669  98E5                     SET_CURSOR LINE2
4673  98EA                     MOV16   DEFAULT,OFFSET
4679  98F2  20 CF AB           JSR     MIN2HM
4680  98F5  20 7C A7           JSR     GETTIME
4681  98F8  90 0A              BCC     B4N
4682  98FA                     HELP    81
4687  9901  4C AC 98           JMP     B4ENTRY
4688  9904  20 B3 AB    B4N:   JSR     HM2MIN       ;save entered time
4689  9907                     MOV16   OFFSET,DEFAULT
4695  990F                     SET_CURSOR LINE2+7
4699  9914  A9 2D              LDA     #'-'
4700  9916  20 10 A3           JSR     DCHAR
4701                                                ;enter TO time
4702  9919                     MOV16   DEFAULT,DEFAULT+2
4708  9921                     MOV16   DEFAULT+2,OFFSET
4714  9929  20 CF AB           JSR     MIN2HM
4715  992C  20 7C A7           JSR     GETTIME
4716  992F  90 0A              BCC     B4O
4717  9931                     HELP    82
4722  9938  4C AC 98           JMP     B4ENTRY
4723  993B  20 B3 AB    B4O:   JSR     HM2MIN       ;save entered time
4724  993E                     MOV16   OFFSET,DEFAULT+2
4730  9946  A5 CA              LDA     DEFAULT+1    ;if FROM>=UNTIL then error
4731  9948  C5 CC              CMP     DEFAULT+3
4732  994A  F0 04              BEQ     B4P
4733  994C                     BLT     B4CONFIRM
4736  994E  80 08              BRA     B4Q
4737  9950  A5 C9       B4P:   LDA     DEFAULT
4738  9952  C5 CB              CMP     DEFAULT+2
4739  9954  F0 02              BEQ     B4Q
4740  9956                     BLT     B4CONFIRM
4743  9958        B4Q:         HELP    68
4748  995F  4C AC 98           JMP     B4ENTRY
4749
4750              B4CONFIRM:                        ;show default and confirm
4751  9962  20 82 A3           JSR     DKCLR
4752  9965                     MESSAGE 4B
4756  996A                     SET_CURSOR LINE2
4760  996F  A5 C9              LDA     DEFAULT      ;no watering time if all 0
4761  9971  05 CA              ORA     DEFAULT+1
4762  9973  05 CB              ORA     DEFAULT+2
4763  9975  05 CC              ORA     DEFAULT+3
4764  9977  F0 23              BEQ     B4S
4765  9979                     MOV16   DEFAULT,OFFSET
```

```
4771  99B1  20 CF AB              JSR    MIN2HM
4772  9984  20 BE A5              JSR    DISPTIME
4773  9987  A9 2D                 LDA    #'-'
4774  9989  20 10 A3              JSR    OCHAR
4775  998C                        MOV16  DEFAULT+2,OFFSET
4781  9994  20 CF AB              JSR    MIN2HM
4782  9997  20 BE A5              JSR    DISPTIME
4783  999A  80 05                 BRA    B4F
4784  999C                 B4G:   MESSAGE 162
4788  99A1  20 E4 A1        B4F:  JSR    CONFIRM_BLINK
4789  99A4  20 86 AB        B4C:  JSR    GETKEY
4790  99A7  C9 20                 CMP    #OKKEY
4791  99A9  F0 17                 BEQ    B4OK
4792  99AB  C9 10                 CMP    #NOKEY
4793  99AD  D0 0A                 BNE    B4I
4794  99AF  AD 72 02              LDA    REVIEW            ;no key ends review
4795  99B2  C9 00                 CMP    #RREVIEW
4796  99B4  F0 27                 BEQ    B4END
4797  99B6  4C AC 98              JMP    B4ENTRY
4798  99B9  C9 88           B4I:  CMP    #HELPKEY
4799  99BB  D0 E7                 BNE    B4C
4800  99BD  20 CD A1              JSR    CONFIRM_HELP
4801  99C0  80 AB                 BRA    B4CONFIRM
4802
4803  99C2  AD 72 02        B4OK: LDA    REVIEW            ;default is confirmed
4804  99C5  C9 00                 CMP    #RREVIEW          ;next one if review
4805  99C7  F0 14                 BEQ    B4END
4806  99C9                        MOV16  DEFAULT,XFROM
4812  99D3                        MOV16  DEFAULT+2,XTO
4818  99DD  60              B4END: RTS
4819
4820                        ;--------------------------------
4821
4822                        BLOCK5:                         ;enter start time
4823  99DE  AD 72 02              LDA    REVIEW
4824  99E1  C9 02                 CMP    #RNEW
4825  99E3  D0 06                 BNE    B5E
4826  99E5  64 C9                 STZ    DEFAULT           ;new input
4827  99E7  64 CA                 STZ    DEFAULT+1
4828  99E9  80 0C                 BRA    B5ENTRY
4829                        B5E:                            ;modify or review input
4830  99EB                        MOV16  BASE_START,DEFAULT
4836  99F5  80 2D                 BRA    B5CONFIRM
4837
4838                        B5ENTRY:                        ;enter a new start time
4839  99F7  20 82 A3              JSR    DKCLR
4840  99FA                        MESSAGE 36
4844  99FF                        MOV16  DEFAULT,OFFSET
4850  9A07  20 CF AB              JSR    MIN2HM
4851  9A0A  20 7C A7              JSR    GETTIME
4852  9A0D  90 0A                 BCC    B5K
4853  9A0F                        HELP   53
4858  9A16  4C F7 99              JMP    B5ENTRY
4859  9A19  20 B3 AB        B5K:  JSR    HM2MIN            ;save entered time
4860  9A1C                        MOV16  OFFSET,DEFAULT
4866
4867                        B5CONFIRM:                      ;show default and confirm
```

```
4868  9A24  20 82 A3              JSR      DKCLR
4869  9A27                        MESSAGE  36
4873  9A2C                        MOV16    DEFAULT,OFFSET
4879  9A34  20 CF AB              JSR      MIN2HM
4880  9A37  20 BE A5              JSR      DISPTIME
4881  9A3A  20 E4 A1              JSR      CONFIRM_BLINK
4882  9A3D  20 06 AB     B5C:     JSR      GETKEY
4883  9A40  C9 20                 CMP      #OKKEY
4884  9A42  F0 16                 BEQ      B5OK
4885  9A44  C9 10                 CMP      #NOKEY
4886  9A46  D0 09                 BNE      B5I
4887  9A48  AD 72 02              LDA      REVIEW       ;no key ends review
4888  9A4B  C9 00                 CMP      #RREVIEW
4889  9A4D  F0 1C                 BEQ      B5END
4890  9A4F  80 A6                 BRA      B5ENTRY
4891  9A51  C9 0B        B5I:     CMP      #HELPKEY
4892  9A53  D0 E8                 BNE      B5C
4893  9A55  20 CD A1              JSR      CONFIRM_HELP
4894  9A58  80 CA                 BRA      B5CONFIRM
4895
4896  9A5A  AD 72 02     B5OK:    LDA      REVIEW       ;default is confirmed
4897  9A5D  C9 00                 CMP      #RREVIEW     ;next one if review
4898  9A5F  F0 0A                 BEQ      B5END
4899  9A61                        MOV16    DEFAULT,BASE_START
4905
4906  9A6B  60           B5END:   RTS
4907
4908                              ;------------------------------
4909
4910                              BLOCK10:               ;soak criteria
4911  9A6C  AD 72 02              LDA      REVIEW
4912  9A6F  C9 02                 CMP      #RNEW
4913  9A71  D0 31                 BNE      BK10C
4914  9A73  20 82 A3              JSR      DKCLR        ;want soaks?
4915  9A76                        MESSAGE  141
4919  9A7B                        ON
4924  9A81  20 06 AB     BK10A:   JSR      GETKEY
4925  9A84  C9 20                 CMP      #OKKEY
4926  9A86  F0 1C                 BEQ      BK10C
4927  9A88  C9 10                 CMP      #NOKEY
4928  9A8A  D0 08                 BNE      BK10B
4929  9A8C  A2 11                 LDX      #17          ;clear soak durations
4930  9A8E  9E 85 15     B10AA:   STZ      DUR3,X
4931  9A91  CA                    DEX
4932  9A92  10 FA                 BPL      B10AA
4933  9A94  4C 06 9C              JMP      B10END
4934  9A97  C9 0B        BK10B:   CMP      #HELPKEY
4935  9A99  D0 E6                 BNE      BK10A
4936  9A9B                        HELP     121
4941  9AA2  80 CB                 BRA      BLOCK10
4942
4943
4944  9AA4  64 49        BK10C:   STZ      VALVE        ;entry of soak duration
4945  9AA6  20 A7 9E     B10SKIP: JSR      NXTVALVE
4946  9AA9  90 03                 BCC      B10NEXT
4947  9AAB  4C 06 9C              JMP      B10END
4948  9AAE                        B10NEXT:
```

| | | | | | | |
|---|---|---|---|---|---|---|
|4949|9AAE|A6 49| |LDX|VALVE|;skip if no base dur|
|4950|9AB0| | |DBLI| | |
|4958|9AB6|BD 58 15| |LDA|DUR1,X| |
|4959|9AB9|1D 59 15| |ORA|DUR1+1,X| |
|4960|9ABC|F0 E8| |BEQ|B10SKIP| |
|4961|9ABE|AD 72 02| |LDA|REVIEW| |
|4962|9AC1|C9 02| |CMP|#RNEW| |
|4963|9AC3|D0 22| |BNE|B10E| |
|4964|9AC5|20 07 9C| |JSR|USESOAK|;new input|
|4965|9AC8|90 37| |BCC|B10NO| |
|4966|9ACA|20 82 A3| |JSR|DKCLR| |
|4967|9ACD| | |MESSAGE|229|;use site info to calculate|
|4971|9AD2|20 A7 AB| |JSR|MSGWAIT| |
|4972|9AD5|A6 49| |LDX|VALVE| |
|4973|9AD7|BD CB 02| |LDA|TERRAIN,X| |
|4974|9ADA|85 CB| |STA|DEFAULT+2| |
|4975|9ADC|BD D4 02| |LDA|SPRINKLER,X| |
|4976|9ADF|85 CC| |STA|DEFAULT+3| |
|4977|9AE1|20 20 A2| |JSR|GETSOAKDUR| |
|4978|9AE4|4C 51 9B| |JMP|B10CONFIRM| |
|4979|9AE7|A6 49|B10E:|LDX|VALVE|;modify or review input|
|4980|9AE9| | |DBLI| | |
|4988|9AEF|BD B5 15| |LDA|DUR3,X| |
|4989|9AF2|85 C9| |STA|DEFAULT| |
|4990|9AF4|BD B6 15| |LDA|DUR3+1,X| |
|4991|9AF7|85 CA| |STA|DEFAULT+1| |
|4992|9AF9|4C 51 9B| |JMP|B10CONFIRM| |
|4993| | | | | | |
|4994| | |B10ENTRY:| | |;enter new soaks|
|4995|9AFC|20 07 9C| |JSR|USESOAK|;do soak?|
|4996|9AFF|B0 07| |BCS|B10YES| |
|4997|9B01|64 C9|B10NO:|STZ|DEFAULT|;no soak for this station|
|4998|9B03|64 CA| |STZ|DEFAULT+1| |
|4999|9B05|4C 51 9B| |JMP|B10CONFIRM| |
|5000|9B08|20 82 A3|B10YES: JSR|DKCLR| | |
|5001|9B0B|20 4E A1| |JSR|DSTA| |
|5002|9B0E| | |SKIP|1| |
|5006|9B13| | |MESSAGE|28| |
|5010|9B18|64 D7| |STZ|SUB| |
|5011|9B1A|20 BA 9E| |JSR|SHOW_DUR| |
|5012|9B1D| | |SET_CURSOR|LINE2| |
|5016|9B22| | |MESSAGE|183| |
|5020|9B27|A9 02| |LDA|#2| |
|5021|9B29|85 D7| |STA|SUB| |
|5022|9B2B| | |MOV16|DEFAULT,OFFSET| |
|5028|9B33|20 CF AB| |JSR|MIN2HM| |
|5029|9B36|20 3F AB| |JSR|GETDUR8| |
|5030|9B39|B0 0D| |BCS|B10S| |
|5031|9B3B|20 B3 AB| |JSR|HM2MIN| |
|5032|9B3E| | |MOV16|OFFSET,DEFAULT| |
|5038|9B46|80 09| |BRA|B10CONFIRM| |
|5039|9B48| |B10S:|HELP|54| |
|5044|9B4F|80 AB| |BRA|B10ENTRY| |
|5045| | | | | | |
|5046| | |B10CONFIRM:| | |;show default and confirm|
|5047|9B51|A5 C9| |LDA|DEFAULT| |
|5048|9B53|05 CA| |ORA|DEFAULT+1| |

```
5049  9B55  F0 66              BEQ    B10A
5050  9B57  20 B2 A3           JSR    DKCLR
5051  9B5A  20 4E A1           JSR    DSTA
5052  9B5D              MESSAGE 186
5056  9B62              MOV16  DEFAULT,OFFSET
5062  9B6A  20 CF AB           JSR    MIN2HM
5063  9B6D  20 F3 A5           JSR    DISPDURATION
5064  9B70              SET_CURSOR LINE2
5068  9B75  A6 49              LDX    VALVE
5069  9B77  BD 42 15           LDA    MAXON,X
5070  9B7A  D0 07              BNE    B102
5071  9B7C              MESSAGE 230            ;no splits
5075  9B81  80 05              BRA    B10B
5076  9B83         B102: MESSAGE 184
5080  9B88              SET_CURSOR LINE2+5
5084  9B8D  A9 02              LDA    #2
5085  9B8F  85 D7              STA    SUB
5086  9B91  A6 49              LDX    VALVE
5087  9B93              DBLX
5095  9B99  A5 C9              LDA    DEFAULT
5096  9B9B  9D B5 15           STA    DUR3,X
5097  9B9E  A5 CA              LDA    DEFAULT+1
5098  9BA0  9D B6 15           STA    DUR3+1,X
5099  9BA3  20 6B AB           JSR    HOWMANY
5100  9BA6  20 9C A6           JSR    D2D
5101  9BA9              SKIP   1
5105  9BAE  A6 49              LDX    VALVE
5106  9BB0  BD 42 15           LDA    MAXON,X
5107  9BB3  20 9C A6           JSR    D2D
5108  9BB6              SET_CURSOR LINE2+15
5112  9BBB  80 0B              BRA    B10B
5113  9BBD  20 B2 A3    B10A:  JSR    DKCLR
5114  9BC0              MESSAGE 185            ;no soak
5118  9BC5  20 55 A1           JSR    DSTATION0
5119  9BC8  20 E4 A1    B10B:  JSR    CONFIRM_BLINK
5120  9BCB  20 86 AB    B10C:  JSR    GETKEY
5121  9BCE  C9 20              CMP    #OKKEY
5122  9BD0  F0 18              BEQ    B10OK
5123  9BD2  C9 10              CMP    #NOKEY
5124  9BD4  D0 0A              BNE    B10P
5125  9BD6  AD 72 02           LDA    REVIEW          ;no key ends review
5126  9BD9  C9 00              CMP    #RREVIEW
5127  9BDB  F0 29              BEQ    B10END
5128  9BDD  4C FC 9A           JMP    B10ENTRY
5129  9BE0  C9 08       B10P:  CMP    #HELPKEY
5130  9BE2  D0 E7              BNE    B10C
5131  9BE4  20 CD A1           JSR    CONFIRM_HELP
5132  9BE7  4C 51 9B           JMP    B10CONFIRM
5133
5134  9BEA  A6 49       B10OK: LDX    VALVE           ;default is confirmed
5135  9BEC              DBLX
5143  9BF2  A5 C9              LDA    DEFAULT
5144  9BF4  9D B5 15           STA    DUR3,X
5145  9BF7  A5 CA              LDA    DEFAULT+1
5146  9BF9  9D B6 15           STA    DUR3+1,X
5147  9BFC  20 A7 9E           JSR    NXTVALVE
5148  9BFF  90 02              BCC    B10D
```

```
5149  9C01  80 03              BRA    B10END       ;next valve if any
5150                     B10D: ; LDA   REVIEW       ;if new,
5151                          ; CMP   #RNEW
5152                          ; BNE   B10Q
5153                          ; JSR   ISCOPY       ;copy to next valve?
5154                          ; BCC   B10Q
5155                          ; JMP   B10CONFIRM   ;yes
5156  9C03  4C AE 9A     B10Q: JMP   B10NEXT      ;no
5157
5158  9C06  60           B10END: RTS
5159
5160  9C07              USESOAK:                    
5161  9C07  20 82 A3           JSR    DKCLR        ;use soaks for this valve?
5162  9C0A  20 4E A1           JSR    DSTA
5163  9C0D                     MESSAGE 146
5167  9C12                     SET_CURSOR LINE2
5171  9C17  A9 28              LDA    #'('
5172  9C19  20 10 A3           JSR    DCHAR
5173  9C1C                     MESSAGE 28
5177  9C21  64 D7              STZ    SUB
5178  9C23  20 BA 9E           JSR    SHOW_DUR
5179  9C26  A9 29              LDA    #')'
5180  9C28  20 10 A3           JSR    DCHAR
5181  9C2B                     SET_CURSOR 14
5185  9C30                     ON
5190  9C36  20 06 AB     US01: JSR    GETKEY
5191  9C39  C9 20              CMP    #OKKEY
5192  9C3B  F0 11              BEQ    US02
5193  9C3D  C9 10              CMP    #NOKEY
5194  9C3F  F0 0F              BEQ    US03
5195  9C41  C9 08              CMP    #HELPKEY
5196  9C43  D0 F1              BNE    US01
5197  9C45                     HELP   61
5202  9C4C  80 B9              BRA    USESOAK
5203  9C4E  38           US02: SEC                 ;return carry set to use soak
5204  9C4F  60                 RTS
5205  9C50  18           US03: CLC                 ;carry clear for no soak
5206  9C51  60                 RTS
5207
5208                     ;--------------------------
5209
5210  9C52              VA9B:
5211                    VA60:                       ;WANT SYRINGES?
5212  9C52  20 82 A3           JSR    DKCLR
5213  9C55                     MESSAGE 65
5217  9C5A                     ON
5222  9C60  20 06 AB     VA61: JSR    GETKEY
5223  9C63  C9 20              CMP    #OKKEY
5224  9C65  F0 14              BEQ    VA62
5225  9C67  C9 10              CMP    #NOKEY
5226  9C69  D0 03              BNE    VA6A
5227  9C6B  4C 52 9C           JMP    VA9B
5228  9C6E  C9 08        VA6A: CMP    #HELPKEY
5229  9C70  D0 EE              BNE    VA61
5230  9C72                     HELP   73
5235  9C79  80 D7              BRA    VA60
5236
```

```
5237  9C7B  4C 21 9D   VA62:  JMP   VA70              ;SKIP THIS FOR NOW
5238  9C7E  A9 01             LDA   #1                ;enter syringe active months
5239  9C80  A2 0C             LDX   #12               ;start off with all active
5240  9C82  9D A2 15   VA68:  STA   ACTIVE_MONTH,X
5241  9C85  CA                DEX
5242  9C86  D0 FA             BNE   VA68
5243  9C88  20 C4 A8   VA65:  JSR   SHOW_MONTHS       ;show active months
5244  9C8B             SKIP  1
5248  9C90             ON                             ;then confirm
5253  9C96  20 06 AB   VA6F:  JSR   GETKEY
5254  9C99  C9 20             CMP   #OKKEY
5255  9C9B  D0 03             BNE   VA66
5256  9C9D  4C 21 9D          JMP   VA70              ;ok
5257  9CA0  C9 10      VA66:  CMP   #NOKEY
5258  9CA2  F0 0D             BEQ   VA63
5259  9CA4  C9 08             CMP   #HELPKEY
5260  9CA6  D0 EE             BNE   VA6F
5261  9CA8             HELP  73
5266  9CAF  80 CA             BRA   VA62
5267  9CB1  64 49      VA63:  STZ   VALVE             ;no, enter new active months
5268  9CB3  20 82 A3          JSR   DKCLR
5269  9CB6             MESSAGE 190
5273  9CBB             SET_CURSOR LINE2
5277  9CC0  64 41             STZ   LSB
5278  9CC2  E6 41      VA64:  INC   LSB
5279  9CC4  A5 41             LDA   LSB
5280  9CC6  C9 0D             CMP   #13
5281  9CC8  F0 BE             BEQ   VA65
5282  9CCA             SKIP  1
5286  9CCF  A6 41             LDX   LSB
5287  9CD1  A9 01             LDA   #1
5288  9CD3  9D A2 15          STA   ACTIVE_MONTH,X
5289  9CD6  20 92 A3   VA6H:  JSR   KEY_RESET         ;show current month
5290  9CD9  A6 41             LDX   LSB
5291  9CDB  BD A2 15          LDA   ACTIVE_MONTH,X
5292  9CDE  F0 05             BEQ   VA6I
5293  9CE0  BD 4B F8          LDA   MONTBL,X
5294  9CE3  80 02             BRA   VA6J
5295  9CE5  A9 2D      VA6I:  LDA   #'-'
5296  9CE7  20 18 A3   VA6J:  JSR   OCHAR
5297  9CEA             BACKUP 1
5301  9CEF             SLOW  NOKEY
5307  9CF7             UL
5314  9CFD  20 06 AB   VA6K:  JSR   GETKEY            ;select on/off
5315  9D00  C9 20             CMP   #OKKEY
5316  9D02  F0 BE             BEQ   VA64              ;ok, do next month
5317  9D04  C9 10             CMP   #NOKEY
5318  9D06  F0 0D             BEQ   VA6L
5319  9D08  C9 08             CMP   #HELPKEY
5320  9D0A  D0 F1             BNE   VA6K
5321  9D0C             HELP  73
5326  9D13  80 9C             BRA   VA63
5327  9D15  A6 41      VA6L:  LDX   LSB               ;no, toggle month
5328  9D17  BD A2 15          LDA   ACTIVE_MONTH,X
5329  9D1A  49 01             EOR   #00000001B
5330  9D1C  9D A2 15          STA   ACTIVE_MONTH,X
5331  9D1F  80 B5             BRA   VA6H
```

```
5332
5333    9D21    64 49           VA78:   STZ     VALVE           ;enter syringe durations
5334    9D23    64 C9                   STZ     DEFAULT
5335    9D25    20 A7 9E        VA7A:   JSR     INITVALVE
5336    9D28    90 03                   BCC     VA7B
5337    9D2A    4C 6F 9D                JMP     VA75
5338    9D2D    20 82 A3        VA7B:   JSR     BKCLR           ;show default duration and get new one
5339    9D30    20 E5 9F                JSR     FLASH
5340    9D33                            MESSAGE 191
5344    9D3B                            SET_CURSOR LINE2+11
5348    9D3D    A5 C9                   LDA     DEFAULT
5349    9D3F                            SELECT  0,15
5357    9D4C    90 09                   BCC     VA7C
5358    9D4E                            HELP    73              ;help requested
5363    9D55    80 D6                   BRA     VA7B
5364    9D57    A6 49           VA7C:   LDX     VALVE           ;store the entered value
5365    9D59                            DBLX
5373    9D5F    9E 7F 15                STZ     DUR2+1,X
5374    9D62    A5 61                   LDA     IBFR
5375    9D64    9D 7E 15                STA     DUR2,X
5376    9D67    85 C9                   STA     DEFAULT
5377    9D69    D0 BA                   BNE     VA7A            ;if 0 entered,
5378                                    JSR     ENTER_SKIP2     ;then verify to skip valve
5379    9D6B    90 B8                   BCC     VA7A
5380    9D6D    80 BE                   BRA     VA7B
5381
5382    9D6F    20 82 A3        VA75:   JSR     BKCLR           ;enter syringe from-to
5383    9D72    64 49                   STZ     VALVE
5384    9D74                            MESSAGE 193
5388    9D79    64 65                   STZ     IBFR+4          ;from
5389    9D7B    64 66                   STZ     IBFR+5
5390    9D7D                            SET_CURSOR LINE2
5394    9D82    20 7C A7                JSR     GETTIME
5395    9D85    90 0A                   BCC     VA7D
5396    9D87                            HELP    73
5401    9D8E    4C 6F 9D                JMP     VA75
5402    9D91    20 B3 AB        VA7D:   JSR     HM2MIN          ;save entered time
5403    9D94                            MOV16   OFFSET,SYRINGE_START
5409    9D9E                            SET_CURSOR LINE2+9      ;to
5413    9DA3    20 7C A7                JSR     GETTIME
5414    9DA6    90 0A                   BCC     VA7E
5415    9DA8                            HELP    73
5420    9DAF    4C 6F 9D                JMP     VA75
5421    9DB2    20 B3 AB        VA7E:   JSR     HM2MIN          ;save entered time
5422    9DB5                            MOV16   OFFSET,SYRINGE_END
5428
5429    9DBF    AD B0 15                LDA     SYRINGE_START+1 ;if FROM>TO then error
5430    9DC2    CD B2 15                CMP     SYRINGE_END+1
5431    9DC5    F0 04                   BEQ     VA7F
5432    9DC7                            BLT     VA88
5435    9DC9    80 0A                   BRA     VA76
5436    9DCB    AD AF 15        VA7F:   LDA     SYRINGE_START
5437    9DCE    CD B1 15                CMP     SYRINGE_END
5438    9DD1                            BLT     VA88
5441    9DD3    F0 0A                   BEQ     VA7H
5442    9DD5                    VA76:   HELP    68
5447    9DDC    4C 6F 9D                JMP     VA75
```

```
5448  9DDF  9C B4 15    VA7H:  STZ    SOFTEN+1        ;FROM=TO, do one syringe,
5449  9DE2              SET    SOFTEN                 ;don't ask for interval
5453  9DE7  80 6A       BRA    VA85
5454
5455  9DE9  20 82 A3    VA8B:  JSR    DKCLR           ;get how often to syringe
5456  9DEC  64 49       STZ    VALVE
5457  9DEE              MESSAGE 139
5461  9DF3  64 CF       STZ    OFFSET
5462  9DF5  64 D0       STZ    OFFSET+1
5463. 9DF7  20 CF A8    JSR    MIN2HM
5464  9DFA  20 45 A8    JSR    GETDURATION
5465  9DFD  90 02       BCC    VA81
5466  9DFF  80 0D       BRA    VA82
5467  9E01  20 83 AB    VA81:  JSR    HM2MIN
5468  9E04              MOV16  OFFSET,SOFTEN
5474
5475  9E0E  64 41       VA82:  STZ    LSB             ;check input
5476  9E10  64 42       STZ    MSB
5477  9E12              SET    VALVE
5481  9E16  A6 49       VA8A:  LDX    VALVE           ;if SOFTEN
5482  9E18              DBLX
5490  9E1E  18          CLC
5491  9E1F  A5 41       LDA    LSB
5492  9E21  7D 7E 15    ADC    DUR2,X
5493  9E24  85 41       STA    LSB
5494  9E26  A5 42       LDA    MSB
5495  9E28  7D 7F 15    ADC    DUR2+1,X
5496  9E2B  85 42       STA    MSB
5497  9E2D  E6 49       INC    VALVE
5498  9E2F  A5 49       LDA    VALVE
5499  9E31  C9 09       CMP    #9
5500  9E33  D0 E1       BNE    VA8A
5501  9E35  AD B4 15    LDA    SOFTEN+1        ;< sum of syringe durations,
5502  9E38  C5 42       CMP    MSB
5503  9E3A              BLT    VA8C
5506  9E3C  F0 02       BEQ    VA8B
5507  9E3E  80 13       BRA    VA85
5508  9E40  AD B3 15    VA8B:  LDA    SOFTEN
5509  9E43  C5 41       CMP    LSB
5510  9E45              BLT    VA8C
5513  9E47  80 0A       BRA    VA85
5514  9E49              VA8C:  HELP   73              ;then error
5519  9E50  4C 21 9D    JMP    VA70
5520
5521  9E53  20 F1 A8    VA85:  JSR    SHOW_SYRCYC     ;confirm number of syringes
5522  9E56              ON
5527  9E5C  20 06 AB    VA8D:  JSR    GETKEY
5528  9E5F  C9 20       CMP    #OKKEY
5529               ;    BEQ    VA90
5530  9E61  C9 10       CMP    #NOKEY
5531  9E63  D0 03       BNE    VA8E
5532  9E65  4C 6F 9D    JMP    VA75
5533  9E68  C9 0B       VA8E:  CMP    #HELPKEY
5534  9E6A  D0 F0       BNE    VA8D
5535  9E6C              HELP   73
5540  9E73  4C 6F 9D    JMP    VA75
5541
```

```
5542
5543                           ;---------------------------------
5544                           ;     schedule entry subs
5545                           ;---------------------------------
5546
5547
5548                           ENTER_CYCLE_TYPE:              ;input specific or so many days
5549  9E76   20 82 A3                   JSR     DKCLR
5550  9E79                              MESSAGE 51
5554  9E7E                              SET_CURSOR LINE2
5558  9E83   A9 00                      LDA     #0
5559  9E85                              SELECT_SOK 0,1,52    ;select type
5569  9E96   90 09                      BCC     EC0
5570  9E98                              HELP    56
5575  9E9F   80 D5                      BRA     ENTER_CYCLE_TYPE
5576  9EA1   A5 61              EC0:    LDA     IBFR
5577  9EA3   8D 41 15                   STA     CYCLE_TYPE
5578  9EA6   60                         RTS
5579
5580                           NXTVALVE:                      ;out: the next valid valve in VALVE
5581                                                          ;     carry set if no more valves
5582  9EA7   E6 49                      INC     VALVE
5583  9EA9   A6 49                      LDX     VALVE
5584  9EAB   E0 09                      CPX     #9
5585  9EAD   F0 09                      BEQ     NV1
5586  9EAF   BD 7D 02                   LDA     VS,X
5587  9EB2   29 80                      AND     #VID         ;valve must have ID
5588  9EB4   F0 F1                      BEQ     NXTVALVE
5589  9EB6   18                         CLC
5590  9EB7   60                         RTS
5591  9EB8   38                 NV1:    SEC
5592  9EB9   60                         RTS
5593
5594                           SHOW_DUR:                      ;show the duration for VALVE
5595                                                          ;in: VALVE, SUB
5596  9EBA   A5 D7                      LDA     SUB          ;which duration to show?
5597  9EBC   F0 06                      BEQ     SHD1
5598  9EBE   C9 01                      CMP     #1
5599  9EC0   F0 16                      BEQ     SHD2
5600  9EC2   80 28                      BRA     SHD3
5601  9EC4   A6 49              SHD1:   LDX     VALVE        ;show DUR1
5602  9EC6                              DBLX
5610  9ECC   BD 58 15                   LDA     DUR1,X
5611  9ECF   85 CF                      STA     OFFSET
5612  9ED1   BD 59 15                   LDA     DUR1+1,X
5613  9ED4   85 D0                      STA     OFFSET+1
5614  9ED6   80 28                      BRA     SHD4
5615  9ED8   A6 49              SHD2:   LDX     VALVE        ;show DUR2
5616  9EDA                              DBLX
5624  9EE0   BD 7E 15                   LDA     DUR2,X
5625  9EE3   85 CF                      STA     OFFSET
5626  9EE5   BD 7F 15                   LDA     DUR2+1,X
5627  9EE8   85 D0                      STA     OFFSET+1
5628  9EEA   80 14                      BRA     SHD4
5629  9EEC   A6 49              SHD3:   LDX     VALVE        ;show DUR3
5630  9EEE                              DBLX
5638  9EF4   BD B5 15                   LDA     DUR3,X
```

```
5639   9EF7   85 CF                STA    OFFSET
5640   9EF9   BD 06 15             LDA    DUR3+1,X
5641   9EFC   85 D0                STA    OFFSET+1
5642   9EFE   80 08                BRA    SHD4
5643   9F00   20 CF AB    SHD4:    JSR    MIN2HM
5644   9F03   20 F3 A5             JSR    DISPDURATION
5645   9F06   60                   RTS
5646
5647                      SHOW_CYCLE:                 ;show the cycle for valve
5648                                                  ;in: VALVE,SUB
5649   9F07   A5 D7                LDA    SUB         ;which cycle to show?
5650   9F09   F0 06                BEQ    SHC1
5651   9F0B   C9 01                CMP    #1
5652   9F0D   F0 16                BEQ    SHC2
5653   9F0F   80 28                BRA    SHC3
5654   9F11   A6 49       SHC1:    LDX    VALVE       ;show CYCLE1
5655   9F13                        DBLX
5663   9F19   BD 6A 15             LDA    CYCLE1,X
5664   9F1C   85 61                STA    IBFR
5665   9F1E   BD 6B 15             LDA    CYCLE1+1,X
5666   9F21   85 62                STA    IBFR+1
5667   9F23   80 26                BRA    SHC4
5668   9F25   A6 49       SHC2:    LDX    VALVE       ;show CYCLE2
5669   9F27                        DBLX
5677   9F2D   BD 90 15             LDA    CYCLE2,X
5678   9F30   85 61                STA    IBFR
5679   9F32   BD 91 15             LDA    CYCLE2+1,X
5680   9F35   85 62                STA    IBFR+1
5681   9F37   80 12                BRA    SHC4
5682   9F39   A6 49       SHC3:    LDX    VALVE       ;show CYCLE3
5683   9F3B                        DBLX
5691   9F41   BD C7 15             LDA    CYCLE3,X
5692   9F44   85 61                STA    IBFR
5693   9F46   BD C8 15             LDA    CYCLE3+1,X
5694   9F49   85 62                STA    IBFR+1
5695   9F4B   20 0F A6    SHC4:    JSR    DISPCYCLE
5696   9F4E   60                   RTS
5697
5698                      SHOW_START:                 ;show the duration, cycle, and time
5699                                                  ;in: NSPLIT(), out: VCTR() incremented
5700   9F4F   20 82 A3             JSR    BKCLR
5701   9F52   20 E5 9F             JSR    FLASH
5702   9F55   A0 02                LDY    #2
5703   9F57   B1 7B                LDA    (STARTPTR),Y
5704   9F59   85 49                STA    VALVE
5705   9F5B   20 4E A1             JSR    DSTA
5706   9F5E   A0 03                LDY    #3          ;show type
5707   9F60   B1 7B                LDA    (STARTPTR),Y
5708   9F62   29 70                AND    #%01110000
5709   9F64   6A                   ROR    A
5710   9F65   6A                   ROR    A
5711   9F66   6A                   ROR    A
5712   9F67   6A                   ROR    A
5713   9F68   85 41                STA    LSB
5714   9F6A   18                   CLC
5715   9F6B   69 94                ADC    #148
5716   9F6D   AA                   TAX
```

```
5717  9F6E  20 D7 A2            JSR    DISPLAY_MSG
5718  9F71  A6 49               LDX    VALVE
5719  9F73  A5 41               LDA    LSB
5720  9F75  C9 01               CMP    #1
5721  9F77  D0 08               BNE    SST5
5722  9F79  FE 68 02             INC    VSYR,X
5723  9F7C  BD 68 02             LDA    VSYR,X
5724  9F7F  80 04               BRA    SST4
5725  9F81  F6 7D       SST5:   INC    VCTR,X
5726  9F83  B5 7D               LDA    VCTR,X
5727  9F85  C9 64       SST4:   CMP    #100
5728  9F87                      BLT    SST0
5731  9F89  20 85 A6            JSR    D3D
5732  9F8C  80 03               BRA    SST1
5733  9F8E  20 9C A6    SST0:   JSR    D2D
5734  9F91              SST1:   SET_CURSOR 11
5738  9F96  A9 6F               LDA    #'o'
5739  9F98  20 10 A3            JSR    DCHAR
5740  9F9B  A9 66               LDA    #'f'
5741  9F9D  20 10 A3            JSR    DCHAR
5742  9FA0  A6 49               LDX    VALVE
5743  9FA2  A5 41               LDA    LSB
5744  9FA4  C9 01               CMP    #1
5745  9FA6  D0 05               BNE    SST3
5746  9FA8  AD 71 02            LDA    NSYR
5747  9FAB  80 03               BRA    SST2
5748  9FAD  BD 54 02    SST3:   LDA    NSPLIT,X
5749  9FB0  20 85 A6    SST2:   JSR    D3D
5750  9FB3                      SET_CURSOR LINE2
5754  9FB8  A0 04               LDY    #4
5755  9FBA  B1 7B               LDA    (STARTPTR),Y
5756  9FBC  85 CF               STA    OFFSET
5757  9FBE  C8                  INY
5758  9FBF  B1 7B               LDA    (STARTPTR),Y
5759  9FC1  85 D0               STA    OFFSET+1
5760  9FC3  20 CF AB            JSR    MIN2HM
5761  9FC6  20 F3 A5            JSR    DISPDURATION
5762  9FC9                      SET_CURSOR LINE2+7
5766  9FCE  A9 40               LDA    #'@'
5767  9FD0  20 10 A3            JSR    DCHAR
5768  9FD3  A0 00               LDY    #0
5769  9FD5  B1 7B               LDA    (STARTPTR),Y
5770  9FD7  85 CF               STA    OFFSET
5771  9FD9  C8                  INY
5772  9FDA  B1 7B               LDA    (STARTPTR),Y
5773  9FDC  85 D0               STA    OFFSET+1
5774  9FDE  20 CF AB            JSR    MIN2HM
5775  9FE1  20 BE A5            JSR    DISPTIME
5776  9FE4  60                  RTS
5777
5778  9FE5  A0 32       FLASH:  LDY    #50            ;flash the screen
5779  9FE7  20 C0 A2            JSR    WAITMS
5780  9FEA  60                  RTS
5781
5782                    BUILD_START:                   ;generate a start at STARTPTR
5783                                                   ;from S,MT, VALVE, SOURCE, SUB
5784  9FEB  AD EC 15            LDA    NSTARTS        ;return carry set if no more room
```

```
5785  9FEE  C9 80              CMP    #128
5786  9FF0                     BLT    BS1
5789  9FF2  38                 SEC
5790  9FF3  60                 RTS
5791  9FF4  A0 00       BS1:   LDY    #0              ;build a start
5792  9FF6  AD 32 02           LDA    S               ;start time
5793  9FF9  91 7B              STA    (STARTPTR),Y
5794  9FFB  C8                 INY
5795  9FFC  AD 33 02           LDA    S+1
5796  9FFF  91 7B              STA    (STARTPTR),Y
5797  A001  C8                 INY
5798  A002  A5 49              LDA    VALVE           ;valve
5799  A004  91 7B              STA    (STARTPTR),Y
5800  A006  C8                 INY
5801  A007  A5 07              LDA    SUB             ;type byte
5802  A009  18                 CLC                    ;xsssSSSS, s=SUB, S=SOURCE
5803  A00A  2A                 ROL    A
5804  A00B  2A                 ROL    A
5805  A00C  2A                 ROL    A
5806  A00D  2A                 ROL    A
5807  A00E  05 8B              ORA    SOURCE
5808  A010  91 7B              STA    (STARTPTR),Y
5809  A012  C8                 INY
5810  A013  AD 36 02           LDA    WT              ;duration
5811  A016  91 7B              STA    (STARTPTR),Y
5812  A018  C8                 INY
5813  A019  AD 37 02           LDA    WT+1
5814  A01C  91 7B              STA    (STARTPTR),Y
5815  A01E  C8                 INY
5816  A01F  A9 00              LDA    #0              ;spares
5817  A021  91 7B              STA    (STARTPTR),Y
5818  A023  C8                 INY
5819  A024  91 7B              STA    (STARTPTR),Y
5820  A026  EE EC 15           INC    NSTARTS         ;one more start saved
5821  A029  20 F7 A9           JSR    NEXTSTART       ;move STARTPTR
5822  A02C  18                 CLC
5823  A02D  60                 RTS
5824
5825
5826
5827                    ENTER_GLOBAL:                  ;enter global budget
5828  A02E  20 82 A3           JSR    DKCLR
5829  A031  64 49              STZ    VALVE
5830  A033                     MESSAGE S8
5834  A03B                     SET_CURSOR LINE2+9
5838  A03D  AD FE 02           LDA    GLOBAL
5839  A040  85 61              STA    IBFR
5840  A042  A9 0A              LDA    #10
5841  A044  85 62              STA    IBFR+1
5842  A046  A9 C8              LDA    #200
5843  A048  85 63              STA    IBFR+2
5844  A04A  20 F3 A8           JSR    GETNUM10
5845  A04D  90 18              BCC    EGL1
5846  A04F  B2 5A              LDA    (MENUPTR)
5847  A051  C9 01              CMP    #1
5848  A053  F0 09              BEQ    EGL2
5849  A055                     HELP   S8
```

```
5854  A05C  80 00              BRA    ENTER_GLOBAL
5855  A05E         EGL2:        HELP   91
5860  A065  80 C7              BRA    ENTER_GLOBAL
5861  A067  8D FE 02  EGL1:     STA    GLOBAL
5862  A06A  60                  RTS
5863
5864                 HOWMANY:                ;how many splits
5865                                         ;in: VALVE, SUB, MAION
5866                                         ;out: QUOTIENT, A=DUR/MAION
5867  A068  A6 49              LDX    VALVE
5868  A06D  BD 42 15           LDA    MAION,X
5869  A070  85 54              STA    DIVISOR
5870  A072  A5 D7              LDA    SUB
5871  A074  F0 12              BEQ    HOW0
5872  A076               DBLI            ;soak duration
5880  A07C  BD 85 15           LDA    DUR3,X
5881  A07F  85 52              STA    DIVIDEND
5882  A081  BD 86 15           LDA    DUR3+1,X
5883  A084  85 53              STA    DIVIDEND+1
5884  A086  80 10              BRA    HOW2
5885  A088         HOW0:  DBLI            ;base duration
5893  A08E  BD 58 15           LDA    DUR1,X
5894  A091  85 52              STA    DIVIDEND
5895  A093  BD 59 15           LDA    DUR1+1,X
5896  A096  85 53              STA    DIVIDEND+1
5897  A098  20 67 B3 HOW2:     JSR    DIVIDE
5898  A09B  AA                 TAX
5899  A09C  F0 02              BEQ    HOW1
5900  A09E  E6 56              INC    QUOTIENT
5901  A0A0  A5 56   HOW1:      LDA    QUOTIENT
5902  A0A2  60                 RTS
5903
5904                 CALCNSYR:               ;out: QUOTIENT=
5905  A0A3  38                 SEC          ;SYRINGE_END - SYRINGE_START / SOFTEN
5906  A0A4  AD B1 15           LDA    SYRINGE_END
5907  A0A7  ED AF 15           SBC    SYRINGE_START
5908  A0AA  85 52              STA    DIVIDEND
5909  A0AC  AD B2 15           LDA    SYRINGE_END+1
5910  A0AF  ED B0 15           SBC    SYRINGE_START+1
5911  A0B2  85 53              STA    DIVIDEND+1
5912  A0B4               MOV16  SOFTEN,DIVISOR
5918  A0BE  20 7E B3           JSR    DIV16
5919  A0C1  E6 56              INC    QUOTIENT
5920  A0C3  60                 RTS
5921
5922                 SHOW_MONTHS:            ;display active months
5923  A0C4  64 49              STZ    VALVE
5924  A0C6  20 82 A3           JSR    MKCLR
5925  A0C9               MESSAGE 190
5929  A0CE               SET_CURSOR LINE2+1
5933  A0D3               SET    LSB
5937  A0D7  A6 41    SMOC:     LDX    LSB
5938  A0D9  BD A2 15           LDA    ACTIVE_MONTH,X
5939  A0DC  F0 05              BEQ    SMOD
5940  A0DE  BD 4B F8           LDA    MONTBL,X
5941  A0E1  80 02              BRA    SMOE
5942  A0E3  A9 2D    SMOD:     LDA    #'-'
```

```
5943  ADE5  20 1D A3   SHOE:    JSR      DCHAR
5944  ADE8  E6 41               INC      LSB
5945  ADEA  A5 41               LDA      LSB
5946  ADEC  C9 0D               CMP      #13
5947  ADEE  D0 E7               BNE      SHOC
5948  ADF0  60                  RTS
5949
5950              SHOW_SYRCYC:                    ;show number of syringes and interval
5951  ADF1  20 A3 A0            JSR      CALCNSYR
5952  ADF4  20 82 A3            JSR      DKCLR
5953  ADF7  64 49               STZ      VALVE
5954  ADF9                      MESSAGE  140
5958  ADFE                      SET_CURSOR 3
5962  A103  A5 56               LDA      QUOTIENT
5963  A105  20 9C A6            JSR      D20
5964  A108  A5 56               LDA      QUOTIENT
5965  A10A  C9 01               CMP      #1
5966  A10C  D0 14               BNE      SHSY1
5967  A10E  20 C8 A3            JSR      CLR_LINE2
5968  A111                      MOV16    SYRINGE_START,OFFSET
5974  A11B  20 CF AB            JSR      MIN2HM
5975  A11E  20 BE A5            JSR      DISPTIME
5976  A121  60                  RTS
5977  A122              SHSY1:  SET_CURSOR LINE2
5981  A127                      MOV16    SOFTEN,OFFSET
5987  A131  20 CF AB            JSR      MIN2HM
5988  A134  20 F3 A5            JSR      DDUR
5989  A137                      SET_CURSOR LINE2+15
5993  A13C  60                  RTS
5994
5995  A13D              DSTA0:  MESSAGE  73        ;display Sta 0n
5999  A142                      SKIP     1
6003  A147  A9 23               LDA      #'#'
6004  A149  20 1D A3            JSR      DCHAR
6005  A14C  80 1C               BRA      DV
6006
6007  A14E              DSTA:   MESSAGE  73        ;display Stan
6011  A153  80 15               BRA      DV
6012
6013  A155              DSTATION0: MESSAGE 32      ;display Station 0n
6017  A15A  80 0E               BRA      DV
6018
6019              DVALVEMSG:                       ;display "Valve 0n"
6020  A15C                      MESSAGE  126       ;0n: VALVE
6024
6025  A161  20 6A A1   DVALVE:  JSR      DV        ;display valve# and space
6026  A164  A9 20               LDA      #' '
6027  A166  20 1D A3            JSR      DCHAR
6028  A169  60                  RTS
6029
6030  A16A  A5 49      DV:      LDA      VALVE     ;display valve #
6031  A16C  09 30               ORA      #ASCMASK
6032  A16E  20 1D A3            JSR      DCHAR
6033  A171  60                  RTS
6034
6035              ISCOPY:                          ;show copy screen,
6036                                               ;return carry set if copy requested
```

```
6037  A172  20 82 A3           JSR     DKCLR
6038  A175                     MESSAGE 34
6042  A17A  20 55 A1           JSR     DSTATION0
6043  A17D                     ON
6048  A183  20 06 AB  ISC01:   JSR     GETKEY
6049  A186  C9 20              CMP     #OKKEY
6050  A188  F0 11              BEQ     ISC02
6051  A18A  C9 10              CMP     #NOKEY
6052  A18C  F0 0F              BEQ     ISC03
6053  A18E  C9 08              CMP     #HELPKEY
6054  A190  D0 F1              BNE     ISC01
6055  A192                     HELP    8
6060  A199  80 07              BRA     ISCOPY
6061  A19B  38        ISC02:   SEC
6062  A19C  60                 RTS
6063  A19D  18        ISC03:   CLC
6064  A19E  60                 RTS
6065
6066                 DISP_SOURCE:                  ;show the source
6067  A19F  A5 BB              LDA     SOURCE
6068  A1A1  18                 CLC
6069  A1A2  69 CA              ADC     #202
6070  A1A4  AA                 TAX
6071  A1A5  20 D7 A2           JSR     DISPLAY_MSG
6072  A1A8                     BACKUP  1
6076  A1AD  A9 3A              LDA     #':'
6077  A1AF  20 18 A3           JSR     DCHAR
6078  A1B2  60                 RTS
6079
6080                 ISSOURCE:                     ;return carry set if source exists
6081  A1B3  A6 BB              LDX     SOURCE
6082  A1B5                     DBLX
6090  A1B8  BD 02 FB           LDA     SOURCEADDR,X
6091  A1BE  85 75              STA     SRCPTR
6092  A1C0  BD 03 FB           LDA     SOURCEADDR+1,X
6093  A1C3  85 76              STA     SRCPTR+1
6094  A1C5  B2 75              LDA     (SRCPTR)
6095  A1C7  F0 02              BEQ     ISS0
6096  A1C9  38                 SEC
6097  A1CA  60                 RTS
6098  A1CB  18        ISS0:    CLC
6099  A1CC  60                 RTS
6100
6101                 CONFIRM_HELP:                 ;help screen for all confirm screens
6102  A1CD  AD 72 02           LDA     REVIEW
6103  A1D0  C9 08              CMP     #RREVIEW
6104  A1D2  D0 08              BNE     CHE1
6105  A1D4                     HELP    7
6110  A1DB  60                 RTS
6111  A1DC           CHE1:     HELP    6
6116  A1E3  60                 RTS
6117
6118                 CONFIRM_BLINK:                ;use ? for modify, OK for review
6119  A1E4  AD 72 02           LDA     REVIEW
6120  A1E7  C9 01              CMP     #RMODIFY
6121  A1E9  D0 07              BNE     CHE2
6122  A1EB                     ON
```

```
6127  A1F1  60              RTS
6128  A1F2          CHE2:   OK
6133  A1F8  60              RTS
6134
6135          GETONOFF:               ;retrieve MAXON/MINOFF from tables
6136                                  ;DEFAULT+2=terrain, +3=sprinkler type
6137                                  ;out: DEFAULT= MAXON, +1= MINOFF
6138  A1F9  A6 CB           LDX     DEFAULT+2       ;find MINOFF
6139  A1FB  CA              DEX
6140  A1FC  BD 8C F8        LDA     MINOFFTBL,X     ;index = terrain-1
6141  A1FF  85 CA           STA     DEFAULT+1
6142  A201  A6 CC           LDX     DEFAULT+3       ;find MAXON
6143  A203  CA              DEX
6144  A204  86 BC           STX     R1
6145  A206  8A              TXA
6146  A207  18              CLC             ;index = 6*(sprinkler type-1) + (terrain-1)
6147  A208  65 BC           ADC     R1
6148  A20A  65 BC           ADC     R1
6149  A20C  65 BC           ADC     R1
6150  A20E  65 BC           ADC     R1
6151  A210  65 BC           ADC     R1
6152  A212  A6 CB           LDX     DEFAULT+2
6153  A214  CA              DEX
6154  A215  86 BC           STX     R1
6155  A217  65 BC           ADC     R1
6156  A219  AA              TAX
6157  A21A  BD 92 F8        LDA     MAXONTBL,X
6158  A21D  85 C9           STA     DEFAULT
6159  A21F  60              RTS
6160
6161          GETSOAKDUR:             ;retrieve Soak duration from table
6162                                  ;in: DEFAULT+2=terrain, +3=sprinkler type
6163                                  ;out: DEFAULT,+1= Soak dur
6164  A220  A6 CC           LDX     DEFAULT+3
6165  A222  CA              DEX
6166  A223  86 BC           STX     R1
6167  A225  8A              TXA
6168  A226  18              CLC             ;index = 6*(sprinkler type-1) + (terrain-1)
6169  A227  65 BC           ADC     R1
6170  A229  65 BC           ADC     R1
6171  A22B  65 BC           ADC     R1
6172  A22D  65 BC           ADC     R1
6173  A22F  65 BC           ADC     R1
6174  A231  A6 CB           LDX     DEFAULT+2
6175  A233  CA              DEX
6176  A234  86 BC           STX     R1
6177  A236  65 BC           ADC     R1
6178  A238  AA              TAX
6179  A239          DBLX            ;double it to get words
6187  A23F  BD BC F8        LDA     SOAKDURTBL,X
6188  A242  85 C9           STA     DEFAULT
6189  A244  BD BD F8        LDA     SOAKDURTBL+1,X
6190  A247  85 CA           STA     DEFAULT+1
6191  A249  60              RTS
6192
6193          SHOW_SITE:              ;show current site info
6194                                  ;in: VALVE
```

```
6195  A24A  20 82 A3          JSR     DKCLR
6196  A24D  20 4E A1          JSR     DSTA
6197  A250                    MESSAGE 109              ;want to see it?
6201  A255                    ON
6206  A25B  20 06 AB   SS14:  JSR     GETKEY
6207  A25E  C9 20             CMP     #OKKEY
6208  A260  F0 0C             BEQ     SS10
6209  A262  C9 10             CMP     #NOKEY
6210  A264  D0 01             BNE     SS15
6211  A266  60                RTS
6212  A267  C9 08      SS15:  CMP     #HELPKEY
6213  A269  D0 F0             BNE     SS14
6214  A26B  4C B5 A2          JMP     SS12
6215
6216  A26E  20 82 A3   SS10:  JSR     DKCLR            ;show site info
6217  A271  20 4E A1          JSR     DSTA
6218  A274  A9 3A             LDA     #':'
6219  A276  20 10 A3          JSR     DCHAR
6220  A279  A6 49             LDX     VALVE
6221  A27B  BD C0 02          LDA     TERRAIN,X
6222  A27E  18                CLC
6223  A27F  69 06             ADC     #214
6224  A281  AA                TAX
6225  A282  20 07 A2          JSR     DISPLAY_MSG
6226  A285                    BACKUP  1
6230  A28A  A9 2C             LDA     #','
6231  A28C  20 10 A3          JSR     DCHAR
6232  A28F                    SET_CURSOR LINE2
6236  A294  A6 49             LDX     VALVE
6237  A296  BD D4 02          LDA     SPRINKLER,X
6238  A299  18                CLC
6239  A29A  69 DC             ADC     #220
6240  A29C  AA                TAX
6241  A29D  20 07 A2          JSR     DISPLAY_MSG
6242  A2A0                    OK
6247  A2A6  20 06 AB   SS11:  JSR     GETKEY
6248  A2A9  C9 20             CMP     #OKKEY
6249  A2AB  F0 12             BEQ     SS13
6250  A2AD  C9 10             CMP     #NOKEY
6251  A2AF  F0 04             BEQ     SS12
6252  A2B1  C9 08             CMP     #HELPKEY
6253  A2B3  D0 F1             BNE     SS11
6254  A2B5             SS12:  HELP    76
6259  A2BC  4C 4F 9F          JMP     SHOW_START
6260  A2BF  60         SS13:  RTS
6261
6262
6263
6264
6265
6266  A2C0                    INCLUDE    SUBS.ASM
6267                   ;----------------------------------
6268                   ;    SUBROUTINES
6269                   ;----------------------------------
6270
6271  A2C0  DA         WAITMS: PHX                      ;wait 1 ms. * Y
6272  A2C1  A2 5A      WA0:   LDX     #90
```

```
6273  A2C3  CA              WA1:     DEX
6274  A2C4  D0 F0                    BNE    WA1
6275  A2C6  88                       DEY
6276  A2C7  D0 F8                    BNE    WA0
6277  A2C9  FA                       PLX
6278  A2CA  60                       RTS
6279
6280                        CALCSUM:                  ;read checksum data into A
6281  A2CB  A2 0F                    LDX    #15
6282  A2CD  18                       CLC
6283  A2CE  A9 00                    LDA    #0
6284  A2D0  7D 00 02        CS1:     ADC    CKDATA,X
6285  A2D3  CA                       DEX
6286  A2D4  D0 FA                    BNE    CS1
6287  A2D6  60                       RTS
6288
6289                        DISPLAY_MSG:              ;display message
6290                                                  ;in: X=index of msg, CURSOR
6291                                                  ;out: Y=length of msg, MSGPTR=next msg
6292  A2D7                           DBLX             ;get MSGPTR
6300  A2DD  90 0C                    BCC    DMSG1
6301  A2DF  BD E1 F4                 LDA    MSGTBL1,X     ;use bank 1
6302  A2E2  85 43                    STA    MSGPTR
6303  A2E4  BD E2 F4                 LDA    MSGTBL1+1,X
6304  A2E7  85 44                    STA    MSGPTR+1
6305  A2E9  80 0A                    BRA    DMSG
6306  A2EB  BD E1 F3        DMSG1:   LDA    MSGTBL,X      ;use bank 0
6307  A2EE  85 43                    STA    MSGPTR
6308  A2F0  BD E2 F3                 LDA    MSGTBL+1,X
6309  A2F3  85 44                    STA    MSGPTR+1
6310  A2F5  A0 00           DMSG:    LDY    #0            ;show msg at MSGPTR
6311  A2F7  B1 43                    LDA    (MSGPTR),Y    ;get length of msg
6312  A2F9  AA                       TAX
6313  A2FA  C8              M1:      INY
6314  A2FB  B1 43                    LDA    (MSGPTR),Y    ;get byte
6315  A2FD  20 10 A3                 JSR    DCHAR         ;display it
6316  A300  CA                       DEX                  ;until done
6317  A301  D0 F7                    BNE    M1
6318  A303  98                       TYA                  ;point MSGPTR to next msg
6319  A304  38                       SEC
6320  A305  65 43                    ADC    MSGPTR
6321  A307  85 43                    STA    MSGPTR
6322  A309  A5 44                    LDA    MSGPTR+1
6323  A30B  69 00                    ADC    #0
6324  A30D  85 44                    STA    MSGPTR+1
6325  A30F  60                       RTS
6326
6327
6328  A310  5A              DCHAR:   PHY                  ;display character in A
6329  A311  DA                       PHX
6330  A312  A6 18           DC0:     LDX    LCD_STATUS    ;wait for LCD ready
6331  A314  30 FC                    BMI    DC0
6332  A316  85 19                    STA    LCD_DATA      ;give LCD the data
6333  A318  E6 48                    INC    CURSOR
6334  A31A  A5 48                    LDA    CURSOR
6335  A31C  C9 10                    CMP    #$10          ;if 2nd line,
6336  A31E  D0 05                    BNE    DC1
```

```
6337  A320                    SET_CURSOR LINE2       ;then move cursor there
6341  A325  FA      DC1:  PLX
6342  A326  7A            PLY
6343  A327  60            RTS
6344
6345
6346  A328  A4 18   CMD:  LDY   LCD_STATUS           ;send cmd, X=index
6347  A32A  30 FC         BMI   CMD                  ;wait for ready
6348  A32C  BD CD F3 CMDNR: LDA  LCDTBL,X            ;get cmd from table
6349  A32F  85 18         STA   LCD_CMD              ;send cmd in A
6350  A331  60            RTS
6351
6352  A332          LCD_ON: SET LCD_POWER
6356  A336  A0 32         LDY   #50                  ;power on, wait
6357  A338  20 C0 A2      JSR   WAITMS
6358  A33B                SET   LCD_ENABLE           ;enable interface
6362  A33F  60            RTS
6363
6364                DISPLAY_ON:                       ;initialize LCD
6365  A340  A2 09         LDX   #9                   ;function set, wait
6366  A342  20 2C A3      JSR   CMDNR
6367  A345  A0 0A         LDY   #10
6368  A347  20 C0 A2      JSR   WAITMS
6369  A34A  A2 09         LDX   #9                   ;function set, wait
6370  A34C  20 2C A3      JSR   CMDNR
6371  A34F  A0 0A         LDY   #10
6372  A351  20 C0 A2      JSR   WAITMS
6373  A354  A2 05         LDX   #5                   ;display on, no cursor
6374  A356  20 28 A3      JSR   CMD
6375  A359  A2 02         LDX   #2                   ;entry mode set
6376  A35B  20 28 A3      JSR   CMD
6377  A35E  A2 01         LDX   #1                   ;cursor home
6378  A360  20 28 A3      JSR   CMD
6379  A363  64 48         STZ   CURSOR
6380
6381  A365  A2 0B         LDX   #11                  ;make the custom char
6382  A367  20 28 A3      JSR   CMD
6383  A36A  A2 00         LDX   #0
6384  A36C  BD D9 F3 DON1: LDA  CUSTOMTBL,X
6385  A36F  20 10 A3      JSR   DCHAR
6386  A372  E8            INX
6387  A373  E0 08         CPX   #8
6388  A375  D0 F5         BNE   DON1
6389  A377                SET_CURSOR 0
6393  A37C  60            RTS
6394
6395                DISPLAY_OFF:                      ;turn LCD off
6396  A37D  64 04         STZ   LCD_POWER
6397  A37F  64 05         STZ   LCD_ENABLE
6398  A381  60            RTS
6399
6400  A382  20 92 A3 DKCLR: JSR KEY_RESET             ;clear display and keys
6401
6402                DISPLAY_CLR:                      ;clear display, cursor at 0
6403  A385  A2 00         LDX   #0
6404  A387  20 28 A3      JSR   CMD
6405  A38A  64 48         STZ   CURSOR
```

```
6406  A38C  A2 00         LDX   #0          ;cmd twice, bug in LCD
6407  A38E  20 28 A3      JSR   CMD
6408  A391  60            RTS
6409
6410  A392         KEY_RESET:
6411  A392  64 6C         STZ   BLINK
6412  A394  64 5D         STZ   KEYPRESS
6413  A396  64 6B         STZ   INTCTR
6414  A398  64 60         STZ   REPEAT_MASK
6415  A39A  64 E2         STZ   INTCMD
6416  A39C  64 E3         STZ   CMDCTR
6417  A39E  60            RTS
6418
6419         INC_LCD_ADDR:               ;move LCD addr ahead A chars
6420  A39F  18            CLC
6421  A3A0  65 48         ADC   CURSOR
6422  A3A2  C9 10         CMP   #$10        ;if past line 1,
6423  A3A4                BLT   LCD_ADDR
6426  A3A6  29 0F         AND   #00001111B  ;then make it line 2
6427  A3A8  09 40         ORA   #01000000B
6428  A3AA  80 10         BRA   LCD_ADDR
6429
6430         DEC_LCD_ADDR:               ;move LCD addr back A chars
6431  A3AC  A8            TAY
6432  A3AD  A5 48         LDA   CURSOR
6433  A3AF  84 48         STY   CURSOR
6434  A3B1  38            SEC
6435  A3B2  E5 48         SBC   CURSOR
6436  A3B4  C9 40         CMP   #$40        ;if before line 2,
6437  A3B6                BGE   LCD_ADDR
6440  A3B8  29 0F         AND   #00001111B  ;than make it line 1
6441  A3BA  80 00         BRA   LCD_ADDR
6442
6443         LCD_ADDR:                   ;set cursor address in A
6444  A3BC  A4 18         LDY   LCD_STATUS
6445  A3BE  30 FC         BMI   LCD_ADDR
6446  A3C0  85 48         STA   CURSOR
6447  A3C2  0D D7 F3      ORA   ADDR_CMD
6448  A3C5  85 18         STA   LCD_CMD
6449  A3C7  60            RTS
6450
6451         CLR_LINE2:                  ;clear the second line of the display
6452  A3C8                SET_CURSOR LINE2
6456  A3CD  A2 10         LDX   #16
6457  A3CF  20 C2 AD      JSR   SPACES
6458  A3D2                SET_CURSOR LINE2
6462  A3D7  60            RTS
6463
6464         DISPLAY_WORD:               ;display MSB,LSB in hex
6465  A3D8  A5 42         LDA   MSB
6466  A3DA  6A            ROR   A
6467  A3DB  6A            ROR   A
6468  A3DC  6A            ROR   A
6469  A3DD  6A            ROR   A
6470  A3DE  20 01 A4      JSR   AASC
6471  A3E1  20 10 A3      JSR   DCHAR       ;hi nibble of MSB
6472  A3E4  A5 42         LDA   MSB
```

```
6473  A3E6  20 01 A4              JSR    AASC
6474  A3E9  20 10 A3              JSR    DCHAR        ;lo nibble of MSB
6475
6476                 DISPLAY_BYTE:                    ;display LSB in hex
6477  A3EC  A5 41                 LDA    LSB
6478  A3EE  6A                    ROR    A
6479  A3EF  6A                    ROR    A
6480  A3F0  6A                    ROR    A
6481  A3F1  6A                    ROR    A
6482  A3F2  20 01 A4              JSR    AASC
6483  A3F5  20 10 A3              JSR    DCHAR        ;hi nibble of LSB
6484  A3F8  A5 41                 LDA    LSB
6485  A3FA  20 01 A4              JSR    AASC
6486  A3FD  20 10 A3              JSR    DCHAR        ;lo nibble of LSB
6487  A400  60                    RTS
6488
6489
6490  A401  29 0F    AASC:        AND    00001111B    ;convert low 4 bits of A to ASCII char
6491  A403  C9 0A                 CMP    #10          ;if A>=10 then add 7
6492  A405  90 03                 BCC    LS5
6493  A407  18                    CLC
6494  A408  69 07                 ADC    #7
6495  A40A  18       LS5:         CLC
6496  A40B  69 30                 ADC    #30H         ;add 30H to make ASCII
6497  A40D  60                    RTS
6498
6499
6500  A40E           AD_ON:       SET    AD_POWER     ;turn A/D on
6504  A412  A0 1E                 LDY    #30
6505  A414  20 C8 A2              JSR    WAITMS
6506  A417                        SET    AD_ENABLE
6510  A41B  95 20                 STA    ADBASE,X     ;do dummy start to get EOC high
6511  A41D  A0 01                 LDY    #1
6512  A41F  20 C8 A2              JSR    WAITMS
6513  A422  60                    RTS
6514
6515  A423  64 02    AD_OFF:      STZ    AD_POWER     ;turn A/D off
6516  A425  64 03                 STZ    AD_ENABLE
6517  A427  60                    RTS
6518
6519  A428  78       TIMERON:     SEI                 ;TIMER counts system clock/16
6520                                                  ;= .000035 sec per count
6521  A429  A9 0A                 LDA    #10          ;set TIMER for 40 ms. interrupt
6522  A42B  85 08                 STA    TIMER_MSB    ;.040/.000035=1143
6523  A42D  A9 72                 LDA    #114         ;so count 10 groups of 114
6524  A42F  85 09                 STA    TIMER_LSB
6525  A431  85 0D                 STA    TIMER_LOAD
6526  A433                        SET    TIMER
6530  A437  58                    CLI
6531  A438  60                    RTS
6532
6533                 TIMER_OFF:                       ;turn TIMER off
6534  A439  64 0A                 STZ    TIMER
6535  A43B  78                    SEI
6536  A43C  60                    RTS
6537
6538                 READ:                            ;Read A/D channel in ADCHANNEL (0-15)
```

```
6539                                                  ;NO INTERRUPTS are allowed!
6540   A43D  A6 45              LDX   ADCHANNEL       ;set up AD mux and start convert
6541   A43F  95 20              STA   ADBASE,X
6542   A441  A0 64              LDY   #100            ;software timeout after 2ms.
6543   A443  88         REA1:   DEY
6544   A444  F0 11              BEQ   REA4
6545   A446  A5 13              LDA   STATUS2         ;Wait for EOC high
6546   A448  10 F9              BPL   REA1
6547   A44A  A0 64              LDY   #100
6548   A44C  88         REA3:   DEY
6549   A44D  F0 08              BEQ   REA4
6550   A44F  A5 13              LDA   STATUS2         ;Wait for EOC low
6551   A451  30 F9              BMI   REA3
6552   A453  A5 15              LDA   AD_DATA         ;read data
6553   A455  18                 CLC                   ;return carry clear if ok
6554   A456  60                 RTS
6555   A457  38         REA4:   SEC                   ;carry set if timeout
6556   A458  60                 RTS
6557
6558
6559                    VON:                           ;turn valve # VALVE on
6560                                                   ;in: VALVE, VALVEID()
6561                                                   ;out: VS bit0 = 1
6562   A459  A6 49              LDX   VALVE
6563   A45B  BD 7D 02           LDA   VS,X
6564   A45E  09 10              ORA   #00010000B
6565   A460  9D 7D 02           STA   VS,X
6566   A463  BD 89 02           LDA   VALVEID,X       ;VALVEID contains the proper
6567   A466  85 06      V01:    STA   VALVE_SETUP     ;valve position (A-H) and polarity
6568   A468  A5 60              LDA   FLAGS           ;if battery present,
6569   A46A  29 01              AND   #00000001B
6570   A46C  F0 0B              BEQ   V05
6571   A46E                     SET   VALVE_ENABLE
6575   A472  A0 38              LDY   #56             ;then wait via software loop
6576   A474  20 C0 A2           JSR   WAITMS
6577   A477  80 10              BRA   V04
6578   A479  64 46      V05:    STZ   TIMCTR          ;else wait via INT
6579   A47B                     SET   VALVE_ENABLE
6583   A47F  20 28 A4           JSR   TIMERON
6584   A482  A5 46      V02:    LDA   TIMCTR          ;wait for 40 ms. (one INT)
6585   A484  F0 FC              BEQ   V02
6586   A486  20 39 A4           JSR   TIMER_OFF
6587   A489  64 07      V04:    STZ   VALVE_ENABLE
6588   A48B  60                 RTS
6589
6590                    VOFF:                          ;turn valve # VALVE off
6591                                                   ;in: VALVE, VALVEID()
6592                                                   ;out: VS bit 0=0
6593   A48C  A6 49              LDX   VALVE
6594   A48E  BD 7D 02           LDA   VS,X
6595   A491  29 EF              AND   #11101111B
6596   A493  9D 7D 02           STA   VS,X
6597   A496  BD 89 02           LDA   VALVEID,X
6598   A499  49 40              EOR   #01000000B      ;reverse the polarity
6599   A49B  80 C9              BRA   V01
6600
6601                    ALL_VALVES_OFF:                ;turn all valves off that are on
```

```
6602                                                  ;carry set if any valves turned off
6603  A49D  9C 7D 02           STZ    VS
6604  A4A0  A9 08              LDA    #8
6605  A4A2  85 49              STA    VALVE
6606  A4A4  A6 49       AV0:   LDX    VALVE
6607  A4A6  BD 7D 02           LDA    VS,X
6608  A4A9  29 10              AND    #00010000B
6609  A4AB  F0 08              BEQ    AV1
6610  A4AD  20 8C A4           JSR    VOFF
6611  A4B0                     SET    VS
6615  A4B5  C6 49       AV1:   DEC    VALVE
6616  A4B7  D0 EB              BNE    AV0
6617  A4B9  AD 7D 02           LDA    VS
6618  A4BC  D0 02              BNE    AV2
6619  A4BE  18                 CLC
6620  A4BF  60                 RTS
6621  A4C0  38          AV2:   SEC
6622  A4C1  60                 RTS
6623
6624                      VALVE_HI:                   ;set VALVE +=hi, -=tristate
6625                                                  ;in: valve 1-8
6626  A4C2  A5 49              LDA    VALVE
6627  A4C4  38                 SEC
6628  A4C5  E9 01              SBC    #1
6629  A4C7  29 07       VHI:   AND    #00000111B      ;alt entry, position # in A
6630  A4C9  D0 02              BNE    VH0             ;- is set at position 0
6631  A4CB  09 38              ORA    #00111000B      ;if valve=0, then set - not position 0
6632  A4CD  09 00       VH0:   ORA    #POS
6633  A4CF  85 06              STA    VALVE_SETUP
6634  A4D1                     SET    VALVE_ENABLE
6638  A4D5  60                 RTS
6639
6640                      READ_RTC:                   ;read real time counter into MSB,LSB
6641  A4D6  A5 11              LDA    RTC_LSB         ;do it twice in case update in progress
6642  A4D8  85 41              STA    LSB
6643  A4DA  A5 11              LDA    RTC_LSB
6644  A4DC  C5 41              CMP    LSB
6645  A4DE  D0 F6              BNE    READ_RTC
6646  A4E0  A5 10       RRB:   LDA    RTC_MSB
6647  A4E2  85 42              STA    MSB
6648  A4E4  A5 10              LDA    RTC_MSB
6649  A4E6  C5 42              CMP    MSB
6650  A4E8  D0 EC              BNE    READ_RTC
6651  A4EA  A5 41              LDA    LSB             ;return Z flag if zero
6652  A4EC  05 42              ORA    MSB
6653  A4EE  60                 RTS
6654
6655                      UPDATE_CLOCK:               ;increment clock
6656  A4EF  20 00 A5           JSR    BUMP_CLOCK      ;read and reset counter
6657  A4F2  20 F9 A4           JSR    CLR_RTC
6658  A4F5  20 CF 81           JSR    WATER           ;do watering task
6659  A4F8  60                 RTS
6660
6661                      CLR_RTC:                    ;reset RTC counter to 0
6662  A4F9  64 01              STZ    RTC_CLR
6663  A4FB  A5 11              LDA    RTC_LSB
6664  A4FD  A5 10              LDA    RTC_MSB
```

```
6665  A4FF  60                        RTS
6666
6667              BUMP_CLOCK:              ;minutes in A  ((=60)
6668  A500  18                        CLC
6669  A501  6D 77 02                  ADC   MINUTE
6670  A504  8D 77 02                  STA   MINUTE
6671  A507  C9 3C                     CMP   #60
6672  A509                            BLT   UC4
6675  A50B  38                        SEC            ;if )=60 minutes,
6676  A50C  AD 77 02                  LDA   MINUTE
6677  A50F  E9 3C                     SBC   #60      ;then subtract 60 minutes
6678  A511  8D 77 02                  STA   MINUTE
6679  A514  EE 76 02      UC1:        INC   HOUR     ;and add 1 hour
6680  A517  AD 76 02                  LDA   HOUR
6681  A51A  C9 18                     CMP   #24
6682  A51C                            BLT   UC4
6685  A51E  9C 76 02                  STZ   HOUR     ;if midnight, then new day
6686  A521  EE 7A 02                  INC   DAY
6687  A524  EE 7B 02                  INC   DOW
6688  A527  AD 78 02                  LDA   DOW      ;new day of the week
6689  A52A  C9 08                     CMP   #8
6690  A52C  D0 08                     BNE   UC2
6691  A52E                            SET   DOW
6695  A533  20 50 83                  JSR   INCDAYNUM ;new day number for watering
6696  A536  AD 7A 02      UC2:        LDA   DAY
6697  A539  CD 7C 02                  CMP   DIM
6698  A53C  F0 3A                     BEQ   UC4
6699  A53E                            BLT   UC4
6702  A540                            SET   DAY      ;new month, day=1
6706  A545  EE 79 02                  INC   MONTH
6707  A548  AD 79 02                  LDA   MONTH
6708  A54B  C9 0D                     CMP   #13
6709  A54D                            BLT   UC3
6712  A54F                            SET   MONTH    ;new year, month=1
6716  A554  EE 7B 02                  INC   YEAR
6717  A557  AD 7B 02                  LDA   YEAR
6718  A55A  C9 64                     CMP   #100
6719  A55C  D0 03                     BNE   UC3
6720  A55E  9C 7B 02                  STZ   YEAR
6721  A561  AE 79 02      UC3:        LDX   MONTH    ;find # of days in month
6722  A564  BD 88 F7                  LDA   DAYTBL,X
6723  A567  8D 7C 02                  STA   DIM
6724  A56A  C9 02                     CMP   #2       ;if FEB
6725  A56C  D0 0A                     BNE   UC4
6726  A56E  AD 7B 02                  LDA   YEAR
6727  A571  29 03                     AND   #00000011B  ;and leap year
6728  A573  D0 03                     BNE   UC4
6729  A575  EE 7C 02                  INC   DIM      ;then add a day
6730  A578  38            UC4:        SEC
6731  A579  60                        RTS
6732
6733              DISPLAY_DOW:              ;display day of the week in IBFR+6
6734  A57A  A5 67                     LDA   IBFR+6
6735  A57C  18                        CLC
6736  A57D  69 5A                     ADC   #90
6737  A57F  AA                        TAX
6738  A580  20 07 A2                  JSR   DISPLAY_MSG
```

```
6739  A583  60              RTS
6740
6741              DISPLAY_DATE:              ;display month, day, yr in IBFR+7
6742  A584  20 A1 A5        JSR   DISPLAY_MONTH
6743  A587                  SKIP  1
6747  A58C  A5 69           LDA   IBFR+8       ;day
6748  A58E  20 9C A6        JSR   D2D
6749  A591  A9 2C           LDA   #','
6750  A593  20 10 A3        JSR   DCHAR
6751  A596  A9 27           LDA   #$27
6752  A598  20 10 A3        JSR   DCHAR
6753  A59B  A5 6A           LDA   IBFR+9       ;year
6754  A59D  20 C2 A6        JSR   D2NS
6755  A5A0  60              RTS
6756
6757              DISPLAY_MONTH:               ;display the month in IBFR+7
6758  A5A1  A5 68           LDA   IBFR+7
6759  A5A3  18              CLC
6760  A5A4  69 4C           ADC   #76
6761  A5A6  AA              TAX
6762  A5A7  20 D7 A2        JSR   DISPLAY_MSG
6763  A5AA  60              RTS
6764
6765  A5AB  A5 D7   DSUB:   LDA   SUB          ;show msg for which valve setup
6766  A5AD  18              CLC
6767  A5AE  69 94           ADC   #148
6768  A5B0  AA              TAX
6769  A5B1  20 D7 A2        JSR   DISPLAY_MSG
6770  A5B4  60              RTS
6771
6772              DSTART:                      ;display the start time at
6773  A5B5  B1 75           LDA   (SRCPTR),Y   ;(SRCPTR),Y
6774  A5B7  85 65           STA   IBFR+4
6775  A5B9  C8              INY
6776  A5BA  B1 75           LDA   (SRCPTR),Y
6777  A5BC  85 66           STA   IBFR+5       ;show it at CURSOR
6778
6779              DISPTIME:                    ;display the hour and minute
6780                                           ;IBFR+4= hour, minute
6781  A5BE  A5 65           LDA   IBFR+4       ;show 12 if hour=0
6782  A5C0  F0 09           BEQ   DT3
6783  A5C2  C9 0D           CMP   #13
6784  A5C4                  BLT   DT0
6787  A5C6  38              SEC                ;if hour>12 then show hour-12
6788  A5C7  E9 0C           SBC   #12
6789  A5C9  80 02           BRA   DT0
6790  A5CB  A9 0C   DT3:    LDA   #12
6791  A5CD  20 9C A6 DT0:   JSR   D2D
6792  A5D0  A9 3A           LDA   #':'
6793  A5D2  20 10 A3        JSR   DCHAR
6794  A5D5  A5 66           LDA   IBFR+5       ;show minute
6795  A5D7  20 C2 A6        JSR   D2NS         ;without suppressing leading 0
6796  A5DA  A5 65           LDA   IBFR+4
6797  A5DC  C9 00           CMP   #0
6798  A5DE  F0 08           BEQ   DT1
6799  A5E0  C9 0C           CMP   #12          ;show am or pm
6800  A5E2                  BLT   DT1
```

```
6803  A5E4  A9 70              LDA    #'p'
6804  A5E6  80 02              BRA    DT2
6805  A5E8  A9 61       DT1:   LDA    #'a'
6806  A5EA  20 10 A3    DT2:   JSR    DCHAR
6807  A5ED  A9 6D              LDA    #'m'
6808  A5EF  20 10 A3           JSR    DCHAR
6809  A5F2  60          DT10:  RTS
6810
6811  A5F3              DDUR:
6812                    DISPDURATION:                  ;display the hour and minute 0h+00m
6813                                                   ;IBFR+4= hour, minute
6814  A5F3  A5 65       DD1:   LDA    IBFR+4           ;show hour
6815  A5F5  09 30              ORA    #ASCMASK
6816  A5F7  20 10 A3           JSR    DCHAR
6817  A5FA  A9 68       DD0:   LDA    #'h'
6818  A5FC  20 10 A3           JSR    DCHAR
6819  A5FF  A9 2B       DD2:   LDA    #'+'
6820  A601  20 10 A3           JSR    DCHAR
6821  A604  A5 66              LDA    IBFR+5           ;show minute
6822  A606  20 9C A6           JSR    D2D              ;without suppressing leading 0
6823  A609  A9 6D              LDA    #'m'
6824  A60B  20 10 A3           JSR    DCHAR
6825  A60E  60          DD3:   RTS
6826
6827                    DISPCYCLE:                     ;show cycle info @ CURSOR
6828                                                   ;in: CYCLE_TYPE=0:
6829                                                   ;    IBFR= 1-90 days, IBFR+1=1
6830                                                   ;in: CYCLE_TYPE=1:
6831                                                   ;    IBFR= cycle in weeks (1-9)
6832                                                   ;    IBFR+1= the specific days (SMTWTFSS)
6833  A60F  AD 41 15           LDA    CYCLE_TYPE
6834  A612  D0 16              BNE    DMC5
6835  A614                     MESSAGE 38
6839  A619  A5 61              LDA    IBFR             ;## days
6840  A61B  20 9C A6           JSR    D2D
6841  A61E                     MESSAGE 33
6845  A623                     SKIP   1
6849  A628  80 3E              BRA    DMC20
6850  A62A  A5 61       DMC5:  LDA    IBFR
6851  A62C  C9 01              CMP    #1
6852  A62E  F0 2B              BEQ    DMC10
6853  A630  A5 62       DMC0:  LDA    IBFR+1           ;cycle > 1 week
6854  A632  F0 19              BEQ    DMC2
6855  A634  18                 CLC
6856  A635  A2 01              LDX    #1
6857  A637  2A                 ROL    A
6858  A638  2A          DMC3:  ROL    A
6859  A639  B0 03              BCS    DMC1
6860  A63B  E8                 INX
6861  A63C  80 FA              BRA    DMC3
6862  A63E  86 67       DMC1:  STX    IBFR+6           ;show day of week
6863  A640  20 7A A5           JSR    DISPLAY_DOW
6864  A643                     SKIP   1
6868  A648                     MESSAGE 38
6872  A64D  A5 61       DMC2:  LDA    IBFR             ;show how many weeks
6873  A64F  09 30              ORA    #ASCMASK
6874  A651  20 10 A3           JSR    DCHAR
```

```
6875  A654              MESSAGE 35
6879  A659  80 8D       BRA     DMC20
6888  A65B        DMC10: MESSAGE 38              ;weekly cycle
6884  A660  20 69 A6    JSR     DSP
6885  A663              SKIP    1
6889  A668  60    DMC20: RTS
6890
6891              DSP:                           ;show specific days
6892                                             ;in: cycle byte in IBFR+1
6893  A669  A5 62       LDA     IBFR+1           ;IMTWTFSS
6894  A66B  85 41       STA     LSB
6895  A66D  A2 00       LDX     #0
6896  A66F  26 41       ROL     LSB
6897  A671  26 41  DP11: ROL    LSB
6898  A673  90 05       BCC     DP12
6899  A675  BD 44 FB    LDA     SDTBL,X          ;day set, show first letter of day
6900  A678  80 02       BRA     DP13
6901  A67A  A9 2D  DP12: LDA    #'-'             ;day not set, show -
6902  A67C  20 10 A3 DP13: JSR   DCHAR
6903  A67F  E8          INX
6904  A680  E0 07       CPX     #7
6905  A682  D0 ED       BNE     DP11
6906  A684  60          RTS
6907
6908
6909  A685  20 DB A6  D3D: JSR   BINDEC           ;display byte in A as 3 digits
6910  A688  A5 6F       LDA     DIGIT
6911  A68A  C9 30       CMP     #'0'
6912  A68C  D0 07       BNE     D31
6913  A68E  A9 20       LDA     #' '
6914  A690  20 10 A3    JSR     DCHAR
6915  A693  80 1C       BRA     D20
6916  A695  A5 6F  D31: LDA     DIGIT
6917  A697  20 10 A3    JSR     DCHAR
6918  A69A  80 29       BRA     D2N1
6919
6920  A69C  20 DB A6  D2D: JSR   BINDEC           ;dispay byte in A is 2 digits, 99 max.
6921  A69F  A5 6F       LDA     DIGIT
6922  A6A1  C9 30       CMP     #'0'
6923  A6A3  F0 0C       BEQ     D20
6924  A6A5  A9 39       LDA     #'9'
6925  A6A7  20 10 A3    JSR     DCHAR
6926  A6AA  A9 39       LDA     #'9'
6927  A6AC  20 10 A3    JSR     DCHAR
6928  A6AF  80 10       BRA     D21
6929  A6B1  A5 70  D20: LDA     DIGIT+1
6930  A6B3  C9 30       CMP     #'0'
6931  A6B5  D0 02       BNE     D22
6932  A6B7  A9 20       LDA     #' '
6933  A6B9  20 10 A3  D22: JSR   DCHAR
6934  A6BC  A5 71  D23: LDA     DIGIT+2
6935  A6BE  20 10 A3    JSR     DCHAR
6936  A6C1  60    D21: RTS
6937
6938  A6C2  20 DB A6  D2NS: JSR  BINDEC           ;display byte in A as 2 digits
6939  A6C5  A5 70  D2N1: LDA    DIGIT+1          ;no leading 0 supression
6940  A6C7  20 10 A3    JSR     DCHAR
```

```
6941  A6CA  A5 71              LDA      DIGIT+2
6942  A6CC  20 10 A3           JSR      DCHAR
6943  A6CF  60                 RTS
6944
6945  A6D0  AA       DINDEC:   TAX                        ;convert byte in A to 3 digits at DIGIT
6946  A6D1  A9 30              LDA      #'0'
6947  A6D3  85 6F              STA      DIGIT
6948  A6D5  85 70              STA      DIGIT+1
6949  A6D7  85 71              STA      DIGIT+2
6950  A6D9  8A       BD0:      TXA
6951  A6DA  38                 SEC
6952  A6DB  E9 64              SBC      #100
6953  A6DD  90 05              BCC      BD1
6954  A6DF  AA                 TAX                        ;if >=100, then inc DIGIT
6955  A6E0  E6 6F              INC      DIGIT
6956  A6E2  80 F5              BRA      BD0
6957  A6E4  8A       BD1:      TXA
6958  A6E5  38                 SEC
6959  A6E6  E9 0A              SBC      #10
6960  A6E8  90 05              BCC      BD2
6961  A6EA  AA                 TAX                        ;if >=10, then inc DIGIT+1
6962  A6EB  E6 70              INC      DIGIT+1
6963  A6ED  80 F5              BRA      BD1
6964  A6EF  8A       BD2:      TXA                        ;<10, add to DIGIT+2
6965  A6F0  18                 CLC
6966  A6F1  65 71              ADC      DIGIT+2
6967  A6F3  85 71              STA      DIGIT+2
6968  A6F5  60                 RTS
6969
6970                 OBJCLEAR:                             ;clear the object area
6971  A6F6  A2 AB              LDX      #171               ;all 172 bytes
6972  A6F8  A9 00              LDA      #0
6973  A6FA  9D 40 15 OC1:      STA      OBJBASE,X
6974  A6FD  CA                 DEX
6975  A6FE  D0 FA              BNE      OC1
6976  A700  9C 40 15           STZ      OBJBASE
6977  A703  9C EC 15           STZ      NSTARTS
6978  A706  60                 RTS
6979
6980                 S20:                                  ;move source code to object area
6981                                                       ;in: SOURCE
6982  A707  A6 BB              LDX      SOURCE
6983  A709           DBLX
6991  A70F  BD 02 FB           LDA      SOURCEADDR,X       ;move valve settings from source
6992  A712  85 75              STA      SRCPTR
6993  A714  BD 03 FB           LDA      SOURCEADDR+1,X
6994  A717  85 76              STA      SRCPTR+1
6995  A719  BD 1A FB           LDA      OBJECTADDR,X       ;to object
6996  A71C  85 77              STA      DESTPTR
6997  A71E  BD 1B FB           LDA      OBJECTADDR+1,X
6998  A721  85 78              STA      DESTPTR+1
6999  A723  BD 2C FB           LDA      SOURCELEN,X
7000  A726  85 73              STA      CTR
7001  A728  BD 2D FB           LDA      SOURCELEN+1,X
7002  A72B  85 74              STA      CTR+1
7003  A72D  20 5B A7           JSR      BLOCK_MOVE
7004  A730  60                 RTS
```

```
7005
7006                    O2S:                            ;move object back to source
7007   A731  A6 BB              LDX    SOURCE
7008   A733                     DBLX
7016   A739  BD 1A F8           LDA    OBJECTADDR,X     ;move valve settings from object
7017   A73C  85 75              STA    SRCPTR
7018   A73E  BD 1B F8           LDA    OBJECTADDR+1,X
7019   A741  85 76              STA    SRCPTR+1
7020   A743  BD 02 F8           LDA    SOURCEADDR,X     ;to source
7021   A746  85 77              STA    DESTPTR
7022   A748  BD 03 F8           LDA    SOURCEADDR+1,X
7023   A74B  85 78              STA    DESTPTR+1
7024   A74D  BD 2C F8           LDA    SOURCELEN,X
7025   A750  85 73              STA    CTR
7026   A752  BD 2D F8           LDA    SOURCELEN+1,X
7027   A755  85 74              STA    CTR+1
7028   A757  20 5B A7           JSR    BLOCK_MOVE
7029   A75A  60                 RTS
7030
7031
7032                    BLOCK_MOVE:                     ;move CTR bytes from SRCPTR to DESTPTR
7033   A75B  A5 73              LDA    CTR              ;while CTR <>0,
7034   A75D  05 74              ORA    CTR+1
7035   A75F  F0 1A              BEQ    BLDONE
7036   A761  B2 75              LDA    (SRCPTR)
7037   A763  92 77              STA    (DESTPTR)        ;move data
7038   A765  E6 75              INC    SRCPTR           ;inc source addr
7039   A767  D0 02              BNE    BL1
7040   A769  E6 76              INC    SRCPTR+1
7041   A76B  E6 77     BL1:     INC    DESTPTR          ;inc destination addr
7042   A76D  D0 02              BNE    BL2
7043   A76F  E6 78              INC    DESTPTR+1
7044   A771  A5 73     BL2:     LDA    CTR              ;dec 16 bit counter
7045   A773  D0 02              BNE    BL3
7046   A775  C6 74              DEC    CTR+1
7047   A777  C6 73     BL3:     DEC    CTR
7048   A779  80 E0              BRA    BLOCK_MOVE
7049   A77B  60        BLDONE:  RTS
7050
7051
7052                    GETTIME:                        ;get time
7053                                                    ;in: CURSOR, time in IBFR+4
7054                                                    ;out: time in IBFR+4, carry set if HELP key
7055   A77C                     FAST   NOKEY
7061   A784            GT0:     NOBLINK                 ;get hour
7065   A788                     ANFAST
7069   A78C  A5 65              LDA    IBFR+4           ;show selected hour
7070   A78E  F0 09              BEQ    GT5
7071   A790  C9 0D              CMP    #13
7072   A792                     BLT    GT6
7075   A794  38                 SEC
7076   A795  E9 0C              SBC    #12
7077   A797  80 02              BRA    GT6
7078   A799  A9 0C     GT5:     LDA    #12
7079   A79B  20 9C A6  GT6:     JSR    D2D
7080   A79E  A9 3A              LDA    #':'
7081   A7A0  20 1D A3           JSR    DCHAR
```

```
7082  A7A3  A5 65            LDA     IBFR+4
7083  A7A5  D0 07            BNE     GT1
7084  A7A7                   MESSAGE 144        ;midnite, hr=0
7088  A7AC  80 29            BRA     GT10
7089  A7AE  C9 0C    GT1:    CMP     #12
7090  A7B0  D0 07            BNE     GT2
7091  A7B2                   MESSAGE 145        ;noon, hr=12
7095  A7B7  80 1E            BRA     GT10
7096  A7B9  A9 20    GT2:    LDA     #' '
7097  A7BB  20 10 A3         JSR     DCHAR
7098  A7BE  A9 20            LDA     #' '
7099  A7C0  20 10 A3         JSR     DCHAR
7100  A7C3  A5 65            LDA     IBFR+4
7101  A7C5  C9 0C            CMP     #12
7102  A7C7                   BLT     GT3
7105  A7C9  A9 70            LDA     #'p'       ;pm, hr>12
7106  A7CB  80 02            BRA     GT4
7107  A7CD  A9 61    GT3:    LDA     #'a'       ;am, hr<12
7108  A7CF  20 10 A3  GT4:   JSR     DCHAR
7109  A7D2  A9 6D            LDA     #'m'
7110  A7D4  20 10 A3         JSR     DCHAR
7111  A7D7             GT10: BACKUP  7
7115  A7DC                   UL                 ;use underline
7122  A7E2  20 06 AB  GT22:  JSR     GETKEY     ;wait for an answer
7123  A7E5  C9 20            CMP     #OKKEY
7124  A7E7  F0 16            BEQ     GT25       ;ok
7125  A7E9  C9 10            CMP     #NOKEY
7126  A7EB  F0 06            BEQ     GT23       ;change
7127  A7ED  C9 08            CMP     #HELPKEY
7128  A7EF  F0 4A            BEQ     GTHELP
7129  A7F1  80 EF            BRA     GT22
7130  A7F3  E6 65    GT23:   INC     IBFR+4     ;next
7131  A7F5  A5 65            LDA     IBFR+4
7132  A7F7  C9 18            CMP     #24
7133  A7F9  D0 B9            BNE     GT0
7134  A7FB  64 65            STZ     IBFR+4
7135  A7FD  80 B5            BRA     GT0
7136  A7FF  20 BE A5  GT25:  JSR     DISPTIME   ;show selected hour in am/pm format
7137  A802                   BACKUP  4
7141
7142  A807             GT30: NOBLINK            ;get minute
7146  A80B  A5 66            LDA     IBFR+5
7147  A80D  20 C2 A6         JSR     D2NS
7148  A810                   BACKUP  2
7152  A815                   UL                 ;use underline
7159  A81B  20 06 AB  GT32:  JSR     GETKEY     ;wait for an answer
7160  A81E  C9 20            CMP     #OKKEY
7161  A820  F0 16            BEQ     GTOK       ;minute ok
7162  A822  C9 10            CMP     #NOKEY
7163  A824  F0 06            BEQ     GT33       ;change minute
7164  A826  C9 08            CMP     #HELPKEY
7165  A828  F0 11            BEQ     GTHELP
7166  A82A  80 EF            BRA     GT32
7167  A82C  E6 66    GT33:   INC     IBFR+5     ;next minute
7168  A82E  A5 66            LDA     IBFR+5
7169  A830  C9 3C            CMP     #60
7170  A832  D0 D3            BNE     GT30
```

```
7171  A834  64 66            STZ     IBFR+5
7172  A836  80 CF            BRA     GT30
7173  A838  18       GTOK:   CLC
7174  A839  80 01            BRA     GT3A
7175  A83B  38       GTHELP: SEC
7176  A83C           GT3A:   ANOFF
7179  A83E  60               RTS
7180
7181
7182           GETDUR8:                          ;get duration, 8hr. max
7183  A83F  A9 08            LDA     #8
7184  A841  85 E1            STA     R5
7185  A843  80 04            BRA     GU0
7186
7187           GETDURATION:                      ;get duration in hr, min
7188                                             ;in: CURSOR, time in IBFR+4
7189                                             ;out: time in IBFR+4, carry set if HELP key
7190  A845  A9 04            LDA     #4
7191  A847  85 E1            STA     R5
7192  A849           GU0:    FAST    NOKEY
7198  A851           GU20:   NOBLINK                ;get hour
7202  A855                   ANFAST
7206  A859  A5 65            LDA     IBFR+4
7207  A85B  09 30            ORA     #ASCMASK
7208  A85D  20 10 A3         JSR     DCHAR
7209  A860  A9 68            LDA     #'h'
7210  A862  20 10 A3         JSR     DCHAR
7211  A865  A9 2B            LDA     #'+'
7212  A867  20 10 A3         JSR     DCHAR
7213  A86A  A5 65            LDA     IBFR+4
7214  A86C  C5 E1            CMP     R5            ;if 4hr, show 4:00
7215  A86E  D0 07            BNE     GU10
7216  A870  A9 00            LDA     #0
7217  A872  20 C2 A6         JSR     02NS
7218  A875  80 05            BRA     GU11
7219  A877  A5 66    GU10:   LDA     IBFR+5
7220  A879  20 9C A6         JSR     D2D
7221  A87C  A9 60    GU11:   LDA     #'a'
7222  A87E  20 10 A3         JSR     DCHAR
7223  A881           BACKUP  6
7227  A886           UL                             ;use underline
7234  A88C  20 06 AB GU22:   JSR     GETKEY         ;wait for an answer
7235  A88F  C9 20            CMP     #OKKEY
7236  A891  F0 19            BEQ     GU28           ;hour ok
7237  A893  C9 10            CMP     #NOKEY
7238  A895  F0 06            BEQ     GU23           ;change hour
7239  A897  C9 08            CMP     #HELPKEY
7240  A899  F0 54            BEQ     GUHELP
7241  A89B  80 EF            BRA     GU22
7242  A89D  E6 65    GU23:   INC     IBFR+4         ;next hour
7243  A89F  A5 65            LDA     IBFR+4
7244  A8A1  38               SEC
7245  A8A2  E9 01            SBC     #1
7246  A8A4  C5 E1            CMP     R5
7247  A8A6  D0 A9            BNE     GU20
7248  A8A8  64 65            STZ     IBFR+4
7249  A8AA  80 A5            BRA     GU20
```

```
7250  A8AC  A5 65        6U28:   LDA    IBFR+4
7251  A8AE  C5 E1                CMP    R5
7252  A8B0  D0 04                BNE    6U29
7253  A8B2  64 66                STZ    IBFR+5
7254  A8B4  80 36                BRA    6UOK
7255  A8B6               6U29:   SKIP   3
7259  A8BB               6U30:   NOBLINK                  ;get minute
7263  A8BF  A5 66                LDA    IBFR+5
7264  A8C1  20 9C A6             JSR    B2D
7265  A8C4                       BACKUP 2
7269  A8C9                       UL                       ;use underline
7276  A8CF  20 06 A8     6U32:   JSR    GETKEY            ;wait for an answer
7277  A8D2  C9 20                CMP    #OKKEY
7278  A8D4  F0 16                BEQ    6UOK              ;minute ok
7279  A8D6  C9 10                CMP    #NOKEY
7280  A8D8  F0 06                BEQ    6U33              ;change minute
7281  A8DA  C9 08                CMP    #HELPKEY
7282  A8DC  F0 11                BEQ    6UHELP
7283  A8DE  80 EF                BRA    6U32
7284  A8E0  E6 66        6U33:   INC    IBFR+5            ;next minute
7285  A8E2  A5 66                LDA    IBFR+5
7286  A8E4  C9 3C                CMP    #60
7287  A8E6  D0 D3                BNE    6U30
7288  A8E8  64 66                STZ    IBFR+5
7289  A8EA  80 CF                BRA    6U30
7290  A8EC  18           6UOK:   CLC
7291  A8ED  80 01                BRA    6U3A
7292  A8EF  38           6UHELP: SEC
7293  A8F0               6U3A:   ANOFF
7296  A8F2  60                   RTS
7297
7298                     GETNUM10:                         ;increment by 10
7299  A8F3  A9 0A                LDA    #10
7300  A8F5  85 BF                STA    R4
7301  A8F7  80 04                BRA    GNUM
7302
7303
7304                     GETNUM:                           ;get a number from the user
7305                                                       ;in: IBFR=present number
7306                                                       ;    IBFR+1=lo limit
7307                                                       ;    IBFR+2=upper limit
7308                                                       ;    CURSOR
7309                                                       ;out: carry clear:
7310                                                       ;    IBFR,A = selected number
7311                                                       ;    carry set:
7312                                                       ;    HELP requested, IBFR=number
7313  A8F9                       SET    R4
7317  A8FD               GNUM:   FAST   NOKEY
7323  A905               GN0:    NOBLINK
7327  A909                       ANFAST
7331  A90D  A5 61                LDA    IBFR             ;if num>upper limit
7332  A90F  C5 63                CMP    IBFR+2
7333  A911                       BLT    GN1
7336  A913  F0 04                BEQ    GN1
7337  A915  A5 62                LDA    IBFR+1           ;then num=lo limit
7338  A917  85 61                STA    IBFR
7339  A919  A5 63        GN1:    LDA    IBFR+2           ;if num>=100
```

```
7340  A91B  C9 64              CMP    #100
7341  A91D                     BLT    GN2
7344  A91F  A5 61              LDA    IBFR           ;then display 3 digits
7345  A921  20 85 A6           JSR    $30
7346  A924                     BACKUP 3
7350  A929  80 1C              BRA    GN4
7351  A92B  C9 0A       GN2:   CMP    #10            ;if num>=10
7352  A92D                     BLT    GN3
7355  A92F  A5 61              LDA    IBFR           ;then display 2 digits
7356  A931  20 9C A6           JSR    $2D
7357  A934                     BACKUP 2
7361  A939  80 0C              BRA    GN4
7362  A93B  A5 61       GN3:   LDA    IBFR
7363  A93D  09 30              ORA    #ASCMASK       ;else display 1 digit
7364  A93F  20 10 A3           JSR    DCHAR
7365  A942                     BACKUP 1
7369  A947              GN4:   UL
7376  A94D  20 06 AB    GN5:   JSR    GETKEY         ;wait for key
7377  A950  C9 20              CMP    #OKKEY
7378  A952  F0 11              BEQ    GNOK
7379  A954  C9 8B              CMP    #HELPKEY
7380  A956  F0 12              BEQ    GNHELP
7381  A958  C9 10              CMP    #NOKEY
7382  A95A  D0 F1              BNE    GN5
7383  A95C  A5 61              LDA    IBFR           ;NO key, inc num
7384  A95E  18                 CLC
7385  A95F  65 BF              ADC    R4
7386  A961  85 61              STA    IBFR
7387  A963  80 A0              BRA    GN0
7388  A965  A5 61       GNOK:  LDA    IBFR           ;OK, return num and carry clear
7389  A967  18                 CLC
7390  A968  80 01              BRA    GN6
7391  A96A  38          GNHELP: SEC                  ;HELP, return carry set
7392  A96B              GN6:   AMOFF
7395  A96D  60                 RTS
7396
7397                           ;get a selection via messages with auto NO key
7398                                  ;in: IBFR=present selection
7399                                  ;    IBFR+1=lo limit
7400                                  ;    IBFR+2=upper limit
7401                                  ;    IBFR+3=msg number for lo limit
7402                                  ;    (all messages must be same length)
7403                                  ;    CURSOR
7404                                  ;out: carry clear:
7405                                  ;     IBFR,A = selected number
7406                                  ;     carry set:
7407                                  ;     HELP requested, IBFR=number
7408
7409  A96E  A9 01       GETMUL: LDA   #1             ;use medium speed and underline
7410  A970  8D 73 02           STA    SEL1
7411  A973  A9 02              LDA    #2
7412  A975  8D 74 02           STA    SEL2
7413  A978  80 1B              BRA    GM
7414
7415  A97A  A9 05       GETSOK: LDA   #5             ;use slow speed and OK char
7416  A97C  8D 73 02           STA    SEL1
7417  A97F  A9 01              LDA    #1
```

```
7418   A981   8D 74 02               STA    SEL2
7419   A984   80 0C                  BRA    6M
7420
7421   A986   A9 05         GETMOK:  LDA    #5              ;use medium speed and OK char
7422   A988   8D 73 02               STA    SEL1
7423   A98B   A9 02                  LDA    #2
7424   A98D   8D 74 02               STA    SEL2
7425   A990   80 00                  BRA    6M
7426
7427   A992         6M:              SLOW   NOKEY
7433   A99A                          NOBLINK                ;turn off blinking char
7437   A99E   AD 74 02               LDA    SEL2            ;turn on auto NO key
7438   A9A1   85 E2                  STA    INTCMD
7439   A9A3   A5 48                  LDA    CURSOR          ;save starting cursor location
7440   A9A5   8D 74 02               STA    SEL2
7441   A9A8   A5 61         6M0:     LDA    IBFR            ;if num>upper limit
7442   A9AA   C5 63                  CMP    IBFR+2
7443   A9AC                          BLT    6M1
7446   A9AE   F0 04                  BEQ    6M1
7447   A9B0   A5 62                  LDA    IBFR+1          ;then num=lo limit
7448   A9B2   85 61                  STA    IBFR
7449   A9B4   A5 64         6M1:     LDA    IBFR+3          ;display msg for num
7450   A9B6   18                     CLC
7451   A9B7   65 61                  ADC    IBFR
7452   A9B9   38                     SEC
7453   A9BA   E5 62                  SBC    IBFR+1
7454   A9BC   AA                     TAX
7455   A9BD   20 D7 A2               JSR    DISPLAY_MSG
7456   A9C0   84 41                  STY    LSB             ;save message length
7457   A9C2   AD 74 02               LDA    SEL2            ;put cursor at beginning of msg
7458   A9C5   20 BC A3               JSR    LCD_ADDR
7459   A9C8   AD 73 02               LDA    SEL1            ;turn on blinking char
7460   A9CB   85 6C                  STA    BLINK
7461   A9CD   64 6B                  STZ    INTCTR
7462   A9CF   20 86 AB      6M5:     JSR    GETKEY          ;wait for key
7463   A9D2   C9 20                  CMP    #OKKEY
7464   A9D4   F0 17                  BEQ    6MOK
7465   A9D6   C9 08                  CMP    #HELPKEY
7466   A9D8   F0 18                  BEQ    6MHELP
7467   A9DA   C9 10                  CMP    #NOKEY
7468   A9DC   D0 F1                  BNE    6M5
7469   A9DE   E6 61                  INC    IBFR            ;NO key; inc num
7470   A9E0   A6 41                  LDX    LSB             ;erase message
7471   A9E2   20 C2 AD               JSR    SPACES
7472   A9E5   AD 74 02               LDA    SEL2
7473   A9E8   20 BC A3               JSR    LCD_ADDR
7474   A9EB   80 BB                  BRA    6M0
7475   A9ED   A5 61         6MOK:    LDA    IBFR            ;OK, return num and carry clear
7476   A9EF   18                     CLC
7477   A9F0   80 01                  BRA    6M6
7478   A9F2   38            6MHELP:  SEC                    ;HELP, return carry set
7479   A9F3   20 92 A3      6M6:     JSR    KEY_RESET       ;turn off auto keys
7480   A9F6   60                     RTS
7481
7482                        NEXTSTART:                      ;move STARTPTR to next start time
7483   A9F7   18                     CLC
7484   A9F8   A5 7B                  LDA    STARTPTR
```

```
7485  A9FA  69 08              ADC   #8
7486  A9FC  85 7B              STA   STARTPTR
7487  A9FE  A5 7C              LDA   STARTPTR+1
7488  AA00  69 00              ADC   #0
7489  AA02  85 7C              STA   STARTPTR+1
7490  AA04  E6 7A              INC   STARTCTR
7491  AA06  60                 RTS
7492
7493              FIRSTSTART:                     ;set pointers to beginning of obj starts
7494  AA07                     LDW   STARTPTR,STARTS
7500  AA0F  64 7A              STZ   STARTCTR
7501  AA11  60                 RTS
7502
7503              INC_HWRITE:                     ;point to next entry in history
7504                                              ;out: carry set if wraparound
7505  AA12  A5 B7              LDA   HWRITE       ;if pointer = end,
7506  AA14  C9 FB              CMP   #<HEND
7507  AA16  D0 11              BNE   IH2
7508  AA18  A5 B8              LDA   HWRITE+1
7509  AA1A  C9 1F              CMP   #>HEND
7510  AA1C  D0 0B              BNE   IH2
7511  AA1E                     LDW   HWRITE,HISTORY  ;then reset to beginning
7517  AA26  38                 SEC
7518  AA27  80 0E              BRA   IH3
7519  AA29  A5 B7       IH2:   LDA   HWRITE       ;else inc 16 bit pointer
7520  AA2B  18                 CLC
7521  AA2C  69 08              ADC   #8
7522  AA2E  85 B7              STA   HWRITE
7523  AA30  A5 B8              LDA   HWRITE+1
7524  AA32  69 00              ADC   #0
7525  AA34  85 B8              STA   HWRITE+1
7526  AA36  18                 CLC
7527  AA37  A9 00       IH3:   LDA   #0           ;mark entry as empty
7528  AA39  92 B7              STA   (HWRITE)
7529  AA3B  60                 RTS
7530
7531              INC_HREAD:                      ;point to next entry in history
7532  AA3C  A5 B5              LDA   HREAD        ;if pointer = end,
7533  AA3E  C9 FB              CMP   #<HEND
7534  AA40  D0 10              BNE   IR2
7535  AA42  A5 B6              LDA   HREAD+1
7536  AA44  C9 1F              CMP   #>HEND
7537  AA46  D0 0A              BNE   IR2
7538  AA48                     LDW   HREAD,HISTORY   ;then reset to beginning
7544  AA50  80 0D              BRA   IR3
7545  AA52  A5 B5       IR2:   LDA   HREAD        ;else inc 16 bit pointer
7546  AA54  18                 CLC
7547  AA55  69 08              ADC   #8
7548  AA57  85 B5              STA   HREAD
7549  AA59  A5 B6              LDA   HREAD+1
7550  AA5B  69 00              ADC   #0
7551  AA5D  85 B6              STA   HREAD+1
7552  AA5F  60          IR3:   RTS
7553
7554              GETHPTR:                        ;move history ptr for valve
7555  AA60  A6 49              LDX   VALVE        ;to HPTR
7556  AA62                     DBLX
```

```
7564  AA68  B5 A3           LDA   HPTR,X
7565  AA6A  85 A3           STA   HPTR
7566  AA6C  B5 A4           LDA   HPTR+1,X
7567  AA6E  85 A4           STA   HPTR+1
7568  AA70  60              RTS
7569
7570
7571            HOPEND:                         ;open a history entry for date stamp
7572  AA71  A9 80           LDA   #$80          ;key
7573  AA73  92 B7           STA   (HWRITE)
7574  AA75  A0 01           LDY   #1
7575  AA77  AD 7B 02        LDA   DOW           ;day of week
7576  AA7A  91 B7           STA   (HWRITE),Y
7577  AA7C  C8              INY
7578  AA7D  AD 79 02        LDA   MONTH         ;month
7579  AA80  91 B7           STA   (HWRITE),Y
7580  AA82  85 B9           STA   HDATE
7581  AA84  C8              INY
7582  AA85  AD 7A 02        LDA   DAY           ;day
7583  AA88  91 B7           STA   (HWRITE),Y
7584  AA8A  85 BA           STA   HDATE+1
7585  AA8C  C8              INY
7586  AA8D  AD 7B 02        LDA   YEAR          ;year
7587  AA90  91 B7           STA   (HWRITE),Y
7588  AA92  20 12 AA        JSR   INC_HWRITE
7589  AA95  60              RTS
7590
7591            HOPENM:                         ;open history for menu
7592  AA96  AD 7A 02        LDA   DAY           ;stamp date if needed
7593  AA99  C5 BA           CMP   HDATE+1
7594  AA9B  D0 07           BNE   HOP2
7595  AA9D  AD 79 02        LDA   MONTH
7596  AAA0  C5 B9           CMP   HDATE
7597  AAA2  F0 03           BEQ   HOP1
7598  AAA4  20 71 AA  HOP2: JSR   HOPEND
7599  AAA7  B2 5A     HOP1: LDA   (MENUPTR)
7600  AAA9  09 40           ORA   #%01000000    ;key=menu+MODE
7601  AAAB  92 B7           STA   (HWRITE)
7602  AAAD  A0 01           LDY   #1
7603  AAAF  AD 76 02        LDA   HOUR          ;hour
7604  AAB2  91 B7           STA   (HWRITE),Y
7605  AAB4  C8              INY
7606  AAB5  AD 77 02        LDA   MINUTE        ;minute
7607  AAB8  91 B7           STA   (HWRITE),Y
7608  AABA  A0 01           LDY   #1
7609  AABC  B1 5A           LDA   (MENUPTR),Y   ;mode+1
7610  AABE  A0 03           LDY   #3
7611  AAC0  91 B7           STA   (HWRITE),Y
7612  AAC2  A0 03           LDY   #3
7613  AAC4  B1 5A           LDA   (MENUPTR),Y   ;msg #
7614  AAC6  A0 04           LDY   #4
7615  AAC8  91 B7           STA   (HWRITE),Y
7616  AACA  20 12 AA        JSR   INC_HWRITE
7617  AACD  60              RTS
7618
7619            HOPENF:                         ;open history for function
7620                                            ;in: A=function #
```

```
7621  AACE  48                       PHA
7622  AACF  AD 7A 02                 LDA   DAY            ;stamp date if needed
7623  AAD2  C5 BA                    CMP   HDATE+1
7624  AAD4  D0 07                    BNE   H02
7625  AAD6  AD 79 02                 LDA   MONTH
7626  AAD9  C5 B9                    CMP   HDATE
7627  AADB  F0 03                    BEQ   H01
7628  AADD  20 71 AA        H02:     JSR   HDPEND
7629  AAE0  68              H01:     PLA                  ;all functions
7630  AAE1  48                       PHA
7631  AAE2  09 C0                    ORA   #11000000B     ;key=function
7632  AAE4  92 B7                    STA   (HWRITE)
7633  AAE6  A0 01                    LDY   #1
7634  AAE8  AD 76 02                 LDA   HOUR           ;hour
7635  AAEB  91 B7                    STA   (HWRITE),Y
7636  AAED  C8                       INY
7637  AAEE  AD 77 02                 LDA   MINUTE         ;minute
7638  AAF1  91 B7                    STA   (HWRITE),Y
7639  AAF3  68                       PLA
7640  AAF4  C9 01                    CMP   #1             ;if SVL,
7641  AAF6  D0 0A                    BNE   H03
7642  AAF8  A5 41                    LDA   LSB            ;then store duration of SVL
7643  AAFA  C8                       INY
7644  AAFB  91 B7                    STA   (HWRITE),Y
7645  AAFD  A5 42                    LDA   MSB
7646  AAFF  C8                       INY
7647  AB00  91 B7                    STA   (HWRITE),Y
7648  AB02  20 12 AA        H03:     JSR   INC_HWRITE
7649  AB05  60                       RTS
7650
7651                        GETKEY:                        ;look for a key pressed or programmer
7652                                                       ;removed
7653                                                       ;out: key in A
7654  AB06  A5 5D                    LDA   KEYPRESS        ;look for key
7655  AB08  F0 17                    BEQ   GTK2
7656  AB0A  C9 01                    CMP   #STOPKEY        ;if STOP key
7657  AB0C  D0 03                    BNE   GTK0
7658  AB0E  4C 46 86                 JMP   FSTOP           ;then go to function select
7659  AB11  C9 80           GTK0:    CMP   #10000000B      ;if power key removed
7660  AB13  D0 03                    BNE   GTK1
7661  AB15  4C A1 81                 JMP   NO_BATT         ;then do orderly shut down
7662  AB18  C9 01           GTK1:    CMP   #10000001B      ;if low-batt then deal with it
7663  AB1A  D0 03                    BNE   GTK3
7664  AB1C  4C 7B 81                 JMP   BATT_LOW
7665  AB1F  64 5D           GTK3:    STZ   KEYPRESS        ;otherwise get ready for next key
7666  AB21  60              GTK2:    RTS                   ;return the key pressed in A
7667
7668                        SCROLL_MSG:                    ;scroll group of screens
7669                                                       ;in: HELPNUM=index into SCROLLTBL
7670                                                       ;out: return when NO key
7671  AB22  A9 03                    LDA   #3
7672  AB24  48              SLL10:   PHA
7673  AB25  20 02 A3                 JSR   BKCLR           ;blink a blank screen
7674  AB28  A0 C8                    LDY   #200
7675  AB2A  20 C0 A2                 JSR   WAITMS
7676  AB2D  A6 72                    LDX   HELPNUM
7677  AB2F                           BBL1
```

```
7685  AB35  90 0C                  BCC      SLL11
7686  AB37  BD AD F6                LDA      SCROLLTBL1,X
7687  AB3A  85 43                   STA      MSGPTR           ;MSGPTR points to msg
7688  AB3C  BD AE F6                LDA      SCROLLTBL1+1,X
7689  AB3F  85 44                   STA      MSGPTR+1
7690  AB41  80 0A                   BRA      SLL12
7691  AB43  BD AF F5        SLL11:  LDA      SCROLLTBL,X
7692  AB46  85 43                   STA      MSGPTR           ;MSGPTR points to msg
7693  AB48  BD B0 F5                LDA      SCROLLTBL+1,X
7694  AB4B  85 44                   STA      MSGPTR+1
7695  AB4D  A0 00           SLL12:  LDY      #0
7696  AB4F  B1 43                   LDA      (MSGPTR),Y       ;set up number of screens
7697  AB51  85 D5                   STA      SCREENS
7698  AB53  64 D6                   STZ      SCREEN           ;start at the first
7699  AB55  64 6B                   STZ      INTCTR
7700  AB57                          INC16    MSGPTR
7709  AB64  68                      PLA                       ;INT does it, BLINK=3 or 4
7710  AB65  85 6C                   STA      BLINK
7711  AB67  20 9F AB        SLL0:   JSR      GETHKEY          ;stop scrolling if any key or done
7712  AB6A  F0 02                   BEQ      SLL1
7713  AB6C  38                      SEC
7714  AB6D  60                      RTS                       ;set carry if NO key
7715  AB6E  A5 6C           SLL1:   LDA      BLINK
7716  AB70  D0 F5                   BNE      SLL0
7717  AB72  18                      CLC                       ;carry clear if done
7718  AB73  60                      RTS
7719
7720                        HELP_MSG:                          ;do a scrolling msg, ask for repeat
7721  AB74  A5 5E                   LDA      KEYMASK
7722  AB76  48                      PHA
7723  AB77  A9 39                   LDA      #00111001B       ;any key stops help message
7724  AB79  85 5E                   STA      KEYMASK
7725  AB7B  A9 04           SLL4:   LDA      #4
7726  AB7D  20 24 AB                JSR      SLL10
7727  AB80  B0 18                   BCS      ENDI             ;scroll msg was aborted
7728  AB82                          ON
7733  AB88  20 9F AB        SLL5:   JSR      GETHKEY          ;repeat the message?
7734  AB8B  F0 FB                   BEQ      SLL5
7735  AB8D  C9 20                   CMP      #OKKEY
7736  AB8F  F0 EA                   BEQ      SLL4             ;OK, repeat msg
7737  AB91  C9 01                   CMP      #STOPKEY
7738  AB93  F0 05                   BEQ      ENDI
7739  AB95  68              ENDH:   PLA                       ;any other key ends help
7740  AB96  85 5E                   STA      KEYMASK
7741  AB98  18                      CLC
7742  AB99  60                      RTS
7743  AB9A  68              ENDI:   PLA                       ;aborted exit
7744  AB9B  85 5E                   STA      KEYMASK
7745  AB9D  38                      SEC
7746  AB9E  60                      RTS
7747                        GETHKEY:                           ;out: key in A
7748  AB9F  A5 50                   LDA      KEYPRESS         ;look for key
7749  ABA1  F0 03                   BEQ      GTH2             ;no key
7750  ABA3  4C 11 AB                JMP      GTK0             ;check if batt low or removed
7751  ABA6  60              GTH2:   RTS                       ;return the key pressed in A
7752
7753  ABA7  A9 3E           MSGWAIT: LDA     #SRATE2          ;wait while msg is being read
```

```
7754  ABA9  85 47              STA   TIMCTR2
7755  ABAB  20 06 AB   MSGW:   JSR   GETKEY      ;but allow STOP key
7756  ABAE  A5 47              LDA   TIMCTR2
7757  ABB0  D0 F9              BNE   MSGW
7758  ABB2  60                 RTS
7759
7760
7761                  HM2MIN:              ;convert hr, min to 16 bit minutes
7762                                       ;in: IBFR+4=hr, IBFR+5=min
7763                                       ;out: OFFSET= minutes
7764  ABB3  A6 65              LDX   IBFR+4
7765  ABB5  64 D0              STZ   OFFSET+1
7766  ABB7  A5 66              LDA   IBFR+5
7767  ABB9  85 CF              STA   OFFSET      ;leftover minutes
7768  ABBB  8A         HM0:    TXA
7769  ABBC  F0 10              BEQ   HM1
7770  ABBE  CA                 DEX
7771  ABBF  A5 CF              LDA   OFFSET      ;add 60 to minutes
7772  ABC1  18                 CLC
7773  ABC2  69 3C              ADC   #60
7774  ABC4  85 CF              STA   OFFSET
7775  ABC6  A5 D0              LDA   OFFSET+1
7776  ABC8  69 00              ADC   #0
7777  ABCA  85 D0              STA   OFFSET+1
7778  ABCC  80 ED              BRA   HM0         ;until no more hours
7779  ABCE  60         HM1:    RTS
7780
7781                  MIN2HM:              ;convert minutes to hr, min
7782                                       ;in: OFFSET= 16 bit minutes
7783                                       ;out: IBFR+4= hr, IBFR+5= min
7784  ABCF  64 65              STZ   IBFR+4
7785  ABD1  64 66              STZ   IBFR+5
7786  ABD3  A5 D0      HM2:    LDA   OFFSET+1
7787  ABD5  D0 06              BNE   HM3
7788  ABD7  A5 CF              LDA   OFFSET
7789  ABD9  C9 3C              CMP   #60
7790  ABDB                     BLT   HM4
7793  ABDD  A5 CF      HM3:    LDA   OFFSET      ;subtract 60 form total minutes
7794  ABDF  38                 SEC
7795  ABE0  E9 3C              SBC   #60
7796  ABE2  85 CF              STA   OFFSET
7797  ABE4  A5 D0              LDA   OFFSET+1
7798  ABE6  E9 00              SBC   #0
7799  ABE8  85 D0              STA   OFFSET+1
7800  ABEA  E6 65              INC   IBFR+4      ;and add 1 hr
7801  ABEC  80 E5              BRA   HM2
7802  ABEE  85 66      HM4:    STA   IBFR+5      ;remaining minutes
7803  ABF0  60                 RTS
7804
7805                  INC_DAYCTR:          ;move dayctr to next day
7806  ABF1  AD 41 15           LDA   CYCLE_TYPE
7807  ABF4  D0 12              BNE   IDA1
7808  ABF6             IDA2:   INC16 DAYNUM
7817  AC07  60         IDA3:   RTS
7818  AC08  AD 1C 03   IDA1:   LDA   DAYNUM+2    ;specific days
7819  AC0B  18                 CLC
7820  AC0C  6A                 ROR   A           ;inc day
```

```
7821  AC0D  90 FB              BCC    IDA3
7822  AC0F  A9 40              LDA    #01000000B        ;a new week
7823  AC11  8D 1C 03           STA    DAYNUM+2
7824  AC14  80 E0              BRA    IDA2
7825
7826                 BFR2VID:                           ;move ID bfr to valve ID
7827  AC16  A2 08              LDX    #8
7828  AC18  9E B9 02    BF0:   STZ    VALVEID,X         ;clear valve ID area
7829  AC1B  9E 7D 02           STZ    VS,X              ;and valve status
7830  AC1E  CA                 DEX
7831  AC1F  D0 F7              BNE    BF0
7832  AC21  64 DE              STZ    POSITION          ;for each position,
7833  AC23  A6 DE      BF1:   LDX    POSITION
7834  AC25  BD 5E 02           LDA    IDBFR,X           ;get the valve #
7835  AC28  F0 15              BEQ    BF2               ;if any
7836  AC2A  AA                 TAX
7837  AC2B  A5 DE              LDA    POSITION          ;store the position in valve ID
7838  AC2D  9D B9 02           STA    VALVEID,X
7839  AC30  18                 CLC                      ;position duplicated in bits 3-5
7840  AC31  2A                 ROL    A
7841  AC32  2A                 ROL    A
7842  AC33  2A                 ROL    A
7843  AC34  1D B9 02           ORA    VALVEID,X
7844  AC37  9D B9 02           STA    VALVEID,X
7845  AC3A  A9 C0              LDA    #11000000B        ;valve status=IDed and enabled
7846  AC3C  9D 7D 02           STA    VS,X
7847  AC3F  E6 DE      BF2:   INC    POSITION          ;until no more left
7848  AC41  A5 DE              LDA    POSITION
7849  AC43  C9 08              CMP    #8
7850  AC45  D0 DC              BNE    BF1
7851  AC47  60                 RTS
7852
7853                 VID2BFR:                           ;move existing valve IDs to bfr area
7854  AC48  20 85 AC           JSR    CLR_IDBFR         ;clear bfr area
7855  AC4B               SET    VALVE
7859  AC4F  A6 49      IB1:   LDX    VALVE             ;for each valve,
7860  AC51  BD 7D 02           LDA    VS,X              ;if there is a valid ID
7861  AC54  10 0B              BPL    IB2
7862  AC56  BD B9 02           LDA    VALVEID,X         ;move position to bfr
7863  AC59  29 07              AND    #00000111B
7864  AC5B  AA                 TAX
7865  AC5C  A5 49              LDA    VALVE
7866  AC5E  9D 5E 02           STA    IDBFR,X
7867  AC61  E6 49      IB2:   INC    VALVE             ;until no more
7868  AC63  A5 49              LDA    VALVE
7869  AC65  C9 09              CMP    #9
7870  AC67  D0 E6              BNE    IB1
7871  AC69  60                 RTS
7872
7873                 DISPID:                            ;display contents of ID bfr
7874  AC6A  64 DE              STZ    POSITION
7875  AC6C  A6 DE      DID0:  LDX    POSITION          ;in positional order (0-7)
7876  AC6E  BD 5E 02           LDA    IDBFR,X
7877  AC71  D0 04              BNE    DID1
7878  AC73  A9 2D              LDA    #'-'              ;if no valve, show special char
7879  AC75  80 02              BRA    DID2
7880  AC77  09 30      DID1:  ORA    #ASCMASK          ;else show valve #
```

```
7881  AC79  20 10 A3    DID2:    JSR    DCHAR
7882  AC7C  E6 DE                INC    POSITION
7883  AC7E  A5 DE                LDA    POSITION
7884  AC80  C9 08                CMP    #8
7885  AC82  D0 E8                BNE    DID0
7886  AC84  60                   RTS
7887
7888                    CLR_IDBFR:                      ;store zeros in ID bfr
7889  AC85  A2 07                LDX    #7
7890  AC87  9E 5E 02    CI0:     STZ    IDBFR,X         ;clear bfr area
7891  AC8A  CA                   DEX
7892  AC8B  10 FA                BPL    CI0
7893  AC8D  60                   RTS
7894
7895                    ;------------------------------------
7896                    ;       MENUING ROUTINES
7897                    ;------------------------------------
7898
7899                    GETMENU:                        ;manage program branching
7900                                                    ;in: MODE, MODE+1
7901                                                    ;out: branch to selected entry
7902  AC8E  A2 FF                LDX    #$FF
7903  AC90  9A                   TXS
7904  AC91  20 82 A3             JSR    DKCLR
7905  AC94                       SLOW   NOKEY
7911  AC9C                       NOBLINK
7915  ACA0                       ANSLOW                 ;use autoscroll
7919  ACA4  20 4C AD    GME0:    JSR    FINDMENU        ;get MENUPTR = table entry
7920  ACA7  B0 3E                BCS    GME3            ;didn't find it
7921  ACA9  20 29 AD    GME1:    JSR    SHOWMENU        ;display menu screen
7922  ACAC                       OK                     ;blink OK char
7927  ACB2  20 06 AB    GME7:    JSR    GETKEY          ;see if key
7928  ACB5  C9 20                CMP    #OKKEY
7929  ACB7  F0 0A                BEQ    GMEOK
7930  ACB9  C9 08                CMP    #HELPKEY
7931  ACBB  F0 1A                BEQ    GMEHELP
7932  ACBD  C9 10                CMP    #NOKEY
7933  ACBF  F0 21                BEQ    GME2
7934  ACC1  80 EF                BRA    GME7
7935  ACC3  20 82 A3    GMEOK:   JSR    DKCLR           ;OK, jump to selected entry
7936  ACC6  20 96 AA             JSR    HOPENM          ;tell history
7937  ACC9  A0 05                LDY    #5
7938  ACCB  B1 5A                LDA    (MENUPTR),Y
7939  ACCD  85 75                STA    SRCPTR
7940  ACCF  C8                   INY
7941  ACD0  B1 5A                LDA    (MENUPTR),Y
7942  ACD2  85 76                STA    SRCPTR+1
7943  ACD4  6C 75 00             JMP    (SRCPTR)
7944                    GMEHELP:                        ;HELP, return carry set
7945  ACD7  A0 04                LDY    #4
7946  ACD9  B1 5A                LDA    (MENUPTR),Y
7947  ACDB  85 72                STA    HELPNUM
7948  ACDD  20 74 AB             JSR    HELP_MSG
7949  ACE0  80 AC                BRA    GETMENU
7950  ACE2  20 0F AD    GME2:    JSR    INCMENU         ;NO, goto next menu entry
7951  ACE5  80 D0                BRA    GME0
7952  ACE7  A5 59       GME3:    LDA    MODE+1          ;end of menu, reset to top
```

```
7953  ACE9  29 0F              AND   00001111B      ;if lo nibble not 0,
7954  ACEB  F0 0A              BEQ   GME5           ;(level 3 menu),
7955  ACED  A5 59              LDA   MODE+1         ;set lo nibble to 1
7956  ACEF  29 F0              AND   11110000B
7957  ACF1  09 01              ORA   00000001B
7958  ACF3  85 59              STA   MODE+1
7959  ACF5  80 12              BRA   GME4
7960  ACF7  A5 59       GME5:  LDA   MODE+1         ;if hi nibble not 0,
7961  ACF9  29 F0              AND   11110000B      ;(level 2 menu),
7962  ACFB  F0 06              BEQ   GME6
7963  ACFD  A9 10              LDA   #$10           ;reset hi nibble to 1
7964  ACFF  85 59              STA   MODE+1
7965  AD01  80 06              BRA   GME4
7966  AD03              GME6:  SET   MODE           ;if main menu (level 1),
7970  AD07  80 98              BRA   GME8           ;reset to 1 and skip exit msg
7971  AD09  20 98 AD    GME4:  JSR   ISEXIT         ;exit menu?
7972  AD0C  4C BE AC           JMP   GETMENU
7973
7974                    INCMENU:                    ;inc MODE, MODE+1
7975  AD0F  A5 59              LDA   MODE+1         ;if lo nibble not 0,
7976  AD11  29 0F              AND   00001111B      ;(level 3 menu),
7977  AD13  F0 03              BEQ   IME0
7978  AD15  E6 59              INC   MODE+1         ;inc lo nibble
7979  AD17  60                 RTS
7980  AD18  A5 59       IME0:  LDA   MODE+1         ;if hi nibble not 0,
7981  AD1A  29 F0              AND   11110000B      ;(level 2 menu),
7982  AD1C  F0 0B              BEQ   IME1
7983  AD1E  A5 59              LDA   MODE+1         ;inc hi nibble
7984  AD20  18                 CLC
7985  AD21  69 10              ADC   #16
7986  AD23  85 59              STA   MODE+1
7987  AD25  60                 RTS
7988  AD26  E6 58       IME1:  INC   MODE           ;else inc main menu
7989  AD28  60                 RTS
7990
7991                    SHOWMENU:                   ;show the screen defined by MENUPTR
7992  AD29  20 85 A3           JSR   DISPLAY_CLR
7993  AD2C  A0 02              LDY   #2
7994  AD2E  B1 5A              LDA   (MENUPTR),Y
7995  AD30  AA                 TAX
7996  AD31  20 D7 A2           JSR   DISPLAY_MSG
7997  AD34  A9 3A              LDA   #':'
7998  AD36  20 10 A3           JSR   DCHAR
7999  AD39              SET_CURSOR LINE2
8003  AD3E  A0 03              LDY   #3
8004  AD40  B1 5A              LDA   (MENUPTR),Y
8005  AD42  AA                 TAX
8006  AD43  20 D7 A2           JSR   DISPLAY_MSG
8007  AD46  A9 3F              LDA   #'?'
8008  AD4B  20 10 A3           JSR   DCHAR
8009  AD4B  60                 RTS
8010
8011                    FINDMENU:                   ;in: MODE, MODE+1 out: MENUPTR
8012  AD4C  A9 AD              LDA   #<MENUTBL      ;start looking at top of table
8013  AD4E  85 5A              STA   MENUPTR
8014  AD50  A9 F6              LDA   #>MENUTBL
8015  AD52  85 5B              STA   MENUPTR+1
```

```
8016   AD54   B2 5A        FM1:        LDA     (MENUPTR)         ;if (MENUPTR)<>MODE then next
8017   AD56   C5 58                    CMP     MODE
8018   AD58   D0 0A                    BNE     FM2
8019   AD5A   A0 01                    LDY     #1                ;if MENUPTR+1<>MODE+1 then next
8020   AD5C   B1 5A                    LDA     (MENUPTR),Y
8021   AD5E   C5 59                    CMP     MODE+1
8022   AD60   D0 02                    BNE     FM2
8023   AD62   18                       CLC                       ;else found it
8024   AD63   60                       RTS
8025   AD64   A5 5A        FM2:        LDA     MENUPTR           ;next menu table entry
8026   AD66   18                       CLC
8027   AD67   69 07                    ADC     #7
8028   AD69   85 5A                    STA     MENUPTR
8029   AD6B   A5 5B                    LDA     MENUPTR+1
8030   AD6D   69 00                    ADC     #0
8031   AD6F   85 5B                    STA     MENUPTR+1
8032   AD71   B2 5A                    LDA     (MENUPTR)         ;if entry=$FF then end of table reached
8033   AD73   C9 FF                    CMP     #$FF
8034   AD75   D0 DD                    BNE     FM1
8035   AD77   38                       SEC
8036   AD78   60                       RTS
8037
8038                       NA:                                   ;menu selection not available
8039   AD79                            HELP    0
8044   AD80   4C BE AC                 JMP     GETMENU
8045
8046                       NEXTLEVEL:                            ;move menu to next level down
8047   AD83   A5 59                    LDA     MODE+1
8048   AD85   F0 0A                    BEQ     GME1A
8049   AD87   A5 59                    LDA     MODE+1            ;init level 3
8050   AD89   29 F0                    AND     #%11110000B
8051   AD8B   09 01                    ORA     #%00000001B
8052   AD8D   85 59                    STA     MODE+1
8053   AD8F   80 04                    BRA     GME1B
8054   AD91   A9 10        GME1A:      LDA     #$10              ;init level 2
8055   AD93   85 59                    STA     MODE+1
8056   AD95   4C BE AC     GME1B:      JMP     GETMENU
8057
8058                       ISEXIT:                               ;go to main menu? on line 2
8059   AD98   20 C8 A3                 JSR     CLR_LINE2
8060   AD9B                            MESSAGE 138
8064   ADA0                            OK
8069   ADA6   20 06 AB     GME11:      JSR     GETKEY
8070   ADA9   C9 20                    CMP     #OKKEY
8071   ADAB   D0 03                    BNE     GME12
8072   ADAD   4C 46 86                 JMP     FSTOP             ;yes, goto main menu
8073   ADB0   C9 10        GME12:      CMP     #NOKEY
8074   ADB2   D0 01                    BNE     GME13
8075   ADB4   60                       RTS                       ;no, return
8076   ADB5   C9 08        GME13:      CMP     #HELPKEY
8077   ADB7   D0 ED                    BNE     GME11
8078   ADB9                            HELP    44
8083   ADC0   80 E4                    BRA     GME11
8084
8085   ADC2   A9 20        SPACES: LDA     #' '              ;display X spaces
8086   ADC4   20 10 A3                 JSR     DCHAR
8087   ADC7   CA                       DEX
```

```
8088   ADC8  D0 F8              BNE     SPACES
8089   ADCA  60                 RTS
8090
8091                    ISRUNNING:                       ;return carry set if schedule is running
8092   ADCB  AD 1F 03           LDA     RUNNING
8093   ADCE  C9 02              CMP     02
8094   ADD0  F0 0A              BEQ     ISR0
8095   ADD2  C9 03              CMP     03
8096   ADD4  F0 06              BEQ     ISR0
8097   ADD6  C9 04              CMP     04
8098   ADD8  F0 02              BEQ     ISR0
8099   ADDA  18                 CLC
8100   ADDB  60                 RTS
8101   ADDC  38         ISR0:   SEC
8102   ADDD  60                 RTS
8103
8104
8105
8106
8107
8108
8109   ADDE                     INCLUDE   GEN.ASM
8110
8111                    ;---------------------------------
8112                    ;       PROGRAM GENERATOR
8113                    ;---------------------------------
8114
8115                    GENERATE:                        ;generate today's schedule
8116                                                     ;in: DAYNUM is the day to compile,
8117                                                     ;    setup is in object area
8118                                                     ;    WCLK=0 if AUTO, 1 if SEMI-AUTO
8119                                                     ;out: carry set and ERROR
8120                                                     ;    NSPLITS()=# of base or soak cycles
8121                                                     ;    GENTIME = starting time
8122                                                     ;    DONETIME = ending time
8123                                                     ;    NSTARTS = number of starts today
8124                                                     ;    STARTPTR points to next start to do
8125                                                     ;    STARTCTR=NSTARTS if all starts are past
8126   ADDE  9C 67 02           STZ     CHKFLAG
8127   ADE1  A2 0B      GE0:    LDX     0B               ;alt entry for checking of setup
8128   ADE3  9E 54 02   GE9:    STZ     NSPLIT,X
8129   ADE6  CA                 DEX
8130   ADE7  D0 FA              BNE     GE9
8131   ADE9  9C 71 02           STZ     NSYR
8132   ADEC             SET     VALVE
8136   ADF0  A6 49      GE10:   LDX     VALVE            ;work with base water
8137   ADF2  9E 4A 02           STZ     BASETYPE,X
8138   ADF5  BD 7D 02           LDA     VS,X             ;ignore disabled valves
8139   ADF8  29 C0              AND     #11000000B
8140   ADFA  C9 C0              CMP     #11000000B
8141   ADFC  D0 2E              BNE     GEN
8142                                                     ;DON'T FORGET TO IGNORE @ SOAK & SYRINGE
8143   ADFE  AD 41 15           LDA     CYCLE_TYPE       ;first see who's scheduled to water today
8144   AE01  D0 7B              BNE     GE15
8145
8146   AE03  AD 1A 03   GE12:   LDA     DAYNUM           ;see if user cycle = current day or week
8147   AE06  85 52              STA     DIVIDEND
```

```
8148  AE08  AD 1B 03            LDA   DAYNUM+1
8149  AE0B  85 53                STA   DIVIDEND+1
8150  AE0D  C6 52                DEC   DIVIDEND      ;if DAYNUM=1, (first day or week)
8151  AE0F  A5 52                LDA   DIVIDEND      ;everything is scheduled
8152  AE11  05 53                ORA   DIVIDEND+1
8153  AE13  F0 25                BEQ   6EV
8154  AE15  A6 49                LDX   VALVE
8155  AE17                       DBLX
8163  AE1D  BD 6A 15             LDA   CYCLE1,X
8164  AE20  85 54                STA   DIVISOR
8165  AE22  C9 01                CMP   #1            ;if user cycle=1, always water
8166  AE24  F0 14                BEQ   6EV
8167  AE26  20 67 B3             JSR   DIVIDE        ;divide today by cycle
8168  AE29  AA                   TAX                 ;if no remainder, then water today
8169  AE2A  F0 0E                BEQ   6EV
8170
8171  AE2C  A6 49       6EN:     LDX   VALVE         ;else no water today for this valve
8172  AE2E                       DBLX
8180  AE34  74 8F                STZ   TR,X
8181  AE36  74 90                STZ   TR+1,X
8182  AE38  80 5C                BRA   6E20
8183
8184  AE3A  A6 49       6EV:     LDX   VALVE         ;water with entered duration
8185  AE3C                       DBLX
8193  AE42  BD 58 15             LDA   DUR1,X
8194  AE45  95 8F                STA   TR,X
8195  AE47  85 4E                STA   MULTIPLIER
8196  AE49  BD 59 15             LDA   DUR1+1,X
8197  AE4C  95 90                STA   TR+1,X
8198                                                 ;modified by budget
8199  AE4E  AD 67 02             LDA   CHKFLAG       ;if not checking
8200  AE51  D0 43                BNE   6E20
8201  AE53  AD FE 02             LDA   GLOBAL        ;TR = TR * GLOBAL /100
8202  AE56  85 4F                STA   MULTIPLICAND
8203  AE58  20 4D B3             JSR   MULT
8204  AE5B                       MOV16 PRODUCT,DIVIDEND
8210  AE63  64 55                STZ   DIVISOR+1
8211  AE65  A9 64                LDA   #100
8212  AE67  85 54                STA   DIVISOR
8213  AE69  20 7E B3             JSR   DIV16
8214  AE6C  A6 49                LDX   VALVE
8215  AE6E                       DBLX
8223  AE74  A5 56                LDA   QUOTIENT
8224  AE76  95 8F                STA   TR,X
8225  AE78  A5 57                LDA   QUOTIENT+1
8226  AE7A  95 90                STA   TR+1,X
8227  AE7C  80 18                BRA   6E20
8228
8229  AE7E  A6 49       6E15:    LDX   VALVE         ;specific days
8230  AE80                       DBLX
8238  AE86  BD 6B 15             LDA   CYCLE1+1,X    ;see if day matches today
8239  AE89  2A                   ROL   A
8240  AE8A  AE 1C 03             LDX   DAYNUM+2
8241  AE8D  2A          6E16:    ROL   A
8242  AE8E  CA                   DEX
8243  AE8F  D0 FC                BNE   6E16
8244  AE91  90 99                BCC   6EN           ;not today
```

```
8245  AE93  4C B3 AE          JMP   6E12        ;now see if it's the right week
8246
8247  AE96  A6 49     6E20:    LDX   VALVE       ;SEE IF SOAK DAY
8248  AE98  BD 70 02           LDA   VS,X
8249  AE9B  29 C0              AND   %11000000B
8250  AE9D  C9 C0              CMP   %11000000B
8251  AE9F  D0 6F              BNE   6E30        ;ignore if valve disabled
8252  AEA1                     DBLX
8260  AEA7  BD B5 15           LDA   DUR3,X      ;or if no soak duration
8261  AEAA  1D B6 15           ORA   DUR3+1,X
8262  AEAD  F0 61              BEQ   6E30
8263  AEAF  AD 41 15           LDA   CYCLE_TYPE
8264  AEB2  D0 44              BNE   6E25
8265  AEB4  AD 1A 03  6E22:    LDA   DAYNUM      ;see if user cycle = current day or week
8266  AEB7  85 52              STA   DIVIDEND
8267  AEB9  AD 1B 03           LDA   DAYNUM+1
8268  AEBC  85 53              STA   DIVIDEND+1
8269  AEBE  C6 52              DEC   DIVIDEND    ;if DAYNUM=1, (first day or week)
8270  AEC0  A5 52              LDA   DIVIDEND    ;everything is scheduled
8271  AEC2  05 53              ORA   DIVIDEND+1
8272  AEC4  F0 17              BEQ   6ES
8273  AEC6  A6 49              LDX   VALVE
8274  AEC8                     DBLX
8282  AECE  BD C7 15           LDA   CYCLE3,X
8283  AED1  85 54              STA   DIVISOR
8284  AED3  C9 01              CMP   #1          ;if user cycle=1, always soak
8285  AED5  F0 06              BEQ   6ES
8286  AED7  20 67 B3           JSR   DIVIDE      ;divide today by cycle
8287  AEDA  AA                 TAX               ;if no remainder, then water today
8288  AEDB  D0 33              BNE   6E30
8289
8290  AEDD  A6 49     6ES:     LDX   VALVE       ;water with entered duration
8291  AEDF  A9 02              LDA   #2
8292  AEE1  9D 4A 02           STA   BASETYPE,X
8293  AEE4                     DBLX
8301  AEEA  BD B5 15           LDA   DUR3,X
8302  AEED  95 8F              STA   TR,X
8303  AEEF  B5 4E              STA   MULTIPLIER
8304  AEF1  BD B6 15           LDA   DUR3+1,X
8305  AEF4  95 90              STA   TR+1,X
8306  AEF6  80 18              BRA   6E30
8307
8308  AEF8  A6 49     6E25:    LDX   VALVE       ;specific days
8309  AEFA                     DBLX
8317  AF00  BD C8 15           LDA   CYCLE3+1,X  ;see if day matches today
8318  AF03  2A                 ROL   A
8319  AF04  AE 1C 03           LDX   DAYNUM+2
8320  AF07  2A        6E26:    ROL   A
8321  AF08  CA                 DEX
8322  AF09  D0 FC              BNE   6E26
8323  AF0B  90 03              BCC   6E30        ;not today
8324  AF0D  4C B4 AE           JMP   6E22        ;now see if it's the right week
8325
8326  AF10  A6 49     6E30:    LDX   VALVE       ;if valve has time remaining today,
8327  AF12                     DBLX
8335  AF18  B5 8F              LDA   TR,X
8336  AF1A  15 90              ORA   TR+1,X
```

```
8337  AF1C  F0 0E            BEQ    6E32
8338  AF1E  AD 7C 15         LDA    BASE_START
8339  AF21  9D 38 02         STA    NXTTIME,X         ;then set to start ASAP
8340  AF24  AD 7D 15         LDA    BASE_START+1
8341  AF27  9D 39 02         STA    NXTTIME+1,X
8342  AF2A  80 12            BRA    6E35
8343  AF2C  A6 49    6E32:   LDX    VALVE             ;if no time entered
8344  AF2E                   DBLI                     ;don't water with valve
8352  AF34  A9 05            LDA    #$05
8353  AF36  9D 39 02         STA    NXTTIME+1,X
8354  AF39  A9 A0            LDA    #$A0
8355  AF3B  9D 38 02         STA    NXTTIME,X
8356  AF3E  E6 49    6E35:   INC    VALVE             ;do the next valve
8357  AF40  A5 49            LDA    VALVE
8358  AF42  C9 09            CMP    #9
8359  AF44  F0 03            BEQ    6E40
8360  AF46  4C F0 AD         JMP    6E10
8361
8362  AF49  9C EC 15  6E40:  STZ    NSTARTS           ;prepare to generate starts
8363  AF4C                   MOV16  BASE_START,E
8369  AF58  20 07 AA         JSR    FIRSTSTART        ;init start pointer
8370  AF5B                   SET    VALVE             ;init NXTTIME for syringe
8374  AF5F  A6 49    6E4B:   LDX    VALVE
8375  AF61                   DBLI
8383  AF67  BD 7E 15         LDA    DUR2,X
8384  AF6A  D0 12            BNE    6E4A
8385  AF6C  E6 49            INC    VALVE
8386  AF6E  A5 49            LDA    VALVE
8387  AF70  C9 09            CMP    #9
8388  AF72  D0 EB            BNE    6E4B
8389  AF74  A9 05            LDA    #$05              ;if no syringing, then SYRINGE_START=1440
8390  AF76  8D B0 15         STA    SYRINGE_START+1
8391  AF79  A9 A0            LDA    #$A0
8392  AF7B  8D AF 15         STA    SYRINGE_START
8393                                                  ;NXTTIME(0)=start of syringes
8394  AF7E           6E4A:   MOV16  SYRINGE_START,NXTTIME
8400
8401                 GENXT:                           ;OK, now we generate starts
8402  AF8A  A9 05            LDA    #$05              ;find next valve up
8403  AF8C  85 42            STA    MSB               ;it's the one with the lowest NXTTIME
8404  AF8E  A9 A0            LDA    #$A0
8405  AF90  85 41            STA    LSB               ;LSB holds lowest time so far
8406  AF92  A9 08            LDA    #8                ;if a tie, the lowest valve # wins
8407  AF94  85 BC            STA    R1
8408  AF96  85 49            STA    VALVE
8409  AF98  A6 BC    6E41:   LDX    R1                ;if NXTTIME <= lowest time,
8410  AF9A                   DBLI
8418  AFA0  BD 39 02         LDA    NXTTIME+1,X
8419  AFA3  C5 42            CMP    MSB
8420  AFA5                   BLT    6E44
8423  AFA7  F0 02            BEQ    6E42
8424  AFA9  80 21            BRA    6E45
8425  AFAB  BD 38 02  6E42:  LDA    NXTTIME,X
8426  AFAE  C5 41            CMP    LSB
8427  AFB0                   BLT    6E44
8430  AFB2  F0 02            BEQ    6E44
8431  AFB4  80 16            BRA    6E45
```

```
8432  AFB6  A5 BC         6E44:  LDA   R1           ;then save that valve
8433  AFB8  85 49                STA   VALVE
8434  AFBA  A6 49                LDX   VALVE        ;and new lowest time
8435  AFBC                       DBLX
8443  AFC2  BD 38 02             LDA   NXTTIME,X
8444  AFC5  85 41                STA   LSB
8445  AFC7  BD 39 02             LDA   NXTTIME+1,X
8446  AFCA  85 42                STA   MSB
8447  AFCC  C6 BC         6E45:  DEC   R1
8448  AFCE  D0 C8                BNE   6E41
8449
8450  AFD0  A6 49                LDX   VALVE        ;if time remaining is 0 for next valve,
8451  AFD2                       DBLX
8459  AFD8  B5 8F                LDA   TR,X
8460  AFDA  15 90                ORA   TR+1,X
8461  AFDC  D0 03                BNE   6E50
8462  AFDE  4C 77 B0             JMP   6E65         ;that means no more watering left
8463
8464  AFE1                6E50:  MOV16 E,S          ;start at end of last watering
8470  AFED  A6 49                LDX   VALVE
8471  AFEF                       DBLX
8479  AFF5  AD 33 02             LDA   S+1          ;if start before MINOFF,
8480  AFF8  DD 39 02             CMP   NXTTIME+1,X
8481  AFFB                       BLT   6E52
8484  AFFD  F0 02                BEQ   6E51
8485  AFFF  80 1E                BRA   6E55
8486  B001  AD 32 02      6E51:  LDA   S
8487  B004  DD 38 02             CMP   NXTTIME,X
8488  B007                       BLT   6E52
8491  B009  80 14                BRA   6E55
8492  B00B  A6 49         6E52:  LDX   VALVE        ;then move start to there
8493  B00D                       DBLX
8501  B013  BD 38 02             LDA   NXTTIME,X
8502  B016  8D 32 02             STA   S
8503  B019  BD 39 02             LDA   NXTTIME+1,X
8504  B01C  8D 33 02             STA   S+1
8505
8506                      6E55:                     ;check if start is in syringe time
8507  B01F  AD 33 02             LDA   S+1
8508  B022  CD 39 02             CMP   NXTTIME+1    ;if start >= NXTTIME(0)
8509  B025  F0 05                BEQ   6E56
8510  B027                       BLT   6E60
8513  B029  4C 5E B2             JMP   GSC
8514  B02C  AD 32 02      6E56:  LDA   S
8515  B02F  CD 38 02             CMP   NXTTIME
8516  B032                       BLT   6E60
8519  B034  4C 5E B2             JMP   GSC          ;then generate syringe cycles
8520
8521  B037  AD 1E 83      6E60:  LDA   WCLK         ;check if start is in xtime
8522  B03A  C9 01                CMP   01
8523  B03C  F0 50                BEQ   6E70
8524  B03E  AD 33 02             LDA   S+1
8525  B041  CD 55 15             CMP   IFROM+1      ;if start < IFROM
8526  B044                       BLT   6E70
8529  B046  F0 02                BEQ   6E61
8530  B048  80 08                BRA   6E62
8531  B04A  AD 32 02      6E61:  LDA   S
```

```
8532  B04D  CD 54 15         CMP    IFROM
8533  B050                    BLT    6E70
8536  B052  AD 33 02  6E62:   LDA    S+1          ;or if start >= ITO
8537  B055  CD 57 15          CMP    ITO+1
8538  B058                    BLT    6E64
8541  B05A  F0 02             BEQ    6E63
8542  B05C  80 30             BRA    6E70
8543  B05E  AD 32 02  6E63:   LDA    S
8544  B061  CD 56 15          CMP    ITO
8545  B064                    BLT    6E64
8548  B066  80 26             BRA    6E70         ;then do nothing
8549  B068            6E64:   MOV16  ITO,E        ;else move to end of stime
8555  B074  4C 8A AF          JMP    GENXT
8556
8557  B077  AD 39 02  6E65:   LDA    NXTTIME+1    ;base watering done
8558  B07A  C9 05             CMP    #$05         ;check if any more syringes
8559  B07C  F0 0D             BEQ    6E6A
8560  B07E  4C 5E B2          JMP    GSC          ;yes, generate syringe
8561  B081  AD 38 02          LDA    NXTTIME
8562  B084  C9 A0             CMP    #$A0
8563  B086  F0 03             BEQ    6E6A
8564  B088  4C 5E B2          JMP    GSC
8565  B08B  4C F4 B1  6E6A:   JMP    6E97         ;nope, all done
8566
8567  B08E  A6 49     6E70:   LDX    VALVE        ;calculate watering time
8568  B090                    DBLX
8576  B096  B5 8F             LDA    TR,X         ;use all of the time remaining
8577  B098  8D 36 02          STA    WT
8578  B09B  B5 90             LDA    TR+1,X
8579  B09D  8D 37 02          STA    WT+1
8580  B0A0  A6 49             LDX    VALVE
8581  B0A2  BD 42 15          LDA    MAXON,X      ;unless limited by MAXON
8582  B0A5  F0 1E             BEQ    6E75
8583  B0A7  85 BC             STA    R1           ;if WT>MAXON then WT=MAXON
8584  B0A9                    DBLX
8592  B0AF  AD 37 02          LDA    WT+1
8593  B0B2  D0 09             BNE    6E73
8594  B0B4  AD 36 02          LDA    WT
8595  B0B7  C5 BC             CMP    R1
8596  B0B9                    BLT    6E75
8599  B0BB  F0 08             BEQ    6E75
8600  B0BD  A5 BC     6E73:   LDA    R1
8601  B0BF  8D 36 02          STA    WT
8602  B0C2  9C 37 02          STZ    WT+1
8603  B0C5
8604  B0C5  64 BE     6E75:   STZ    R3           ;init watering interrupted flag
8605  B0C7                    ADD16  S,WT,E       ;end= start + watering time
8614                                               ;check for watering into syringe cycle
8615  B0DA  AD 35 02          LDA    E+1          ;if end>NXTTIME(0)
8616  B0DD  CD 39 02          CMP    NXTTIME+1
8617  B0E0                    BLT    6E80
8620  B0E2  F0 02             BEQ    6E7B
8621  B0E4  80 0A             BRA    6E7A
8622  B0E6  AD 34 02  6E7B:   LDA    E
8623  B0E9  CD 38 02          CMP    NXTTIME
8624  B0EC                    BLT    6E80
8627  B0EE  F0 15             BEQ    6E80
```

```
8628  80F0  38                6E7A:  SEC                    ;then stop watering at beginning
8629  80F1  AD 38 02                 LDA    NXTTIME         ;of syringe cycle
8630  80F4  ED 32 02                 SBC    S
8631  80F7  8D 36 02                 STA    WT
8632  80FA  AD 39 02                 LDA    NXTTIME+1
8633  80FD  ED 33 02                 SBC    S+1
8634  0100  8D 37 02                 STA    WT+1
8635  0103  80 48                    BRA    6E8A
8636
8637  0105  AD 1E 03          6E80:  LDA    WCLK            ;check for watering into xtime
8638  0108  C9 01                    CMP    #1              ;skip check if semi-auto
8639  010A  F0 2C                    BEQ    6E83
8640  010C  AD 33 02                 LDA    S+1
8641  010F  CD 57 15                 CMP    XTO+1           ;if start >= XTO
8642  0112                           BLT    6E77
8645  0114  F0 02                    BEQ    6E81
8646  0116  80 20                    BRA    6E83
8647  0118  AD 32 02          6E81:  LDA    S
8648  011B  CD 56 15                 CMP    XTO
8649  011E                           BGE    6E83
8652  0120  AD 35 02          6E77:  LDA    E+1             ;or if end<=XFROM
8653  0123  CD 55 15                 CMP    XFROM+1
8654  0126                           BLT    6E83
8657  0128  F0 02                    BEQ    6E82
8658  012A  80 0E                    BRA    6E84
8659  012C  AD 34 02          6E82:  LDA    E
8660  012F  CD 54 15                 CMP    XFROM
8661  0132                           BLT    6E83
8664  0134  F0 02                    BEQ    6E83
8665  0136  80 02                    BRA    6E84
8666  0138  80 2A             6E83:  BRA    6E85            ;then leave end alone
8667
8668  013A  38                6E84:  SEC                    ;else stop watering at beginning
8669  013B  AD 54 15                 LDA    XFROM           ;of Xtime
8670  013E  ED 32 02                 SBC    S
8671  0141  8D 36 02                 STA    WT
8672  0144  AD 55 15                 LDA    XFROM+1
8673  0147  ED 33 02                 SBC    S+1
8674  014A  8D 37 02                 STA    WT+1
8675  014D                    6E8A:  ADD16  S,WT,E          ;calculate new end
8684  0160                           SET    R3              ;and set interrupted flag
8688
8689                          6E85:                         ;we now have a good watering time
8690                                                        ;with flag set if interrupted
8691  0164  AD 35 02                 LDA    E+1             ;error if past midnite
8692  0167  C9 05                    CMP    #$05
8693  0169                           BLT    6E87
8696  016B  F0 03                    BEQ    6E86
8697  016D  4C 0B 03                 JMP    6ERR2
8698  0170  AD 34 02          6E86:  LDA    E
8699  0173  C9 A0                    CMP    #$A0
8700  0175                           BLT    6E87
8703  0177  4C 0B 03                 JMP    6ERR2
8704
8705  017A  A6 49             6E87:  LDX    VALVE           ;modify time remaining
8706  017C                           DBLX                   ;by subtracting watering time from it
8714  0182  38                       SEC
```

```
8715  B183  B5 98           LDA    TR+1,I
8716  B185  ED 37 02        SBC    MT+1
8717  B188  95 98           STA    TR+1,I
8718  B18A  B5 BF           LDA    TR,I
8719  B18C  ED 36 02        SBC    MT
8720  B18F  95 BF           STA    TR,I
8721  B191  A6 49           LDX    VALVE          ;then set up for next time
8722  B193                  DBLX
8730  B199  B5 BF           LDA    TR,I
8731  B19B  15 98           ORA    TR+1,I
8732  B19D  D0 0C           BNE    6E90
8733  B19F  A9 05           LDA    #$05           ;no time left for this station,
8734  B1A1  9D 39 02        STA    NXTTIME+1,I    ;so no next time
8735  B1A4  A9 A0           LDA    #$A0
8736  B1A6  9D 38 02        STA    NXTTIME,X
8737  B1A9  80 32           BRA    6E95
8738
8739  B1AB  A5 BE   6E90:   LDA    R3             ;if watering interrupted,
8740  B1AD  F0 10           BEQ    6E91
8741  B1AF  A6 49           LDX    VALVE          ;then make it next one to start
8742  B1B1                  DBLX
8750  B1B7  9E 39 02        STZ    NXTTIME+1,X
8751  B1BA  9E 38 02        STZ    NXTTIME,X
8752  B1BD  80 1E           BRA    6E95
8753  B1BF  A6 49   6E91:   LDX    VALVE          ;else next time will be end + MINOFF
8754  B1C1  BD 4B 15        LDA    MINOFF,X
8755  B1C4  85 BD           STA    R2
8756  B1C6                  DBLX
8764  B1CC  18              CLC
8765  B1CD  AD 34 02        LDA    E
8766  B1D0  65 BD           ADC    R2
8767  B1D2  9D 38 02        STA    NXTTIME,X
8768  B1D5  AD 35 02        LDA    E+1
8769  B1D8  69 00           ADC    #0
8770  B1DA  9D 39 02        STA    NXTTIME+1,X
8771
8772  B1DD  A6 49   6E95:   LDX    VALVE          ;send along base or soak
8773  B1DF  BD 4A 02        LDA    BASETYPE,X
8774  B1E2  85 D7           STA    SUB
8775  B1E4  20 EB 9F        JSR    BUILD_START    ;make a start @ STARTPTR
8776                                              ;using S, MT, VALVE
8777  B1E7  90 03           BCC    6E96
8778  B1E9  4C 07 B3        JMP    6ERR1          ;too many starts
8779  B1EC  A6 49   6E96:   LDX    VALVE
8780  B1EE  FE 54 02        INC    NSPLIT,X
8781  B1F1  4C 8A AF        JMP    6ENXT          ;else do next start
8782
8783  B1F4  20 07 AA 6E97:  JSR    FIRSTSTART     ;good exit
8784  B1F7                  MOV16  E,DONETIME
8790  B203                  MOV16  BASE_START,GENTIME
8796  B20F  AD B0 15        LDA    SYRINGE_START+1 ;GENTIME = lesser of base or syringe start
8797  B212  CD EE 15        CMP    GENTIME+1
8798  B215                  BLT    6E9A
8801  B217  F0 02           BEQ    6E9C
8802  B219  80 14           BRA    6E9B
8803  B21B  AD AF 15 6E9C:  LDA    SYRINGE_START
8804  B21E  CD ED 15        CMP    GENTIME
```

```
8805  B221                              BGE   6E9B
8808  B223             6E9A:    MOV16  SYRINGE_START,6ENTIME
8814                   6E9B:                           ;point to next start
8815  B22F                      MOV16  HOUR,IBFR+4
8821  B239  20 B3 AB            JSR    HM2MIN
8822  B23C  A5 7A     6EE0:    LDA    STARTCTR        ;see if any more starts
8823  B23E  CD EC 15            CMP    NSTARTS
8824  B241  F0 17               BEQ    6EE4            ;nope, we missed the whole day
8825  B243  A0 01               LDY    #1              ;see if current time
8826  B245  B1 7B               LDA    (STARTPTR),Y    ;is < start time
8827  B247  C5 D0               CMP    OFFSET+1
8828  B249  F0 04               BEQ    6EE1
8829  B24B                      BLT    6EE2
8832  B24D  80 0B               BRA    6EE4
8833  B24F  B2 7B     6EE1:    LDA    (STARTPTR)
8834  B251  C5 CF               CMP    OFFSET
8835  B253                      BGE    6EE4
8838  B255  20 F7 A9  6EE2:    JSR    NEXTSTART       ;start was < current time,
8839  B258  80 E2               BRA    6EE0            ;look at next one
8840                   6EE4:                           ;done, STARTPTR points to next start to do
8841  B25A  64 79               STZ    ERROR
8842  B25C  18                  CLC
8843  B25D  60                  RTS
8844
8845                   6SC:                            ;generate syringe cycles
8846  B25E  A9 01               LDA    #1
8847  B260  85 D7               STA    SUB
8848  B262  EE 71 02            INC    NSYR
8849  B265                      MOV16  NXTTIME,E
8855  B271  64 49               STZ    VALVE
8856  B273  20 A7 9E  6SC1:    JSR    NXTVALVE        ;for each valve
8857  B276  90 03               BCC    6SC2
8858  B278  4C D1 B2            JMP    6SC5
8859  B27B  A6 49     6SC2:    LDX    VALVE
8860  B27D                      DBLX
8868  B283  BD 7E 15            LDA    DUR2,X          ;if no duration, skip
8869  B286  1D 7F 15            ORA    DUR2+1,X
8870  B289  F0 E8               BEQ    6SC1
8871  B28B  BD 7E 15            LDA    DUR2,X          ;else WT=duration
8872  B28E  8D 36 02            STA    WT
8873  B291  BD 7F 15            LDA    DUR2+1,X
8874  B294  8D 37 02            STA    WT+1
8875  B297                      MOV16  E,S             ;start=end of last one
8881  B2A3                      ADD16  S,WT,E          ;end=start + WT, nothing can interfere
8890  B2B6  AD 35 02            LDA    E+1             ;except going past midnite
8891  B2B9  C9 05               CMP    #$05
8892  B2BB                      BLT    6SC3
8895  B2BD  F0 03               BEQ    6SC4
8896  B2BF  4C 8B B3            JMP    6ERR2
8897  B2C2  AD 34 02  6SC4:    LDA    E
8898  B2C5  C9 A0               CMP    #$A0
8899  B2C7                      BLT    6SC3
8902  B2C9  4C 8B B3            JMP    6ERR2
8903  B2CC  20 EB 9F  6SC3:    JSR    BUILD_START     ;make the start
8904  B2CF  80 A2               BRA    6SC1            ;next valve
8905                   6SC5:                           ;find next syringe time
8906  B2D1                      ADD16  NXTTIME,SOFTEN,NXTTIME
```

```
8915  B2E4  AD 39 02           LDA   NXTTIME+1       ;if nxttime > end of syringes
8916  B2E7  CD B2 15           CMP   SYRINGE_END+1
8917  B2EA                     BLT   GSC9
8920  B2EC  F0 02              BEQ   GSC7
8921  B2EE  80 0A              BRA   GSC8
8922  B2F0  AD 38 02    GSC7:  LDA   NXTTIME
8923  B2F3  CD B1 15           CMP   SYRINGE_END
8924  B2F6                     BLT   GSC9
8927  B2F8  F0 0A              BEQ   GSC9
8928  B2FA  A9 05       GSC8:  LDA   #$05            ;then no more
8929  B2FC  8D 39 02           STA   NXTTIME+1
8930  B2FF  A9 A0              LDA   #$A0
8931  B301  8D 38 02           STA   NXTTIME
8932  B304  4C BA AF    GSC9:  JMP   GENXT           ;go back to base watering
8933
8934                                                 ;generator errors
8935  B307  A9 01       GERR1: LDA   #1              ;1=too many starts
8936  B309  80 04              BRA   GERR
8937  B30B  A9 02       GERR2: LDA   #2              ;2=past midnite
8938  B30D  80 00              BRA   GERR
8939  B30F  85 79       GERR:  STA   ERROR
8940  B311  38                 SEC
8941  B312  60                 RTS
8942
8943                    CHECK:                       ;check setup for errors
8944  B313                     SET   CHKFLAG         ;ignore budget settings for check
8948  B318  AD 41 15           LDA   CYCLE_TYPE      ;if "so many" days,
8949  B31B  D0 0E              BNE   CHK1
8950  B31D                     SET   DAYNUM          ;just check 1st day
8954  B322  9C 1B 03           STZ   DAYNUM+1
8955  B325  9C 1C 03           STZ   DAYNUM+2
8956  B328  4C E1 AD           JMP   GE0
8957  B32B                     SET   DAYNUM          ;if specific days
                        CHK1:
8961  B330  9C 1B 03           STZ   DAYNUM+1
8962  B333  9C 1C 03           STZ   DAYNUM+2
8963  B336  EE 1C 03    CHK2:  INC   DAYNUM+2        ;check the first week
8964  B339  AD 1C 03           LDA   DAYNUM+2
8965  B33C  C9 08              CMP   #8
8966  B33E  F0 0B              BEQ   CHK4
8967  B340  20 E1 AD           JSR   GE0
8968  B343  90 F1              BCC   CHK2
8969  B345  60                 RTS
8970  B346  18          CHK3:  CLC
8971  B347  66 73              ROR   CTR
8972  B349  80 EB              BRA   CHK2
8973  B34B  18          CHK4:  CLC
8974  B34C  60                 RTS
8975
8976
8977
8978                    ;----------------------------------
8979                    ;     MATH ROUTINES
8980                    ;----------------------------------
8981
8982                    MULT:                        ;MULTIPLIER (8) * MULTIPLICAND (8) =
8983                                                 ;PRODUCT (16 bits, LSB,MSB)
8984  B34D  A9 00              LDA   #0
```

```
8985  B34F  85 51            STA    PRODUCT+1
8986  B351  A2 08            LDX    #8
8987  B353  0A       MUL1:   ASL    A
8988  B354  26 51            ROL    PRODUCT+1
8989  B356  06 4E            ASL    MULTIPLIER
8990  B358  90 07            BCC    MUL2
8991  B35A  18               CLC
8992  B35B  65 4F            ADC    MULTIPLICAND
8993  B35D  90 02            BCC    MUL2
8994  B35F  E6 51            INC    PRODUCT+1
8995  B361  CA       MUL2:   DEX
8996  B362  D0 EF            BNE    MUL1
8997  B364  85 50            STA    PRODUCT
8998  B366  60               RTS
8999
9000                 DIVIDE:                         ;DIVIDEND (15) / DIVISOR (7) =
9001                                                 ;QUOTIENT (8), with remainder in A
9002  B367  A2 08            LDX    #8
9003  B369  A5 52            LDA    DIVIDEND
9004  B36B  85 56            STA    QUOTIENT
9005  B36D  A5 53            LDA    DIVIDEND+1
9006  B36F  06 56    DIV1:   ASL    QUOTIENT
9007  B371  2A               ROL    A
9008  B372  C5 54            CMP    DIVISOR
9009  B374  90 04            BCC    DIV2
9010  B376  E5 54            SBC    DIVISOR
9011  B378  E6 56            INC    QUOTIENT
9012  B37A  CA       DIV2:   DEX
9013  B37B  D0 F2            BNE    DIV1
9014  B37D  60               RTS
9015
9016                 DIV16:                          ;DIVIDEND(16) / DIVISOR(16) =
9017                                                 ;QUOTIENT (16)
9018  B37E  A9 00            LDA    #0              ;clear partial dividend
9019  B380  85 41            STA    LSB
9020  B382  85 42            STA    MSB
9021  B384  A2 10            LDX    #16             ;dividend bit count=16
9022  B386  06 52    NXTBT:  ASL    DIVIDEND        ;shift dividend (quotient) left
9023  B388  26 53            ROL    DIVIDEND+1
9024  B38A  26 41            ROL    LSB             ;shift partial dividend left
9025  B38C  26 42            ROL    MSB
9026  B38E  A5 41            LDA    LSB             ;subtract low bytes
9027  B390  38               SEC
9028  B391  E5 54            SBC    DIVISOR
9029  B393  A8               TAY                    ;save low result in Y
9030  B394  A5 42            LDA    MSB             ;subtract hi bytes
9031  B396  E5 55            SBC    DIVISOR+1
9032  B398  90 06            BCC    CNTDN           ;divisor>dividend?
9033  B39A  E6 52            INC    DIVIDEND        ;no, set bit in quotient
9034  B39C  85 42            STA    MSB             ;  and enter subtraction result
9035  B39E  84 41            STY    LSB             ;  into partial dividend
9036  B3A0  CA       CNTDN:  DEX                    ;decrement bit count
9037  B3A1  D0 E3            BNE    NXTBT           ;loop until 16 bits are done
9038  B3A3                   MOV16  DIVIDEND,QUOTIENT
9044  B3AB  60               RTS
9045
9046
```

```
9047                           ;------------------------------------
9048                           ;       EEPROM SUPPORT
9049                           ;------------------------------------
9050
9051  B3AC  A5 4C    E2CSHI:  LDA   E2MASK        ;bring EEPROM chip select high
9052  B3AE  09 04             ORA   #00000100B
9053  B3B0  85 4C             STA   E2MASK
9054  B3B2  85 1D             STA   E2
9055  B3B4  60                RTS
9056
9057  B3B5  A9 08    E2STANDBY: LDA #00001000B   ;initialize EEPROM interface
9058  B3B7  85 4C             STA   E2MASK        ;VE high, CS low, DI low
9059  B3B9  85 1D             STA   E2
9060  B3BB  60                RTS
9061
9062  B3BC  A5 4C    E2CLK:   LDA   E2MASK        ;bring EEPROM serial clock high
9063  B3BE  09 02             ORA   #00000010B
9064  B3C0  85 4C             STA   E2MASK
9065  B3C2  85 1D             STA   E2
9066  B3C4  A5 4C             LDA   E2MASK        ;then low
9067  B3C6  29 FD             AND   #11111101B
9068  B3C8  85 4C             STA   E2MASK
9069  B3CA  85 1D             STA   E2
9070  B3CC  60                RTS
9071
9072  B3CD  A9 30    E2EWEN:  LDA   #E2EWEN_CMD   ;EEPROM erase/write enable
9073  B3CF  20 D3 B3          JSR   E2CMD         ;E2ADDR must be 0
9074  B3D2  60                RTS
9075
9076  B3D3  85 4B    E2CMD:   STA   E2WR          ;send EEPROM command in A
9077  B3D5  20 B5 B3          JSR   E2STANDBY
9078  B3D8  20 AC B3          JSR   E2CSHI
9079  B3DB  A5 4C             LDA   E2MASK        ;send 0 start bit
9080  B3DD  29 FE             AND   #11111110B
9081  B3DF  85 4C             STA   E2MASK
9082  B3E1  20 BC B3          JSR   E2CLK
9083  B3E4  A5 4C             LDA   E2MASK        ;send 1 start bit
9084  B3E6  09 01             ORA   #00000001B
9085  B3E8  85 4C             STA   E2MASK
9086  B3EA  20 BC B3          JSR   E2CLK
9087  B3ED  A5 4D             LDA   E2ADDR
9088  B3EF  05 4B             ORA   E2WR
9089  B3F1  20 F5 B3          JSR   E2TX
9090  B3F4  60                RTS
9091
9092  B3F5  85 4B    E2TX:    STA   E2WR          ;send byte in A to EEPROM
9093  B3F7  A2 08             LDX   #8            ;8 bits, no start
9094  B3F9  66 4C    E2T1:    ROR   E2MASK        ;prepare to get D0
9095  B3FB  26 4B             ROL   E2WR          ;MSB of data
9096  B3FD  26 4C             ROL   E2MASK        ;into D0 of E2MASK (DI of EEPROM)
9097  B3FF  A5 4C             LDA   E2MASK
9098  B401  85 1D             STA   E2            ;send the bit
9099  B403  20 BC B3          JSR   E2CLK
9100  B406  CA                DEX
9101  B407  D0 F0             BNE   E2T1
9102  B409  60                RTS
9103
```

```
9104                         E2READ:                    ;read word from EEPROM @ E2ADDR
9105                                                    ;into MSB, LSB
9106                                                    ;carry set if error
9107   B40A  A9 80            LDA     #E2READ_CMD
9108   B40C  20 D3 B3         JSR     E2CMD
9109   B40F  A5 1D            LDA     E2
9110   B411  30 14            BMI     E2RNG              ;DO start bit should be 0
9111   B413  A2 10            LDX     #16                ;get in 16 data bits
9112   B415  20 BC B3  E2R1:  JSR     E2CLK
9113   B418  A5 1D            LDA     E2                 ;bit is in D7
9114   B41A  2A               ROL     A                  ;bit is in carry
9115   B41B  26 41            ROL     LSB                ;now in target word
9116   B41D  26 42            ROL     MSB
9117   B41F  CA               DEX
9118   B420  D0 F3            BNE     E2R1
9119   B422  20 B5 B3  E2ROK: JSR     E2STANDBY          ;good exit
9120   B425  18               CLC
9121   B426  60               RTS
9122   B427  20 B5 B3  E2RNG: JSR     E2STANDBY          ;didn't get start bit
9123   B42A  38               SEC
9124   B42B  60               RTS
9125
9126   B42C  A9 C0     E2ERASE: LDA   #E2ERASE_CMD       ;erase EEPROM @ E2ADDR
9127   B42E  80 02            BRA     E2W2
9128
9129                         E2WRITE:                    ;write word to EEPROM @ E2ADDR
9130                                                    ;from MSB, LSB
9131                                                    ;carry set if error
9132   B430  A9 40            LDA     #E2WRITE_CMD
9133   B432  20 D3 B3  E2W2:  JSR     E2CMD
9134   B435  A5 42            LDA     MSB                ;send data
9135   B437  20 F5 B3         JSR     E2TX
9136   B43A  A5 41            LDA     LSB
9137   B43C  20 F5 B3         JSR     E2TX
9138   B43F  20 B5 B3         JSR     E2STANDBY
9139   B442  20 BC B3         JSR     E2CLK              ;start programming cycle
9140   B445  20 AC B3         JSR     E2CSHI
9141   B448  A9 14            LDA     #20
9142   B44A  85 BC            STA     R1                 ;wait 20 ms. max
9143   B44C  A0 01     E2W1:  LDY     #1
9144   B44E  20 C0 A2         JSR     WAITMS
9145   B451  A5 1D            LDA     E2
9146   B453  30 09            BMI     E2WOK              ;for cycle to finish
9147   B455  C6 BC            DEC     R1
9148   B457  D0 F3            BNE     E2W1
9149   B459  20 B5 B3  E2WNG: JSR     E2STANDBY          ;didn't get ready bit
9150   B45C  38               SEC
9151   B45D  60               RTS
9152   B45E  20 B5 B3  E2WOK: JSR     E2STANDBY          ;good exit
9153   B461  18               CLC
9154   B462  60               RTS
9155
9156
9157                         ;------------------------------------
9158                         ;    INTERRUPT ROUTINE
9159                         ;------------------------------------
9160
```

```
9161                         ;INT reloads the TIMER to generate the next INT
9162
9163                         ;These are the tasks of the interrupt:
9164                         ;     Clear the watchdog
9165                         ;     Decrement a down counter
9166                         ;     Shut down in battery removed or battery low
9167                         ;     Return keys to the main program with debounce and repeat
9168                         ;     Blink the cursor
9169                         ;     Blink the question mark
9170                         ;     Scroll messages of more than two lines
9171                         ;     Update the clock
9172
9173                         ;The variable BLINK controls blinking and scrolling.
9174                         ;     0= no blink
9175                         ;     1= blink cursor @ CURSOR
9176                         ;     2= blink ? @ CURSOR
9177                         ;     3= scroll message
9178                         ;     4= repeat message after scroll
9179                         ;     5= blink special char in lower right corner
9180
9181   B463  48        INTR:  PHA              ;interrupt service routine (TIMER)
9182   B464  DA               PHX              ;save registers
9183   B465  5A               PHY
9184   B466  A5 41            LDA    LSB
9185   B468  48               PHA
9186   B469  A5 42            LDA    MSB
9187   B46B  48               PHA
9188
9189   B46C  85 1B            STA    WATCHDOG  ;clear watchdog timer
9190   B46E  C6 46            DEC    TIMCTR    ;decrement down counter
9191   B470  C6 47            DEC    TIMCTR2
9192   B472  C6 A2            DEC    SECCTR+1  ;decrement seconds counter
9193   B474  D0 0F            BNE    INT1
9194   B476  C6 A1            DEC    SECCTR
9195   B478  A9 19            LDA    #PERSEC
9196   B47A  85 A2            STA    SECCTR+1
9197   B47C  A5 6D            LDA    FLAGS     ;that's all if no power key
9198   B47E  29 01            AND    #00000001B
9199   B480  D0 03            BNE    INT1
9200   B482  4C 09 B6         JMP    INT70
9201
9202   B485  A5 12     INT1:  LDA    STATUS1   ;if power key now gone,
9203   B487  29 01            AND    #00000001B
9204   B489  F0 07            BEQ    INT2
9205   B48B  A9 80            LDA    #10000000B  ;then return it as a key pressed
9206   B48D  85 50            STA    KEYPRESS
9207   B48F  4C 01 B6         JMP    INT60
9208   B492  A5 12     INT2:  LDA    STATUS1   ;or if battery low
9209   B494  29 20            AND    #00100000B
9210   B496  F0 07            BEQ    INT20
9211   B498  A9 81            LDA    #10000001B
9212   B49A  85 50            STA    KEYPRESS
9213   B49C  4C 01 B6         JMP    INT60
9214
9215   B49F  A5 5C     INT20: LDA    KEYREG    ;manage keyboard
9216   B4A1  D0 1D            BNE    INT22
9217   B4A3  A5 13            LDA    STATUS2   ;no keys in progress
```

```
9218  B4A5  25 5E                AND    KEYMASK
9219  B4A7  F0 40                BEQ    INT25         ;no new ones either
9220  B4A9  A0 05                LDY    #5            ;one is here, debounce
9221  B4AB  20 C0 A2             JSR    WAITMS
9222  B4AE  A5 13                LDA    STATUS2
9223  B4B0  25 5E                AND    KEYMASK
9224  B4B2  F0 35                BEQ    INT25         ;bogus key
9225  B4B4  85 5D                STA    KEYPRESS      ;key still here, save it
9226  B4B6  85 5C                STA    KEYREG
9227  B4B8  A9 19                LDA    #PERSEC       ;start repeat counter after 1 sec.
9228  B4BA  85 5F                STA    REPCTR
9229  B4BC  64 E3                STZ    CMDCTR        ;reset auto-key
9230  B4BE  80 4D                BRA    INT30
9231
9232  B4C0  A5 13        INT22:  LDA    STATUS2       ;working on a key already
9233  B4C2  25 5E                AND    KEYMASK
9234  B4C4  C5 5C                CMP    KEYREG
9235  B4C6  D0 12                BNE    INT23         ;key is gone, make sure
9236  B4C8  25 68        INT24:  AND    REPEAT_MASK   ;key still here
9237  B4CA  F0 41                BEQ    INT30
9238  B4CC  C6 5F                DEC    REPCTR
9239  B4CE  D0 3D                BNE    INT30         ;don't repeat yet
9240  B4D0  A5 5C                LDA    KEYREG        ;repeat time up, send another key
9241  B4D2  85 5D                STA    KEYPRESS
9242  B4D4  A5 6E                LDA    REPEAT_RATE   ;and reload the counter
9243  B4D6  85 5F                STA    REPCTR
9244  B4D8  80 33                BRA    INT30
9245
9246  B4DA  A0 05        INT23:  LDY    #5            ;key is going away
9247  B4DC  20 C0 A2             JSR    WAITMS        ;debounce
9248  B4DF  A5 13                LDA    STATUS2
9249  B4E1  25 5E                AND    KEYMASK
9250  B4E3  C5 5C                CMP    KEYREG
9251  B4E5  F0 E1                BEQ    INT24         ;it's still here
9252  B4E7  64 5C                STZ    KEYREG        ;it's really gone
9253
9254  B4E9  A5 E2        INT25:  LDA    INTCMD        ;no keys in progress
9255  B4EB  D0 04                BNE    INT26         ;do auto-key
9256  B4ED  64 E3                STZ    CMDCTR
9257  B4EF  80 1C                BRA    INT30
9258  B4F1  A5 E3        INT26:  LDA    CMDCTR        ;if new command,
9259  B4F3  D0 09                BNE    INT27
9260  B4F5  A6 E2                LDX    INTCMD
9261  B4F7  BD 7E F8             LDA    CMDRATE1,X
9262  B4FA  85 E3                STA    CMDCTR        ;wait before 1st key
9263  B4FC  80 0F                BRA    INT30
9264  B4FE  C6 E3        INT27:  DEC    CMDCTR        ;old command, dec ctr
9265  B500  D0 0B                BNE    INT30
9266  B502  A6 E2                LDX    INTCMD        ;if =0, reload counter with rep rate,
9267  B504  BD B2 F8             LDA    CMDRATE2,X
9268  B507  85 E3                STA    CMDCTR
9269  B509  A9 10                LDA    #NOKEY        ;and send NO key
9270  B50B  85 5D                STA    KEYPRESS
9271
9272  B50D  A5 6C        INT30:  LDA    BLINK         ;blink cursor
9273  B50F  C9 01                CMP    #1
9274  B511  F0 13                BEQ    INT31
```

```
9275  B513  A5 6D             LDA    FLAGS           ;no cursor mode, therefore
9276  B515  29 40             AND    10100000B       ;if cursor left on,
9277  B517  F0 40             BEQ    INT40           ;turn it off
9278  B519  A5 6D             LDA    FLAGS           ;no cursor mode, cursor off
9279  B51B  29 BF             AND    01011111B
9280  B51D  85 6D             STA    FLAGS
9281  B51F                    CURSOR_OFF
9285  B524  80 33             BRA    INT40
9286  B526  A5 5C      INT31: LDA    KEYREG          ;if keypress, then cursor on
9287  B528  D0 21             BNE    INT33
9288  B52A  A5 6B             LDA    INTCTR
9289  B52C  F0 05             BEQ    INT32
9290  B52E  C6 6B             DEC    INTCTR          ;blink counter running
9291  B530  4C 01 B6          JMP    INT60
9292  B533  A9 06      INT32: LDA    #BLINK_RATE     ;time up, reload
9293  B535  85 6B             STA    INTCTR
9294  B537  A5 6D             LDA    FLAGS
9295  B539  29 40             AND    10100000B
9296  B53B  F0 0E             BEQ    INT33
9297  B53D  A5 6D             LDA    FLAGS           ;cursor was on, turn off
9298  B53F  29 BF             AND    01011111B
9299  B541  85 6D             STA    FLAGS
9300  B543                    CURSOR_OFF
9304  B548  4C 01 B6          JMP    INT60
9305  B54B  A5 6D      INT33: LDA    FLAGS           ;cursor was off, turn on
9306  B54D  09 40             ORA    10100000B
9307  B54F  85 6D             STA    FLAGS
9308  B551                    CURSOR_ON
9312  B556  4C 01 B6          JMP    INT60
9313
9314  B559  A5 6C      INT40: LDA    BLINK           ;blink "?"
9315  B55B  C9 02             CMP    #2
9316  B55D  F0 0C             BEQ    INT45
9317  B55F  C9 05             CMP    #5              ;or OK char
9318  B561  F0 08             BEQ    INT45
9319  B563  A5 6D             LDA    FLAGS           ;if not, clear flag
9320  B565  29 7F             AND    01111111B
9321  B567  85 6D             STA    FLAGS
9322  B569  80 56             BRA    INT50
9323  B56B  A5 5C      INT45: LDA    KEYREG          ;? on if keypress
9324  B56D  F0 02             BEQ    INT46
9325  B56F  80 11             BRA    INT41
9326  B571  A5 6B      INT46: LDA    INTCTR          ;time to blink?
9327  B573  F0 05             BEQ    INT42
9328  B575  C6 6B             DEC    INTCTR          ;blink counter running
9329  B577  4C 01 B6          JMP    INT60
9330  B57A  A9 06      INT42: LDA    #BLINK_RATE     ;time up, reload
9331  B57C  85 6B             STA    INTCTR
9332  B57E  A5 6D             LDA    FLAGS
9333  B580  30 35             BMI    INT43
9334  B582  A5 6D      INT41: LDA    FLAGS           ;char was off, turn on
9335  B584  09 80             ORA    10000000B
9336  B586  85 6D             STA    FLAGS
9337  B588  A5 6C             LDA    BLINK
9338  B58A  C9 02             CMP    #2
9339  B58C  F0 04             BEQ    INT4A
9340  B58E  A9 00             LDA    #0              ;char=OK if blink=5
```

| | | | | | | |
|---|---|---|---|---|---|---|
| 9341 | B590 | 80 02 | | BRA | INT44 | |
| 9342 | B592 | A9 3F | INT4A: | LDA | #'?' | ;char=? if blink=2 |
| 9343 | B594 | A6 6C | INT44: | LDX | BLINK | ;display the char |
| 9344 | B596 | E0 02 | | CPX | #2 | |
| 9345 | B598 | F0 13 | | BEQ | INT4B | |
| 9346 | B59A | A6 48 | | LDX | CURSOR | ;if blink=5, display in corner |
| 9347 | B59C | 8A | | PHX | | |
| 9348 | B59D | 48 | | PHA | | |
| 9349 | B59E | | | SET_CURSOR LINE2+15 | | |
| 9353 | B5A3 | 68 | | PLA | | |
| 9354 | B5A4 | 20 10 A3 | | JSR | OCHAR | |
| 9355 | B5A7 | 68 | | PLA | | |
| 9356 | B5A8 | 20 BC A3 | | JSR | LCD_ADDR | |
| 9357 | B5AB | 80 54 | | BRA | INT60 | |
| 9358 | B5AD | 20 10 A3 | INT4B: | JSR | OCHAR | ;if blink=2, display at cursor |
| 9359 | B5B0 | | | BACKUP | 1 | |
| 9363 | B5B5 | 80 4A | | BRA | INT60 | |
| 9364 | B5B7 | A5 6D | INT43: | LDA | FLAGS | ;char was on, turn off |
| 9365 | B5B9 | 29 7F | | AND | #01111111B | |
| 9366 | B5BB | 85 6D | | STA | FLAGS | |
| 9367 | B5BD | A9 20 | | LDA | #' ' | |
| 9368 | B5BF | 80 D3 | | BRA | INT44 | |
| 9369 | | | | | | |
| 9370 | B5C1 | A5 6C | INT50: | LDA | BLINK | |
| 9371 | B5C3 | C9 03 | | CMP | #3 | |
| 9372 | B5C5 | F0 04 | | BEQ | INT55 | |
| 9373 | B5C7 | C9 04 | | CMP | #4 | |
| 9374 | B5C9 | D0 36 | | BNE | INT60 | |
| 9375 | B5CB | A5 68 | INT55: | LDA | INTCTR | ;see if time to scroll |
| 9376 | B5CD | F0 04 | | BEQ | INT51 | ;no, keep counting |
| 9377 | B5CF | C6 68 | | DEC | INTCTR | |
| 9378 | B5D1 | 80 2E | | BRA | INT60 | |
| 9379 | B5D3 | A9 3E | INT51: | LDA | #SRATE2 | ;yes, reload counter |
| 9380 | B5D5 | 85 68 | | STA | INTCTR | |
| 9381 | B5D7 | E6 D6 | | INC | SCREEN | ;show next screen |
| 9382 | B5D9 | 20 85 A3 | | JSR | DISPLAY_CLR | |
| 9383 | B5DC | 20 F5 A2 | | JSR | DMSG | |
| 9384 | B5DF | A5 6C | | LDA | BLINK | |
| 9385 | B5E1 | C9 03 | | CMP | #3 | |
| 9386 | B5E3 | F0 12 | | BEQ | INT52 | |
| 9387 | B5E5 | A5 D6 | | LDA | SCREEN | ;if blink=4 |
| 9388 | B5E7 | C5 D5 | | CMP | SCREENS | |
| 9389 | B5E9 | | | BLT | INT60 | |
| 9392 | B5EB | F0 14 | | BEQ | INT60 | |
| 9393 | B5ED | 20 85 A3 | | JSR | DISPLAY_CLR | ;ask repeat msg after last screen |
| 9394 | B5F0 | | | MESSAGE 111 | | |
| 9398 | B5F5 | 80 06 | | BRA | INT53 | |
| 9399 | | | | | | |
| 9400 | B5F7 | A5 D6 | INT52: | LDA | SCREEN | ;if blink=3 and last screen then quit |
| 9401 | B5F9 | C5 D5 | | CMP | SCREENS | |
| 9402 | B5FB | D0 04 | | BNE | INT60 | |
| 9403 | | | | | | |
| 9404 | B5FD | | INT53: | NOBLINK | | ;stop scrolling |
| 9408 | | | | | | |
| 9409 | B601 | 20 D6 A4 | INT60: | JSR | READ_RTC | ;update clock |
| 9410 | B604 | F0 03 | | BEQ | INT70 | |
| 9411 | B606 | 20 EF A4 | | JSR | UPDATE_CLOCK | ;when it needs it |

```
9412
9413   B609  85 0D         INT70:  STA     TIMER_LOAD      ;restart TIMER
9414
9415   B60B  68                    PLA
9416   B60C  85 42                 STA     MSB
9417   B60E  68                    PLA
9418   B60F  85 41                 STA     LSB
9419   B611  7A                    PLY                     ;restore registers
9420   B612  FA                    PLX
9421   B613  68                    PLA
9422   B614  40                    RTI
9423
9424   B615  40            NMIINT: RTI                     ;never happens
9425
9426
9427
9428
9429   B616                        INCLUDE     HELP.ASM
9430                        ;-----------------------------------
9431                        ;     SCROLLING MESSAGES
9432                        ;-----------------------------------
9433   B616
9434   B616  01 1E 54 68 69  SCROLL0: BYTE  1,30,'This feature is NOT AVAILABLE.'
9435   B636
9436   B636  02 1B 43 68 6F  SCROLL1: BYTE  2,27,'Choose whether to exit the'
9437   B653  19 40 6F 64 65           BYTE     25,'Mode or do    it again.'
9438   B66D
9439   B66D  02 20 4E 6F 20  SCROLL2: BYTE  2,32,'No watering   schedule set up.'
9440   B68F  16 44 6F 20 53           BYTE     22,'Do SET SCHEDULESfirst.'
9441   B6A6
9442   B6A6  02 19 54 6F 20  SCROLL3: BYTE  2,25,'To start      watering,'
9443   B6C1  18 54 61 68 65           BYTE     24,'Take POWER KEY out now.'
9444   B6DA
9445   B6DA  02 19 54 68 69  SCROLL4: BYTE  2,25,'This Set Up has an error.'
9446   B6F5  16 44 6F 20 53           BYTE     22,'Do SET SCHEDULESagain.'
9447   B70C
9448   B70C  02 1C 54 68 65  SCROLL5: BYTE  2,28,'The SETUP type you selected'
9449   B72A  1C 68 61 73 20           BYTE     28,'has not been  entered yet.'
9450   B747
9451                        ; global message for new setup or modify CONFIRM screens
9452   B747
9453   B747  02 20 50 72 65  SCROLL6: BYTE  2,32,'Press OK to-  CONFIRM setting;'
9454   B769  1A 50 72 65 73           BYTE     26,'Press NO to   CHANGE it.'
9455   B784
9456                        ; global message for HISTORY or SETTINGS review screens
9457   B784
9458   B784  02 20 50 72 65  SCROLL7: BYTE  2,32,'Press OK to viewthe next screen,'
9459   B7A6  20 6F 72 20 4E           BYTE     32,'or NO to start the review over.'
9460   B7C7
9461                        ; global message for all COPY TO NEXT VALVE screens
9462   B7C7
9463   B7C7  03 20 50 72 65  SCROLL8: BYTE  3,32,'Press OK to use the SAME setting'
9464   B7E9  1B 66 6F 72 20           BYTE     27,'for the next  station, or'
9465   B805  20 70 72 65 73           BYTE     32,'press NO to set a different one.'
9466   B826
9467   B826  03 18 57 65 6C  SCROLL9: BYTE  3,24,'Welcome to the SOLATROL'
9468   B840  1B 4C 45 49 54           BYTE     27,'LEIT(TM) 8000 Controller.'
```

```
9469  B85C  20 57 61 6E 74           BYTE    32,'Want Directions?(Press NO or OK)'
9470  B87D
9471                                 ; Directions (Scroll10-Scroll23)
9472  B87D
9473  B87D  04 18 53 4F 4C  SCROLL10: BYTE   4,24,'SOLATROL    welcomes'
9474  B897  1D 45 4E 56 49           BYTE    29,'ENVIRONMENTAL   INDUSTRIES to'
9475  B8B5  1B 74 68 65 20           BYTE    27,'the LEIT(TM)8000Controller.'
9476  B8D1  20 57 61 6E 74           BYTE    32,'Want Directions?(Press OK or NO)'
9477  B8F2
9478  B8F2  03 1F 54 68 69  SCROLL11: BYTE   3,31,'This Controller uses and stores'
9479  B913  1B 6C 69 67 68           BYTE    27,'light energy to run up to 8'
9480  B92F  20 53 4F 4C 41           BYTE    32,'SOLATROL    SUPERVALVES(TM).'
9481  B950
9482  B950  08 1F 57 68 65  SCROLL12: BYTE   8,31,'When the displayasks a question'
9483  B971  1E 6F 72 20 62           BYTE    30,'or blinks the   underline (_),'
9484  B990  20 79 6F 75 20           BYTE    32,'you press OK    to answer YES or'
9485  B9B1  1E 74 6F 20 61           BYTE    30,'to accept the   current number'
9486  B9D0  1F 6F 72 20 79           BYTE    31,'or you press NO to see the next'
9487  B9F0  17 63 68 6F 69           BYTE    23,'choice or       number.'
9488  BA09  1D 48 6F 6C 64           BYTE    29,'Holding down theNO key causes'
9489  BA26  1F 74 68 65 20           BYTE    31,'the numbers to  change rapidly.'
9490  BA46
9491  BA46  09 20 57 68 65  SCROLL13: BYTE   9,32,'When you need toenter numbers or'
9492  BA68  1E 73 65 6C 65           BYTE    30,'select options  from a list of'
9493  BA87  1A 63 68 6F 69           BYTE    26,'choices, the    Controller'
9494  BAA2  1D 61 75 74 6F           BYTE    29,'automatically   advances thru'
9495  BAC0  20 74 68 65 20           BYTE    32,'the choices or  numbers for you.'
9496  BAE1  1B 50 72 65 73           BYTE    27,'Press OK when   the correct'
9497  BAFD  1D 63 68 6F 69           BYTE    29,'choice or numberis displayed.'
9498  BB1B  20 48 6F 6C 64           BYTE    32,'Holding down theNO key makes the'
9499  BB3C  17 64 69 73 70           BYTE    23,'display change  faster.'
9500  BB54
9501  BB54  06 1C 59 6F 75  SCROLL14: BYTE   6,28,'You can press   the HELP key'
9502  BB72  1A 74 6F 20 68           BYTE    26,'to have the     Controller'
9503  BB8D  1E 65 78 70 6C           BYTE    30,'explain the     question or to'
9504  BBAC  1C 67 65 74 20           BYTE    28,'get more        information.'
9505  BBC9  1F 54 68 65 20           BYTE    31,'The STOP key canbe used to exit'
9506  BBE9  20 66 72 6F 6D           BYTE    32,'from Help to theprevious screen.'
9507  BC0A
9508  BC0A  08 1F 54 68 65  SCROLL15: BYTE   8,31,'There are 4 mainoptions used in'
9509  BC2B  1B 73 65 74 74           BYTE    27,'setting up and  running the'
9510  BC47  1D 43 6F 6E 74           BYTE    29,'Controller.-    These options'
9511  BC65  20 61 72 65 20           BYTE    32,'are chosen from a self-advancing'
9512  BC86  1B 6C 69 73 74           BYTE    27,'list by pressingthe OK key.'
9513  BCA2  1F 54 68 65 20           BYTE    31,'The STOP Key    always abandons'
9514  BCC2  20 74 68 65 20           BYTE    32,'the current     screen & returns'
9515  BCE3  1A 79 6F 75 20           BYTE    26,'you to the      beginning.'
9516  BCFE
9517  BCFE  08 1E 45 4E 54  SCROLL16: BYTE   8,30,'ENTER SETUP     lets you enter'
9518  BD1E  19 53 43 48 45           BYTE    25,'SCHEDULES or    ALTERNATE'
9519  BD38  18 53 43 48 45           BYTE    24,'SCHEDULES to    tell the'
9520  BD51  1A 43 6F 6E 74           BYTE    26,'Controller when and how to'
9521  BD6C  1B 72 75 6E 20           BYTE    27,'run each valve  or station.'
9522  BD88  1F 45 4E 54 45           BYTE    31,'ENTER SETUP alsolets you set up'
9523  BDAB  1D 74 68 65 20           BYTE    29,'the SYSTEM to   fit your site'
9524  BDC6  1C 61 6E 64 20           BYTE    28,'and specific    application.'
9525  BDE3
```

```
9526  BDE3  03 1C 52 55 4E   SCROLL17:  BYTE  3,28,'RUN STATIONS   lets you run'
9527  BE01  1F 73 74 61 74              BYTE  31,'stations in 3    ways: AUTOMATIC'
9528  BE21  19 53 45 4D 49              BYTE  25,'SEMI-AUTOMATIC, & MANUAL.'
9529  BE3B
9530  BE3B  03 1E 41 55 54   SCROLL18:  BYTE  3,30,'AUTOMATIC RUN isthe normal way'
9531  BE5B  1B 74 6F 20 74              BYTE  27,'to turn valves   on & off as'
9532  BE77  1E 73 63 68 65              BYTE  30,'scheduled in     Set SCHEDULES.'
9533  BE96
9534  BE96  04 1B 53 45 4D   SCROLL19:  BYTE  4,27,'SEMI-AUTO RUN    lets you do'
9535  BEB3  1E 61 6E 20 69              BYTE  30,'an immediate OneTime Soak or a'
9536  BED2  1C 6E 6F 72 6D              BYTE  28,'normal watering cycle before'
9537  BEEF  1E 72 65 76 65              BYTE  30,'reverting to     AUTOMATIC RUN.'
9538  BF0E
9539  BF0E  05 1D 4D 41 4E   SCROLL20:  BYTE  5,29,'MANUAL RUN       allows you to'
9540  BF2D  1E 6F 70 65 72              BYTE  30,'operate Valves   one at a time,'
9541  BF4C  1E 6F 72 20 69              BYTE  30,'or in a defined TEST SEQUENCE,'
9542  BF6B  1D 61 6E 64 20              BYTE  29,'and it lets you take Moisture'
9543  BF89  10 53 65 6E 73              BYTE  16,'Sensor readings.'
9544  BF9A
9545  BF9A  04 1F 4E 4F 20   SCROLL21:  BYTE  4,31,'NO WATERING willoccur if you OK'
9546  BFBB  1E 53 54 41 59              BYTE  30,'STAY IDLE/OFF. The Controller'
9547  BFDA  1C 77 69 6C 6C              BYTE  28,'will keep all    your setups,'
9548  BFF7  1C 62 75 74 20              BYTE  28,'but none of thewill be run.'
9549  C014
9550  C014  04 1F 56 49 45   SCROLL22:  BYTE  4,31,'VIEW INFO lets  you see HISTORY'
9551  C035  1F 65 76 65 6E              BYTE  31,'events by date, see DIRECTIONS,'
9552  C055  1E 73 65 65 20              BYTE  30,'see RUN TOTALS, or do a system'
9553  C074  0A 53 45 4C 46              BYTE  10,'SELF TEST.'
9554  C07F
9555  C07F  06 1F 42 65 66   SCROLL23:  BYTE  6,31,'Before you can  BEGIN WATERING,'
9556  C0A0  1D 79 6F 75 20              BYTE  29,'you need to     complete both'
9557  C0BE  1E 53 65 74 75              BYTE  30,'Setup SYSTEM &  Set SCHEDULES.'
9558  C0DD  1D 54 68 65 6E              BYTE  29,'Then choose     RUN STATIONS,'
9559  C0FB  1E 74 68 65 6E              BYTE  30,'then either     AUTOMATIC RUN,'
9560  C11A  1E 53 45 4D 49              BYTE  30,'SEMI-AUTO RUN, or MANUAL RUN.'
9561  C139
9562               ; message for Self Test question
9563  C139
9564  C139  03 1D 54 68 65   SCROLL24:  BYTE  3,29,'The SELF TEST  automatically'
9565  C158  1D 74 65 73 74              BYTE  29,'tests the wiringand tells you'
9566  C176  1F 74 68 65 20              BYTE  31,'the time, date, & current mode.'
9567  C196
9568  C196  04 20 50 72 65   SCROLL25:  BYTE  4,32,'Press STOP to   temporarily STOP'
9569  C1B8  18 52 55 4E 4E              BYTE  24,'RUNNING your    watering'
9570  C1D1  1A 73 63 68 65              BYTE  26,'schedule, or    REMOVE the'
9571  C1EC  1D 50 4F 57 45              BYTE  29,'POWER KEY to    keep running.'
9572  C20A
9573               ; message for Secret Codes (only use if Secret Code set)
9574  C20A
9575  C20A  06 1F 54 6F 20   SCROLL26:  BYTE  6,31,'To change the  settings of the'
9576  C22B  1B 43 6F 6E 74              BYTE  27,'Controller,     you need to'
9577  C247  1E 65 6E 74 65              BYTE  30,'enter your      USER CODE now.'
9578  C266  1D 49 66 20 79              BYTE  29,'If you remove  the POWER KEY'
9579  C284  1D 6E 6F 77 2C              BYTE  29,'now, all       settings will'
9580  C2A2  1A 72 65 6D 61              BYTE  26,'remain the same as before.'
9581  C2BD
9582  C2BD  02 1B 45 6E 74   SCROLL27:  BYTE  2,27,'Enter how long to run each'
```

```
9583   C20A  1E 53 74 61 74            BYTE    30,'Station (from  1-30 minutes).'
9584
9585   C2F9                   SCROLL28:
9586   C2F9
9587   C2F9                   SCROLL29:
9588   C2F9
9589   C2F9  03 1E 45 4E 54   SCROLL30: BYTE  3,30,'ENTER SETUP modelets you enter'
9590   C319  19 53 43 48 45            BYTE    25,'SCHEDULES,    ALTERNATE'
9591   C333  20 53 43 48 45            BYTE    32,'SCHEDULES, or  SYSTEM SETTINGS.'
9592   C354
9593   C354  02 1E 53 65 74   SCROLL31: BYTE  2,30,'Set SCHEDULES  lets you enter'
9594   C374  20 76 61 72 69            BYTE    32,'various types ofwatering setups.'
9595   C395
9596   C395  03 1E 53 65 74   SCROLL32: BYTE  3,30,'Set ALT. SCHED. lets you enter'
9597   C3B5  1F 61 6C 74 65            BYTE    31,'alternate      versions of the'
9598   C3D5  20 76 61 72 69            BYTE    32,'various types ofwatering setups.'
9599   C3F6
9600   C3F6  03 1F 53 65 74   SCROLL33: BYTE  3,31,'Setup SYSTEM   lets you set up'
9601   C417  1D 74 68 65 20            BYTE    29,'the SYSTEM to  fit your site'
9602   C435  1C 61 6E 64 20            BYTE    28,'and specific   application.'
9603   C452
9604   C452  03 1F 54 68 65   SCROLL34: BYTE  3,31,'There are no   wired stations.'
9605   C473  1A 4F 6C 64 20            BYTE    26,'Old ID will be kept until'
9606   C48E  1A 77 69 72 65            BYTE    26,'wires are      connected.'
9607   C4A9
9608   C4A9  08 1F 43 68 6F   SCROLL35: BYTE  8,31,'Choose (OK)    "Use site info"'
9609   C4CA  1E 74 6F 20 61            BYTE    30,'to automaticallyenter the best'
9610   C4E9  1E 73 70 6C 69            BYTE    30,'split ON and OFFtimes based on'
9611   C508  20 74 62 65 20            BYTE    32,'the type of    soil, terrain, &'
9612   C529  1C 73 70 72 69            BYTE    28,'sprinklers for each station'
9613   C546  1B 6C 6F 63 61            BYTE    27,'location, or   choose (OK)'
9614   C562  1D 22 45 6E 74            BYTE    29,'"Enter directly"to enter your'
9615   C580  1F 6F 77 6E 20            BYTE    31,'own maximum ONs,& minimum OFFs.'
9616   C5A0
9617   C5A0  05 20 50 72 65   SCROLL36: BYTE  5,32,'Press OK when  the correct type'
9618   C5C2  1D 6F 66 20 74            BYTE    29,'of terrain and soil for this'
9619   C5E0  1B 73 74 61 74            BYTE    27,'station is     shown, then'
9620   C5FC  20 70 72 65 73            BYTE    32,'press OK when  the correct type'
9621   C61D  16 6F 66 20 73            BYTE    22,'of sprinkler is shown.'
9622   C634
9623   C634                   SCROLL37:
9624   C634
9625   C634  01 1D 54 68 69   SCROLL38: BYTE  1,29,'This HELP is   for Set Site.'
9626   C653
9627   C653  02 1F 53 65 74   SCROLL39: BYTE  2,31,'Set TIME/DATE  lets you see or'
9628   C674  1F 63 68 61 6E            BYTE    31,'change the time & date setting.'
9629   C694
9630   C694  03 1E 44 6F 20   SCROLL40: BYTE  3,30,'Do WIRE CHECK  lets you check'
9631   C6B4  1D 66 6F 72 20            BYTE    29,'for shorted or broken (open)'
9632   C6D2  16 76 61 6C 76            BYTE    22,'valve or sensor wires.'
9633   C6E9
9634   C6E9  03 1D 53 65 74   SCROLL41: BYTE  3,29,'Setup STATIONS lets you View'
9635   C708  1E 43 75 72 72            BYTE    30,'Current Station IDs (numbers),'
9636   C727  20 6F 72 20 45            BYTE    32,'or Enter New IDsto change ID #s.'
9637
9638                          ;add to Scroll41 when add "Assign Types" function:
9639   C748
```

```
9640                                     ;       BYTE    25,'It also lets you designate'
9641                                     ;       BYTE    31,'station uses.  Stations can be'
9642                                     ;       BYTE    30,'used for REGULAR valves, MASTER'
9643                                     ;       BYTE    32,'valves, or for a SPECIAL use like'
9644                                     ;       BYTE    16,'lights or pumps.'
9645    C748
9646    C748
9647    C748  07 1D 53 65 74    SCROLL42: BYTE   7,29,'Setup SENSORS    lets you View'
9648    C767  1E 43 75 72 72              BYTE   30,'Current Sensor  IDs (numbers),'
9649    C786  20 6F 72 20 45              BYTE   32,'or Enter New IDs to change ID #s.'
9650    C7A7  1D 49 74 20 61              BYTE   29,'It also lets you assign sensor'
9651    C7C5  20 70 6F 73 69              BYTE   32,'positions to    different sensor'
9652    C7E6  1C 74 79 70 65              BYTE   28,'types, such as  Moisture, or'
9653    C803  0D 52 61 69 6E              BYTE   13,'Rain Sensors.'
9654    C811
9655    C811  02 1E 53 65 74    SCROLL43: BYTE   2,30,'Set USER CODES limits who may'
9656    C831  1F 68 61 76 65              BYTE   31,'have access to  the Controller.'
9657    C851
9658    C851  02 20 50 72 65    SCROLL44: BYTE   2,32,'Press OK to EXIT this task and go'
9659    C873  1A 62 61 63 6B              BYTE   26,'back to the     beginning.'
9660    C88E
9661    C88E                    SCROLL45:
9662    C88E
9663    C88E                    SCROLL46:
9664    C88E
9665    C88E                    SCROLL47:
9666    C88E
9667    C88E  03 1F 41 20 4D    SCROLL48: BYTE   3,31,'A MASTER VALVE is a valve that'
9668    C8AF  1C 69 73 20 74              BYTE   28,'is turned on    whenever any'
9669    C8CC  13 6F 74 68 65              BYTE   19,'other valve is  on.'
9670    C8E0
9671    C8E0  02 20 54 68 65    SCROLL49: BYTE   2,32,'The Controller  is asking if the'
9672    C902  1C 73 65 74 74              BYTE   28,'settings shown  are correct.'
9673    C91F
9674    C91F  02 19 50 72 65    SCROLL50: BYTE   2,25,'Press OK to see or change'
9675    C93A  1B 77 68 69 63              BYTE   27,'which stations  are active.'
9676    C956
9677    C956                    SCROLL51:
9678    C956
9679    C956  02 1C 54 68 65    SCROLL52: BYTE   2,28,'The valve shown is presently'
9680    C974  19 73 65 74 20              BYTE   25,'set up to do NO WATERING.'
9681    C98E
9682    C98E  05 1F 45 6E 74    SCROLL53: BYTE   5,31,'Enter when to   START WATERING.'
9683    C9AF  1F 55 73 65 20              BYTE   31,'Use a Start Time early enough to'
9684    C9CF  1F 66 69 6E 69              BYTE   31,'finish before   midnight if you'
9685    C9EF  1D 61 72 65 20              BYTE   29,'are using long  100% Watering'
9686    CA0D  1F 44 75 72 61              BYTE   31,'Durations or    Excluded Times.'
9687    CA2D
9688    CA2D  07 1D 45 6E 74    SCROLL54: BYTE   7,29,'Enter the TOTAL watering time'
9689    CA4C  1D 70 65 72 20              BYTE   29,'per day for this valve. Enter'
9690    CA6A  1C 68 6F 75 72              BYTE   28,'hours (h), then minutes (m).'
9691    CA87  1D 4F 4B 20 30              BYTE   29,'OK 0h to enter  minutes only.'
9692    CAA5  20 45 6E 74 65              BYTE   32,'Entering a 100% Duration = 0h+0m'
9693    CAC6  1D 6C 65 74 73              BYTE   29,'lets you SKIP   watering with'
9694    CAE4  0B 74 68 69 73              BYTE   11,'this valve.'
9695    CAF0
9696    CAF0  02 1D 45 6E 74    SCROLL55: BYTE   2,29,'Enter HOW OFTEN to water from'
```

```
9697   CB0F  20 31 20 39 30              BYTE     32,'1-90 days (every1 days = daily).'
9698   CB30
9699   CB30  04 1F 22 53 4F   SCROLL56:  BYTE     4,31,'"SO MANY" DAYS waters at fixed'
9700   CB51  1A 69 6E 74 65              BYTE     26,'intervals from 1-90 days.'
9701   CB6C  1E 22 53 50 45              BYTE     30,'"SPECIFIC DAYS" waters only on'
9702   CB8B  1A 63 65 72 74              BYTE     26,'certain days    each week.'
9703   CBA6
9704   CBA6                   SCROLL57:
9705   CBA6
9706   CBA6  06 1C 54 68 65   SCROLL58:  BYTE     6,28,'The WATER BUDGETincreases or'
9707   CBC4  1E 64 65 63 72              BYTE     30,'decreases the   water applied.'
9708   CBE3  1E 41 20 76 61              BYTE     30,'A value of 100% waters exactly'
9709   CC02  17 61 63 63 6F              BYTE     23,'according to theSet Up.'
9710   CC1A  1F 54 68 65 20              BYTE     31,'The water budgetdoes not affect'
9711   CC3A  17 53 6F 61 6B              BYTE     23,'Soak & syringe  cycles.'
9712   CC52
9713   CC52  03 19 54 68 65   SCROLL59:  BYTE     3,25,'The display     shows the'
9714   CC6D  1B 63 75 72 72              BYTE     27,'currently activestation #s.'
9715   CC89  18 50 72 65 73              BYTE     24,'Press NO to makechanges.'
9716   CCA2
9717   CCA2  02 1C 50 72 65   SCROLL60:  BYTE     2,28,'Press OK for    each station'
9718   CCC0  1D 74 68 61 74              BYTE     29,'that you want touse (ENABLE).'
9719   CCDE
9720   CCDE  04 1E 53 50 4C   SCROLL61:  BYTE     4,30,'SPLITS let you  split the 100%'
9721   CCFE  1C 77 61 74 65              BYTE     28,'watering time   into shorter'
9722   CD1B  1D 4F 4E 20 74              BYTE     29,'ON times to     reduce runoff'
9723   CD39  0C 61 6E 64 20              BYTE     12,'and erosion.'
9724   CD46
9725   CD46  03 1C 43 68 6F   SCROLL62:  BYTE     3,28,'Choose whether  to turn this'
9726   CD64  1E 73 74 61 74              BYTE     30,'station OFF/ON, go to the NEXT'
9727   CD83  1B 73 74 61 74              BYTE     27,'station, or EXITManual Run.'
9728
9729   CD9F  06 1D 54 68 65   SCROLL63:  BYTE     6,29,'The top line    shows whether'
9730   CDBE  1E 73 74 61 74              BYTE     30,'stations are ON (number shown)'
9731   CDDD  1F 6F 72 20 4F              BYTE     31,'or OFF (-).     The bottom line'
9732   CDFD  1F 6C 65 74 73              BYTE     31,'lets you Turn ONor Turn OFF the'
9733   CE1D  1E 69 6E 64 69              BYTE     30,'indicated Sta #,go to the NEXT'
9734   CE3C  1B 73 74 61 74              BYTE     27,'station, or EXITmanual run.'
9735   CE58
9736   CE58  04 1A 54 68 69   SCROLL64:  BYTE     4,26,'This HISTORY    event is a'
9737   CE74  1D 76 61 6C 76              BYTE     29,'valve start. Thedisplay shows'
9738   CE92  1D 74 68 65 20              BYTE     29,'the valve #, thestart time, &'
9739   CEB0  1E 74 68 65 20              BYTE     30,'the actual      watering time.'
9740   CECF
9741   CECF  04 1A 54 68 69   SCROLL65:  BYTE     4,26,'This HISTORY    event is a'
9742   CEEB  1A 74 69 6D 65              BYTE     26,'time and date   stamp. All'
9743   CF06  1F 65 76 65 6E              BYTE     31,'events displayedafter the stamp'
9744   CF26  14 6F 63 63 75              BYTE     20,'occurred on thatday.'
9745   CF3B
9746   CF3B  03 20 54 68 69   SCROLL66:  BYTE     3,32,'This HISTORY    event shows when'
9747   CF5D  20 6F 70 65 72              BYTE     32,'operating Modes or the Power Key'
9748   CF7E  0F 68 61 76 65              BYTE     15,'have been used.'
9749   CF8E
9750   CF8E  07 1F 53 65 65   SCROLL67:  BYTE     7,31,'See DIRECTIONS  shows operating'
9751   CFAF  1B 70 72 6F 63              BYTE     27,'procedures;     See HISTORY'
9752   CFCB  1B 73 68 6F 77              BYTE     27,'shows the last  128 events;'
9753   CFE7  1D 53 65 65 20              BYTE     29,'See RUN TOTALS  shows monthly'
```

```
9754  D0B5  1A 63 75 6D 75           BYTE   26,'cumulative run  times; and'
9755  D020  1F 44 6F 20 53           BYTE   31,'Do SELF TEST    shows the mode,'
9756  D040  20 74 69 6D 65           BYTE   32,'time & date,    & wiring status.'
9757  D061
9758  D061  02 1C 2A 45 52  SCROLL68: BYTE  2,28,'*ERROR* The 2nd time MUST be'
9759  D07F  19 4C 41 54 45           BYTE   25,'LATER THAN the  1st time.'
9760  D099
9761  D099  02 1C 4E 4F 20  SCROLL69: BYTE  2,28,'NO WATERING    will be done'
9762  D0B7  14 6F 6E 20 74           BYTE   20,'on the selected day.'
9763  D0CC
9764  D0CC  04 1F 53 65 6C  SCROLL70: BYTE  4,31,'Select a number of days to WAIT'
9765  D0ED  20 62 65 66 6F           BYTE   32,'before watering with this valve.'
9766  D10E  1C 53 65 6C 65           BYTE   28,'Select 0 to     water at the'
9767  D12B  1B 66 69 72 73           BYTE   27,'first allowable start time.'
9768  D147
9769  D147  03 1D 2A 45 52  SCROLL71: BYTE  3,29,'*ERROR*    Set Up empty.'
9770  D166  20 55 73 65 20           BYTE   32,'Use ENTER SETUP to Set SCHEDULE,'
9771  D187  20 66 6F 72 20           BYTE   32,'for the Set Up  you want to run.'
9772  D1A8
9773  D1A8  05 1D 50 72 65  SCROLL72: BYTE  5,29,'Press OK for    each week day'
9774  D1C7  1E 6F 6E 20 77           BYTE   30,'on which you    want to water.'
9775  D1E6  1C 49 66 20 6F           BYTE   28,'If only one day is selected,'
9776  D203  1C 63 68 6F 6F           BYTE   28,'choose every    1wk (7 days)'
9777  D220  1E 75 70 20 74           BYTE   30,'up to every     9wk (63 days).'
9778  D23F
9779  D23F  02 1E 48 45 4C  SCROLL73: BYTE  2,30,'HELP message is not available.'
9780  D25F  1D 52 65 66 65           BYTE   29,'Refer to the    USERS MANUAL.'
9781  D27D
9782  D27D  04 20 2A 45 52  SCROLL74: BYTE  4,32,'*ERROR*         Too many starts.'
9783  D29F  19 54 68 65 20           BYTE   25,'The maximum     number is'
9784  D2B9  1D 31 32 38 20           BYTE   29,'128 per day, or an average of'
9785  D2D7  0F 31 36 20 70           BYTE   15,'16 per station.'
9786  D2E7
9787  D2E7  05 1D 2A 45 52  SCROLL75: BYTE  5,29,'*ERROR*         Sequence runs'
9788  D306  1E 70 61 73 74           BYTE   30,'past midnight! Set an earlier'
9789  D325  1D 53 74 61 72           BYTE   29,'Start Time,     set a shorter'
9790  D343  1E 45 78 63 6C           BYTE   30,'Excluded Time,  or use a lower'
9791  D362  0D 57 61 74 65           BYTE   13,'Water Budget.'
9792
9793  D370                  SCROLL76:
9794
9795  D370  05 20 45 6E 74  SCROLL77: BYTE  5,32,'Enter the split ON time for this'
9796  D392  1E 76 61 6C 76           BYTE   30,'valve. Shorter times give you'
9797  D3B1  17 6D 6F 72 65           BYTE   23,'more repeat     cycles.'
9798  D3C9  1C 54 68 65 20           BYTE   28,'The sum of all  the split ON'
9799  D3E6  1F 74 69 6D 65           BYTE   31,'times equals thetotal duration.'
9800
9801  D406  03 1E 53 65 74  SCROLL78: BYTE  3,30,'Set the MINIMUM time the valve'
9802  D426  1F 69 73 20 4F           BYTE   31,'is OFF between  split ON times.'
9803  D446  1E 49 6E 20 6D           BYTE   30,'In most cases 30minutes is OK.'
9804  D465
9805  D465                  SCROLL79:
9806
9807  D465  04 1E 45 58 43  SCROLL80: BYTE  4,30,'EXCLUDED PERIOD is a time when'
9808  D485  1B 4E 4F 20 57           BYTE   27,'NO WATERING willoccur. Any'
9809  D4A1  1E 75 6E 66 69           BYTE   30,'unfinished ON   cycles will be'
9810  D4C0  1C 66 69 6E 69           BYTE   28,'finished after  this period.'
```

```
9811  D4DD
9812  D4DD  02 1C 45 6E 74    SCROLLB1:  BYTE  2,28,'Enter the START time for the'
9813  D4F8  07 70 65 72 69               BYTE  7,'period.'
9814  D503
9815  D503  02 1C 45 6E 74    SCROLLB2:  BYTE  2,28,'Enter the ENDINGtime for the'
9816  D521  07 70 65 72 69               BYTE  7,'period.'
9817  D529
9818  D529  05 1C 43 68 6F    SCROLLB3:  BYTE  5,28,'Choose whether  you want to:'
9819  D547  1C 52 45 56 49               BYTE  28,'REVIEW SETUP   (view only),'
9820  D564  20 4D 4F 44 49               BYTE  32,'MODIFY SETUP   (change values),'
9821  D585  20 44 4F 20 4E               BYTE  32,'DO NEW SETUP   (start over), or'
9822  D5A6  09 45 58 49 54               BYTE  9,'EXIT NOW.'
9823  D5B0
9824  D5B0  03 1B 50 72 65    SCROLLB4:  BYTE  3,27,'Press OK to see the entered'
9825  05CD  1B 64 75 72 61               BYTE  27,'durations, splitcycles, and'
9826  D5E9  0E 77 61 74 65               BYTE  14,'watering days.'
9827  D5F8
9828  D5F8  05 1E 53 59 52    SCROLLB5:  BYTE  5,30,'SYRINGES are    short watering'
9829  D618  20 63 79 63 6C               BYTE  32,'cycles at fixed intervals during'
9830  D639  20 61 20 66 69               BYTE  32,'a fixed period  every day during'
9831  D65A  20 61 63 74 69               BYTE  32,'active months. Use syringes for'
9832  D67B  1F 66 72 6F 73               BYTE  31,'frost wipes, or summer cooling.'
9833  D69B
9834  D69B  02 1F 50 72 65    SCROLLB6:  BYTE  2,31,'Press OK for    each month that'
9835  06BC  1F 79 6F 75 20               BYTE  31,'you want to havedaily syringes.'
9836  D6DC
9837  D6DC  03 20 45 6E 74    SCROLLB7:  BYTE  3,32,'Enter the       syringe duration'
9838  D6FE  1E 69 6E 20 6D               BYTE  30,'in minutes (m)  per syringe ON'
9839  D71D  16 74 69 6D 65               BYTE  22,'time for this   valve.'
9840  D734
9841  D734  04 20 41 20 53    SCROLLB8:  BYTE  4,32,'A SYRINGE       DURATION = 0h+0m'
9842  D756  1F 68 61 73 20               BYTE  31,'has been enteredfor this valve.'
9843  D776  1D 54 68 61 74               BYTE  29,'That tells the  Controller to'
9844  D794  1B 4E 4F 54 20               BYTE  27,'NOT syringe withthis valve.'
9845  D7B0
9846  D7B0  04 20 45 6E 74    SCROLLB9:  BYTE  4,32,'Enter HOW OFTEN to syringe every'
9847  D7D2  1D 64 61 79 20               BYTE  29,'day during      active months'
9848  D7F0  1B 69 6E 20 68               BYTE  27,'in hours (h) andminutes (m)'
9849  D80C  19 62 65 74 77               BYTE  25,'between syringe ON times.'
9850  D826
9851  D826  06 1F 50 72 65    SCROLL90:  BYTE  6,31,'Press OK if you want to see the'
9852  D847  1F 45 4E 44 49               BYTE  31,'ENDING TIME for the day, and/or'
9853  DB67  1E 74 68 65 20               BYTE  30,'the sequential  START TIMES by'
9854  D886  1E 76 61 6C 76               BYTE  30,'valve for each  regular, soak,'
9855  DBA5  1D 6F 72 20 73               BYTE  29,'or syringe ON   time (if any)'
9856  DBC3  17 66 6F 72 20               BYTE  23,'for this Valve Set Up.'
9857  DBDB
9858  D8DB  06 1E 4F 4B 20    SCROLL91:  BYTE  6,30,'OK a BUDGET from0-200% to use'
9859  D8FB  1F 66 6F 72 20               BYTE  31,'for viewing the daily schedule.'
9860  D91B  1E 41 20 62 75               BYTE  30,'A budget of 100%waters exactly'
9861  D93A  17 61 63 63 6F               BYTE  23,'according to theSet Up.'
9862  D952  1A 53 6F 61 6B               BYTE  26,'Soak and syringecycles are'
9863  D96D  1B 4E 4F 54 20               BYTE  27,'NOT affected by the budget.'
9864  D989
9865  D989  02 1C 59 6F 75    SCROLL92:  BYTE  2,28,'You can review  the watering'
9866  D9A7  20 73 63 68 65               BYTE  32,'schedule for ANYDAY of the week.'
9867  D9C8
```

```
9868  D9CB  02 1E 49 6E 64   SCROLL93: BYTE  2,30,'Indicate which  week # of your'
9869  D9E8  1E 6D 75 6C 74              BYTE    30,'multiple week     setup to view.'
9870  DA07
9871  DA07  05 1D 49 6E 64   SCROLL94: BYTE  5,29,'Indicate which  day # of your'
9872  0A26  1E 6D 75 6C 74              BYTE    30,'multiple day    setup to view.'
9873  DA45  1D 41 4C 4C 20              BYTE    29,'ALL active valvestations will'
9874  0A63  20 41 4C 57 41              BYTE    32,'ALWAYS water on DAY #1 no matter'
9875  DA84  1E 77 68 69 63              BYTE    30,'which day cycle you are using.'
9876  0AA3
9877  DAA3  08 20 50 72 65   SCROLL95: BYTE  8,32,'Press OK for    each ON time, or'
9878  0AC5  1C 70 72 65 73              BYTE    28,'press NO to STOPthis review.'
9879  DAE2  1F 45 61 63 68              BYTE    31,'Each screen     shows the VALVE'
9880  0B02  1F 4E 55 4D 42              BYTE    31,'NUMBER, the     CYCLE TYPE, the'
9881  DB22  1B 63 75 72 72              BYTE    27,'current & total ON CYCLE #s'
9882  0B3E  1E 28 4F 4E 20              BYTE    30,'(ON # _ of _),  and the ACTUAL'
9883  DB5D  1E 44 55 52 41              BYTE    30,'DURATION and    START TIME for'
9884  0B7C  0D 74 68 69 73              BYTE    13,'this ON time.'
9885  DB8A
9886  DBBA  03 1D 55 73 65   SCROLL96: BYTE  3,29,'Use the MINI    Set Up if you'
9887  DBA9  1A 6F 6E 6C 79              BYTE    26,'only need ONE   START TIME'
9888  DBC4  0A 70 65 72 20              BYTE    10,'per valve.'
9889  DBCF
9890  DBCF  06 15 54 68 65   SCROLL97: BYTE  6,21,'The AUTOSPLIT   Setup'
9891  DBE6  1C 6C 65 74 73              BYTE    28,'lets you SPLIT  the watering'
9892  DC03  1E 64 75 72 61              BYTE    30,'durations into  shorter repeat'
9893  DC22  1F 63 79 63 6C              BYTE    31,'cycles. The     Controller then'
9894  DC42  1E 41 55 54 4F              BYTE    30,'AUTOMATICALLY   calculates all'
9895  DC61  1F 74 68 65 20              BYTE    31,'the sequential  split ON times.'
9896  DC81
9897  DC81  02 1E 55 73 65   SCROLL98: BYTE  2,30,'Use the RATION  Setup to water'
9898  DCA1  19 6F 6E 6C 79              BYTE    25,'only on EVEN or ODD days.'
9899  DCBB
9900                                   ; ISC
9901  DCBB
9902  DCBB                    SCROLL99:
9903  DCBB
9904                                   ; One-time
9905  DCBB
9906  DCBB                    SCROLL100:
9907  DCBB
9908                                   ; Special
9909  DCBB
9910  DCBB  01 1E 54 68 69   SCROLL101: BYTE 1,30,'This feature is NOT AVAILABLE.'
9911  DCDB
9912  DCDB  05 20 55 73 65   SCROLL102: BYTE 5,32,'Use FAILSAFE to enter a watering'
9913  DCFD  1B 73 63 68 65              BYTE    27,'schedule to be  used if the'
9914  DD19  1E 43 6F 6E 74              BYTE    30,'Controller lens is covered for'
9915  0D38  1F 70 72 6F 6C              BYTE    31,'prolonged       periods causing'
9916  DD58  0D 61 20 70 6F              BYTE    13,'a power loss.'
9917  DD66
9918  DD66                    SCROLL103:
9919  DD66
9920  DD66                    SCROLL104:
9921  DD66
9922  DD66                    SCROLL105:
9923  DD66
9924  DD66  04 20 53 65 74   SCROLL106: BYTE 4,32,'Set Up ALREADY  EXISTS. You can'
```

```
9925   DD88   1F 52 45 56 49              BYTE    31,'REVIEW the      current Set Up,'
9926   DDA8   1E 6F 72 20 45              BYTE    30,'or ERASE it by  entering a new'
9927   DDC7   07 53 65 74 20              BYTE    7,'Set Up.'
9928   DDCF
9929   DDCF   03 1E 54 68 65   SCROLL107: BYTE    3,30,'The ENDING TIME for the day is'
9930   DDEF   20 74 68 65 20              BYTE    32,'the time when   the last ON time'
9931   DE10   1A 66 6F 72 20              BYTE    26,'for the day is  completed.'
9932   DE2B
9933   DE2B   02 1D 53 45 4D   SCROLL108: BYTE    2,29,'SEMI-AUTO with SPECIFIC DAYS'
9934   DE4A   1D 69 73 20 4E              BYTE    29,'is NOT AVAILABLEat this time.'
9935   DE6B
9936                                      ; wire checking
9937   DE6B
9938   DE6B   04 1E 54 68 65   SCROLL109: BYTE    4,30,'The LEFT symbol on the display'
9939   DE8B   1A 73 68 6F 77              BYTE    26,'shows the statusof the TOP'
9940   DEA3   20 77 69 72 65              BYTE    32,'wire position   where "o" = OPEN'
9941   DEC4   20 22 56 22 20              BYTE    32,'"V" = VALVE,    and "x" = SHORT.'
9942   DEE5
9943                                      ; assign station IDs
9944   DEE5
9945   DEE5   05 1B 50 72 65   SCROLL110: BYTE    5,27,'Press OK to see the current'
9946   DF02   1C 53 74 61 74              BYTE    28,'Station ID #s.  The LEFTMOST'
9947   DF1F   1F 6E 75 6D 62              BYTE    31,'number shows thenumber assigned'
9948   DF3F   1E 74 6F 20 74              BYTE    30,'to the TOP lightgrey connector'
9949   DF5E   1F 70 61 69 72              BYTE    31,'pair on the leftterminal strip.'
9950   DF7E
9951   DF7E   04 1E 50 72 65   SCROLL111: BYTE    4,30,'Press OK to    Enter new IDs.'
9952   DF9E   19 54 68 69 73              BYTE    25,'This allows you to change'
9953   DFB8   20 73 74 61 74              BYTE    32,'station #s      without changing'
9954   DFD3   0B 74 68 65 20              BYTE    11,'the wiring.'
9955   DFE5
9956   DFE5   03 1E 49 66 20   SCROLL112: BYTE    3,30,'If you do not   want to ID all'
9957   E005   20 74 68 65 20              BYTE    32,'the stations nowwired, press NO,'
9958   E026   1F 26 20 65 6E              BYTE    31,'& enter how manystations to ID.'
9959   E046
9960   E046   09 1F 54 6F 20   SCROLL113: BYTE    9,31,'To ID station 1,go to the valve'
9961   E067   1E 73 74 61 74              BYTE    30,'station that youwant to be #1.'
9962   E086   20 55 6E 70 6C              BYTE    32,'Unplug the wire connector on the'
9963   E0A7   1F 76 61 6C 76              BYTE    31,'valve pigtail,  wait 2 seconds,'
9964   E0C7   1F 74 68 65 6E              BYTE    31,'then reconnect  the wires. The'
9965   E0E7   1D 43 6F 6E 74              BYTE    29,'Controller will automatically'
9966   E105   1D 61 73 73 69              BYTE    29,'assign #1 to    this station.'
9967   E123   1F 52 65 70 65              BYTE    31,'Repeat this     process for all'
9968   E143   0F 77 69 72 65              BYTE    15,'wired stations.'
9969   E153
9970   E153   03 18 50 72 65   SCROLL114: BYTE    3,24,'Press OK to     SAVE the'
9971   E16D   1C 6E 65 77 20              BYTE    28,'new valve numberassignments,'
9972   E1BA   19 61 6E 64 20              BYTE    25,'and ERASE the   old ones.'
9973   E1A4
9974   E1A4   07 1C 2A 45 52   SCROLL115: BYTE    7,28,'*ERROR* Shortedwire exists!'
9975   E1C2   1D 42 65 66 6F              BYTE    29,'Before you can  assign ID #s,'
9976   E1E0   1B 79 6F 75 20              BYTE    27,'you must repair all shorts.'
9977   E1FC   1D 55 73 65 20              BYTE    29,'Use built-in    WIRE CHECKING'
9978   E21A   1E 74 6F 20 69              BYTE    30,'to identify     shorted wires.'
9979   E239   1A 4E 45 56 45              BYTE    26,'NEVER USE A     CONTINUITY'
9980   E254   10 54 45 53 54              BYTE    16,'TESTER FOR THIS!'
9981   E265
```

```
9982                        ;Automatic mode
9983    E265
9984    E265  03 20 55 73 65  SCROLL116: BYTE  3,32,'Use this RAIN   DELAY to suspend'
9985    E287  20 77 61 74 65             BYTE  32,'watering for     0-14 days before'
9986    E2AB  20 79 6F 75 72             BYTE  32,'your watering    schedule starts.'
9987
9988    E2C9                  SCROLL117:
9989    E2C9
9990    E2C9  03 1A 53 65 6C  SCROLL118: BYTE  3,26,'Select which    previously'
9991    E2E5  18 65 6E 74 65             BYTE  24,'entered          schedule'
9992    E2FE  1D 79 6F 75 20             BYTE  29,'you want to use for watering.'
9993    E31C
9994    E31C  03 1D 49 66 20  SCROLL119: BYTE  3,29,'If you REMOVE   the POWER KEY'
9995    E33B  1D 6E 6F 77 2C             BYTE  29,'now, watering   will begin on'
9996    E359  1A 74 68 65 20             BYTE  26,'the first day   scheduled.'
9997    E374
9998                          ;Semi-Automatic
9999    E374
10000   E374  06 1D 49 66 20  SCROLL120: BYTE  6,29,'If you REMOVE   the POWER KEY'
10001   E393  1A 6E 6F 77 2C             BYTE  26,'now, watering   will begin'
10002   E3AE  19 69 6D 6D 65             BYTE  25,'immediately, andwhen this'
10003   E3C8  1B 77 61 74 65             BYTE  27,'watering         sequence is'
10004   E3E4  1F 63 6F 6D 70             BYTE  31,'completed, the Controller will'
10005   E404  1E 72 65 76 65             BYTE  30,'revert to       AUTOMATIC RUN.'
10006   E423
10007                         ;Soak messages
10008   E423
10009   E423  04 1F 53 4F 41  SCROLL121: BYTE  4,31,'SOAK CYCLES let you do periodic'
10010   E444  1F 6C 6F 6E 67             BYTE  31,'long watering   cycles for deep'
10011   E464  1F 77 61 74 65             BYTE  31,'watering trees  in lawns or for'
10012   E484  0F 6C 65 61 63             BYTE  15,'leaching salts.'
10013   E494
10014   E494  04 1D 45 6E 74  SCROLL122: BYTE  4,29,'Enter the TOTAL SOAK TIME'
10015   E4AF  1D 70 65 72 20             BYTE  29,'per day for thisvalve. Enter'
10016   E4CD  1C 68 6F 75 72             BYTE  28,'hours (h), then minutes (m).'
10017   E4EA  1D 4F 4B 20 30             BYTE  29,'OK 0h to enter  minutes only.'
10018   E508
10019   E508  04 17 41 20 53  SCROLL123: BYTE  4,23,'A SOAK DURATION = 0h+0m'
10020   E521  1F 68 61 73 20             BYTE  31,'has been enteredfor this valve.'
10021   E541  1D 54 68 61 74             BYTE  29,'That tells the  Controller to'
10022   E55F  1B 4E 4F 54 20             BYTE  27,'NOT soak with   this valve.'
10023   E57B
10024   E57B  02 1C 45 6E 74  SCROLL124: BYTE  2,28,'Enter HOW OFTEN to soak from'
10025   E599  20 31 2D 39 30             BYTE  32,'1-90 days (every1 days = daily).'
10026   E5BA
10027   E5BA  05 1D 50 72 65  SCROLL125: BYTE  5,29,'Press OK for    each week day'
10028   E5D9  1E 74 68 61 74             BYTE  30,'that you to use as a SOAK day.'
10029   E5FB  1C 49 66 20 6F             BYTE  28,'If only one day is selected,'
10030   E615  1C 63 68 6F 6F             BYTE  28,'choose every    1wk (7 days)'
10031   E632  1E 75 70 20 74             BYTE  30,'up to every     9wk (63 days).'
10032   E651
10033   E651                  SCROLL126:
10034
10035
10036   E651                  INCLUDE    MSG.ASM
10037                         ;------------------------------------
10038                         ;     STRING STORAGE
```

```
10039                       ;----------------------------------
10040
10041  E651  1E 20 50 72 65  MSG0:   BYTE    30,' Press OK when  most readable '
10042  E670  0F 43 48 4F 4F  MSG1:   BYTE    15,'CHOOSE ONE (OK)'
10043  E680  0C 45 4E 54 45  MSG2:   BYTE    12,'ENTER SETUP '
10044  E68D  0D 52 55 4E 20  MSG3:   BYTE    13,'RUN STATIONS '
10045  E69B  0E 53 54 41 59  MSG4:   BYTE    14,'STAY IDLE/OFF '
10046  E6AA  0A 56 49 45 57  MSG5:   BYTE    10,'VIEW INFO '
10047  E6B5  00              MSG6:   BYTE    0
10048  E6B6  00              MSG7:   BYTE    0
10049  E6B7  1B 43 68 61 72  MSG8:   BYTE    27,'Charging...    Please Wait'
10050  E6D3  0C 52 75 6E 20  MSG9:   BYTE    12,'Run Stations'
10051  E6E0  0D 52 75 6E 20  MSG10:  BYTE    13,'Run Test Seq.'
10052  E6EE  0D 52 65 61 64  MSG11:  BYTE    13,'Read Sensors '
10053  E6FC  00              MSG12:  BYTE    0
10054  E6FD  09 45 58 49 54  MSG13:  BYTE    9,'EXIT now '
10055  E707  0D 53 65 74 20  MSG14:  BYTE    13,'Set SCHEDULES'
10056  E715  0E 53 65 74 20  MSG15:  BYTE    14,'Set ALT.SCHED.'
10057  E724  0D 53 65 74 75  MSG16:  BYTE    13,'Setup SYSTEM '
10058  E732  0D 41 55 54 4F  MSG17:  BYTE    13,'AUTOMATIC RUN'
10059  E740  0D 53 45 4D 49  MSG18:  BYTE    13,'SEMI-AUTO RUN'
10060  E74E  0A 4D 41 4E 55  MSG19:  BYTE    10,'MANUAL RUN'
10061  E759  0E 53 65 65 20  MSG20:  BYTE    14,'See DIRECTIONS'
10062  E768  0C 53 65 65 20  MSG21:  BYTE    12,'See HISTORY '
10063  E775  0E 53 65 65 20  MSG22:  BYTE    14,'See RUN TOTALS'
10064  E784  0D 44 6F 20 53  MSG23:  BYTE    13,'Do SELF TEST '
10065  E792  00              MSG24:  BYTE    0
10066  E793  07 20 73 70 6C  MSG25:  BYTE    7,' splits'
10067  E79B  09 4F 4E 20 64  MSG26:  BYTE    9,'ON days: '
10068  E7A5  1D 20 53 74 61  MSG27:  BYTE    29,' Stations       wired: I0 all '
10069  E7C3  06 20 31 30 30  MSG28:  BYTE    6,' 100%='
10070  E7CA  03 20 4F 4E     MSG29:  BYTE    3,' ON'
10071  E7CE  1A 3A 55 73 65  MSG30:  BYTE    26,':Use Splits (100%=        )'
10072  E7E9  0F 40 20 20 60  MSG31:  BYTE    15,'@ = ON, o OFF'
10073  E7F9  09 53 74 61 74  MSG32:  BYTE    9,'Station #'
10074  E803  05 20 64 61 79  MSG33:  BYTE    5,' days'
10075  E809  14 55 73 65 20  MSG34:  BYTE    20,'Use SAME setting for '
10076  E81E  04 20 77 6B 73  MSG35:  BYTE    4,' wks'
10077  E823  18 53 74 61 72  MSG36:  BYTE    24,'Start Time each ON day ='
10078  E83C  13 20 57 61 74  MSG37:  BYTE    19,' Watering Duration='
10079  E850  06 65 76 65 72  MSG38:  BYTE    6,'every '
10080  E857  14 41 55 54 4F  MSG39:  BYTE    20,'AUTO emulation Day#'
10081  E86C  09 55 73 65 20  MSG40:  BYTE    9,'Use Mini '
10082  E876  0D 55 73 65 20  MSG41:  BYTE    13,'Use Autosplit'
10083  E884  0B 55 73 65 20  MSG42:  BYTE    11,'Use Ration '
10084  E890  08 55 73 65 20  MSG43:  BYTE    8,'Use ISC '
10085  E899  0D 55 73 65 20  MSG44:  BYTE    13,'Use One-time '
10086  E8A7  0C 55 73 65 20  MSG45:  BYTE    12,'Use Special '
10087  E8B4  0D 55 73 65 20  MSG46:  BYTE    13,'Use Failsafe '
10088  E8C2  09 45 58 49 54  MSG47:  BYTE    9,'EXIT now '
10089  E8CC  10 45 78 63 6C  MSG48:  BYTE    16,'Excluded Period:'
10090  E8DD  1F 44 6F 20 79  MSG49:  BYTE    31,'Do you want an  Excluded Period'
10091  E8FD  1B FF FF 48 49  MSG50:  BYTE    27,$FF,$FF,'HISTORY DONE',$FF,$FF,'Please Wait'
10092  E919  10 57 61 74 65  MSG51:  BYTE    16,'Water Day Cycle='
10093  E92A  0F 22 53 6F 20  MSG52:  BYTE    15,'"So many" days?'
10094  E93A  0E 53 70 65 63  MSG53:  BYTE    14,'Specific days?'
10095  E949  1A 20 57 61 74  MSG54:  BYTE    26,' Water only on    days'
```

```
10096  E964  04 20 4F 44 44   MSG55:   BYTE   4,' ODD'
10097  E969  04 45 56 45 4E   MSG56:   BYTE   4,'EVEN'
10098  E96E  1B 42 61 73 65   MSG57:   BYTE   27,'Base Multiplier:Water    Z'
10099  E98A  1D 57 61 74 65   MSG58:   BYTE   29,'Water Budget    to use =    Z'
10100  E9A8  08 44 49 53 41   MSG59:   BYTE   8,'DISABLED'
10101  E9B1  08 45 4E 41 42   MSG60:   BYTE   8,'ENABLED '
10102  E9BA  07 53 74 6E 20   MSG61:   BYTE   7,'Stn #: '
10103  E9C2  07 20 53 65 6E   MSG62:   BYTE   7,' Sensor'
10104  E9CA  10 44 72 79 20   MSG63:   BYTE   16,'Dry Level :      Z'
10105  E9DB  10 53 6F 61 6B   MSG64:   BYTE   16,'Soak Level:      Z'
10106  E9EC  19 44 6F 20 79   MSG65:   BYTE   25,'Do you want      syringes '
10107  EA06  08 20 20 20 20   MSG66:   BYTE   8,'        '
10108  EA0F  04 54 69 6D 65   MSG67:   BYTE   4,'Time'
10109  EA14  0D 65 76 65 72   MSG68:   BYTE   13,'every    days'
10110  EA22  1C 53 74 6F 70   MSG69:   BYTE   28,'Stopping         all watering'
10111  EA3F  0A 69 73 20 52   MSG70:   BYTE   10,'is RUNNING'
10112  EA4A  1D 43 6F 6E 74   MSG71:   BYTE   29,'Controller IDLE (No watering)'
10113  EA68  1D 2A 2A 4C 4F   MSG72:   BYTE   29,'LOW BATTERY in Power Key'
10114  EA86  03 53 74 6E      MSG73:   BYTE   3,'Stn'
10115  EA8A  05 53 65 74 75   MSG74:   BYTE   5,'Setup'
10116  EA90  02 20 20         MSG75:   BYTE   2,'--'
10117  EA93  00               MSG76:   BYTE   0
10118  EA94  03 4A 41 4E      MSG77:   BYTE   3,'JAN'
10119  EA98  03 46 45 42      MSG78:   BYTE   3,'FEB'
10120  EA9C  03 4D 41 52      MSG79:   BYTE   3,'MAR'
10121  EAA0  03 41 50 52      MSG80:   BYTE   3,'APR'
10122  EAA4  03 4D 41 59      MSG81:   BYTE   3,'MAY'
10123  EAA8  03 4A 55 4E      MSG82:   BYTE   3,'JUN'
10124  EAAC  03 4A 55 4C      MSG83:   BYTE   3,'JUL'
10125  EAB0  03 41 55 47      MSG84:   BYTE   3,'AUG'
10126  EAB4  03 53 45 50      MSG85:   BYTE   3,'SEP'
10127  EAB8  03 4F 43 54      MSG86:   BYTE   3,'OCT'
10128  EABC  03 4E 4F 56      MSG87:   BYTE   3,'NOV'
10129  EAC0  03 44 45 43      MSG88:   BYTE   3,'DEC'
10130  EAC4  08 54 69 6D 65   MSG89:   BYTE   8,'Time is '
10131  EACD  1D 52 65 70 6C   MSG90:   BYTE   29,'Replace Battery  in Power Key'
10132  EAEB  03 4D 4F 4E      MSG91:   BYTE   3,'MON'
10133  EAEF  03 54 55 45      MSG92:   BYTE   3,'TUE'
10134  EAF3  03 57 45 44      MSG93:   BYTE   3,'WED'
10135  EAF7  03 54 48 55      MSG94:   BYTE   3,'THU'
10136  EAFB  03 46 52 49      MSG95:   BYTE   3,'FRI'
10137  EAFF  03 53 41 54      MSG96:   BYTE   3,'SAT'
10138  EB03  03 53 55 4E      MSG97:   BYTE   3,'SUN'
10139  EB07  06 52 65 70 65   MSG98:   BYTE   6,'Repeat'
10140  EB0E  20 54 61 6B 65   MSG99:   BYTE   32,'Take Power Key  out now to IDLE!'
10141  EB2F  0C 48 49 53 54   MSG100:  BYTE   12,'HISTORY for:'
10142  EB3C  05 43 6F 64 65   MSG101:  BYTE   5,'Code#'
10143  EB42  0D 50 6F 77 65   MSG102:  BYTE   13,'Power Key in'
10144  EB50  03 6D 69 6E 2E   MSG103:  BYTE   3,'min.'
10145  EB55  0D 4E 4F 20 57   MSG104:  BYTE   13,'NO Watering ?'
10146  EB63  0A 45 58 49 54   MSG105:  BYTE   10,'EXIT now ?'
10147  EB6E  1B 41 6C 6C 20   MSG106:  BYTE   27,'All assigned    Stations OK'
10148  EB8A  0F 53 74 6E 20   MSG107:  BYTE   15,'Stn wires OPEN:'
10149  EB9A  10 53 74 6E 20   MSG108:  BYTE   16,'Stn wires SHORT:'
10150  EBAB  15 3A 20 56 69   MSG109:  BYTE   21,': View      Site Info'
10151  EBC1  08 20 20 76 2E   MSG110:  BYTE   8,'  v.2.09'
10152  EBCA  1C 52 65 70 65   MSG111:  BYTE   28,'Repeat          the message '
```

```
10153  EBE7  1F 54 61 6B 65   MSG112: BYTE   31,'Take Power Key  out to quit, or'
10154  EC07  1A 52 65 70 65   MSG113: BYTE   26,'Repeat          self test '
10155  EC22  1E 53 65 6C 66   MSG114: BYTE   30,'Self test       in progress...'
10156  EC41  1F 48 45 4C 4C   MSG115: BYTE   31,'HELLO! Press OKto pick options'
10157  EC61  1E 54 6F 20 77   MSG116: BYTE   30,'To water, take  Power Key out!'
10158  EC80  1D 54 75 72 6E   MSG117: BYTE   29,'Turn on valves  min. each?'
10159  EC9E  06 54 65 73 74   MSG118: BYTE   6,'Test: '
10160  ECA5  00               MSG119: BYTE   0
10161  ECA6  00               MSG120: BYTE   0
10162  ECA7  00               MSG121: BYTE   0
10163  ECA8  0E 4F 6E 2C 20   MSG122: BYTE   14,'On,       left'
10164  ECB7  0B 54 75 72 6E   MSG123: BYTE   11,'Turning Off'
10165  ECC3  1F 44 6F 20 79   MSG124: BYTE   31,'Do you want to  do a self-test?'
10166  ECE3  1F 41 6E 79 20   MSG125: BYTE   31,'Any valves ON   are turning OFF'
10167  ED03  08 56 61 6C 76   MSG126: BYTE   8,'Valve 0 '
10168  ED0C  07 55 73 69 6E   MSG127: BYTE   7,'Using: '
10169  ED14  0B 49 73 20 74   MSG128: BYTE   11,'Is this OK '
10170  ED20  04 55 73 65 20   MSG129: BYTE   4,'Use '
10171  ED25  1E 44 6F 20 79   MSG130: BYTE   30,'Do you want to  delay watering'
10172  ED44  1B 44 65 6C 61   MSG131: BYTE   27,'Delay watering  for     days'
10173  ED60  1B 56 69 65 77   MSG132: BYTE   27,'View active     station #s '
10174  ED7C  00               MSG133: BYTE   0
10175  ED7D  00               MSG134: BYTE   0
10176  ED7E  0D 52 65 76 69   MSG135: BYTE   13,'Review Setup?'
10177  ED8C  0D 4D 6F 64 69   MSG136: BYTE   13,'Modify Setup?'
10178  ED9A  0D 44 6F 20 4E   MSG137: BYTE   13,'Do New Setup?'
10179  EDA8  0A 45 58 49 54   MSG138: BYTE   10,'EXIT now ?'
10180  EDB3  16 53 79 72 69   MSG139: BYTE   22,'Syringe IntervalEvery '
10181  EDCA  1C 20 73 79 72   MSG140: BYTE   28,' syringes at    interval'
10182  EDE7  1D 44 6F 20 79   MSG141: BYTE   29,'Do you want     a Soak Cycle '
10183  EE05  17 52 65 76 69   MSG142: BYTE   23,'Review for      Day = 0'
10184  EE1D  17 52 65 76 69   MSG143: BYTE   23,'Review for      week= 0'
10185  EE35  04 4D 69 64 6E   MSG144: BYTE   4,'Midn'
10186  EE3A  04 4E 6F 6F 6E   MSG145: BYTE   4,'Noon'
10187  EE3F  09 3A 20 44 6F   MSG146: BYTE   9,': Do Soak'
10188  EE49  10 4E 4F 20 77   MSG147: BYTE   16,'NO watering for '
10189  EE5A  04 20 4F 4E 20   MSG148: BYTE   4,' ON '
10190  EE5F  04 20 53 59 52   MSG149: BYTE   4,' SYR'
10191  EE64  04 53 4F 41 4B   MSG150: BYTE   4,'SOAK'
10192  EE69  18 44 6F 20 79   MSG151: BYTE   24,'Do you want to  Emulate '
10193  EE82  1F 56 61 6C 76   MSG152: BYTE   31,'Valves:         starting at top'
10194  EEA2  1B 50 72 65 73   MSG153: BYTE   27,'Press OK to see ending time'
10195  EEBE  19 52 65 76 69   MSG154: BYTE   25,'Review daily    schedule '
10196  EED8  1B 3A 20 6E 6F   MSG155: BYTE   27,': not split (Are you sure?)'
10197  EEF4  07 52 65 76 69   MSG156: BYTE   7,'Review '
10198  EEFC  07 4D 6F 64 69   MSG157: BYTE   7,'Modify '
10199  EF04  0C 42 61 73 69   MSG158: BYTE   12,'Basic setup '
10200  EF11  0E 53 79 72 69   MSG159: BYTE   14,'Syringe setup '
10201  EF20  0B 53 6F 61 6B   MSG160: BYTE   11,'Soak setup '
10202  EF2C  1C 50 72 65 73   MSG161: BYTE   28,'Press OK to see each ON time'
10203  EF49  0F 4E 6F 6E 65   MSG162: BYTE   15,'None entered   '
10204  EF59  0A 53 79 73 74   MSG163: BYTE   10,'System Low'
10205  EF64  04 53 56 4C 20   MSG164: BYTE   4,'SVL '
10206  EF69  0D 50 6F 77 65   MSG165: BYTE   13,'Power Key Low'
10207  EF77  0A 50 77 72 4B   MSG166: BYTE   10,'PwrKey Out'
10208  EF82  09 50 77 72 4B   MSG167: BYTE   9,'PwrKey In'
10209  EF8C  0E 53 74 61 72   MSG168: BYTE   14,'Start Watering'
```

```
10210  EF98  0D 48 61 6C 74  MSG169: BYTE    13,'Halt Watering'
10211  EFA9  1C 50 72 65 73  MSG170: BYTE    28,'Press HELP-NO-OK to RESET RAM'
10212  EFC6  1C 56 69 65 77  MSG171: BYTE    28,'View current      station IDs '
10213  EFE3  1C 45 6E 74 65  MSG172: BYTE    28,'Enter new         station IDs '
10214  F000  17 43 75 72 72  MSG173: BYTE    23,'Current ID (fromTOP) : '
10215  F018  20 53 74 6E 20  MSG174: BYTE    32,'Stn #s:           Unplug # to ID!'
10216  F039  1F 53 74 6E 20  MSG175: BYTE    31,'Stn #s:           Save new Stn ID'
10217  F059  0F 45 6E 61 62  MSG176: BYTE    15,'Enable/Disable '
10218  F069  0D 41 73 73 69  MSG177: BYTE    13,'Assign ID #s '
10219  F077  0D 41 73 73 69  MSG178: BYTE    13,'Assign Types '
10220  F085  10 53 41 56 49  MSG179: BYTE    16,'SAVING new Setup'
10221  F096  1A 50 72 65 73  MSG180: BYTE    26,'Press OK to see each event'
10222  F0B1  1C 50 72 65 73  MSG181: BYTE    28,'Press STOP to     STOP running'
10223  F0CE  12 57 61 74 65  MSG182: BYTE    18,'Watering ends    at '
10224  F0E2  09 53 6F 61 6B  MSG183: BYTE    9,'Soak Dur='
10225  F0EC  0F 77 69 74 68  MSG184: BYTE    15,'with       # ONs'
10226  F0FC  14 4E 4F 20 53  MSG185: BYTE    20,'NO Soak Cycle    for '
10227  F111  06 20 53 6F 61  MSG186: BYTE    6,' Soak='
10228  F118  0C 53 79 72 69  MSG187: BYTE    12,'Syringes ON '
10229  F125  0C 53 79 72 69  MSG188: BYTE    12,'Syringes OFF'
10230  F132  0D 53 65 74 20  MSG189: BYTE    13,'Set SITE INFO'
10231  F140  0D 20 53 79 72  MSG190: BYTE    13,' Syr Months :'
10232  F14E  17 53 79 72 69  MSG191: BYTE    23,'Syringe Duration =  #'
10233  F166  0F 4E 4F 20 53  MSG192: BYTE    15,'NO Syringes for'
10234  F176  10 53 79 72 69  MSG193: BYTE    16,'Syringe Period :'
10235  F187  0D 53 65 74 20  MSG194: BYTE    13,'Set TIME/DATE'
10236  F195  0D 44 6F 20 57  MSG195: BYTE    13,'Do WIRE CHECK'
10237  F1A3  0E 53 65 74 75  MSG196: BYTE    14,'Setup STATIONS'
10238  F1B2  0D 53 65 74 75  MSG197: BYTE    13,'Setup SENSORS'
10239  F1C0  0E 53 65 74 20  MSG198: BYTE    14,'Set USER CODES'
10240  F1CF  18 23 20 6F 66  MSG199: BYTE    24,'# of stations    to ID : '
10241  F1E8  0D 54 75 72 6E  MSG200: BYTE    13,'Turn # OFF?'
10242  F1F6  0C 54 75 72 6E  MSG201: BYTE    12,'Turn # ON?'
10243  F203  0E 47 6F 20 74  MSG202: BYTE    14,'Go to Stn # ?'
10244  F212  0B 4D 69 6E 69  MSG203: BYTE    11,'Mini setup?'
10245  F21E  10 41 75 74 6F  MSG204: BYTE    16,'Autosplit setup?'
10246  F22F  0D 52 61 74 69  MSG205: BYTE    13,'Ration setup?'
10247  F23D  0A 49 53 43 20  MSG206: BYTE    10,'ISC setup?'
10248  F248  0F 4F 6E 65 2D  MSG207: BYTE    15,'One-time setup?'
10249  F258  0E 53 70 65 63  MSG208: BYTE    14,'Special setup?'
10250  F267  0F 46 61 69 6C  MSG209: BYTE    15,'Failsafe setup?'
10251  F277  0A 45 58 49 54  MSG210: BYTE    10,'EXIT now ?'
10252  F282  1E 44 6F 20 79  MSG211: BYTE    30,'Do you want      to use splits '
10253  F2A1  0F 4D 61 78 20  MSG212: BYTE    15,'Max ON/Min OFF:'
10254  F2B1  0A 20 53 69 74  MSG213: BYTE    10,' Site Info'
10255  F2BC  1F 50 72 65 73  MSG214: BYTE    31,'Press '',#,'' to splitusing site info'
10256  F2DC  0B 6C 65 76 65  MSG215: BYTE    11,'level sand?'
10257  F2E8  0B 68 69 6C 6C  MSG216: BYTE    11,'hilly sand?'
10258  F2F4  0B 6C 65 76 65  MSG217: BYTE    11,'level loam?'
10259  F300  0B 68 69 6C 6C  MSG218: BYTE    11,'hilly loam?'
10260  F30C  0B 6C 65 76 65  MSG219: BYTE    11,'level clay?'
10261  F318  0B 68 69 6C 6C  MSG220: BYTE    11,'hilly clay?'
10262  F324  0C 66 6C 61 74  MSG221: BYTE    12,'flat sprays?'
10263  F331  0C 6C 61 77 6E  MSG222: BYTE    12,'lawn sprays?'
10264  F33E  0C 72 6F 74 6F  MSG223: BYTE    12,'rotor heads?'
10265  F34B  0D 69 6D 70 61  MSG224: BYTE    13,'impact heads?'
10266  F359  0E 73 74 72 65  MSG225: BYTE    14,'stream sprays?'
```

```
10267  F36B  0C 6D 69 63 72   MSG226: BYTE    12,'microsprays?'
10268  F375  0E 64 72 69 70   MSG227: BYTE    14,'drip emitters?'
10269  F384  1F 55 73 69 6E   MSG228: BYTE    31,'Using site info to auto-split..'
10270  F3A4  1E 55 73 69 6E   MSG229: BYTE    30,'Using site info to calculate..'
10271  F3C3  09 4E 6F 74 20   MSG230: BYTE    9,'Not split'
10272
10273                                 ;---------------------------------
10274                                 ;        TABLES
10275                                 ;---------------------------------
10276
10277  F3CD  01               LCDTBL: BYTE    00000001B        ;Clear display
10278  F3CE  02                       BYTE    00000010B        ;Cursor home
10279  F3CF  06                       BYTE    00000110B        ;Entry mode, no scrolling
10280  F3D0  0E                       BYTE    00001110B        ;Display on, show cursor
10281  F3D1  08                       BYTE    00001000B        ;Display off
10282  F3D2  0C                       BYTE    00001100B        ;Display on, no cursor
10283  F3D3  0D                       BYTE    00001101B        ;Display on, blink cursor position
10284  F3D4  14                       BYTE    00010100B        ;Move cursor right
10285  F3D5  18                       BYTE    00011000B        ;Scroll display left
10286  F3D6  38                       BYTE    00111000B        ;Interface data length=8 bits
10287  F3D7                   ADDR_CMD:
10288  F3D7  80                       BYTE    10000000B        ;Set address for data display
10289                                                          ;AND address (0-50H) with command
10290  F3D8  40                       BYTE    01000000B        ;Set Custom Character RAM to 0
10291
10292                         CUSTOMTBL:                       ;this is the custom char data
10293  F3D9  1C 14 1C 00 05           BYTE    $1C,$14,$1C,0,$05,$06,$05,0
10294
10295  F3E1  51E6             MSGTBL: WORD    MSG0            ;table of msg addresses
10296  F3E3  70E6                     WORD    MSG1
10297  F3E5  80E6                     WORD    MSG2
10298  F3E7  8DE6                     WORD    MSG3
10299  F3E9  9BE6                     WORD    MSG4
10300  F3EB  AAE6 B5E6 B6E6           WORD    MSG5,MSG6,MSG7,MSG8,MSG9
       F3F1  B7E6 D3E6
10301  F3F5  E0E6 EEE6 FCE6           WORD    MSG10,MSG11,MSG12,MSG13,MSG14
       F3FB  FDE6 07E7
10302  F3FF  15E7 24E7 32E7           WORD    MSG15,MSG16,MSG17,MSG18,MSG19
       F405  40E7 4EE7
10303  F409  59E7 68E7 75E7           WORD    MSG20,MSG21,MSG22,MSG23,MSG24
       F40F  84E7 92E7
10304  F413  93E7 9BE7 A5E7           WORD    MSG25,MSG26,MSG27,MSG28,MSG29
       F419  C3E7 CAE7
10305  F41D  CEE7 E9E7 F9E7           WORD    MSG30,MSG31,MSG32,MSG33,MSG34
       F423  03E8 09E8
10306  F427  1EE8 23E8 3CE8           WORD    MSG35,MSG36,MSG37,MSG38,MSG39
       F42D  50E8 57E8
10307  F431  6CE8 76E8 84E8           WORD    MSG40,MSG41,MSG42,MSG43,MSG44
       F437  90E8 99E8
10308  F43B  A7E8 B4E8 C2E8           WORD    MSG45,MSG46,MSG47,MSG48,MSG49
       F441  CCE8 DDE8
10309  F445  FDE8 19E9 2AE9           WORD    MSG50,MSG51,MSG52,MSG53,MSG54
       F44B  3AE9 49E9
10310  F44F  64E9 69E9 6EE9           WORD    MSG55,MSG56,MSG57,MSG58,MSG59
       F455  8AE9 A8E9
10311  F459  B1E9 BAE9 C2E9           WORD    MSG60,MSG61,MSG62,MSG63,MSG64
       F45F  CAE9 DBE9
```

| | | | | |
|---|---|---|---|---|
| 10312 | F463 | ECE9 06EA 0FEA | WORD | MS665,MS666,MS667,MS668,MS669 |
| | F469 | 14EA 22EA | | |
| 10313 | F46D | 3FEA 4AEA 68EA | WORD | MS670,MS671,MS672,MS673,MS674 |
| | F473 | 86EA 8AEA | | |
| 10314 | F477 | 90EA 93EA 94EA | WORD | MS675,MS676,MS677,MS678,MS679 |
| | F47D | 98EA 9CEA | | |
| 10315 | F481 | A0EA A4EA A8EA | WORD | MS680,MS681,MS682,MS683,MS684 |
| | F487 | ACEA B0EA | | |
| 10316 | F48B | B4EA B8EA BCEA | WORD | MS685,MS686,MS687,MS688,MS689 |
| | F491 | C0EA C4EA | | |
| 10317 | F495 | CDEA EBEA EFEA | WORD | MS690,MS691,MS692,MS693,MS694 |
| | F49B | F3EA F7EA | | |
| 10318 | F49F | FBEA FFEA 03EB | WORD | MS695,MS696,MS697,MS698,MS699 |
| | F4A5 | 07EB 0EEB | | |
| 10319 | F4A9 | 2FEB 3CEB 42EB | WORD | MS6100,MS6101,MS6102,MS6103,MS6104 |
| | F4AF | 50EB 55EB | | |
| 10320 | F4B3 | 63EB 6EEB 8AEB | WORD | MS6105,MS6106,MS6107,MS6108,MS6109 |
| | F4B9 | 9AEB ABEB | | |
| 10321 | F4BD | C1EB CAEB E7EB | WORD | MS6110,MS6111,MS6112,MS6113,MS6114 |
| | F4C3 | 07EC 22EC | | |
| 10322 | F4C7 | 41EC 61EC 80EC | WORD | MS6115,MS6116,MS6117,MS6118,MS6119 |
| | F4CD | 9EEC A5EC | | |
| 10323 | F4D1 | A6EC A7EC A8EC | WORD | MS6120,MS6121,MS6122,MS6123,MS6124 |
| | F4D7 | B7EC C3EC | | |
| 10324 | F4DB | E3EC 03ED 0CED | WORD | MS6125,MS6126,MS6127 |
| 10325 | | | | |
| 10326 | F4E1 | 14ED 20ED | MS6TBL1: WORD | MS6128,MS6129 |
| 10327 | F4E5 | 25ED 44ED 60ED | WORD | MS6130,MS6131,MS6132,MS6133,MS6134 |
| | F4EB | 7CED 7DED | | |
| 10328 | F4EF | 7EED 8CED 9AED | WORD | MS6135,MS6136,MS6137,MS6138,MS6139 |
| | F4F5 | A8ED B3ED | | |
| 10329 | F4F9 | CAED E7ED 05EE | WORD | MS6140,MS6141,MS6142,MS6143,MS6144 |
| | F4FF | 1DEE 35EE | | |
| 10330 | F503 | 3AEE 3FEE 49EE | WORD | MS6145,MS6146,MS6147,MS6148,MS6149 |
| | F509 | 5AEE 5FEE | | |
| 10331 | F50D | 64EE 69EE 82EE | WORD | MS6150,MS6151,MS6152,MS6153,MS6154 |
| | F513 | A2EE BEEE | | |
| 10332 | F517 | D8EE F4EE FCEE | WORD | MS6155,MS6156,MS6157,MS6158,MS6159 |
| | F51D | 04EF 11EF | | |
| 10333 | F521 | 20EF 2CEF 49EF | WORD | MS6160,MS6161,MS6162,MS6163,MS6164 |
| | F527 | 59EF 64EF | | |
| 10334 | F52B | 69EF 77EF 82EF | WORD | MS6165,MS6166,MS6167,MS6168,MS6169 |
| | F531 | 8CEF 9BEF | | |
| 10335 | F535 | A9EF C6EF E3EF | WORD | MS6170,MS6171,MS6172,MS6173,MS6174 |
| | F53B | 00F0 18F0 | | |
| 10336 | F53F | 39F0 59F0 69F0 | WORD | MS6175,MS6176,MS6177,MS6178,MS6179 |
| | F545 | 77F0 85F0 | | |
| 10337 | F549 | 96F0 B1F0 CEF0 | WORD | MS6180,MS6181,MS6182,MS6183,MS6184 |
| | F54F | E2F0 ECF0 | | |
| 10338 | F553 | FCF0 11F1 18F1 | WORD | MS6185,MS6186,MS6187,MS6188,MS6189 |
| | F559 | 25F1 32F1 | | |
| 10339 | F55D | 40F1 4EF1 66F1 | WORD | MS6190,MS6191,MS6192,MS6193,MS6194 |
| | F563 | 76F1 87F1 | | |
| 10340 | F567 | 95F1 A3F1 B2F1 | WORD | MS6195,MS6196,MS6197,MS6198,MS6199 |
| | F56D | C0F1 CFF1 | | |
| 10341 | F571 | E8F1 F6F1 03F2 | WORD | MS6200,MS6201,MS6202,MS6203,MS6204 |
| | F577 | 12F2 1EF2 | | |

```
10342  F57B  2FF2 3DF2 48F2        WORD    MS6205,MS6206,MS6207,MS6208,MS6209
       F581  58F2 67F2
10343  F585  77F2 82F2 A1F2        WORD    MS6210,MS6211,MS6212,MS6213,MS6214
       F58B  B1F2 BCF2
10344  F58F  DCF2 E8F2 F4F2        WORD    MS6215,MS6216,MS6217,MS6218,MS6219
       F595  00F3 0CF3
10345  F599  18F3 24F3 31F3        WORD    MS6220,MS6221,MS6222,MS6223,MS6224
       F59F  3EF3 48F3
10346  F5A3  59F3 6BF3 75F3        WORD    MS6225,MS6226,MS6227,MS6228,MS6229
       F5A9  84F3 A4F3
10347  F5AD  C3F3                  WORD    MS6230
10348
10349
10350                    SCROLLTBL:                ;groups of lines for scrolling
10351  F5AF  16B6 36B6 6DB6        WORD    SCROLL0,SCROLL1,SCROLL2,SCROLL3,SCROLL4
       F5B5  A6B6 DAB6
10352  F5B9  0CB7 47B7 84B7        WORD    SCROLL5,SCROLL6,SCROLL7,SCROLL8,SCROLL9
       F5BF  C7B7 26B8
10353  F5C3  7DB8 F2B8 50B9        WORD    SCROLL10,SCROLL11,SCROLL12,SCROLL13,SCROLL14
       F5C9  46BA 54BB
10354  F5CD  0ABC FEBC E3BD        WORD    SCROLL15,SCROLL16,SCROLL17,SCROLL18,SCROLL19
       F5D3  3BBE 96BE
10355  F5D7  0EBF 9ABF 14C0        WORD    SCROLL20,SCROLL21,SCROLL22,SCROLL23,SCROLL24
       F5DD  7FC0 39C1
10356  F5E1  96C1 0AC2 BDC2        WORD    SCROLL25,SCROLL26,SCROLL27,SCROLL28,SCROLL29
       F5E7  F9C2 F9C2
10357  F5EB  F9C2 54C3 95C3        WORD    SCROLL30,SCROLL31,SCROLL32,SCROLL33,SCROLL34
       F5F1  F6C3 52C4
10358  F5F5  A9C4 A0C5 34C6        WORD    SCROLL35,SCROLL36,SCROLL37,SCROLL38,SCROLL39
       F5FB  34C6 53C6
10359  F5FF  94C6 E9C6 48C7        WORD    SCROLL40,SCROLL41,SCROLL42,SCROLL43,SCROLL44
       F605  11C8 51C8
10360  F609  8EC8 8EC8 8EC8        WORD    SCROLL45,SCROLL46,SCROLL47,SCROLL48,SCROLL49
       F60F  8EC8 E0C8
10361  F613  1FC9 56C9 56C9        WORD    SCROLL50,SCROLL51,SCROLL52,SCROLL53,SCROLL54
       F619  8EC9 2DCA
10362  F61D  F0CA 30CB A6CB        WORD    SCROLL55,SCROLL56,SCROLL57,SCROLL58,SCROLL59
       F623  A6CB 52CC
10363  F627  A2CC DECC 46CD        WORD    SCROLL60,SCROLL61,SCROLL62,SCROLL63,SCROLL64
       F62D  9FCD 58CE
10364  F631  CFCE 3BCF 8ECF        WORD    SCROLL65,SCROLL66,SCROLL67,SCROLL68,SCROLL69
       F637  61D0 99D0
10365  F63B  CCD0 47D1 ABD1        WORD    SCROLL70,SCROLL71,SCROLL72,SCROLL73,SCROLL74
       F641  3FD2 7DD2
10366  F645  E7D2 70D3 70D3        WORD    SCROLL75,SCROLL76,SCROLL77,SCROLL78,SCROLL79
       F64B  06D4 65D4
10367  F64F  65D4 DDD4 03D5        WORD    SCROLL80,SCROLL81,SCROLL82,SCROLL83,SCROLL84
       F655  29D5 B0D5
10368  F659  FBD5 9BD6 DCD6        WORD    SCROLL85,SCROLL86,SCROLL87,SCROLL88,SCROLL89
       F65F  34D7 B0D7
10369  F663  26D8 DBD8 89D9        WORD    SCROLL90,SCROLL91,SCROLL92,SCROLL93,SCROLL94
       F669  C8D9 07DA
10370  F66D  A3DA 0ADB CFDB        WORD    SCROLL95,SCROLL96,SCROLL97,SCROLL98,SCROLL99
       F673  01DC BBDC
10371  F677  BBDC BRDC DBDC        WORD    SCROLL100,SCROLL101,SCROLL102,SCROLL103,SCROLL104
       F67D  66DD 66DD
10372  F681  66DD 66DD CFDD        WORD    SCROLL105,SCROLL106,SCROLL107,SCROLL108,SCROLL109
```

```
        F687    2BDE 68DE
10373   F68B    E5DE 7EDF E5DF          WORD    SCROLL110,SCROLL111,SCROLL112,SCROLL113,SCROLL114
        F691    46E0 53E1
10374   F695    A4E1 65E2 C9E2          WORD    SCROLL115,SCROLL116,SCROLL117,SCROLL118,SCROLL119
        F69B    C9E2 1CE3
10375   F69F    74E3 23E4 94E4          WORD    SCROLL120,SCROLL121,SCROLL122,SCROLL123,SCROLL124
        F6A5    08E5 7BE5
10376   F6A9    BAE5 51E6               WORD    SCROLL125,SCROLL126
10377
10378   F6AD                    SCROLLTBL1:
10379
10380                           MENUTBL:        ;mode mode+1 msg#,line 1 msg#,line2 help# jmp
10381
10382   F6AD    01 00 01 02 10          BYTE    1,$0,1,2,16
10383   F6B2    83AD                    WORD    NEXTLEVEL       ;SETUP
10384   F6B4    02 00 01 03 11          BYTE    2,$0,1,3,17
10385   F6B9    83AD                    WORD    NEXTLEVEL       ;RUN
10386   F6BB    03 00 01 04 15          BYTE    3,$0,1,4,21
10387   F6C0    B786                    WORD    IDLE_MODE       ;IDLE
10388   F6C2    04 00 01 05 16          BYTE    4,$0,1,5,22
10389   F6C7    83AD                    WORD    NEXTLEVEL       ;INFO
10390   F6C9    01 10 02 0E 10          BYTE    1,$10,2,14,16
10391   F6CE    83AD                    WORD    NEXTLEVEL       ;SETUP SCHED
10392   F6D0    01 20 02 0F 10          BYTE    1,$20,2,15,16
10393   F6D5    79AD                    WORD    NA              ;SETUP ALT SCHED
10394   F6D7    01 30 02 10 10          BYTE    1,$30,2,16,16
10395   F6DC    83AD                    WORD    NEXTLEVEL       ;SETUP SYSTEM
10396   F6DE    02 10 03 11 12          BYTE    2,$10,3,17,18
10397   F6E3    2E8D                    WORD    AUTO_MODE       ;AUTO RUN
10398   F6E5    02 20 03 12 13          BYTE    2,$20,3,18,19
10399   F6EA    248D                    WORD    SEMI_MODE       ;SEMI-AUTO RUN
10400   F6EC    02 30 03 13 14          BYTE    2,$30,3,19,20
10401   F6F1    83AD                    WORD    NEXTLEVEL       ;MANUAL RUN
10402   F6F3    04 10 05 14 43          BYTE    4,$10,5,20,67
10403   F6F8    79AD                    WORD    NA              ;DIRECTIONS
10404   F6FA    04 20 05 15 43          BYTE    4,$20,5,21,67
10405   F6FF    708B                    WORD    HIST            ;HISTORY
10406   F701    04 30 05 16 43          BYTE    4,$30,5,22,67
10407   F706    79AD                    WORD    NA              ;LOG RUN TOTALS
10408   F708    04 40 05 17 43          BYTE    4,$40,5,23,67
10409   F70D    79AD                    WORD    NA              ;SELF-TEST
10410   F70F    01 11 0E 28 60          BYTE    1,$11,14,40,96
10411   F714    7791                    WORD    VM0             ;Mini
10412   F716    01 12 0E 29 61          BYTE    1,$12,14,41,97
10413   F71B    7791                    WORD    VM0             ;Auto-split
10414   F71D    01 13 0E 2A 62          BYTE    1,$13,14,42,98
10415   F722    79AD                    WORD    NA              ;Ration
10416   F724    01 14 0E 2B 63          BYTE    1,$14,14,43,99
10417   F729    79AD                    WORD    NA              ;ISC
10418   F72B    01 15 0E 2C 64          BYTE    1,$15,14,44,100
10419   F730    79AD                    WORD    NA              ;One time
10420   F732    01 16 0E 2D 65          BYTE    1,$16,14,45,101
10421   F737    79AD                    WORD    NA              ;Special
10422   F739    01 17 0E 2E 66          BYTE    1,$17,14,46,102
10423   F73E    79AD                    WORD    NA              ;Failsafe
10424   F740    01 31 10 C2 27          BYTE    1,$31,16,194,39
10425   F745    8887                    WORD    SET_TIME        ;Set Time
```

```
10426  F747  01 32 10 BD 26       BYTE   1,$32,16,189,38
10427  F74C  0B8B                 WORD   SET_SITE         ;Set Site Info
10428  F74E  01 33 10 C3 6D       BYTE   1,$33,16,195,109
10429  F753  F78B                 WORD   WIRE_CHECKV      ;Wire Checking
10430  F755  01 34 10 C4 29       BYTE   1,$34,16,196,41
10431  F75A  6D89                 WORD   STATION_SETUP    ;Station Setup
10432  F75C  01 35 10 C5 2A       BYTE   1,$35,16,197,42
10433  F761  79AD                 WORD   NA               ;Sensor Setup
10434  F763  01 36 10 C6 2B       BYTE   1,$36,16,198,43
10435  F768  4E8B                 WORD   SET_CODES        ;Secret Codes
10436  F76A  02 31 13 09 14       BYTE   2,$31,19,9,20
10437  F76F  468E                 WORD   MMV              ;Manual Valves
10438  F771  02 32 13 0A 14       BYTE   2,$32,19,10,20
10439  F776  238F                 WORD   MMT              ;Manual Test Seq.
10440  F778  02 33 13 0B 14       BYTE   2,$33,19,11,20
10441  F77D  79AD                 WORD   NA               ;Manual Sensors
10442  F77F  FF                   BYTE   $FF              ;end of table
10443
10444  F780  00       DAYTBL:     BYTE   0                ;number of days in each month
10445  F781  1F                   BYTE   31               ;JAN
10446  F782  1C                   BYTE   28               ;FEB
10447  F783  1F                   BYTE   31               ;MAR
10448  F784  1E                   BYTE   30               ;APR
10449  F785  1F                   BYTE   31               ;MAY
10450  F786  1E                   BYTE   30               ;JUN
10451  F787  1F                   BYTE   31               ;JUL
10452  F788  1F                   BYTE   31               ;AUG
10453  F789  1E                   BYTE   30               ;SEP
10454  F78A  1F                   BYTE   31               ;OCT
10455  F78B  1E                   BYTE   30               ;NOV
10456  F78C  1F                   BYTE   31               ;DEC
10457
10458                 SSTBL:                              ;default system settings
10459  F78D  01 00 05 01 01       BYTE   1,0,5,1,1,00,31                        ;time
10460  F794  00 C0 C0 C0 C0       BYTE   0,$C0,$C0,$C0,$C0,$C0,$C0,$C0,$C0      ;VS
10461  F79D  00 00 00 00 00       BYTE   0,0,0,0,0,0,0,0,0                      ;sensor status
10462  F7A6  00 00 00 00 00       BYTE   0,0,0,0,0,0,0,0,0                      ;dry level
10463  F7AF  00 00 00 00 00       BYTE   0,0,0,0,0,0,0,0,0                      ;soak level
10464  F7B8  00                   BYTE   0                                      ;rain sensor
10465  F7B9  00 00 00 00 00       BYTE   0,0,0,0,0,0,0,0,0,0,0,0,0              ;codes
10466  F7C6  41 42 43 44 45       BYTE   'ABCDEF'                               ;controller ID
10467  F7CC  05 00 0A 00          BYTE   5,0,10,0                               ;emergency
10468  F7D0  00                   BYTE   0                ;default valve ID table
10469  F7D1  00                   BYTE   00000000B        ;valve 1, position 0, +
10470  F7D2  09                   BYTE   00001001B        ;valve 2, position 1, +
10471  F7D3  12                   BYTE   00010010B        ;valve 3, position 2, +
10472  F7D4  1B                   BYTE   00011011B        ;valve 4, position 3, +
10473  F7D5  24                   BYTE   00100100B        ;valve 5, position 4, +
10474  F7D6  2D                   BYTE   00101101B        ;valve 6, position 5, +
10475  F7D7  36                   BYTE   00110110B        ;valve 7, position 6, +
10476  F7D8  3F                   BYTE   00111111B        ;valve 8, position 7, +
10477  F7D9  00 00 00 00 00       BYTE   0,0,0,0,0,0,0,0,0                      ;sensor ID
10478  F7E2  01 01 01 01 01       BYTE   1,1,1,1,1,1,1,1,1                      ;terrain
10479  F7EB  01 01 01 01 01       BYTE   1,1,1,1,1,1,1,1,1                      ;sprinkler types
10480
10481                 RUNTBL:                             ;default RUN settings
10482  F7F4  00 00 00             BYTE   0,0,0            ;no setups yet
```

| | | | | | | |
|---|---|---|---|---|---|---|
| 10483 | F7F7 | 00 64 | | BYTE | 0,100 | ;no rain delay or global budget |
| 10484 | F7F9 | 00 64 64 64 64 | | BYTE | 0,100,100,100,100,100,100,100,100 | |
| 10485 | | | | | | |
| 10486 | | | SOURCEADDR: | | | ;start addresses of valve setups, etc |
| 10487 | F802 | 0000 | | WORD | 0 | |
| 10488 | F804 | 0089 | | WORD | SRC1 | ;Mini |
| 10489 | F806 | AC09 | | WORD | SRC2 | ;Auto-split |
| 10490 | F808 | 58BA | | WORD | SRC3 | ;Ration |
| 10491 | F80A | 040B | | WORD | SRC4 | ;ISC |
| 10492 | F80C | B0BB | | WORD | SRC5 | ;One-time |
| 10493 | F80E | 5C0C | | WORD | SRC6 | ;Special |
| 10494 | F810 | 0B0D | | WORD | SRC7 | ;Failsafe |
| 10495 | F812 | 0C0D | | WORD | SRC8 | ;ISC starts |
| 10496 | F814 | 0C11 | | WORD | SRC9 | ;Special starts |
| 10497 | F816 | 7602 | | WORD | SYSTEM_BLOCK | ;system settings |
| 10498 | F818 | FA02 | | WORD | RUN_BLOCK | ;run settings |
| 10499 | | | | | | |
| 10500 | | | OBJECTADDR: | | | ;start addresses object areas |
| 10501 | F81A | 4015 | | WORD | OBJBASE | |
| 10502 | F81C | 4015 | | WORD | OBJBASE | |
| 10503 | F81E | 4015 | | WORD | OBJBASE | |
| 10504 | F820 | 4015 | | WORD | OBJBASE | |
| 10505 | F822 | 4015 | | WORD | OBJBASE | |
| 10506 | F824 | 4015 | | WORD | OBJBASE | |
| 10507 | F826 | 0000 | | WORD | 0 | |
| 10508 | F828 | F115 | | WORD | STARTS | |
| 10509 | F82A | F115 | | WORD | STARTS | |
| 10510 | | | | | | |
| 10511 | | | SOURCELEN: | | | ;length of blocks |
| 10512 | F82C | 0000 | | WORD | 0 | |
| 10513 | F82E | AC00 | | WORD | 172 | |
| 10514 | F830 | AC00 | | WORD | 172 | |
| 10515 | F832 | AC00 | | WORD | 172 | |
| 10516 | F834 | AC00 | | WORD | 172 | |
| 10517 | F836 | AC00 | | WORD | 172 | |
| 10518 | F838 | AC00 | | WORD | 172 | |
| 10519 | F83A | 040B | | WORD | 4 | |
| 10520 | F83C | 0004 | | WORD | 1024 | |
| 10521 | F83E | 0004 | | WORD | 1024 | |
| 10522 | F840 | 8400 | | WORD | 132 | |
| 10523 | F842 | 2300 | | WORD | 35 | |
| 10524 | | | | | | |
| 10525 | F844 | 4D 54 57 54 46 | SDTBL: | BYTE | 'MTWTFSS' | |
| 10526 | | | | | | |
| 10527 | F84B | 20 4A 46 4D 41 | MONTBL: | BYTE | ' JFMAMJJASOND' | |
| 10528 | | | | | | |
| 10529 | | | CBTBL: | | | ;cycle byte specific days |
| 10530 | F858 | 80 | | BYTE | 10000000B | ;bit not used |
| 10531 | F859 | 40 | | BYTE | 01000000B | ;Mon |
| 10532 | F85A | 20 | | BYTE | 00100000B | ;Tue |
| 10533 | F85B | 10 | | BYTE | 00010000B | ;Wed |
| 10534 | F85C | 08 | | BYTE | 00001000B | ;Thur |
| 10535 | F85D | 04 | | BYTE | 00000100B | ;Fri |
| 10536 | F85E | 02 | | BYTE | 00000010B | ;Sat |
| 10537 | F85F | 01 | | BYTE | 00000001B | ;Sun |
| 10538 | | | | | | |
| 10539 | | | TYPETBL: | | | ;start type for set ups |

```
10540   F860  00                    BYTE    0
10541   F861  E0                    BYTE    11100000B        ;mini
10542   F862  E0                    BYTE    11100000B        ;normal
10543   F863  E0                    BYTE    11100000B        ;special
10544   F864  E0                    BYTE    11100000B        ;ration
10545   F865  01                    BYTE    00000001B        ;add-on soak
10546   F866  02                    BYTE    00000010B        ;add-on syringe
10547
10548                    LABELTBL:                           ;letter designations for source
10549   F867  46                    BYTE    'F'
10550   F868  4D                    BYTE    'M'
10551   F869  41                    BYTE    'A'
10552   F86A  52                    BYTE    'R'
10553   F86B  49                    BYTE    'I'
10554   F86C  4F                    BYTE    'O'
10555   F86D  53                    BYTE    'S'
10556
10557                    BITON:                              ;use OR to turn bit on
10558   F86E  01                    BYTE    00000001B        ;bit 0
10559   F86F  02                    BYTE    00000010B
10560   F870  04                    BYTE    00000100B
10561   F871  08                    BYTE    00001000B
10562   F872  10                    BYTE    00010000B
10563   F873  20                    BYTE    00100000B
10564   F874  40                    BYTE    01000000B
10565   F875  80                    BYTE    10000000B
10566
10567                    BITOFF:                             ;use AND to turn bit off
10568   F876  FE                    BYTE    11111110B        ;bit 0
10569   F877  FD                    BYTE    11111101B
10570   F878  FB                    BYTE    11111011B
10571   F879  F7                    BYTE    11110111B
10572   F87A  EF                    BYTE    11101111B
10573   F87B  DF                    BYTE    11011111B
10574   F87C  BF                    BYTE    10111111B
10575   F87D  7F                    BYTE    01111111B
10576
10577                                                        ;wait times are 25 per second
10578                    CMDRATE1:                           ;wait time before 1st auto key
10579   F87E  00 64 64 64  BYTE    0,100,100,100             ;slow, med, fast
10580
10581                    CMDRATE2:                           ;wait time between auto keys
10582   F882  00 64 32 12  BYTE    0,100,50,18
10583
10584                    CONTRAST_TBL:                       ;contrst for LCD
10585   F886  00 08 06 04 02  BYTE    0,8,6,4,2,0
10586
10587                    MINOFFTBL:                          ;minimum OFF times for terrain
10588   F88C  0F 0F 1E 1E 20  BYTE    15,15,30,30,45,45
10589
10590                    MAXONTBL:                           ;maximum ON times for sprinkler type,
10591   F892  03 03 06 03 03  BYTE    3,3,6,3,3,2            ;and terrain
10592   F898  05 05 09 05 05  BYTE    5,5,9,5,5,3
10593   F89E  08 08 10 08 08  BYTE    8,8,16,8,8,5
10594   F8A4  08 08 10 08 08  BYTE    8,8,16,8,8,5
10595   F8AA  08 08 10 08 08  BYTE    8,8,16,8,8,5
10596   F8B0  0A 0A 14 0A 0A  BYTE    10,10,20,10,10,7
```

```
10597  F8B6  1E 1E 3C 1E 1E        BYTE   30,30,60,30,30,30
10598
10599                       SOAKDURTBL:                          ;Soak durations for sprinkler type,
10600  F8BC  1500 1500 2400        WORD   21,21,36,36,48,32       ;and terrain
       F8C2  2400 3000 2000
10601  F8C8  2300 2300 3600        WORD   35,35,54,60,80,48
       F8CE  3C00 5000 3000
10602  F8D4  3800 3800 6000        WORD   56,56,96,96,128,80
       F8DA  6000 8000 5000
10603  F8E0  3800 3800 6000        WORD   56,56,96,96,128,80
       F8E6  6000 8000 5000
10604  F8EC  3800 3800 6000        WORD   56,56,96,96,128,80
       F8F2  6000 8000 5000
10605  F8F8  4600 4600 7800        WORD   70,70,120,120,160,112
       F8FE  7800 A000 7000
10606  F904  D200 D200 6801        WORD   210,210,360,360,480,480
       F90A  6801 E001 E001
10607
10608                              ;----------------------------------
10609                              ;    VECTORS
10610                              ;----------------------------------
10611
10612  FFFA                        ORG    0FFFAH
10613  FFFA  1586                  WORD   NMIINT
10614  FFFC  0000                  WORD   RESET
10615  FFFE  6384                  WORD   INTR
10616
10617
10618
10619
10620
10621
10622
10623
10624  0000                        END
```

Lines Assembled : 10624        Assembly Errors : 0

APPENDIX B

LISTING OF AUTOSCROLLED QUESTIONS FOR AN IRRIGATION CONTROLLER

```
;------------------------------------
;         SCROLLING MESSAGES
;------------------------------------

SCROLL0:    BYTE    1,30,'This feature is NOT AVAILABLE.'

SCROLL1:    BYTE    2,27,'Choose whether to exit the'
            BYTE        25,'Mode or do      it again.'

SCROLL2:    BYTE    2,32,'No watering      schedule set up.'
            BYTE        22,'Do SET SCHEDULES first.'

SCROLL3:    BYTE    2,25,'To start         watering,'
            BYTE        24,'Take POWER KEY  out now.'

SCROLL4:    BYTE    2,25,'This Set Up has an error.'
            BYTE        22,'Do SET SCHEDULES again.'

SCROLL5:    BYTE    2,28,'The SETUP type you selected'
            BYTE        28,'has not been    entered yet.'

; global message for new setup or modify CONFIRM screens

SCROLL6:    BYTE    2,32,'Press OK to      CONFIRM setting;'
            BYTE        26,'Press NO to     CHANGE it.'

; global message for HISTORY or SETTINGS review screens

SCROLL7:    BYTE    3,32,'Press OK to viewthe next screen,'
            BYTE        30,'or NO to jump tothe next group'
            BYTE        12,'of settings.'

; global message for all COPY TO NEXT VALVE screens

SCROLL8:    BYTE    3,32,'Press OK to use the SAME setting'
            BYTE        27,'for the next    station, or'
            BYTE        32,'press NO to set a different one.'

SCROLL10:   BYTE    3,24,'Welcome to the  SOLATROL'
            BYTE        27,'LEIT(TM) 8000   Controller.'
            BYTE        32,'Want Directions?(Press NO or OK)'

; Directions (Scroll10-Scroll23)

SCROLL9:    BYTE    4,24,'SOLATROL           welcomes'
            BYTE        29,'ENVIRONMENTAL   INDUSTRIES to'
            BYTE        27,'the LEIT(TM)8000Controller.'
            BYTE        32,'Want Directions?(Press OK or NO)'

SCROLL11:   BYTE    3,31,'This Controller uses and stores'
            BYTE        27,'light energy to run up to 8'
            BYTE        32,'SOLATROL         SUPERVALVES(TM).'
```

```
SCROLL12:   BYTE    8,31,'When the display asks a question'
            BYTE      30,'or blinks the    underline (_),'
            BYTE      32,'you press OK     to answer YES or'
            BYTE      30,'to accept the    current number'
            BYTE      31,'or you press NO to see the next'
            BYTE      23,'choice or        number.'
            BYTE      29,'Holding down the NO key causes'
            BYTE      31,'the numbers to   change rapidly.'

SCROLL13:   BYTE    9,32,'When you need to enter numbers or'
            BYTE      30,'select options   from a list of'
            BYTE      26,'choices, the     Controller'
            BYTE      29,'automatically    advances thru'
            BYTE      32,'the choices or   numbers for you.'
            BYTE      27,'Press OK when    the correct'
            BYTE      29,'choice or number is displayed.'
            BYTE      32,'Holding down the NO key makes the'
            BYTE      23,'display change   faster.'

SCROLL14:   BYTE    6,28,'You can press    the HELP key'
            BYTE      26,'to have the      Controller'
            BYTE      30,'explain the      question or to'
            BYTE      28,'get more         information.'
            BYTE      31,'The STOP key can be used to exit'
            BYTE      32,'from Help to the previous screen.'

SCROLL15:   BYTE    8,31,'There are 4 main options used in'
            BYTE      27,'setting up and   running the'
            BYTE      29,'Controller.      These options'
            BYTE      32,'are chosen from a self-advancing'
            BYTE      27,'list by pressing the OK key.'
            BYTE      31,'The STOP Key     always abandons'
            BYTE      32,'the current      screen & returns'
            BYTE      26,'you to the       beginning.'

SCROLL16:   BYTE    8,30,'ENTER SETUP      lets you enter'
            BYTE      25,'SCHEDULES or     ALTERNATE'
            BYTE      24,'SCHEDULES to     tell the'
            BYTE      26,'Controller when and how to'
            BYTE      27,'run each valve   or station.'
            BYTE      31,'ENTER SETUP also lets you set up'
            BYTE      29,'the SYSTEM to    fit your site'
            BYTE      28,'and specific     application.'

SCROLL17:   BYTE    3,28,'RUN STATIONS     lets you run'
            BYTE      31,'stations in 3    ways: AUTOMATIC'
            BYTE      25,'SEMI-AUTOMATIC, & MANUAL.'

SCROLL18:   BYTE    3,30,'AUTOMATIC RUN is the normal way'
            BYTE      27,'to turn valves   on & off as'
            BYTE      30,'scheduled in     Set SCHEDULES.'

SCROLL19:   BYTE    4,27,'SEMI-AUTO RUN    lets you do'
            BYTE      30,'an immediate One Time Soak or a'
            BYTE      28,'normal watering cycle before'
```

```
                BYTE    30,'reverting to     AUTOMATIC RUN.'

SCROLL20:       BYTE    5,29,'MANUAL RUN         allows you to'
                BYTE    30,'operate Valves   one at a time,'
                BYTE    30,'or in a defined TEST SEQUENCE,'
                BYTE    29,'and it lets you take Moisture'
                BYTE    16,'Sensor readings.'

SCROLL21:       BYTE    4,31,'NO WATERING willoccur if you OK'
                BYTE    30,'STAY IDLE/OFF.  The Controller'
                BYTE    28,'will keep all    your setups,'
                BYTE    28,'but none of themwill be run.'

SCROLL22:       BYTE    4,31,'VIEW INFO lets  you see HISTORY'
                BYTE    31,'events by date, see DIRECTIONS,'
                BYTE    30,'see RUN TOTALS, or do a system'
                BYTE    10,'SELF TEST.'

SCROLL23:       BYTE    6,31,'Before you can  BEGIN WATERING,'
                BYTE    29,'you need to       complete both'
                BYTE    30,'Setup SYSTEM &  Set SCHEDULES.'
                BYTE    29,'Then choose       RUN STATIONS,'
                BYTE    30,'then either     AUTOMATIC RUN,'
                BYTE    30,'SEMI-AUTO RUN,  or MANUAL RUN.'

; message for Self Test question

SCROLL24:       BYTE    3,29,'The SELF TEST    automatically'
                BYTE    29,'tests the wiringand tells you'
                BYTE    31,'the time, date, & current mode.'

SCROLL25:       BYTE    4,32,'Press STOP to    temporarily STOP'
                BYTE    24,'RUNNING your    watering'
                BYTE    26,'schedule, or    REMOVE the'
                BYTE    29,'POWER KEY to     keep running.'

; message for Secret Codes (only use if Secret Code set)

SCROLL26:       BYTE    6,31,'To change the   settings of the'
                BYTE    27,'Controller,      you need to'
                BYTE    30,'enter your       USER CODE now.'
                BYTE    29,'If you remove   the POWER KEY'
                BYTE    29,'now,  all         settings will'
                BYTE    26,'remain the same as before.'

SCROLL27:       BYTE    2,27,'Enter how long  to run each'
                BYTE    30,'station (from   1-30 minutes.)'

SCROLL28:

SCROLL29:
```

```
SCROLL30:   BYTE    3,30,'ENTER SETUP modelets you enter'
            BYTE    25,'SCHEDULES,      ALTERNATE'
            BYTE    32,'SCHEDULES, or   SYSTEM SETTINGS.'

SCROLL31:   BYTE    2,30,'Set SCHEDULES    lets you enter'
            BYTE    32,'various types ofwatering setups.'

SCROLL32:   BYTE    3,30,'Set ALT. SCHED. lets you enter'
            BYTE    31,'alternate        versions of the'
            BYTE    32,'various types ofwatering setups.'

SCROLL33:   BYTE    3,31,'Setup SYSTEM     lets you set up'
            BYTE    29,'the SYSTEM to    fit your site'
            BYTE    28,'and specific     application.'

SCROLL34:   BYTE    3,31,'There are no     wired stations.'
            BYTE    26,'Old ID will be   kept until'
            BYTE    26,'wires are        connected.'

SCROLL35:   BYTE    6,29,'Press OK to viewthe Site Info'
            BYTE    32,'(terrain, soil, & sprinker type)'
            BYTE    30,'entered for thisstation.  Site'
            BYTE    29,'Info is   used toautomatically'
            BYTE    30,'enter the best   split ON & OFF'
            BYTE    32,'times for your   site conditions.'

SCROLL36:   BYTE    5,32,'Press OK when    the correct type'
            BYTE    29,'of terrain and   soil for this'
            BYTE    27,'station is       shown, then'
            BYTE    32,'press OK when    the correct type'
            BYTE    22,'of sprinkler is shown.'

SCROLL37:   BYTE    2,32,'To change the    Site Info, go to'
            BYTE    29,'Set Site Info inSETUP SYSTEM.'

SCROLL38:   BYTE    3,30,'Site info MUST   first be used.'
            BYTE    32,'The calculated   numbers can then'
            BYTE    24,'be manually      changed.'

SCROLL39:   BYTE    2,31,'Set TIME/DATE    lets you see or'
            BYTE    31,'change the time & date setting.'

SCROLL40:   BYTE    3,30,'Do WIRE CHECK    lets you check'
            BYTE    29,'for shorted or   broken (open)'
            BYTE    22,'valve or sensor wires.'

SCROLL41:   BYTE    3,29,'Setup STATIONS   lets you View'
            BYTE    30,'Current Station IDs (numbers),'
            BYTE    32,'or Enter New IDsto change ID #s.'

;add to Scroll41 when add "Assign Types" function:

;           BYTE    25,'It also lets youdesignate'
;           BYTE    31,'station uses.    Stations can be'
```

```
;                BYTE    30,'used for REGULARvalves, MASTER'
;                BYTE    32,'valves, or for aSPECIAL use like'
;                BYTE    16,'lights or pumps.'

SCROLL42:        BYTE    7,29,'Setup SENSORS    lets you View'
                 BYTE    30,'Current Sensor   IDs (numbers),'
                 BYTE    32,'or Enter New IDsto change ID #s.'
                 BYTE    29,'It also lets youassign sensor'
                 BYTE    32,'positions to     different sensor'
                 BYTE    28,'types, such as   Moisture, or'
                 BYTE    13,'Rain Sensors.'

SCROLL43:        BYTE    2,30,'Set USER CODES   limits who may'
                 BYTE    31,'have access to   the Controller.'

SCROLL44:        BYTE    2,32,'Press OK to EXITthis task and go'
                 BYTE    26,'back to the      beginning.'

SCROLL45:

SCROLL46:

SCROLL47:        BYTE    3,28,'*ERROR*     Not enough time.'
                 BYTE    32,'Use more time    between syringes'
                 BYTE    26,'or shorten       durations.'

SCROLL48:        BYTE    3,31,'A MASTER VALVE  is a valve that'
                 BYTE    28,'is turned on     whenever any'
                 BYTE    19,'other valve is   on.'

SCROLL49:        BYTE    2,32,'The Controller   is asking if the'
                 BYTE    28,'settings shown   are correct.'

SCROLL50:        BYTE    2,25,'Press OK to see or change'
                 BYTE    27,'which stations  are active.'

SCROLL51:

SCROLL52:        BYTE    2,28,'The valve shown is presently'
                 BYTE    25,'set up to do NO WATERING.'

SCROLL53:        BYTE    5,31,'Enter when to    START WATERING.'
                 BYTE    31,'Use a Start Timeearly enough to'
                 BYTE    31,'finish before    midnight if you'
                 BYTE    29,'are using long   100% Watering'
                 BYTE    31,'Durations or     Excluded Times.'

SCROLL54:        BYTE    7,29,'Enter the TOTAL watering time'
                 BYTE    29,'per day for thisvalve.  Enter'
                 BYTE    28,'hours (h), then minutes (m).'
                 BYTE    29,'OK 0h to enter   minutes only.'
                 BYTE    32,'Entering a 100% Duration = 0h+0m'
                 BYTE    29,'lets you SKIP    watering with'
                 BYTE    11,'this valve.'
```

```
SCROLL55:   BYTE    2,29,'Enter HOW OFTEN to water from'
            BYTE      32,'1-90 days (every1 days = daily).'

SCROLL56:   BYTE    4,31,'"SO MANY" DAYS  waters at fixed'
            BYTE      26,'intervals from  1-90 days.'
            BYTE      30,'"SPECIFIC DAYS" waters only on'
            BYTE      26,'certain days    each week.'

SCROLL57:

SCROLL58:   BYTE    6,28,'The WATER BUDGETincreases or'
            BYTE      30,'decreases the   water applied.'
            BYTE      30,'A value of 100% waters exactly'
            BYTE      23,'according to theSet Up.'
            BYTE      31,'The water budgetdoes not affect'
            BYTE      23,'Soak & syringe  cycles.'

SCROLL59:   BYTE    3,25,'The display     shows the'
            BYTE      27,'currently activestation #s.'
            BYTE      24,'Press NO to makechanges.'

SCROLL60:   BYTE    2,28,'Press OK for    each station'
            BYTE      29,'that you want touse (ENABLE).'

SCROLL61:   BYTE    7,31,'Auto-splits     divide the 100%'
            BYTE      28,'watering time   into shorter'
            BYTE      29,'ON times to     reduce runoff'
            BYTE      28,'and erosion,    based on the'
            BYTE      26,'type of soil,   terrain, &'
            BYTE      28,'sprinklers for  each station'
            BYTE       9,'location.'

SCROLL62:   BYTE    3,28,'Choose whether  to turn this'
            BYTE      30,'station OFF/ON, go to the NEXT'
            BYTE      27,'station, or EXITManual Run.'

SCROLL63:   BYTE    6,29,'The top line    shows whether'
            BYTE      30,'stations are ON (number shown)'
            BYTE      31,'or OFF (-).     The bottom line'
            BYTE      31,'lets you Turn ONor Turn OFF the'
            BYTE      30,'indicated Sta #,go to the NEXT'
            BYTE      27,'station, or EXITmanual run.'

SCROLL64:   BYTE    4,26,'This HISTORY    event is a'
            BYTE      29,'valve start. Thedisplay shows'
            BYTE      29,'the valve #, thestart time, &'
            BYTE      30,'the actual      watering time.'

SCROLL65:   BYTE    4,26,'This HISTORY    event is a'
            BYTE      26,'time and date   stamp. All'
            BYTE      31,'events displayedafter the stamp'
            BYTE      20,'occurred on thatday.'
```

```
SCROLL66:   BYTE    3,32,'This HISTORY      event shows when'
            BYTE      32,'operating Modes  or the Power Key'
            BYTE      15,'have been used.'

SCROLL67:   BYTE    7,31,'See DIRECTIONS   shows operating'
            BYTE      27,'procedures;      See HISTORY'
            BYTE      27,'shows the last   128 events;'
            BYTE      29,'See RUN TOTALS   shows monthly'
            BYTE      26,'cumulative run   times; and'
            BYTE      31,'Do SELF TEST     shows the mode,'
            BYTE      32,'time &  date,    & wiring status.'

SCROLL68:   BYTE    2,28,'*ERROR* The 2nd time MUST be'
            BYTE      25,'LATER THAN the  1st time.'

SCROLL69:   BYTE    2,28,'NO WATERING      will be done'
            BYTE      20,'on the selected day.'

SCROLL70:   BYTE    4,31,'Select a number of days to WAIT'
            BYTE      32,'before watering with this valve.'
            BYTE      28,'Select 0 to      water at the'
            BYTE      27,'first allowable start time.'

SCROLL71:   BYTE    3,29,'*ERROR*          Set Up empty.'
            BYTE      32,'Use ENTER SETUP to Set SCHEDULE,'
            BYTE      32,'for the Set Up  you want to run.'

SCROLL72:   BYTE    5,29,'Press OK for     each week day'
            BYTE      30,'on which you    want to water.'
            BYTE      28,'If only one day is selected,'
            BYTE      28,'choose every    1wk (7 days)'
            BYTE      30,'up to every     9wk (63 days).'

SCROLL73:   BYTE    2,30,'HELP message is not available.'
            BYTE      29,'Refer to the    USERS MANUAL.'

SCROLL74:   BYTE    4,32,'*ERROR*          Too many starts.'
            BYTE      25,'The maximum      number is'
            BYTE      29,'128 per day, or an average of'
            BYTE      15,'16 per station.'

SCROLL75:   BYTE    5,29,'*ERROR*          Sequence runs'
            BYTE      30,'past midnight! Set an earlier'
            BYTE      29,'Start Time,     set a shorter'
            BYTE      30,'Excluded Time,  or use a lower'
            BYTE      13,'Water Budget.'
```

```
SCROLL76:

SCROLL77:   BYTE    6,30,'Press NO if you want to change'
            BYTE      29,'the split ON &  OFF times for'
            BYTE      32,'this valve.     Shorter ON times'
            BYTE      30,'give you more   repeat cycles.'
            BYTE      28,'The sum of all  the split ON'
            BYTE      31,'times equals thetotal duration.'

SCROLL78:   BYTE    3,30,'Set the MINIMUM time the valve'
            BYTE      31,'is OFF between  split ON times.'
            BYTE      30,'In most cases 30minutes is OK.'

SCROLL79:   -

SCROLL80:   BYTE    4,30,'EXCLUDED PERIOD is a time when'
            BYTE      27,'NO WATERING willoccur.  Any'
            BYTE      30,'unfinished ON   cycles will be'
            BYTE      28,'finished after  this period.'

SCROLL81:   BYTE    2,28,'Enter the START time for the'
            BYTE       7,'period.'

SCROLL82:   BYTE    2,28,'Enter the ENDINGtime for the'
            BYTE       7,'period.'

SCROLL83:   BYTE    5,28,'Choose whether  you want to:'
            BYTE      28,'REVIEW SETUP    (view only),'
            BYTE      32,'MODIFY SETUP   (change values),'
            BYTE      32,'DO NEW SETUP    (start over), or'
            BYTE       9,'EXIT NOW.'

SCROLL84:   BYTE    3,27,'Press OK to see the entered'
            BYTE      27,'durations, splitcycles, and'
            BYTE      27,'watering days   by station.'

SCROLL85:   BYTE    5,30,'SYRINGES are    short watering'
            BYTE      32,'cycles at fixed intervals during'
            BYTE      32,'a fixed period  every day during'
            BYTE      32,'active months.  Use syringes for'
            BYTE      31,'frost wipes, or summer cooling.'

SCROLL86:   BYTE    2,31,'Press OK for    each month that'
            BYTE      31,'you want to havedaily syringes.'

SCROLL87:   BYTE    3,32,'Enter the       syringe duration'
            BYTE      30,'in minutes (m)  per syringe ON'
            BYTE      22,'time for this   valve.'

SCROLL88:   BYTE    4,32,'A SYRINGE       DURATION = 0h+0m'
            BYTE      31,'has been enteredfor this valve.'
            BYTE      29,'That tells the  Controller to'
            BYTE      27,'NOT syringe withthis valve.'
```

```
SCROLL89:   BYTE    4,32,'Enter HOW OFTEN to syringe every'
            BYTE      29,'day during      active months'
            BYTE      27,'in hours (h) andminutes (m)'
            BYTE      25,'between syringe ON times.'

SCROLL90:   BYTE    6,31,'Press OK if you want to see the'
            BYTE      31,'ENDING TIME for the day, and/or'
            BYTE      30,'the sequential  START TIMES by'
            BYTE      30,'valve for each  regular, soak,'
            BYTE      29,'or syringe ON   time (if any)'
            BYTE      23,'for this Valve  Set Up.'

SCROLL91:   BYTE    6,30,'OK a BUDGET from10-200% to use'
            BYTE      31,'for viewing the daily schedule.'
            BYTE      30,'A budget of 100%waters exactly'
            BYTE      23,'according to theSet Up.'
            BYTE      26,'Soak and syringecycles are'
            BYTE      27,'NOT affected by the budget.'

SCROLL92:   BYTE    2,28,'You can review  the watering'
            BYTE      32,'schedule for ANYDAY of the week.'

SCROLL93:   BYTE    2,30,'Indicate which  week # of your'
            BYTE      30,'multiple week   setup to view.'

SCROLL94:   BYTE    5,29,'Indicate which  day # of your'
            BYTE      30,'multiple day    setup to view.'
            BYTE      29,'ALL active valvestations will'
            BYTE      32,'ALWAYS water on DAY #1 no matter'
            BYTE      30,'which day cycle you are using.'

SCROLL95:   BYTE    8,32,'Press OK for    each ON time, or'
            BYTE      28,'press NO to STOPthis review.'
            BYTE      31,'Each screen     shows the VALVE'
            BYTE      31,'NUMBER, the     CYCLE TYPE, the'
            BYTE      27,'current & total ON CYCLE #s'
            BYTE      30,'(ON # _ of _),  and the ACTUAL'
            BYTE      30,'DURATION and    START TIME for'
            BYTE      13,'this ON time.'

SCROLL96:   BYTE    3,29,'Use the MINI    Set Up if you'
            BYTE      26,'only need ONE   START TIME'
            BYTE      10,'per valve.'

SCROLL97:   BYTE    6,21,'The AUTOSPLIT   Setup'
            BYTE      28,'lets you SPLIT  the watering'
            BYTE      30,'durations into  shorter repeat'
            BYTE      31,'cycles. The     Controller then'
            BYTE      30,'AUTOMATICALLY   calculates all'
            BYTE      31,'the sequential  split ON times.'

SCROLL98:   BYTE    2,30,'Use the RATION  Setup to water'
            BYTE      25,'only on EVEN or ODD days.'
```

```
; ISC
SCROLL99:

; One-time
SCROLL100:

; Special
SCROLL101:  BYTE    1,30,'This feature is NOT AVAILABLE.'

SCROLL102:  BYTE    5,32,'Use FAILSAFE to enter a watering'
            BYTE      27,'schedule to be   used if the'
            BYTE      30,'Controller lens is covered for'
            BYTE      31,'prolonged         periods causing'
            BYTE      13,'a power loss.'

SCROLL103:

SCROLL104:

SCROLL105:  BYTE    3,27,'Press OK to see the SYRINGE'
            BYTE      28,'DURATIONS by    station, and'
            BYTE      21,'other syringe   info.'

SCROLL106:  BYTE    4,32,'Set Up ALREADY   EXISTS. You can'
            BYTE      31,'REVIEW the       current Set Up,'
            BYTE      30,'or ERASE it by   entering a new'
            BYTE       7,'Set Up.'

SCROLL107:  BYTE    3,30,'The ENDING TIME for the day is'
            BYTE      32,'the time when    the last ON time'
            BYTE      26,'for the day is  completed.'

SCROLL108:  BYTE    2,29,'SEMI-AUTO   with SPECIFIC DAYS'
            BYTE      29,'is NOT AVAILABLEat this time.'

; wire checking

SCROLL109:  BYTE    4,30,'The LEFT symbol on the display'
            BYTE      26,'shows the statusof the TOP'
            BYTE      32,'wire position    where "o" = OPEN'
            BYTE      32,'"v" = VALVE,    and "x" = SHORT.'

; assign station IDs

SCROLL110:  BYTE    5,27,'Press OK to see the current'
            BYTE      28,'Station ID #s.  The LEFTMOST'
            BYTE      31,'number shows thenumber assigned'
            BYTE      30,'to the TOP lightgrey connector'
            BYTE      31,'pair on the leftterminal strip.'
```

```
SCROLL111:  BYTE    4,30,'Press OK to      Enter new IDs.'
            BYTE      25,'This allows you to change'
            BYTE      32,'station #s       without changing'
            BYTE      11,'the wiring.'
SCROLL112:  BYTE    3,30,'If you do not    want to ID all'
            BYTE      32,'the stations nowwired, press NO,'
            BYTE      31,'& enter how manystations to ID.'

SCROLL113:  BYTE    9,31,'To ID station 1,go to the valve'
            BYTE      30,'station that youwant to be #1.'
            BYTE      32,'Unplug the wire connector on the'
          · BYTE      31,'valve pigtail,   wait 2 seconds,'
            BYTE      31,'then reconnect   the wires. The'
            BYTE      29,'Controller will  automatically'
            BYTE      29,'assign #1 to     this station.'
            BYTE      31,'Repeat this      process for all'
            BYTE      15,'wired stations.'

SCROLL114:  BYTE    3,24,'Press OK to      SAVE the'
            BYTE      28,'new valve numberassignments,'
            BYTE      25,'and ERASE the    old ones.'

SCROLL115:  BYTE    7,28,'*ERROR*  Shortedwire exists!'
            BYTE      29,'Before you can   assign ID #s,'
            BYTE      27,'you must repair all shorts.'
            BYTE      29,'Use built-in     WIRE CHECKING'
            BYTE      30,'to identify      shorted wires.'
            BYTE      26,'NEVER USE A      CONTINUITY'
            BYTE      16,'TESTER FOR THIS!'

;Automatic mode

SCROLL116:  BYTE    3,32,'Use this RAIN    DELAY to suspend'
            BYTE      32,'watering for     0-14 days before'
            BYTE      32,'your watering    schedule starts.'

SCROLL117:

SCROLL118:  BYTE    3,26,'Select which     previously'
            BYTE      24,'entered          schedule'
            BYTE      29,'you want to use for watering.'

SCROLL119:  BYTE    3,29,'If you REMOVE    the POWER KEY'
            BYTE      29,'now, watering    will begin on'
            BYTE      26,'the first day    scheduled.'
```

;Semi-Automatic

```
SCROLL120: BYTE    6,29,'If you REMOVE    the POWER KEY'
           BYTE      26,'now, watering    will begin'
           BYTE      25,'immediately, andwhen this'
           BYTE      27,'watering         sequence is'
           BYTE      31,'completed, the   Controller will'
           BYTE      30,'revert to        AUTOMATIC RUN.'
```

;Soak messages

```
SCROLL121: BYTE    8,31,'SOAK CYCLES let you do periodic'
           BYTE      31,'long watering    cycles for deep'
           BYTE      31,'watering trees   in lawns or for'
           BYTE      30,'leaching salts. Soak durations'
           BYTE      28,'are calculated   for you from'
           BYTE      30,'Site Info.  Soakcycles use the'
           BYTE      30,'same maximum ONs& minimum OFFs'
           BYTE      22,'as the Basic     Setup.'

SCROLL122: BYTE    3,25,'Enter the TOTAL SOAK TIME'
           BYTE      29,'per day for thisvalve.  Enter'
           BYTE      28,'hours (h), then minutes (m).'

SCROLL123: BYTE    4,23,'A SOAK DURATION = 0h+0m'
           BYTE      31,'has been enteredfor this valve.'
           BYTE      29,'That tells the  Controller to'
           BYTE      27,'NOT soak with    this valve.'

SCROLL124: BYTE    2,28,'Enter HOW OFTEN to soak from'
           BYTE      32,'1-90 days (every1 days = daily).'

SCROLL125: BYTE    5,29,'Press OK for     each week day'
           BYTE      30,'that you to use as a SOAK day.'
           BYTE      28,'If only one day is selected,'
           BYTE      28,'choose every     1wk (7 days)'
           BYTE      30,'up to every      9wk (63 days).'

SCROLL126: BYTE    3,32,'Press OK to see the entered SOAK'
           BYTE      32,'DURATIONS, splitcycles, and soak'
           BYTE      29,'day cycles for   each station.'
```

What is claimed is:

1. A manually operable interface to a machine comprising:

display means for displaying (i) multiplicity of control options that are organized in a hierarchical tree having a plurality of control options at least some of a plurality of hierarchical control levels between a root control level and a leaf control level, and (ii) a multiplicity of datums that are organized in a hierarchial tree having a plurality of datums upon at least some of a plurality of hierarchical data levels between a root data level and a leaf data level;

scrolling means for causing the display means to (i) sequentially display one control option at a time of the plurality of control options that are upon at least some of the plurality of hierarchal control levels in an endless loop, commencing at a hierarchical control level closest to the root control level, and, at other times, (ii) sequentially display one datum at a time of the plurality of datums that are upon a one hierarchal level in an endless loop, commencing at a hierarchical data level closest to the root data level;

a manually actuable switch operable to effect selection, adoption, and use of a currently displayed control option or datum, as the case may be;

said scrolling means responsive to actuation of said switch for (i) effecting display of each of a plurality of control options from another hierarchical control level having a selected relationship to said selected control option, and, at some control level for at least one selected control option, (ii) effecting display of each of a plurality of datums from another hierarchical data level having a selected relationship to said one selected control option, and, for at least one selected datum, (iii) effecting display of each of a plurality of datums from another hierarchical data level having a selected relationship to said selected datum, as the case may be;

wherein the totality of the control options, and the data options, that may be individually hierarchically selected permit both the substantially complete control, and the substantially complete parameterization with data, of the machine by manual actuations of but the single switch.

2. The interface according to claim 1, further comprising:

manually actuable advance means for causing the scrolling means to immediately effect display of another of said plurality of control options or said plurality of datums, as the case may be.

3. The interface according to claim 1, wherein:

said display means alternatively displays one of said multiplicity of control options and one of a multiplicity of messages associated therewith; said interface further comprising:

manually actuable help means;

means responsive to actuation of said help means for causing said display means to display, for a selected time, one of said multiplicity of messages associated with said currently displayed control option.

4. A manually operable interface to a machine, comprising:

display means for displaying each of a multiplicity of control options one at a time, and, at other times, each of a multiplicity of datums one at a time;

autoscrolling means for causing said display means to automatically and sequentially display each of the multiplicity of control options and each of the multiplicity of datums;

a manually actuable switch for selecting the currently displayed one of said multiplicity of control options or of datums, as the case may be, in response to manual actuation; and manually actuable advance means for causing the display means to immediately sequentially display a next one of said multiplicity of datums in response to manual actuation;

said autoscrolling means responsive to manual actuation of said single switch for (i) effecting automatic sequential display of each of a plurality of control options having a selected relationship to said selected control option, and, for at least one selected control option, (ii) effecting automatic sequential display of each of a plurality of datums having a selected relationship to said one selected control option, and, for at least one selected datum, (iii) effecting automatic sequential display of each of a plurality of datums having a selected relationship to said selected datum, as the case may be.

5. The interface according to claim 4 wherein said display means displays each of a multiplicity of control options organized in a hierarchy having a plurality of control options on each of a plurality of levels, and each of a multiplicity of datums organized in a hierarchy having a plurality of datums on each of a plurality of levels;

wherein said autoscrolling means causes said display means to automatically and sequentially display repetitively each of a plurality of control options from a single hierarchical level, or each of a plurality of datums from a single hierarchical level, as the case may be; and wherein said autoscrolling means responsive to said manual actuation of said single switch causes the display means to display control options from another hierarchical level, or datums from another hierarchical level, as the case may be.

6. The interface according to claim 4, wherein:

said display means alternatively displays one of said multiplicity of control options and one of a multiplicity of messages associated therewith; said interface further comprising:

manually actuable help means;

means responsive to actuation of said help means for causing the display means to display one of the multiplicity of messages associated with a currently displayed one of the control options for a selected time period, and for thereafter causing the display means to display said one control option.

7. A manually operable interface to a machine, comprising:

display means for alternatively displaying a selected one of a multiplicity of control options and a corresponding one of a multiplicity of messages associated with the selected one of said control options, and, at other times a selected one of a multiplicity of datums and a corresponding one of a multiplicity of messages associated with the selected one of said datums, the multiplicity of control options and the multiplicity of datums being, in aggregate, sufficient to both control and parameterize the operation of the machine;

autoscrolling means for causing the display means to display successive ones of the multiplicity of control options or of datums, as the case may be;

a manually actuable selection switch;

selection means responsive to actuation of said single selection switch for selecting the currently displayed one of said multiplicity of control options, or said multiplicity of datums, as the case may be, in order to control and also to parameterize the operation of the machine;

a manually actuable help switch; and help means responsive to actuation of said single help switch for causing said display means to display one of the multiplicity of messages associated with said one currently displayed control option, or said one currently displayed datum, as the case may be.

8. The interface according to claim 7, wherein:

the display means alternatively displays each of a multiplicity of datums in the form of a question, and each of the multiplicity of messages in the form of an explanation for the associated question, and the display means alternatively displays each of a multiplicity of control options in the form of a question, and each of the multiplicity of messages in the form of an explanation for the associated question.

9. The interface according to claim 7 wherein said display means displays each of the multiplicity of datums organized in a hierarchy having a plurality of datums upon each of the plurality of levels;

wherein said display means further displays each of the multiplicity of control options organized in a hierarchy having a plurality of control options upon each of the plurality of levels;

wherein said autoscrolling means causes said display means to sequentially display each of the control options, or the datums, as the case may be, for a selected hierarchical level repetitively; and wherein said selection means is responsive to actuation of said single selection switch to cause said display means to display each of a plurality of control options upon another hierarchical level from the selected control option, or each of a plurality of datums upon another hierarchical level from the selected datum, as the case may be.

10. The interface according to claim 7, further comprising:

a manually actuable advance switch;

advance means responsive to actuation of said single advance switch to effect display of the next one of said multiplicity of control options, or of datums, as the case may be, at the existing hierarchical level.

11. A man machine interface, comprising:

display means for displaying (i) each of a multiplicity of control options one at a time and, alternatively, each of a multiplicity of messages associated with the previously displayed control option, and, at other times, (ii) each of a multiplicity of datums one at a time and, alternatively, each of a multiplicity of messages associated with the previously displayed datum;

a manually actuable selection switch;

selection means responsive to actuation of said single selection switch for effecting selection and use of a currently displayed one of said multiplicity of control options or of datums, as the case may be;

a manually actuable advance switch;

advance means responsive to actuation of said single advance switch for effecting display by said display means of a next one of said multiplicity of control options, or of datums, as the case may be;

a manually actuable help switch; and help means responsive to actuation of said single help switch to effect display by said display means of one of said multiplicity of messages corresponding to the previously displayed one of said multiplicity of control options or of datums, and for subsequently displaying said control option or said datum after a selected time interval.

12. The interface according to claim 11, wherein:

each of said multiplicity of control options and each of said multiplicity of datums is in the form of a question; and each of said multiplicity of messages is associated with a corresponding one of said control options or one of said datums and includes an explanation thereof.

13. An interface to a machine for use by a man comprising:

display means for displaying a multiplicity of control options and a multiplicity of datums that are organized in a hierarchal trees having a plurality of control options or of datums, as the case may be, at each of a plurality of levels between a root level and leaf level;

autoscrolling means for causing the display means to automatically sequentially display one control option, or, at other times, one datum at a time of the plurality of control options and of datums that are each upon a one hierarchal level in an endless loop, commencing at root level;

an OK/YES switch actuable by a man for causing both (i) adoption and use by the machine of a currently displayed one of the multiplicity of control options, or of datums, as the case may be, and (ii) the display means to branch to displaying a plurality of control options or datums that are upon a next hierarchal level to the hierarchal level of a the currently-displayed one of the plurality of control options or of datums, as the case may be;

wherein the totality of the control options, and the datums, that may be individually hierarchically selected with but the single OK/YES switch permit both the control, and the parameterization with data, of the machine.

14. The interface according to claim 13 further comprising:

a NO/NEXT switch actuable by a man for causing the autoscrolling means to cause the display means to automatically advance in its one-at-a-time displaying of the plurality of control options or of datums, as the case may be, upon a one hierarchical level more rapidly, one to the next.

15. The interface according to claim 13 wherein the display means is further for displaying, at other times to the multiplicity of datums, a multiplicity of messages that are associated with the multiplicity of datums, this displaying of a multiplicity of messages also being one at a time; and wherein the interface further comprises:

HELP means actuable by a man to cause the display means to display a one of the multiplicity of messages that is associated with a currently-displayed one of the multiplicity of datums, after which the display means will return to redisplaying said currently-displayed one of the multiplicity of datums.

16. An interface to a machine for use by a man comprising:

display means for displaying a multiplicity of control options one at a time, and, at other times, a multiplicity of datums one at a time, the collective control options and datums being sufficient to completely control and parameterize the operation of the machine;

autoscrolling means for causing the display means to automatically sequentially advance in its one-at-a-time displaying of the multiplicity of control options or of datums, as the case may be;

an OK/YES switch actuable by a man for causing the machine to adopt and use a currently-displayed one of the multiplicity of control options or of datums, as the case may be; and a NO/NEXT switch actuable by a man for causing the autoscrolling means to cause the display means to automatically sequentially advance in the one-at-a-time displaying of the multiplicity of control options or the multiplicity of datums more rapidly, one control option or one datum to the next as the case may be.

17. The interface according to claim 19 wherein the display means is for displaying a multiplicity of datums organized in a hierarchy having a plurality of datums upon a plurality of levels;

wherein the autoscrolling means is for causing the display means to automatically advance in a one-at-a-time displaying of a plurality of datums that are upon a single hierarchical level in an endless loop; and wherein the OK/YES switch is further actuable by the man for causing the display means to progress to displaying a plurality of datums that are upon a next hierarchical level to the hierarchical level of the currently-displayed one of the plurality of datums.

18. The interface according to claim 16 wherein the display means is further for displaying, at other times to the multiplicity of datums, a multiplicity of messages that are associated with the multiplicity of datums, this displaying of a multiplicity of messages also being one at a time; and wherein the interface further comprises:

HELP means actuable by a man to cause the display means to display a one of the multiplicity of messages that is associated with a currently-displayed one of the multiplicity of datums, after which the display means will return to redisplay said currently-displayed one of the multiplicity of datums.

19. An interface to a machine for use by a man comprising:

display means for displaying a multiplicity of control options and datums one at a time, and at other times a multiplicity of messages that are associated with at least some of the multiplicity of control options and datums also one at a time;

scrolling means for causing the display means to advance in its one-at-a-time displaying of the multiplicity of control options and the multiplicity of datums to the displaying of an associated one of the multiplicity of messages, or from displaying a one of the multiplicity of messages back to redisplaying of an associated one of the multiplicity of control options or of datums, as the case may be;

an OK/YES means actuable by a man for causing the machine to adopt and use a currently-displayed one of the multiplicity of control options or of datums, as the case may be; and a HELP switch actuable by a man for causing the display means to display a one of the multiplicity of messages that is associated with a currently displayed one of the multiplicity of control options or of datums, as the case may be.

20. The interface according to claim 19 wherein the display means is for displaying a multiplicity of control options and of datums in the form of a multiplicity of questions, and at other times a multiplicity of messages each in the form of an explanation to an associated one of the multiplicity of questions.

21. The interface according to claim 19 wherein the display means is for displaying a multiplicity of control options and of datums organized in a hierarchy having a plurality of control options and of datums upon a plurality of levels;

wherein the autoscrolling means is for causing the display means to automatically advance in its one-at-a-time displaying among a plurality of control options and of datums that are upon a single hierarchal level in an endless loop; and wherein the OK/YES switch is further actuable by the man for causing the display means to progress to displaying a plurality of control options and of datums that are upon a next hierarchal level to the hierarchal level of the currently-displayed one of the plurality of control options and of datums.

22. The interface according to claim 19 further comprising:

a NO/NEXT switch actuable by a man for causing the autoscrolling means to cause the display means to automatically advance in its one-at-a-time displaying of the multiplicity of control options and of datums more rapidly, one control option and one datum to the next.

23. An interface to a machine for use by a man comprising:

display means for displaying a multiplicity of control options and datums one at a time, and at other times a multiplicity of messages that are associated with the multiplicity of control options and datums also one at a time;

an OK/YES switch actuable by a man to cause the machine to adopt and use a currently displayed one of the multiplicity of control options and datums;

a NO/NEXT switch actuable by a man to cause the display means to display a next one of the multiplicity of control options and datums; and a HELP switch actuable by a man to cause the display means to display a one of the multiplicity of messages that is associated with a currently-displayed one of the multiplicity of control options and datums, after the display of which the display means will return to redisplaying said currently-displayed one of the multiplicity of control options and datums.

24. The interface according to claim 23 wherein at least some of the multiplicity of control options and of datums are in the form of questions;

wherein the multiplicity of messages associated with the multiplicity of questions are in the form of a multiplicity of explanations of the associated questions.

25. A method of man-machine interfacing comprising:

organizing a base of control and data information transmissible from a man to a machine as a hierarchy that has a multiplicity of questions upon a plurality of levels between a first hierarchal level and a last hierarchal level;

automatically sequentially displaying at successive time successive ones of the questions, one at a time in an endless loop, that are upon a one hierarchal level, starting at the first hierarchal level;

first recognizing a man's positive response to, or affirmation and adoption of the premise of, a selected one question of the successive ones of the questions displayed one at a time in an endless loop, that are upon a one hierarchal level by act of the man's selective actuation of but one single switch;

advancing the displaying from one hierarchal level to the next, first level to last level, as the man's positive response selectively occurring by his actuation of the single switch in response to a selected one question upon each hierarchal level is first recognized; and collecting the first-recognized positive responses to the selective questions, one upon each hierarchal level, to serve as both, at different times, control and data information transmitted from the man to the machine solely by the man's selective actuations of but the single switch.

26. The method of man-machine interfacing according to claim 25 wherein the organizing of the base of information is as a hierarchal tree that has a multiplicity of questions between a first, root, level having questions dealing with control information and a last, leaf, level having questions dealing with data;

wherein each advancing of the displaying from one hierarchal level to the next is along that particular branch that is dictated by the selected one question to which the man's positive response is first recognized.

27. The method of man-machine interfacing according to claim 25 further comprising second recognizing a man's negative response to, or rejection and disavowal of the premise of, a one' question that is currently displayed; and reducing the display time latency of the automatically sequentially displaying of successive ones of the questions for all those ones of the questions for which the man's negative response is second recognized.

28. The method of man-machine interfacing according to claim 25 wherein the second recognizing comprises:

detecting a manual actuation of a switch.

29. A method query-response user programming of a machine with complex sequences of both control and data comprising:

organizing the complex sequences into a hierarchy of a multiplicity of questions, the hierarchy of questions consisting of a first plurality of questions dealing with machine control at a first, root, level, with at least some of these first plurality of questions having an associated second plurality of questions also dealing with machine control, with some ones of these second plurality of questions having an associated third plurality of questions dealing with data entry into the machine and so on, the complex sequences being entirely broken down into a hierarchal tree of questions ranging from questions dealing with machine control at the root level to questions dealing with data entry to the machine at the leaf level;

cyclically displaying each successive plurality, starting with the first, of questions to a human user/programmer, the user/programmer permissively adopting for each single question displayed one of the options of a.) doing nothing, in which case the cyclically displayed question will advance in a normal latency time to the next successive question in the same hierarchal plurality, and so on in an endless loop, b.) actuating a no switch meaning NO, that the premise or the article of the currently displayed question is not adopted, in which case the displayed question will immediately cycle to a next successive question within the same currently cyclically displayed plurality of questions without waiting for the expiration of the normal latency time; and c.) actuating on OK/YES switch meaning OK or YES, that the premise or article of the currently-displayed question is adopted, in which case IF the currently-displayed question is not of a leaf-level plurality of questions THEN progressing to a next associated plurality of questions and proceeding to the cyclically displaying of this plurality of questions ELSE IF the currently-displayed question is of a leaf level plurality of questions THEN returning to the cyclically displaying of the first plurality of questions.

30. The method according to claim 29 wherein during the cyclically displaying the human user/programmer has the further option of d.) selecting a STOP response, meaning exit or stop current action, that interrupts the currently cyclically displayed plurality of questions and returns to the cyclically displaying of the first plurality of questions.

31. The method according to claim 30 wherein during the cyclically displaying the human user/programmer has the further option of e.) selecting a HELP response, meaning help is requested, that will result in temporary display of a context sensitive help message explaining to the user/ programmer the responses that are being elicited by the currently cyclically displayed plurality of questions and how the user/programmer may evoke these responses.

32. The method according to claim 29 wherein continuously performing b.) selecting a NO response causes not only that the displayed question will immediately cycle to the next successive question but that, the b.) selecting a NO response being continued, the displayed question will cycle to still another successive question at the expiration of a reduced latency time, this faster cycling thereafter being continued until, and unless, the b.) selecting a NO response is ceased.

33. The method according to claim 29 wherein adoption of the user programmer of the displayed option c.) selecting a second response meaning OK/YES results in the further step comprising:

displaying a confirmation message to the user/programmer showing the particular question/response adopted by act of the user/programmer's c.) selecting an OK/YES response until the user/programmer adopts a one of the options of c1.) selecting again the OK/YES response, herein meaning that the currently displayed confirmation message is adopted, in which case IF further questions/responses of the same plurality of questions/responses remain unanswered and are potentially adoptable THEN returning to the display of successive further ones of the same plurality of questions/responses ELSE IF no further questions/responses of the same plurality of questions/responses remain unanswered and adoptable THEN returning to the cyclically displaying of the first plurality of questions/responses; and c2.) selecting the NO response, herein meaning that the currently displayed confirmation message is not adopted, in which case the displayed question/response will ultimately return to that question/response for which, when previously displayed, the programmer/user did adopt the option c.) selecting an OK/YES response.

34. The method according to claim 33 wherein the displaying is further of an identifiable indicia accompanying the particular question/response adopted by act of the programmer/user.

35. The method according to claim 34 wherein the displaying of a question mark.

36. A method of communicating control and data information from a man to a machine comprising:

organizing in the machine the information in a hierarchy having a plurality of control options at each of a plurality of control levels, and a plurality of datums at each of a plurality of data levels;

sequentially displaying with the machine a first plurality of control options upon a first one of the plurality of hierarchal control levels one at a time in an endless loop;

progressing in the sequentially displaying upon such times as an advance-in-hierarchy occurrence is recognized to a next hierarchal level, one hierarchal level per occurrence, from control level to control level to, ultimately, data level to data level so as to, ultimately, automatically sequentially display an nth plurality of datums upon an nth one of the plurality of hierarchal data levels.

recognizing in the machine on advance-in-hierarchy occurrence responsive to an actuation by a man of a single first switch during the time that some one selective one of the plurality of control options, or of datums, as the case may be, that are upon each hierarchal level are being displayed; and correlating each of the advance-in-hierarchy occurrences resultant from the man's actuations of the single first switch with each associated selective one of the plurality of control options, or of datums, as the case may be, to produce both control and data information usable by the machine.

37. The method according to claim 36 wherein the organizing of the control and the data information is in a hierarchal tree; and wherein the progressing is by branching to a related plurality of control options, or of datums, as the case may be, upon a next hierarchal level of the hierarchal tree.

38. The method according to claim 36 wherein the automatically sequentially displaying is, datum to datum, at a first rate;

wherein the recognizing is further of the actuation by a man of a single second switch during the time that some selective one or ones of the plurality of datums that are on each hierarchal data level are being displayed; and wherein the method for further comprises:

accelerating the automatically sequentially displaying to transpire at a second rate, faster than the first rate, doing the recognized actuation of the second switch.

39. The method according to claim 36 wherein the organizing of the data information is in a hierarchy of questions each directed to a one datum, a plurality of questions existing at each of a plurality of data levels.

40. A man-machine interface of a machine for the communication of information between a man and the machine, the machine's interface comprising:

information base means containing a multiplicity of questions organized in a plurality of hierarchal levels, which questions span the space of control and data information that is communicated between man and machine;

display means for displaying, at times, successive individual ones of the questions from the information base means under control of a sequencer means;

a first, OK/YES, switch permitting the man to indicate the affirmative to a one question on that is at any one time displayed by the display means; and sequencer means, receiving the affirmative indication from the first switch, for causing the display means to cycle, after a first latency time, in an endless loop between successive questions relevant to machine control that are upon a one hierarchal level UNTIL an affirmative indication to a one question is received THEN causing the display means to cycle in an endless loop between further successive questions again relevant to machine control that are corresponding to the one question for which the affirmation indication was received and that are upon a next hierarchal level containing questions relevant to data entry into the machine UNTIL another affirmative indication to one of the further successive questions relevant to data entry into the machine is received, and so on UNTIL an affirmative indication is received to a question again relevant to data entry into the machine at a lowest hierarchal level, at which time information that is respective of by the received affirmative indications to all questions has been communicated from the man to the machine;

wherein the affirmative indications to the questions have communicated both control and data information from the man to the machine by the man's actuations of but the single switch.

41. An apparatus permitting user programming of control and data information into a machine having a multiplicity of both control options and of datums in a plurality of categories by process of the asking of questions and the collection of responses, the apparatus comprising:

display means for the displaying, of successive times under control of a computer means, a hierarchy of questions proceeding in successive levels from root level global questions inquiring whether a specific one of alternative courses of control is adopted to leaf level specific questions inquiring whether a particular one of a multiplicity of datums is confirmed as an answer;

a first, OK/YES, switch responsive to a human user/programmer for permitting the user/programmer to indicate affirmative responses to global questions or to specific questions as each is displayed by the display means;

computer means, receiving the affirmations from the first switch, for automatically sequencing of a first latency time the display means through successive questions on each of the successive levels of the hierarchy of questions, each level being entered because of an affirmative response to an associated question at a higher level, until an affirmative response to a leaf level successive question provides a datum, at which time the automatic sequencing at the latency time of the display means through successive questions is resumed at some level, the affirmative responses to a hierarchy of these questions ultimately leading to another datum, and so on until a multiplicity of datums in a plurality of categories are provided all by the collection of affirmative responses to questions;

wherein a singular characteristic of the query-response user programming of datums so effected is that the computer means automatically sequences the display means at a latency time, as well as because of affirmative responses to questions.

42. In a machine having a user interface and operating in consideration of information supplied by the user across the interface, an improvement to the user interface comprising;
- display means for displaying at successive times under control of a computer means a hierarchy of questions one at time proceeding from root level questions directed to control options of the machine and asking whether an alternative branching within the hierarchy is confirmed and adopted to at least one leaf level specific question directed to entry of a datum into the machine and asking whether this particular datum is confirmed and adopted;
- a first, OK/YES, switch responsive to selective actuations by the user for selectively indicating affirmative responses to a control option question or a datum question as each is displayed by the display means;
- computer means, receiving the selective affirmative response indications from the first switch, for automatically sequencing at a first latency time the display means through successive questions in an endless loop at each level of the hierarchy of questions until, an affirmative response indication to a one question having been received, then causing automatic sequencing of the display means through successive questions in an endless loop at a next, branch, level of the hierarchy of questions, and so on until, an affirmative response to at least one leaf level specific question having been received, information represented by the cumulative user affirmative responses to selected ones of the questions has been effectively communicated from the user to the machine across the user interface, therein to communicate both selection amongst control options, and also data, from the user to the machine by act of the man's selective actuations of but the single OK/YES switch.

* * * * *